US012106100B2

(12) United States Patent
Valentine et al.

(10) Patent No.: US 12,106,100 B2
(45) Date of Patent: Oct. 1, 2024

(54) SYSTEMS, METHODS, AND APPARATUSES FOR MATRIX OPERATIONS

(71) Applicant: Intel Corporation, Santa Clara, CA (US)

(72) Inventors: Robert Valentine, Kiryat Tivon (IL); Mark J. Charney, Lexington, MA (US); Elmoustapha Ould-Ahmed-Vall, Chandler, AZ (US); Dan Baum, Haifa (IL); Zeev Sperber, Zichron Yackov (IL); Jesus Corbal, King City, OR (US); Bret L. Toll, Hillsboro, OR (US); Raanan Sade, Kibutz Sarid (IL); Igor Yanover, Yokneam Illit (IL); Yuri Gebil, Nahariya (IL); Rinat Rappoport, Haifa (IL); Stanislav Shwartsman, Haifa (IL); Menachem Adelman, Haifa (IL); Simon Rubanovich, Haifa (IL)

(73) Assignee: Intel Corporation, Santa Clara, CA (US)

(*) Notice: Subject to any disclaimer, the term of this patent is extended or adjusted under 35 U.S.C. 154(b) by 578 days.

(21) Appl. No.: 16/487,421

(22) PCT Filed: Jul. 1, 2017

(86) PCT No.: PCT/US2017/040546

§ 371 (c)(1),
(2) Date: Aug. 20, 2019

(87) PCT Pub. No.: WO2018/174935

PCT Pub. Date: Sep. 27, 2018

(65) Prior Publication Data

US 2020/0065352 A1 Feb. 27, 2020

Related U.S. Application Data

(60) Provisional application No. 62/473,732, filed on Mar. 20, 2017.

(51) Int. Cl.
*G06F 9/30* (2018.01)
*G06F 7/485* (2006.01)
(Continued)

(52) U.S. Cl.
CPC .......... *G06F 9/30036* (2013.01); *G06F 7/485* (2013.01); *G06F 7/4876* (2013.01);
(Continued)

(58) Field of Classification Search
CPC .... G06F 17/16; G06F 9/3001; G06F 9/30036; G06F 9/3893; G06F 7/5443; G06F 7/78;
(Continued)

(56) References Cited

U.S. PATENT DOCUMENTS 4,310,879 A 1/1982 Pandeya
5,025,407 A 6/1991 Gulley et al.
(Continued)

FOREIGN PATENT DOCUMENTS

CN 1707426 A 12/2005
CN 102081513 A 6/2011
(Continued)

OTHER PUBLICATIONS

Corrected Notice of Allowability, U.S. Appl. No. 16/474,483, Dec. 1, 2020, 2 pages.
(Continued)

*Primary Examiner* — Emily E Larocque
*Assistant Examiner* — Huy Duong
(74) *Attorney, Agent, or Firm* — NICHOLSON DE VOS WEBSTER & ELLIOTT LLP

(57) ABSTRACT

Embodiments detailed herein relate to matrix (tile) operations. For example, decode circuitry to decode an instruction having fields for an opcode and a memory address; and execution circuitry to execute the decoded instruction to set a tile configuration for the processor to utilize tiles in matrix
(Continued)

operations based on a description retrieved from the memory address, wherein a tile a set of 2-dimensional registers are discussed.

19 Claims, 100 Drawing Sheets

(51) Int. Cl.
*G06F 7/487* (2006.01)
*G06F 7/76* (2006.01)
*G06F 9/38* (2018.01)
*G06F 17/16* (2006.01)

(52) U.S. Cl.
CPC ........... *G06F 7/762* (2013.01); *G06F 9/3001* (2013.01); *G06F 9/30032* (2013.01); *G06F 9/30043* (2013.01); *G06F 9/30109* (2013.01); *G06F 9/30112* (2013.01); *G06F 9/30134* (2013.01); *G06F 9/30145* (2013.01); *G06F 9/30149* (2013.01); *G06F 9/3016* (2013.01); *G06F 9/30185* (2013.01); *G06F 9/30196* (2013.01); *G06F 9/3818* (2013.01); *G06F 9/3836* (2013.01); *G06F 17/16* (2013.01); *G06F 2212/454* (2013.01)

(58) Field of Classification Search
CPC .... G06F 7/485; G06F 7/4876; G06F 9/30032; G06F 9/3004; G06F 9/30043; G06F 9/30109; G06F 9/30112; G06F 9/30134; G06F 9/30145; G06F 9/30149; G06F 9/3016; G06F 9/30185; G06F 9/30196; G06F 9/3818; G06F 9/3836; G06F 9/3861; G06F 9/30038
See application file for complete search history.

(56) References Cited

U.S. PATENT DOCUMENTS 5,170,370 A 12/1992 Lee et al.
5,247,632 A 9/1993 Newman
5,426,378 A 6/1995 Ong
5,475,822 A 12/1995 Sibigtroth et al.
5,584,027 A 12/1996 Smith
5,682,544 A 10/1997 Pechanek et al.
5,761,466 A 6/1998 Chau
5,765,216 A 6/1998 Weng et al.
5,887,183 A 3/1999 Agarwal et al.
5,892,962 A 4/1999 Cloutier
6,018,799 A 1/2000 Wallace et al.
6,041,403 A 3/2000 Parker et al.
6,069,489 A 5/2000 Iwanczuk et al.
6,134,578 A 10/2000 Ehlig et al.
6,161,219 A 12/2000 Ramkumar et al.
6,212,112 B1 4/2001 Naura et al.
6,282,557 B1 8/2001 Dhong et al.
6,332,186 B1 12/2001 Elwood et al.
6,393,554 B1 5/2002 Oberman et al.
6,487,171 B1 11/2002 Honig et al.
6,487,524 B1 11/2002 Preuss
6,505,288 B1 1/2003 Jang et al.
6,643,765 B1 11/2003 Hansen et al.
6,647,484 B1 11/2003 Jiang et al.
6,831,654 B2 12/2004 Pether et al.
6,877,020 B1 4/2005 Bratt et al.
6,944,747 B2 9/2005 Nair et al.
7,003,542 B2 2/2006 Devir
7,016,418 B2 3/2006 Wang et al.
7,107,436 B2 9/2006 Moyer
7,209,939 B2 4/2007 Castrapel et al.
7,275,148 B2 9/2007 Moyer et al.
7,430,578 B2 9/2008 Debes et al.
7,506,134 B1 3/2009 Juffa et al.
7,610,466 B2 10/2009 Moyer
7,672,389 B2 3/2010 Gueguen
7,725,521 B2 5/2010 Chen et al.
7,792,895 B1 9/2010 Juffa et al.
7,873,812 B1 1/2011 Mimar
7,912,889 B1 3/2011 Juffa et al.
7,932,910 B2 4/2011 Hansen et al.
8,040,349 B1 10/2011 Danskin
8,051,124 B2 11/2011 Salama et al.
8,145,880 B1 3/2012 Cismas et al.
8,374,284 B2 2/2013 Watson
8,392,487 B1 3/2013 Mesh et al.
8,577,950 B2 11/2013 Eichenberger et al.
8,626,815 B1 1/2014 Langhammer
8,760,994 B2 6/2014 Wang et al.
8,817,033 B2 8/2014 Hur et al.
8,825,988 B2 9/2014 Rupley et al.
8,904,148 B2 12/2014 Claydon et al.
8,943,119 B2 1/2015 Hansen et al.
8,984,043 B2 3/2015 Ginzburg et al.
9,098,460 B2 8/2015 Yanagisawa
9,298,621 B2 3/2016 Li et al.
9,442,723 B2 9/2016 Yang et al.
9,519,947 B2 12/2016 Nickolls et al.
9,557,998 B2 1/2017 Ould-Ahmed-Vall et al.
9,703,708 B2 7/2017 Alameldeen et al.
9,906,359 B2 2/2018 Gueron
9,960,907 B2 5/2018 Gueron
9,996,350 B2 6/2018 Lee et al.
9,996,363 B2 6/2018 Cooksey et al.
10,073,815 B2 9/2018 Zhou
10,146,535 B2 12/2018 Corbal et al.
10,191,744 B2 1/2019 Plotnikov et al.
10,255,547 B2 4/2019 Woolley et al.
10,275,243 B2 4/2019 Grochowski et al.
10,535,114 B2 1/2020 Bolz
10,600,475 B2 3/2020 Yadavalli
10,620,951 B2 4/2020 Azizi et al.
10,649,772 B2 5/2020 Bradford et al.
10,664,287 B2 5/2020 Hughes et al.
10,719,323 B2 7/2020 Baum et al.
10,846,087 B2 11/2020 Plotnikov et al.
10,866,786 B2 12/2020 Sade et al.
10,877,756 B2 12/2020 Valentine et al.
10,896,043 B2 1/2021 Toll et al.
10,922,077 B2 2/2021 Espig et al.
10,942,985 B2 3/2021 Espig et al.
10,963,246 B2 3/2021 Heinecke et al.
10,963,256 B2 3/2021 Sade et al.
10,970,076 B2 4/2021 Ould-Ahmed-Vall et al.
10,990,396 B2 4/2021 Toll et al.
10,990,397 B2 4/2021 Gradstein et al.
11,016,731 B2 5/2021 Gradstein et al.
11,023,235 B2 6/2021 Sade et al.
11,023,382 B2 6/2021 Sade et al.
11,080,048 B2 8/2021 Adelman et al.
11,086,623 B2 8/2021 Valentine et al.
11,093,247 B2 8/2021 Sade et al.
11,138,291 B2 10/2021 Chadha et al.
11,163,565 B2 11/2021 Valentine et al.
11,175,891 B2 11/2021 Rubanovich et al.
11,200,055 B2 12/2021 Valentine et al.
2002/0032710 A1 3/2002 Saulsbury et al.
2003/0038547 A1 2/2003 Reinhardt et al.
2003/0126176 A1 7/2003 Devir
2003/0221089 A1 11/2003 Spracklen
2004/0010321 A1 1/2004 Morishita et al.
2004/0097856 A1 5/2004 Cipra et al.
2004/0111587 A1 6/2004 Nair et al.
2004/0133617 A1 7/2004 Chen et al.
2004/0228295 A1 11/2004 Zhang et al.
2005/0053012 A1 3/2005 Moyer
2005/0055534 A1 3/2005 Moyer
2005/0055535 A1 3/2005 Moyer et al.
2005/0055543 A1 3/2005 Moyer
2005/0094893 A1 5/2005 Samadani
2005/0193050 A1 9/2005 Sazegari
2005/0289208 A1 12/2005 Harrison et al.
2006/0095721 A1 5/2006 Biles et al.

(56) References Cited

U.S. PATENT DOCUMENTS

2006/0101245 A1 5/2006 Nair et al.
2006/0190517 A1 8/2006 Guerrero
2007/0006231 A1 1/2007 Wang et al.
2007/0126474 A1 6/2007 Chang et al.
2007/0156949 A1 7/2007 Rudelic et al.
2007/0186210 A1 8/2007 Hussain et al.
2007/0271325 A1 11/2007 Juffa et al.
2007/0280261 A1 12/2007 Szymanski
2008/0031545 A1 2/2008 Nowicki et al.
2008/0071851 A1 3/2008 Zohar et al.
2008/0091758 A1 4/2008 Hansen et al.
2008/0140994 A1 6/2008 Khailany et al.
2008/0162824 A1 7/2008 Jalowiecki et al.
2008/0208942 A1 8/2008 Won et al.
2008/0301414 A1 12/2008 Pitsianis et al.
2009/0006816 A1 1/2009 Hoyle et al.
2009/0043836 A1 2/2009 Dupaquis et al.
2009/0113170 A1 4/2009 Abdallah
2009/0172365 A1 7/2009 Orenstien et al.
2009/0177858 A1 7/2009 Gschwind et al.
2009/0196103 A1 8/2009 Kim
2009/0292758 A1 11/2009 Brokenshire et al.
2009/0300091 A1 12/2009 Brokenshire et al.
2009/0300249 A1 12/2009 Moyer et al.
2010/0106692 A1 4/2010 Moloney
2010/0180100 A1 7/2010 Lu et al.
2010/0199247 A1 8/2010 Huynh et al.
2010/0325187 A1 12/2010 Juffa et al.
2011/0040821 A1 2/2011 Eichenberger et al.
2011/0040822 A1 2/2011 Eichenberger et al.
2011/0072065 A1 3/2011 Mimar
2011/0153707 A1 6/2011 Ginzburg et al.
2012/0011348 A1 1/2012 Eichenberger et al.
2012/0079252 A1 3/2012 Sprangle
2012/0113133 A1 5/2012 Shpigelblat
2012/0137074 A1 5/2012 Kim et al.
2012/0144130 A1 6/2012 Fossum
2012/0254588 A1 10/2012 Adrian et al.
2012/0254592 A1 10/2012 San et al.
2012/0290608 A1 11/2012 Dantressangle et al.
2012/0314774 A1 12/2012 Yang et al.
2013/0016786 A1 1/2013 Segall
2013/0042093 A1 2/2013 Van et al.
2013/0076761 A1 3/2013 Ellis et al.
2013/0262548 A1 10/2013 Ge et al.
2013/0305020 A1 11/2013 Valentine et al.
2013/0339668 A1 12/2013 Ould-Ahmed-Vall et al.
2014/0006753 A1 1/2014 Gopal et al.
2014/0019713 A1 1/2014 Ould-Ahmed-Vall et al.
2014/0032876 A1 1/2014 Burkart et al.
2014/0052969 A1 2/2014 Corbal et al.
2014/0068230 A1 3/2014 Madduri et al.
2014/0149480 A1 5/2014 Catanzaro et al.
2014/0157287 A1 6/2014 Howes et al.
2014/0172937 A1 6/2014 Linderman et al.
2014/0195783 A1 7/2014 Karthikeyan et al.
2014/0281432 A1 9/2014 Anderson
2015/0052333 A1 2/2015 Hughes et al.
2015/0067302 A1 3/2015 Gueron
2015/0135195 A1 5/2015 Khare et al.
2015/0154024 A1 6/2015 Anderson et al.
2015/0199266 A1 7/2015 Franchetti et al.
2015/0234656 A1* 8/2015 Asano .................. G06F 9/3836 712/222
2015/0242267 A1 8/2015 Modarresi
2015/0339101 A1 11/2015 Dupont et al.
2015/0378734 A1 12/2015 Hansen et al.
2016/0011870 A1 1/2016 Plotnikov et al.
2016/0043737 A1 2/2016 Shinohara et al.
2016/0062947 A1 3/2016 Chetlur et al.
2016/0162402 A1 6/2016 Woolley et al.
2016/0165321 A1 6/2016 Denoual et al.
2016/0188337 A1 6/2016 Lee et al.
2016/0239706 A1 8/2016 Dijkman et al.
2016/0246619 A1 8/2016 Chang et al.
2017/0004089 A1* 1/2017 Clemons ............ G06F 12/0893
2017/0053375 A1 2/2017 Bolz
2017/0097824 A1 4/2017 Elmer et al.
2017/0220352 A1 8/2017 Woo et al.
2017/0337156 A1 11/2017 Yadavalli
2018/0004510 A1 1/2018 Grochowski et al.
2018/0004513 A1 1/2018 Plotnikov et al.
2018/0032477 A1* 2/2018 Gholaminejad .......... G06F 7/78
2018/0107630 A1 4/2018 Zhou et al.
2018/0113708 A1 4/2018 Corbal et al.
2018/0189227 A1 7/2018 Korthikanti et al.
2018/0246854 A1 8/2018 Kasagi
2018/0246855 A1 8/2018 Redfern et al.
2018/0321938 A1 11/2018 Boswell et al.
2019/0042202 A1 2/2019 Sade et al.
2019/0042235 A1 2/2019 Sade et al.
2019/0042248 A1 2/2019 Bradford et al.
2019/0042254 A1 2/2019 Sade et al.
2019/0042255 A1 2/2019 Sade et al.
2019/0042256 A1 2/2019 Sade et al.
2019/0042257 A1 2/2019 Baum et al.
2019/0042260 A1 2/2019 Ould-Ahmed-Vall et al.
2019/0042261 A1 2/2019 Hughes et al.
2019/0042448 A1 2/2019 Sade et al.
2019/0042540 A1 2/2019 Sade et al.
2019/0042541 A1 2/2019 Sade et al.
2019/0042542 A1 2/2019 Narayanamoorthy et al.
2019/0079768 A1 3/2019 Heinecke et al.
2019/0079903 A1 3/2019 Dreyer et al.
2019/0095399 A1 3/2019 Chadha et al.
2019/0102196 A1 4/2019 Sade et al.
2019/0121837 A1 4/2019 Azizi et al.
2019/0205137 A1 7/2019 Meadows et al.
2019/0303167 A1 10/2019 Hughes et al.
2019/0339972 A1 11/2019 Valentine et al.
2019/0347100 A1 11/2019 Valentine et al.
2019/0347310 A1 11/2019 Valentine et al.
2020/0026745 A1 1/2020 Pillai et al.
2020/0050452 A1 2/2020 Baum et al.
2020/0097291 A1 3/2020 Hughes et al.
2020/0104135 A1 4/2020 Toll et al.
2020/0117701 A1 4/2020 Ohno
2020/0201932 A1 6/2020 Gradstein et al.
2020/0210173 A1 7/2020 Ould-Ahmed-Vall et al.
2020/0210174 A1 7/2020 Espig et al.
2020/0210182 A1 7/2020 Hughes et al.
2020/0210188 A1 7/2020 Ould-Ahmed-Vall et al.
2020/0210516 A1 7/2020 Espig et al.
2020/0210517 A1 7/2020 Baum et al.
2020/0233665 A1 7/2020 Valentine et al.
2020/0233666 A1 7/2020 Valentine et al.
2020/0233667 A1 7/2020 Valentine et al.
2020/0241873 A1 7/2020 Valentine et al.
2020/0241877 A1 7/2020 Adelman et al.
2020/0249947 A1 8/2020 Valentine et al.
2020/0249949 A1 8/2020 Valentine et al.
2020/0310756 A1 10/2020 Rubanovich et al.
2020/0310757 A1 10/2020 Gradstein et al.
2020/0310793 A1 10/2020 Rubanovich et al.
2020/0310803 A1 10/2020 Gradstein et al.
2020/0348937 A1 11/2020 Baum et al.
2020/0387383 A1 12/2020 Hughes et al.
2020/0410038 A1 12/2020 Dasgupta et al.
2021/0089386 A1 3/2021 Conq et al.
2021/0096822 A1 4/2021 Sade et al.
2021/0132943 A1 5/2021 Valentine et al.
2021/0216315 A1 7/2021 Toll et al.
2021/0216323 A1 7/2021 Sade et al.
2021/0279038 A1 9/2021 Gradstein et al.
2021/0286620 A1 9/2021 Heinecke et al.
2021/0318874 A1 10/2021 Toll et al.
2021/0349720 A1 11/2021 Valentine et al.
2021/0405974 A1 12/2021 Adelman et al.
2021/0406012 A1 12/2021 Adelman et al.
2021/0406016 A1 12/2021 Hughes et al.
2021/0406018 A1 12/2021 Adelman et al.

(56) References Cited

U.S. PATENT DOCUMENTS

| | | | |
|---|---|---|---|
| 2022/0012305 | A1 | 1/2022 | Baum et al. |
| 2022/0019438 | A1 | 1/2022 | Sade et al. |

FOREIGN PATENT DOCUMENTS

| | | | |
|---|---|---|---|
| CN | 102360344 | A | 2/2012 |
| CN | 102411558 | A | 4/2012 |
| CN | 104011664 | A | 8/2014 |
| CN | 104126174 | A | 10/2014 |
| CN | 104137055 | A | 11/2014 |
| CN | 104969477 | A | 10/2015 |
| CN | 105117372 | A | 12/2015 |
| CN | 105302522 | A | 2/2016 |
| CN | 106445471 | A | 2/2017 |
| EP | 3547120 | A1 | 10/2019 |
| EP | 3646169 | A1 | 5/2020 |
| KR | 10-2011-0079495 | A | 7/2011 |
| WO | 2004/053841 | A2 | 6/2004 |
| WO | 2006/081094 | A2 | 8/2006 |
| WO | 2007/143278 | A2 | 12/2007 |
| WO | 2008/037975 | A2 | 4/2008 |
| WO | 2013/048369 | A1 | 4/2013 |
| WO | 2016/003740 | A1 | 1/2016 |
| WO | 2016/075158 | A1 | 5/2016 |
| WO | 2016/105727 | A1 | 6/2016 |
| WO | 2016/105841 | A1 | 6/2016 |
| WO | 2018/125250 | A1 | 7/2018 |
| WO | 2018/174927 | A1 | 9/2018 |
| WO | 2019/002811 | A1 | 1/2019 |

OTHER PUBLICATIONS

Non Final Office Action, U.S. Appl. No. 16/487,777, Oct. 27, 2020, 12 pages.
Non-Final Office Action, U.S. Appl. No. 16/487,747, Oct. 1, 2020, 13 pages.
Non-Final Office Action, U.S. Appl. No. 16/487,755, Nov. 24, 2020, 10 pages.
Non-Final Office Action, U.S. Appl. No. 16/487,774, Dec. 21, 2020, 13 pages.
Non-Final Office Action, U.S. Appl. No. 16/487,787, Oct. 1, 2020, 16 pages.
Non-Final Office Action, U.S. Appl. No. 16/624,178, Jan. 13, 2021, 12 pages.
Notice of Allowance, U.S. Appl. No. 16/474,483, Sep. 2, 2020, 9 pages.
Supplementary European Search Report and Search Opinion, EP App. No. 17901884.1, Dec. 14, 2020, 12 pages.
Yang et al., "Research and Design of Dedicated Instruction for Reconfigurable Matrix Multiplication of VLIW Processor", International Conference on Intelligent Networking and Collaborative Systems, 2016, 4 pages.
Exposing Memory Access Patterns to Improve Instruction and Memory Efficiency in GPUs by Neal C. Crago et al., ACM Transactions on Architecture and Code Optimization, vol. 15, No. 4, Article 45. Publication date: Oct. 2018. (Year: 2018).
'Brief Introduction to Vectors and Matrices' archived from unf.edu on Dec. 30, 2008. (Year: 2008).
'Incompatibilities with MATLAB in Variable-Size Support for Code Generation' by MathWorks, archive from 2015. (Year: 2015).
'Instruction Decoders and Combinatorial Circuits' from lateblt. tripod, archived from Nov. 2016. (Year: 2016).
'Zeroing one or more matrix rows or columns' from Stackoverflow, Apr. 2015. (Year: 2015).
Corrected Notice of Allowability, U.S. Appl. No. 15/201,442, Jan. 22, 2019, 5 pages.
Corrected Notice of Allowability, U.S. Appl. No. 15/201,442, Mar. 11, 2019, 2 pages.
International Preliminary Report on Patentability, PCT App. No. PCT/US2017/040536, Oct. 3, 2019, 10 pages.
International Preliminary Report on Patentability, PCT App. No. PCT/US2017/040537, Oct. 3, 2019, 10 pages.
International Preliminary Report on Patentability, PCT App. No. PCT/US2017/040538, Oct. 3, 2019, 10 pages.
International Preliminary Report on Patentability, PCT App. No. PCT/US2017/040539, Oct. 3, 2019, 11 pages.
International Preliminary Report on Patentability, PCT App. No. PCT/US2017/040540, Oct. 3, 2019, 9 pages.
International Preliminary Report on Patentability, PCT App. No. PCT/US2017/040541, Oct. 3, 2019, 10 pages.
International Preliminary Report on Patentability, PCT App. No. PCT/US2017/040543, Oct. 3, 2019, 11 pages.
International Preliminary Report on Patentability, PCT App. No. PCT/US2017/040544, Oct. 3, 2019, 11 pages.
International Preliminary Report on Patentability, PCT App. No. PCT/US2017/040545, Oct. 3, 2019, 10 pages.
International Preliminary Report on Patentability, PCT App. No. PCT/US2017/040546, Oct. 3, 2019, 10 pages.
International Preliminary Report on Patentability, PCT App. No. PCT/US2017/040547, Jan. 16, 2020, 12 pages.
International Preliminary Report on Patentability, PCT App. No. PCT/US2017/040548, Oct. 3, 2019, 10 pages.
International Search Report and Written Opinion, PCT App. No. PCT/US2017/040538, Jan. 9, 2018, 12 pages.
International Search Report and Written Opinion, PCT App. No. PCT/US2017/040539, Dec. 20, 2017, 12 pages.
International Search Report and Written Opinion, PCT App. No. PCT/US2017/040541, Dec. 20, 2017, 11 pages.
International Search Report and Written Opinion, PCT App. No. PCT/US2017/040543, Dec. 14, 2017, 15 pages.
International Search Report and Written Opinion, PCT App. No. PCT/US2017/040544, Dec. 14, 2017, 13 pages.
International Search Report and Written Opinion, PCT App. No. PCT/US2017/040545, Jan. 3, 2018, 11 pages.
International Search Report and Written Opinion, PCT App. No. PCT/US2017/040546, Jan. 24, 2018, 15 pages.
International Search Report and Written Opinion, PCT App. No. PCT/US2017/040547, Mar. 30, 2018, 15 pages.
International Search Report and Written Opinion, PCT App. No. PCT/US2017/040548, Dec. 20, 2017, 17 pages.
Lahr Dave, "Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.
Non-Final Office Action, U.S. Appl. No. 15/201,442, May 4, 2018, 11 pages.
Non-Final Office Action, U.S. Appl. No. 16/398,200, Jul. 28, 2020, 17 pages.
Non-Final Office Action, U.S. Appl. No. 16/487,766, Aug. 3, 2020, 13 pages.
Non-Final Office Action, U.S. Appl. No. 16/487,784, Aug. 3, 2020, 19 pages.
Notice of Allowance, U.S. Appl. No. 15/201,442, Dec. 14, 2018, 5 pages.
'CIS-77—The Instruction Cycle' from c-iump.com, 2016. (Year: 2016).
'Clear opcode in rpgle-go4as400.com' from Go4AS400, 2016. (Year: 2016).
'Spotlight On: the Fetchdecode Execute Cycle' by Will Fastiggi, 2016. (Year: 2016).
Final Office Action, U.S. Appl. No. 16/487,766, Mar. 19, 2021, 18 pages.
Final Office Action, U.S. Appl. No. 16/487,784, Mar. 16, 2021, 17 pages.
Non-Final Office Action, U.S. Appl. No. 16/486,960, Mar. 3, 2021, 10 pages.
Non-Final Office Action, U.S. Appl. No. 16/474,507, May 5, 2021, 6 pages.
Notice of Allowance, U.S. Appl. No. 16/487,755, Apr. 1, 2021, 9 pages.
Notice of Allowance, U.S. Appl. No. 16/487,777, Mar. 26, 2021, 7 pages.

(56) References Cited

OTHER PUBLICATIONS

Notice of Allowance, U.S. Appl. No. 16/487,787, Mar. 31, 2021, 10 pages.
Supplementary European Search Report and Search Opinion, EP App. No. 17901997.1, Feb. 25, 2021, 11 pages.
Final Office Action, U.S. Appl. No. 16/487,747, 05 11, 2021, 10 pages.
Notice of Allowance, U.S. Appl. No. 16/487,747, Nov. 29, 2021, 10 pages.
Notice of Allowance, U.S. Appl. No. 16/487,755, Dec. 1, 2021, 9 pages.
Notice of Allowance, U.S. Appl. No. 16/487,774, Nov. 2, 2021, 8 pages.
Notice of Allowance, U.S. App. No. 16/624, 178, Nov. 2, 2021, 8 pages.
'Hardware Acceleration of Matrix Multiplication on a Xilinx FPGA' by Nirav Dave et al., copyright 2007, IEEE. (Year: 2007).
'High-level opcodes' from unthought.net, 1999. (Year: 1999).
International Preliminary Reporton Patentability, PCT App. No. PCT/US2017/036038, Jan. 17, 2019, 14 pages.
Non-Final Office Action, U.S. Appl. No. 16/487,784, Jul. 26, 2021, 18 pages.
Notice of Allowance, U.S. Appl. No. 16/486,960, Jul. 7, 2021, 8 pages.
Notice of Allowance, U.S. Appl. No. 16/487,747, Aug. 11, 2021, 10 pages.
Notice of Allowance, U.S. Appl. No. 16/487,755, Jul. 21, 2021, 9 pages.
Notice of Allowance, U.S. Appl. No. 16/487,774, Jul. 13, 2021, 8 pages.
Notice of Allowance, U.S. Appl. No. 16/624,178, Jul. 23, 2021, 11 pages.
Non-Final Office Action, U.S. Appl. No. 16/474,475 , Feb. 17, 2022, 9 pages.
Notice of Allowance, U.S. Appl. No. 16/487,784, Feb. 9, 2022, 17 pages.
Non-Final Office Action, U.S. Appl. No. 16/487,766, Sep. 14, 2021, 18 pages.
Notice of Allowance, U.S. Appl. No. 16/474,507, Aug. 24, 2021.
International Search Report and Written Opinion for Applciation No. PCT/US2017/040537, Dec. 20, 2017, 11 pages.
International Search Report and Written Opinion for Application No. PCT/US2017/040534, Jan. 3, 2018, 11 pages.
International Search Report and Written Opinion for Application No. PCT/US2017/040536, Dec. 20, 2017, 13 pages.
International Search Report and Written Opinion for Application No. PCT/US2017/040540, Jan. 3, 2018, 14 pages.
'Addressing Modes—Chapter 5' by Dandamudi, 1998. (Year: 1998).
'Chapter 1—Brief Introduction to Vectors and Matrices' from the University of North Florida, archived at unf.edu on Dec. 8, 2017. (Year: 2017).
'Scalars and Vectors ( . . . and Matrices)' from Math Is Fun, copyright 2017. (Year: 2017).
European Search Report and Search Opinion, EP App. No. 22154164.2, Apr. 21, 2022, 13 pages.
Final Office Action, U.S. Appl. No. 16/487,766, Apr. 4, 2022, 22 pages.
Intention to Grant, EP App. No. 17901884.1, Feb. 24, 2022, 6 pages.
Intention to grant, EP App. No. 17901997.1, Apr. 26, 2022, 7 pages.
'Compute Unified Device Architecture Application Sustainability' by Hwu et al., 2009. (Year: 2009).
European Search Report and Search Opinion, EP App. No. 23161367.0, Jun. 22, 2023, 9 pages.
Non-Final Office Action, U.S. Appl. No. 17/548,214, Aug. 28, 2023, 6 pages.
Non-Final Office Action, U.S. Appl. No. 18/100,194, Aug. 8, 2023, 22 pages.
Notice of Allowance, U.S. Appl. No. 17/360,562, Aug. 18, 2023, 9 pages.
Notice of Allowance, U.S. Appl. No. 17/360,562, Sep. 1, 2023, 2 pages.
Notice of Allowance, U.S. Appl. No. 17/516,023, Aug. 15, 2023, 7 pages.
Decision to grant a European patent, EP App. No. 17901997.1, Sep. 1, 2022, 2 pages.
European Search Report and Search Opinion, EP App. No. 22196743.3, Jan. 19, 2023, 12 pages.
European Search Report and Search Opinion, EP App. No. 22196776.3, Jan. 24, 2023, 11 pages.
Final Office Action, U.S. Appl. No. 16/474,475, Nov. 25, 2022, 13 pages.
Final Office Action, U.S. Appl. No. 17/360,562, Mar. 6, 2023, 12 pages.
First Office Action, CN App. No. 201780086894.2, Dec. 28, 2022, 10 pages (3 pages of English Translation and 7 pages of Original Document).
First Office Action, CN App. No. 201780086978.6, Jan. 5, 2023, 9 pages of Original Document Only.
MathWorks, "How to set a range in a matrix to zero", MATLAB Answers—MATLAB Central, Nov. 2017, 3 pages.
Non-Final Office Action, U.S. Appl. No. 17/706,413, Feb. 28, 2023, 15 pages.
Non-Final Office Action, U.S. Appl. No. 17/833,643, Nov. 21, 2022, 18 pages.
Non-Final Office Action, U.S. Appl. No. 17/516,023, Nov. 10, 2022, 8 pages.
Notice of Allowance, U.S. Appl. No. 17/706,428, Mar. 15, 2023, 11 pages.
Notice of Allowance, U.S. Appl. No. 16/487,766, Sep. 23, 2022, 10 pages.
Final Office Action, U.S. Appl. No. 17/382,917, Apr. 27, 2023, 15 pages.
Final Office Action, U.S. Appl. No. 17/516,023, May 23, 2023, 7 pages.
Final Office Action, U.S. Appl. No. 17/833,643, May 31, 2023, 15 pages.
Hu, M., et al., "Dot-product engine for neuromorphic computing: programming 1T1M crossbar to accelerate matrix-vector multiplication", Proceedings of the 53rd Annual Design Automation Conference, Article No. 19, Jun. 5, 2016, 7 pages.
Non-Final Office Action, U.S. Appl. No. 16/474,475, May 25, 2023, 13 pages.
Non-Final Office Action, U.S. Appl. No. 17/548,214, May 18, 2023, 7 pages.
Non-Final Office Action, U.S. Appl. No. 17/587,637, Apr. 27, 2023, 15 pages.
Notice on Grant of Patent Right for Invention, CN App. No. 201780086894.2, Jun. 26, 2023, 6 pages (2 pages of English Translation and 4 pages of Original Document).
• Østergaard, Jakob. Automatic Parallelization. Aug. 9, 1999, https://unthought.net/TONS-1/main.html (Year: 1999).
Decision of Rejection, CN App. No. 201780086978.6, Feb. 1, 2024, 20 pages (07 pages of English Translation and 13 pages of Original Document).
European Search Report and Search Opinion, EP App. No. 23194771.4, Dec. 8, 2023, 9 pages.
Final Office Action, U.S. Appl. No. 16/474,475, Jan. 31, 2024, 13 pages.
Final Office Action, U.S. Appl. No. 17/587,637, Nov. 8, 2023, 13 pages.
Final Office Action, U.S. Appl. No. 18/100,194, Feb. 22, 2024, 25 pages.
First Office Action, CN App. No. 201780086978.6, Feb. 1, 2024, 20 pages (07 pages of English Translation and 13 pages of Original Document).
Non-Final Office Action, U.S. Appl. No. 17/382,917, Nov. 22, 2023, 15 pages.
Non-Final Office Action, U.S. Appl. No. 17/548,214, Apr. 3, 2024, 18 pages.
Notice of Allowance, U.S. Appl. No. 17/516,023, Apr. 25, 2024, 9 pages.

(56) References Cited

OTHER PUBLICATIONS

Notice of Allowance, U.S. Appl. No. 17/516,023, Jan. 5, 2024, 8 pages.
Notice of Allowance, U.S. Appl. No. 17/516,023, Jan. 22, 2024, 3 pages.
Notice of Allowance, U.S. Appl. No. 17/548,214, Dec. 18, 2023, 5 pages.
Notice of Allowance, U.S. Appl. No. 17/548,214, Dec. 26, 2023, 2 pages.
Notice of Allowance, U.S. Appl. No. 17/587,637, Mar. 6, 2024, 10 pages.
Notice of Allowance, U.S. Appl. No. 17/706,413, Apr. 3, 2024, 2 pages.
Notice of Allowance, U.S. Appl. No. 17/706,413, Sep. 13, 2023, 11 pages.
Office Action, CN App. No. 201780086978, Nov. 10, 2023, 22pages (11 pages of English Translation and 11 pages of Original Document).
Office Action, CN App. No. 201780088609.0, Nov. 27, 2023, 13 pages (5 pages of English Translation and 8 pages of Original Document).
Office Action, EP App. No. 22154164.2, Mar. 5, 2024, 4 pages.
Second Office Action, CN App. No. 201780086978, Aug. 10, 2023, 20 pages (09 pages of English Translation and 11 pages of Original Document).

* cited by examiner

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|---|---|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|---|---|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

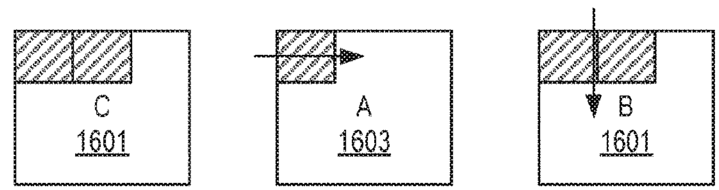

```
TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE
```

FIG. 16

```
// FORMAT OF MEMORY PAYLOAD. EACH FIELD IS ABYTE
// 0: PALETTE_ID
// 1-7: RESERVED (MUST BE ZERO)
// 8-9: STARTM(16B)
// 10-11: STARTK(16B)
// 12-15: RESERVED, (MUST BE ZERO)
// 16-17: TILE0ROWSTILE0COLS
// 18-19: TILE1ROWSTILE1COLS
// 20-21: TILE2ROWSTILE2COLS
// ...
// 46-47: TILE15ROWS TILE15COLS
// 48-63: 16B RESERVED, (MUST BE ZERO)
TILECONFIG MEM
PALETTE_ID := MEM.BYTE[0]
#GP IF PALETTE_ID IS AN UNSUPPORTED PALETTE // FROM CPUID
#GP IF MEM.BYTE[1..7 ISNONZERO
STARTM := MEM.WORD[4] // BYTES 8..9
STARTK := MEM.WORD[5] // BYTES 10..11
#GP IF MEM.BYTE[12..15] ISNONZERO

MAX_NAMES := IMPL.MAX_TILE_BYTES /PALETTE_TABLE[I].TILE_BYTES
MAX_NUM_ROWS := PALETTE_TABLE[PALETTE_ID].TILE_BYTES/
PALETTE_TABLE[PALETTE_ID].BYTES_PER_ROW
P := 16
FOR N IN 0 ...MAX_NAMES-1:
T[N].ROWS :=MEM.BYTE[P++]
T[N].COLS :=MEM.BYTE[P++]
#GP IF T[N].ROWS ==0
#GP IF T[N].COLS ==0
#GP IF T[N].ROWS >MAX_NUM_ROWS
// ALL INSTRUCTIONS CHECK COLUMNS LIMITS BASED ON THEIR ELEMENT
// WIDTHS SO WE DO NOT ENFORCE COLUMN WITH RESTRICTION HERE.

WHILE P < 64: // CONFIRM REST OF BYTES IN 64B CHUNK ARE ZERO
#GP IF MEM.BYTE[P] !=0
P := P +1
FOR N IN 0 ...MAX_NAMES-1:
TILEZERO TILE[N]
TILES_CONFIGURED := 1
```

FIG. 23

```
TILELOADQ TDEST, TSIB
 #GP IF TILES_CONFIGURED ==0
 #GP IF TDEST.COLS * 8 > PALETTE_TABLE[PALETTE_ID].BYTES_PER_ROW
 STARTM := TILECONFIG.STARTM
 #GP IF START >=TDEST.ROWS
 IF START == 0: // NOT RESTARTING, ZERO INCOMINGSTATE
 TILEZERO TDEST
 MEMBEGIN := TSIB.BASE +DISPLACEMENT
 STRIDE := TSIB.INDEX <<TSIB.SCALE
 NBYTES := TDEST.COLS *8
 WHILE START < TDEST.ROWS:
 MEMPTR := MEMBEGIN + START *STRIDE
 WRITE_ROW_AND_ZERO(TDEST,
 START,
 READ_MEMORY(MEMPTR, NBYTES),
 NBYTES)
 START := START +1
 ZERO_UPPER_ROWS(TDEST, TDEST.ROWS)
 ZERO_TILECONFIG_START()
// IN THE CASE OF A MEMORY FAULT IN THE MIDDLE OF AN INSTRUCTION
//TILECONFIG.STARTM := START
```

FIG. 27(A)

```
TILELOADW TDEST, TSIB
 #GP IF TILES_CONFIGURED ==0
 #GP IF TDEST.COLS * 2 > PALETTE_TABLE[PALETTE_ID].BYTES_PER_ROW
 STARTM := TILECONFIG.STARTM
 #GP IF START >=TDEST.ROWS
 IF START == 0: // NOT RESTARTING, ZERO INCOMINGSTATE
 TILEZERO TDEST
 MEMBEGIN := TSIB.BASE +DISPLACEMENT
 STRIDE := TSIB.INDEX <<TSIB.SCALE
 NBYTES := TDEST.COLS *2
 WHILE START < TDEST.ROWS:
 MEMPTR := MEMBEGIN + START *STRIDE
 WRITE_ROW_AND_ZERO(TDEST,
 START,
 READ_MEMORY(MEMPTR, NBYTES),
 NBYTES)
 START := START +1
 ZERO_UPPER_ROWS(TDEST, TDEST.ROWS)
 ZERO_TILECONFIG_START()
// IN THE CASE OF A MEMORY FAULT IN THE MIDDLE OF AN INSTRUCTION
//TILECONFIG.STARTM := START
```

FIG. 27(B)

```
TILELOADD TDEST, TSIB

 #GP IF TILES_CONFIGURED ==0
 #GP IF TDEST.COLS * 4 > PALETTE_TABLE[PALETTE_ID].BYTES_PER_ROW
 STARTM := TILECONFIG.STARTM
 #GP IF START >=TDEST.ROWS
 IF START == 0: // NOT RESTARTING, ZERO INCOMINGSTATE
 TILEZERO TDEST
 MEMBEGIN := TSIB.BASE +DISPLACEMENT
 STRIDE := TSIB.INDEX <<TSIB.SCALE
 NBYTES := TDEST.COLS *4
 WHILE START < TDEST.ROWS:
 MEMPTR := MEMBEGIN + START *STRIDE
 WRITE_ROW_AND_ZERO(TDEST,
 START,
 READ_MEMORY(MEMPTR, NBYTES),
 NBYTES)
 START := START +1
 ZERO_UPPER_ROWS(TDEST, TDEST.ROWS)
 ZERO_TILECONFIG_START()
// IN THE CASE OF A MEMORY FAULT IN THE MIDDLE OF AN INSTRUCTION
//TILECONFIG.STARTM := START
```

FIG. 27(C)

```
TILESTORED TSIB, TSRC

#GP IF TILES_CONFIGURED == 0
#GP IF TSRC.COLS * 4 > PALETTE_TABLE[PALETTE_ID].BYTES_PER_ROW
START := TILECONFIG.STARTM
#GP IF START >= TDEST.ROWS

MEMBEGIN := TSIB.BASE + DISPLACEMENT
STRIDE := TSIB.INDEX << TSIB.SCALE

WHILE START < TDEST.ROWS:
MEMPTR := MEMBEGIN + START * STRIDE
WRITE_MEMORY(MEMPTR, 4*TDEST.COLS, TSRC.ROW[START])
START := START + 1
ZERO_TILECONFIG_START()
// IN THE CASE OF A MEMORY FAULT IN THE MIDDLE OF AN INSTRUCTION, THE
// TILECONFIG.STARTM := START
```

FIG. 31(A)

```
TILESTOREQ TSIB, TSRC

#GP IF TILES_CONFIGURED == 0
#GP IF TSRC.COLS * 8 > PALETTE_TABLE[PALETTE_ID].BYTES_PER_ROW
START := TILECONFIG.STARTM
#GP IF START >= TDEST.ROWS

MEMBEGIN := TSIB.BASE + DISPLACEMENT
STRIDE := TSIB.INDEX << TSIB.SCALE

WHILE START < TDEST.ROWS:
MEMPTR := MEMBEGIN + START * STRIDE
WRITE_MEMORY(MEMPTR, 8*TDEST.COLS, TSRC.ROW[START])
START := START + 1
ZERO_TILECONFIG_START()
// IN THE CASE OF A MEMORY FAULT IN THE MIDDLE OF AN INSTRUCTION, THE
// TILECONFIG.STARTM := START
```

FIG. 31(B)

```
TILESTOREW TSIB, TSRC

#GP IF TILES_CONFIGURED == 0
#GP IF TSRC.COLS * 2 > PALETTE_TABLE[PALETTE_ID].BYTES_PER_ROW
START := TILECONFIG.STARTM
#GP IF START >= TDEST.ROWS

MEMBEGIN := TSIB.BASE + DISPLACEMENT
STRIDE := TSIB.INDEX << TSIB.SCALE

WHILE START < TDEST.ROWS:
MEMPTR := MEMBEGIN + START * STRIDE
WRITE_MEMORY(MEMPTR, 2*TDEST.COLS, TSRC.ROW[START])
START := START + 1
ZERO_TILECONFIG_START()
// IN THE CASE OF A MEMORY FAULT IN THE MIDDLE OF AN INSTRUCTION, THE
// TILECONFIG.STARTM := START
```

FIG. 31(C)

```
3502
TILEDIAGONALD TDEST,   SRC
#GP IF TILES_CONFIGURED == 0
#GP IF TDEST.NUM_BYTES_PER_ELEMENT != 4
#GP IF TDEST.NUM_BYTES_PER_ELEMENT != SRC.NUM_BYTES

LOOP_ITERATIONS = MIN(TDEST.NUM_ROWS, TDEST.NUM_COLUMNS)

FOR X IN 0...LOOP_ITERATIONS-1:
        TDEST[X]X] ← SRC.
        ZERO_UNUSED_ELEMENTS (TDEST)
```

```
3504
TILEDIAGONALW TDEST,   SRC
#GP IF TILES_CONFIGURED == 0
#GP IF TDEST.NUM_BYTES_PER_ELEMENT != 2
#GP IF TDEST.NUM_BYTES_PER_ELEMENT != SRC.NUM_BYTES

LOOP_ITERATIONS = MIN(TDEST.NUM_ROWS, TDEST.NUM_COLUMNS)

FOR X IN 0...LOOP_ITERATIONS-1:
        TDEST[X]X] ← SRC.
        ZERO_UNUSED_ELEMENTS (TDEST)
```

```
TILETRANSPOSED TDEST, TSRC
#GP IF TILES_CONFIGURED == 0
#GP IF TSRC.COLS != TDEST.ROWS
#GP IF TDEST.COLS * 4 > PALETTE_TABLE[PALETTE_ID].BYTES_PER_ROW

FOR I IN 0...TDEST.ROWS-1:
FOR J IN 0..TDEST.COLS-1:
TMP.DWORD[J] := TSRC.ROW[J].DWORD[I]
WRITE_ROW_AND_ZERO(TDEST, I, TMP, 4 * TDEST.COLS)
ZERO_UPPER_ROWS(TDEST, TDEST.ROWS)
```

3904

```
TILETRANSPOSEW TDEST, TSRC
#GP IF TILES_CONFIGURED == 0
#GP IF TSRC.COLS != TDEST.ROWS
#GP IF TDEST.COLS * 2 > PALETTE_TABLE[PALETTE_ID].BYTES_PER_ROW

FOR I IN 0...TDEST.ROWS-1:
FOR J IN 0..TDEST.COLS-1:
TMP.DWORD[J] := TSRC.ROW[J].DWORD[I]
WRITE_ROW_AND_ZERO(TDEST, I, TMP, 2 * TDEST.COLS)
ZERO_UPPER_ROWS(TDEST, TDEST.ROWS)
```

FIG. 39

```
TILEMOVED TDEST, TSRC

 #GP IF TILES_CONFIGURED == 0
 #GP IF TSRC.COLS != TDEST.COLS
 #GP IF TSRC.ROWS != TDEST.ROWS
 #GP IF TDEST.COLS * 4 >
PALETTE_TABLE[PALETTE_ID].BYTES_PER_ROW

 FOR I IN 0..TDEST.ROWS-1:
 WRITE_ROW_AND_ZERO(TDEST, I, TSRC.ROW[I], 4 * TDEST.COLS)
 ZERO_UPPER_ROWS(TDEST, TDEST.ROWS)


TILEMOVEW TDEST, TSRC

 #GP IF TILES_CONFIGURED == 0
 #GP IF TSRC.COLS != TDEST.COLS
 #GP IF TSRC.ROWS != TDEST.ROWS
 #GP IF TDEST.COLS * 2 >
PALETTE_TABLE[PALETTE_ID].BYTES_PER_ROW

 FOR I IN 0..TDEST.ROWS-1:
 WRITE_ROW_AND_ZERO(TDEST, I, TSRC.ROW[I], 2 * TDEST.COLS)
 ZERO_UPPER_ROWS(TDEST, TDEST.ROWS)
```

FIG. 43

```
TILEBROADCASTD TDEST, SRC
#GP IF TILES_CONFIGURED == 0
#GP IF TDEST.COLS * 4 >
PALETTE_TABLE[PALETTE_ID].BYTES_PER_ROW

 FOR I IN 0..TDEST.ROWS-1:
 FOR J IN 0...TDEST.COLS-1:
 TMP.DWORD[J] := SRC
WRITE_ROW_AND_ZERO(TDEST, I, TMP, 4 *
TDEST.COLS)
ZERO_UPPER_ROWS(TDEST, TDEST.ROWS)
```

```
TILEBROADCASTW TDEST, SRC
#GP IF TILES_CONFIGURED == 0
#GP IF TDEST.COLS * 2 >
PALETTE_TABLE[PALETTE_ID].BYTES_PER_ROW

 FOR I IN 0..TDEST.ROWS-1:
 FOR J IN 0...TDEST.COLS-1:
 TMP.WORD[J] := SRC
 WRITE_ROW_AND_ZERO(TDEST, I, TMP, 2 *
TDEST.COLS)
 ZERO_UPPER_ROWS(TDEST, TDEST.ROWS)
```

FIG. 47

```
TILECOLBROADCASTD TDEST, TMEMCOL
 #GP IF TILES_CONFIGURED == 0
 #GP IF TDEST.COLS * 4 >
PALETTE_TABLE[PALETTE_ID].BYTES_PER_ROW

 TDATA := READ_MEMORY(TMEMCOL, 4 * TDEST.ROWS)

 FOR I IN 0 ... TDEST.ROWS-1:
 // COPY EACH ELEMENT TO A WHOLE TEMP ROW.
 // THEN WRITE THE TEMP ROW TO THE TILE.
 FOR J IN 0 ... TDEST.COLS-1 :
 TMP.DWORD[J] := TDATA.DWORD[I]
 WRITE_ROW_AND_ZERO(TDEST, I, TMP, 4 * TDEST.COLS)
 ZERO_UPPER_ROWS(TDEST, TDEST.ROWS)
```

```
TILECOLBROADCASTW TDEST, TMEMCOL
 #GP IF TILES_CONFIGURED == 0
 #GP IF TDEST.COLS * 2 >
PALETTE_TABLE[PALETTE_ID].BYTES_PER_ROW

 TDATA := READ_MEMORY(TMEMCOL, 2 * TDEST.ROWS)

 FOR I IN 0 ... TDEST.ROWS-1:
 // COPY EACH ELEMENT TO A WHOLE TEMP ROW.
 // THEN WRITE THE TEMP ROW TO THE TILE.
 FOR J IN 0 ... TDEST.COLS-1 :
 TMP.WORD[J] := TDATA.WORD[I]
 WRITE_ROW_AND_ZERO(TDEST, I, TMP, 2 * TDEST.COLS)
 ZERO_UPPER_ROWS(TDEST, TDEST.ROWS)
```

FIG. 51

```
TILECOLBROADCASTD TDEST, TMEMCOL
 #GP IF TILES_CONFIGURED == 0
 #GP IF TDEST.COLS * 4 >
PALETTE_TABLE[PALETTE_ID].BYTES_PER_ROW

 TDATA := READ_MEMORY(TMEMCOL, 4 * TDEST.ROWS)

 FOR I IN 0 ... TDEST.ROWS-1:
 // COPY EACH ELEMENT TO A WHOLE TEMP ROW.
 // THEN WRITE THE TEMP ROW TO THE TILE.
 FOR J IN 0 ... TDEST.COLS-1 :
 TMP.DWORD[J] := TDATA.DWORD[I]
 WRITE_ROW_AND_ZERO(TDEST, I, TMP, 4 * TDEST.COLS)
 ZERO_UPPER_ROWS(TDEST, TDEST.ROWS)
```

```
TILECOLBROADCASTW TDEST, TMEMCOL
 #GP IF TILES_CONFIGURED == 0
 #GP IF TDEST.COLS * 2 >
PALETTE_TABLE[PALETTE_ID].BYTES_PER_ROW

 TDATA := READ_MEMORY(TMEMCOL, 2 * TDEST.ROWS)

 FOR I IN 0 ... TDEST.ROWS-1:
// COPY EACH ELEMENT TO A WHOLE TEMP ROW.
 // THEN WRITE THE TEMP ROW TO THE TILE.
 FOR J IN 0 ... TDEST.COLS-1 :
 TMP.WORD[J] := TDATA.WORD[I]
 WRITE_ROW_AND_ZERO(TDEST, I, TMP, 2 * TDEST.COLS)
 ZERO_UPPER_ROWS(TDEST, TDEST.ROWS)
```

FIG. 55

```
TILEZERO TDEST
#GP IF TILES_CONFIGURED == 0

 NBYTES :=
PALETTE_TABLE[PALETTE_ID].BYTES_PER_ROW
MAX_NUM_ROWS :=
PALETTE_TABLE[PALETTE_ID].TILE_BYTES /
PALETTE_TABLE[PALETTE_ID].BYTES_PER_ROW
FOR I IN 0 ... MAX_NUM_ROWS-1:
FOR J IN 0 ... NBYTES-1:
TDEST.BYTE[J] := 0
```

FIG. 58

6101 TILE ADD operation (half-precision)

```
TADDPH tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 2 > impl.tmul_maxn
#GP if tsrc1.cols * 2 > impl.tmul_maxn
#GP if tsrc2.cols * 2 > impl.tmul_maxn
start := tileconfig.startM
#GP if start >= tdest.rows

while start < tdest.rows:
     for n in 0 ... tdest.cols-1:
          tmp.fp16[n] := tsrc1.row[start].fp16[n] + tsrc2.row[start].fp16[n]
     write_row_and_zero(tdest, start, tmp, 2 * tdest.cols)
     start := start + 1

zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 61

6201 TILE ADD operation (single-precision)

```
TADDPS tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 4 > impl.tmul_maxn
#GP if tsrc1.cols * 4 > impl.tmul_maxn
#GP if tsrc2.cols * 4 > impl.tmul_maxn
start := tileconfig.startM
#GP if start >= tdest.rows

while start < tdest.rows:
     for n in 0 ... tdest.cols-1:
          tmp.fp32[n] := tsrc1.row[start].fp32[n] + tsrc2.row[start].fp32[n]
     write_row_and_zero(tdest, start, tmp, 4 * tdest.cols)
     start := start + 1
zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 62

6501 TILE SUBTRACT operation (half-precision)

```
TSUBPH tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 2 > impl.tmul_maxn
#GP if tsrc1.cols * 2 > impl.tmul_maxn
#GP if tsrc2.cols * 2 > impl.tmul_maxn
start := tileconfig.startM
#GP if start >= tdest.rows

while start < tdest.rows:
     for n in 0 ... tdest.cols-1:
          tmp.fp16[n] := tsrc1.row[start].fp16[n] - tsrc2.row[start].fp16[n]
     write_row_and_zero(tdest, start, tmp, 2 * tdest.cols)
     start := start + 1

zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 65

6601 TILE SUBTRACT operation (single-precision)

```
TSUBPS tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 4 > impl.tmul_maxn
#GP if tsrc1.cols * 4 > impl.tmul_maxn
#GP if tsrc2.cols * 4 > impl.tmul_maxn
start := tileconfig.startM
#GP if start >= tdest.rows

while start < tdest.rows:
    for n in 0 ... tdest.cols-1:
        tmp.fp32[n] := tsrc1.row[start].fp32[n] - tsrc2.row[start].fp32[n]
    write_row_and_zero(tdest, start, tmp, 4 * tdest.cols)
    start := start + 1
zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 66

6901 TILE MUL operation (half-precision)

```
TMULPH tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 2 > impl.tmul_maxn
#GP if tsrc1.cols * 2 > impl.tmul_maxn
#GP if tsrc2.cols * 2 > impl.tmul_maxn
start := tileconfig.startM
#GP if start >= tdest.rows

while start < tdest.rows:
     for n in 0 ... tdest.cols-1:
          tmp.fp16[n] := tsrc1.row[start].fp16[n] * tsrc2.row[start].fp16[n]
     write_row_and_zero(tdest, start, tmp, 2 * tdest.cols)
     start := start + 1

zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 69

7001 TILE MUL operation (single-precision)

```
TMULPS tdest, tsrc1, tsrc2
#GP if TILES_CONFIGURED == 0
#GP if tdest.cols != tsrc1.cols
#GP if tdest.cols != tsrc2.cols
#GP if tdest.rows != tsrc1.rows
#GP if tdest.rows != tsrc2.rows
#GP if tdest.cols * 4 > impl.tmul_maxn
#GP if tsrc1.cols * 4 > impl.tmul_maxn
#GP if tsrc2.cols * 4 > impl.tmul_maxn
start := tileconfig.startM
#GP if start >= tdest.rows

while start < tdest.rows:
     for n in 0 ... tdest.cols-1:
          tmp.fp32[n] := tsrc1.row[start].fp32[n] * tsrc2.row[start].fp32[n]
     write_row_and_zero(tdest, start, tmp, 4 * tdest.cols)
     start := start + 1
zero_upper_rows(tdest, tdest.rows)
zero_tileconfig_start()

// If an unmasked FP exception occurs, tileconfig.startM and the TILE
// contain a consistent state from an earlier, fault-free
// iteration. Instruction emulation from this initial condition will
// result in the fault condition(s) present in MXCSR.
```

FIG. 70

```
DEFINE FMAOP(C,A,B): // OPERATES ON
ONE ELEMENT
// FUSED MULTIPLY ADD
 IF *NEGATIVE VERSION*:
 C := C - A * B
 ELSE:
 C := C + A * B


T[,N]MMAPS TSRCDEST, TSRC1, TSRC2
// C = M X N (TSRCDEST), A = M X K (TSRC1), B = K X N (TSRC2)
#GP IF TILES_CONFIGURED == 0
#GP IF TSRC1.COLS != TSRC2.ROWS
#GP IF TSRCDEST.ROWS != TSRC1.ROWS
#GP IF TSRCDEST.COLS != TSRC2.COLS

#GP IF TSRC2.ROWS > IMPL.TMUL_MAXK
#GP IF TSRC2.COLS * 4 > IMPL.TMUL_MAXN
#GP IF TSRCDEST.COLS * 4 > IMPL.TMUL_MAXN

STARTK := TILECONFIG.STARTK
STARTM := TILECONFIG.STARTM
#GP IF STARTM >= TSRCDEST.ROWS
#GP IF STARTK >= TSRC2.ROWS
WHILE STARTM < TSRCDEST.ROWS:
TMP := TSRCDEST.ROW[STARTM]
WHILE STARTK < TSRC1.COLS:
FOR N IN 0 ... TSRCDEST.COLS-1: // SIMD LOOP
FMAOP( TMP.FP32[N],
TSRC1.ROW[STARTM].FP32[STARTK],
TSRC2.ROW[STARTK].FP32[N] )
STARTK := STARTK + 1
WRITE_ROW_AND_ZERO(TSRCDEST, STARTM, TMP, 4 * TSRCDEST.COLS)
STARTK := 0
STARTM := STARTM + 1
ZERO_UPPER_ROWS(TSRCDEST, TSRCDEST.ROWS)
ZERO_TILECONFIG_START()

// IN THE CASE OF AN UNMASKED FLOATING POINT EXCEPTION
// IN THE MIDDLE OF AN INSTRUCTION:
// TILECONFIG.STARTM := STARTM AND TILECONFIG.STARTK := STARTK
```

FIG. 74

8101 TDPWSSDS DOT PRODUCT instruction helper function

```
define DPWSS(c,x,y): // arguments are dwords
     p1dword := SIGN_EXTEND(x.word[0]) * SIGN_EXTEND(y.word[0])
     p2dword := SIGN_EXTEND(x.word[1]) * SIGN_EXTEND(y.word[1])

     c := SIGNED_DWORD_SATURATE(c + p1dword + p2dword)
```

8103 TDPWSSDS DOT PRODUCT operation

```
TDPWSSDS tsrcdest, tsrc1, tsrc2
// C = m x n (tsrcdest), A = m x k (tsrc1), B = k x n (tsrc2)
#GP if TILES_CONFIGURED == 0
#GP if tsrc1.cols != tsrc2.rows
#GP if tsrcdest.rows != tsrc1.rows
#GP if tsrcdest.cols != tsrc2.cols

#GP if tsrc2.rows > impl.tmul_maxk
#GP if tsrc2.cols * 4 > impl.tmul_maxn
#GP if tsrcdest.cols * 4 > impl.tmul_maxn

for m in 0 ... tsrcdest.rows-1:
     for k in 0 ... tsrc1.cols-1:
          tmp := tsrcdest.row[m]
          for n in 0 ... tsrcdest.cols-1:
               DPWSS(tmp.dword[n],
                    tsrc1.row[m].dword[k],
                    tsrc2.row[k].dword[n])
          write_row_and_zero(tsrcdest, m, tmp, 4 * tsrcdest.cols)

zero_upper_rows(tsrcdest, tsrcdest.rows)
zero_tileconfig_start()
```

8105 TDPWSSDS DOT PRODUCT instruction helper function

```
define DPWSSQ(c,x,y): // c is a qword. x and y are qwords containing 4 int16
      p1dword := SIGN_EXTEND(x.word[0]) * SIGN_EXTEND(y.word[0])
      p2dword := SIGN_EXTEND(x.word[1]) * SIGN_EXTEND(y.word[1])
      p3dword := SIGN_EXTEND(x.word[2]) * SIGN_EXTEND(y.word[2])
      p4dword := SIGN_EXTEND(x.word[3]) * SIGN_EXTEND(y.word[3])

      c := SIGNED_QWORD_SATURATE(c + p1dword + p2dword + p3dword + p4dword)
```

8107 TDPWSSDS DOT PRODUCT operation

```
TDPWSSQS tsrcdest, tsrc1, tsrc2
// C = m x n (tsrcdest), A = m x k (tsrc1), B = k x n (tsrc2)
// Tile A is an even/odd pair of tile regs indicated by tsrc1.
// The tiles[.] notation denotes an array representing all the tile registers.

#GP if TILES_CONFIGURED == 0
// reg_id_tsrc1 is the register field in the encoding for the tsrc1 operand.
t1_left := (reg_id_tsrc1 & ~1)
t1_right := (reg_id_tsrc1 & ~1) + 1

startK := tileconfig.startK
startM := tileconfig.startM

#GP if tsrcdest.rows != tiles[t1_left].rows
#GP if tsrcdest.rows != tiles[t1_right].rows
#GP if tsrcdest.cols != tsrc2.cols

#GP if startM >= tsrcdest.rows
#GP if startK >= tsrc2.rows

#GP if tsrc2.rows        > impl.tmul_maxk
#GP if tsrc2.cols * 8    > impl.tmul_maxn
#GP if tsrcdest.cols * 8 > impl.tmul_maxn

if tsrc2.rows > impl.tmul_maxk / 2:
      lim_left := impl.tmul_maxk/2
      lim_right := tsrc2.rows - lim_left
      #GP if tiles[t1_left].cols != lim_left
      #GP if tiles[t1_right].cols != lim_right
else:
      lim_left := tsrc2.rows
      lim_right := 0 // ignore t1_right if not required!
      #GP if tiles[t1_left].cols != lim_left
```

(continued at FIG. 81C)

8107 TDPWSSDS DOT PRODUCT operation (continued)

```
while startM < tsrcdest.rows:
     while startK < tsrc2.rows:
          tempC := tsrcdest.row[startM]

          tk := startK % (impl.tmul_maxk/2)
          if startK < impl.tmul_maxk/2:
               tempA := tiles[t1_left].row[m].qword[tk]
          else:
               tempA := tiles[t1_right].row[m].qword[tk]

          for n := 0 ... tsrcdest.cols-1: //SIMD loop
               DPWSSQ(tempC.qword[n],
                     tempA,
                     tsrc2.row[startK].qword[n])
          write_row_and_zero(tsrcdest, startM, tempC, 8 * tsrcdest.cols)
          startK := startK + 1
     startK := 0
     startM := startM + 1

zero_upper_rows(tsrcdest, tsrcdest.rows)
zero_tileconfig_start()
```

FIG. 81C

8109 TDPB[SS,UU,US,SU]DS DOT PRODUCT operation helper function

```
define DPBD(c,x,y): // arguments are dwords
      if *UU version*:
            saturation_fn := UNSIGNED_SATURATION
      else:
            saturation_fn := SIGNED_SATURATION

      if *x operand is signed*:
            extend_src1 := SIGN_EXTEND
      else:
            extend_src1 := ZERO_EXTEND

      if *y operand is signed*:
            extend_src2 := SIGN_EXTEND
      else:
            extend_src2 := ZERO_EXTEND

      p0word := extend_src1(x.byte[0]) * extend_src2(y.byte[0])
      p1word := extend_src1(x.byte[1]) * extend_src2(y.byte[1])
      p2word := extend_src1(x.byte[2]) * extend_src2(y.byte[2])
      p3word := extend_src1(x.byte[3]) * extend_src2(y.byte[3])

      c := saturation_fn(c + p0word + p1word + p2word + p3word)
```

8111 TDPB[SS,UU,US,SU]DS DOT PRODUCT operation

```
TDPB[SS,SU,US,SS]DS tsrcdest, tsrc1, tsrc2
// C = m x n (tsrcdest), A = m x k (tsrc1), B = k x n (tsrc2)
#GP if TILES_CONFIGURED == 0
#GP if tsrc1.cols != tsrc2.rows
#GP if tsrcdest.rows != tsrc1.rows
#GP if tsrcdest.cols != tsrc2.cols

#GP if tsrc2.rows > impl.tmul_maxk
#GP if tsrc2.cols * 4 > impl.tmul_maxn
#GP if tsrcdest.cols * 4 > impl.tmul_maxn

for m in 0 ... tsrcdest.rows-1:
      for k in 0 ... tsrc1.cols-1:
            tmp := tsrcdest.row[m]
            for n in 0 ... tsrcdest.cols-1:
                  DPBD(tmp.dword[n],
                        tsrc1.row[m].dword[k],
                        tsrc2.row[k].dword[n])
            write_row_and_zero(tsrcdest, m, tmp, 4 * tsrcdest.cols)

zero_upper_rows(tsrcdest, tsrcdest.rows)
zero_tileconfig_start()
```

8113 TDP8B[SS,UU,US,SU]4BITDS DOT PRODUCT operation

```
TDP8B[SS,SU,US,UU]4BITDS tsrcdest, tsrc1, tsrc2
// tsrdest (m x n) := tilepair (m x k, bytes) * tsrc2 (k x n, 4b values)
// tilepair is an even/odd pair of tile regs indicated by tsrc1.
// The tiles[.] notation denotes an array representing all the tile registers.

#GP if TILES_CONFIGURED == 0
// reg_id_tsrc1 is the register field in the encoding for the tsrc1 operand.
t1_left := (reg_id_tsrc1 & ~1)
t1_right := (reg_id_tsrc1 & ~1) + 1

#GP if tsrcdest.rows != tiles[t1_left].rows
#GP if tsrcdest.rows != tiles[t1_right].rows
#GP if tsrcdest.cols != tsrc2.cols

#GP if tsrc2.rows        > impl.tmul_maxk
#GP if tsrc2.cols * 4    > impl.tmul_maxn
#GP if tsrcdest.cols * 4 > impl.tmul_maxn

if tsrc2.rows > impl.tmul_maxk / 2:
      lim_left := impl.tmul_maxk/2
      lim_right := tsrc2.rows - lim_left
      #GP if tiles[t1_left].cols != lim_left
      #GP if tiles[t1_right].cols != lim_right
else:
      lim_left := tsrc2.rows
      lim_right := 0 // ignore t1_right if not required!
      #GP if tiles[t1_left].cols != lim_left

if *tsrc2 operand is signed*:
      extend_src2 := SIGN_EXTEND
else:
      extend_src2 := ZERO_EXTEND

if *tsrc1 operand is signed*:
      extend_src1 := SIGN_EXTEND
else:
      extend_src1 := ZERO_EXTEND
```

8113 TDP8B[SS,UU,US,SU]4BITDS DOT PRODUCT operation (continued)

```
if *tsrc1 is unsigned and tsrc2 is unsigned*:
      saturation_fn := UNSIGNED_SATURATION
else:
      saturation_fn := SIGNED_SATURATION

for m in 0..tsrcdest.rows-1:
      for k in 0..tsrc2.rows-1:
            tk := k % (impl.tmul_maxk/2)
            if k < impl.tmul_maxk/2:
                  tq := tiles[t1_left].row[m].qword[tk]
            else:
                  tq := tiles[t1_right].row[m].qword[tk]
            for n in 0..tsrcdest.cols-1:
                  for b in 0..7: // 4-bit array index & tq byte index
                        x := tsrc2[k].dword[n].nibble[b] // extract 4 bits
                        tprod.dword[b] := extend_src2(x) * extend_src1(tq.byte[b])
                  // 9-way sum
                  tsrcdest.row[m].dword[n] := saturation_fn(tsrcdst.row[m].dword[n] +
                                              tprod.dword[0] +
                                              tprod.dword[1] +
                                              tprod.dword[2] +
                                              ...
                                              tprod.dword[7] )
zero_upper_rows(tsrcdest, tsrcdest.rows)
zero_tileconfig_start()
```

8115 TDP4BIT[S,U][S,U]DS DOT PRODUCT operation

```
TDP4BIT[SS,SU,US,UU]DS tsrcdest, tsrc1, tsrc2
// tsrdest (m x n) += tsrc1 (m x k, bytes) op tsrc2 (k x n, 4b values)

#GP if TILES_CONFIGURED == 0
#GP if tsrcdest.cols != tsrc2.cols
#GP if tsrc2.rows > impl.tmul_maxk
#GP if tsrc2.cols * 4 > impl.tmul_maxn
#GP if tsrcdest.cols * 4 > impl.tmul_maxn

startK := tileconfig.startK
startM := tileconfig.startM
#GP if startM >= tsrcdest.rows
#GP if startK >= tsrc2.rows

if *src2 operand is signed*:
      extend_src2 := SIGN_EXTEND
else:
      extend_src2 := ZERO_EXTEND

if *tmem operand is signed*:
      extend_mem := SIGN_EXTEND
else:
      extend_mem := ZERO_EXTEND

if *src1 is unsigned and src2 is unsigned*:
      saturation_fn := UNSIGNED_SATURATION
else:
      saturation_fn := SIGNED_SATURATION

while startM < tsrcdest.rows:
      while startK < tsrc2.rows:
            td := tsrc1.row[startM].dword[startK]
            for n in 0..tsrcdest.cols-1:
                  for b in 0..7:
                        x := tsrc2.row[startK].dword[n].nibble[b]
                        tprod.dword[b] := extend_src2(x) * extend_mem(td.nibble[b])
                  // 9-way sum
                  tsrcdest.row[startM].dword[n] :=
                              saturation_fn(tsrcdst.row[startM].dword[n] +
                              tprod.dword[0] +
                              tprod.dword[1] +
                              tprod.dword[2] +
                              ...
                              tprod.dword[7])
      startK := 0
      startM := startM + 1
zero_upper_rows(tsrcdest, tsrcdest.rows)
zero_tileconfig_start()
```

FIG. 81G

SYSTEMS, METHODS, AND APPARATUSES FOR MATRIX OPERATIONS

CROSS-REFERENCE TO RELATED APPLICATIONS

This application is a national stage of International Application No. PCT/US2017/040546, filed Jul. 1, 2017, which claims priority to U.S. Provisional Application No. 62/473,732, filed Mar. 20, 2017.

FIELD OF INVENTION

The field of invention relates generally to computer processor architecture, and, more specifically, to matrix manipulation.

BACKGROUND

Matrices are increasingly important in many computing tasks such as machine learning and other bulk data processing.

BRIEF DESCRIPTION OF THE DRAWINGS

The present invention is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment;

FIG. 15 illustrates an example of a matrix expressed in row major format and column major format;

FIG. 16 illustrates an example of usage of matrices (tiles);

FIG. 23 illustrates exemplary pseudocode for an execution of a TILECONFIG instruction;

FIGS. 27(A)-(C) illustrate examples of pseudocode representing a method of executing a TILELOAD instruction using words, doublewords, and quadwords;

FIGS. 31(A)-(C) illustrate examples of pseudocode representing methods of executing a TILESTORE instruction using words, doublewords, and quadwords;

FIG. 35 is exemplary pseudocode describing an embodiment of a method performed by a processor to process a TILEDIAGONALD instruction;

FIG. 39 is exemplary pseudocode describing an embodiment of a method performed by a processor to process a TILETRANSPOSED instruction;

FIG. 43 illustrates exemplary pseudocode for the execution of a TILEMOVE instruction;

FIG. 47 illustrates examples of pseudocode of methods for executing a TILEBROADCAST instruction;

FIG. 51 illustrates examples of pseudocode of methods for executing a TILECOLBROADCAST instruction;

FIG. 55 illustrates examples of pseudocode of methods for executing a TILECOLBROADCAST instruction;

FIG. 58 depicts pseudocode of a method of execution of a TILEZERO instruction;

FIG. 61 illustrates an example process describing a method performed by a processor to process a TILEADD instruction;

FIG. 62 illustrates an example method for performing a TILEADD operation when the source matrix (tile) operands contain single-precision elements;

FIG. 65 illustrates an example process describing a method performed by a processor to process a TILESUB instruction;

FIG. 66 illustrates an example method for performing a TILESUB operation when the source matrix (tile) operands contain single-precision elements;

FIG. 69 illustrates an example process describing a method performed by a processor to process a TILEMUL instruction;

FIG. 70 illustrates an example method for performing a TILEMUL operation when the source matrix (tile) operands contain single-precision elements;

FIG. 74 illustrates pseudocode for a method of implementing a TMMPS instruction;

FIGS. 81A-81G illustrate example methods for performing TILEDOTPRODUCT operations;

DETAILED DESCRIPTION

Figure 1:
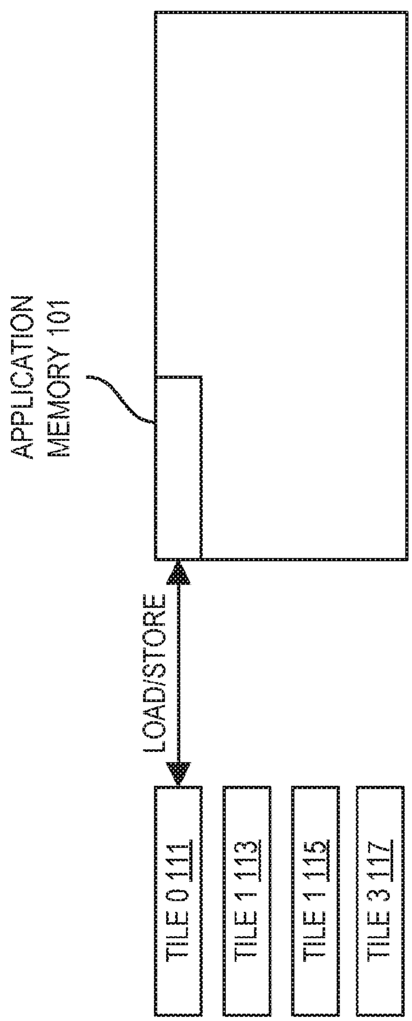
FIG. 1 illustrates an embodiment of configured tiles.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In many mainstream processors, handling matrices is a difficult and/or instruction intensive task. For example, rows of a matrix could be put into a plurality of packed data (e.g., SIMD or vector) registers and then operated on individually. For example, an add two 8×2 matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

I. High-Level Discussion

Described herein are mechanisms to support matrix operations in computer hardware such as central processing units (CPUs), graphic processing units (GPUs), and accelerators. The matrix operations utilize 2-dimensional (2-D)

data structures representing one or more packed regions of memory such as registers. Throughout this description, these 2-D data structures are referred to as tiles. Note that a matrix may be smaller than a tile (use less than all of a tile), or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transpose, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating point, double precision floating point, integer, etc.) may be supported.

A. Exemplary Usage of Configured Tiles

FIG. 1 illustrates an embodiment of configured tiles. As shown, there are four tiles 111, 113, 115, and 117 that are loaded from application memory 101. In this example, tiles T0 111 and T1 113 have M rows and N columns with 4 element bytes (e.g., single precision data). Tiles T2 115 and T3 117 have M rows and N/2 columns with 8 element bytes (e.g., double precision data). As the double precision operands are twice the width of single precision, this configuration is consistent with a palette, used to provide tile options, supplying at least 4 names with total storage of 16*N*M bytes. Depending upon the instruction encoding scheme used, the number of tiles available varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row)

As such, an application can be written such that a fixed usage of names will be able to take advantage of different storage sizes across implementations.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

B. Exemplary Tile Storage Types

Figure 2:
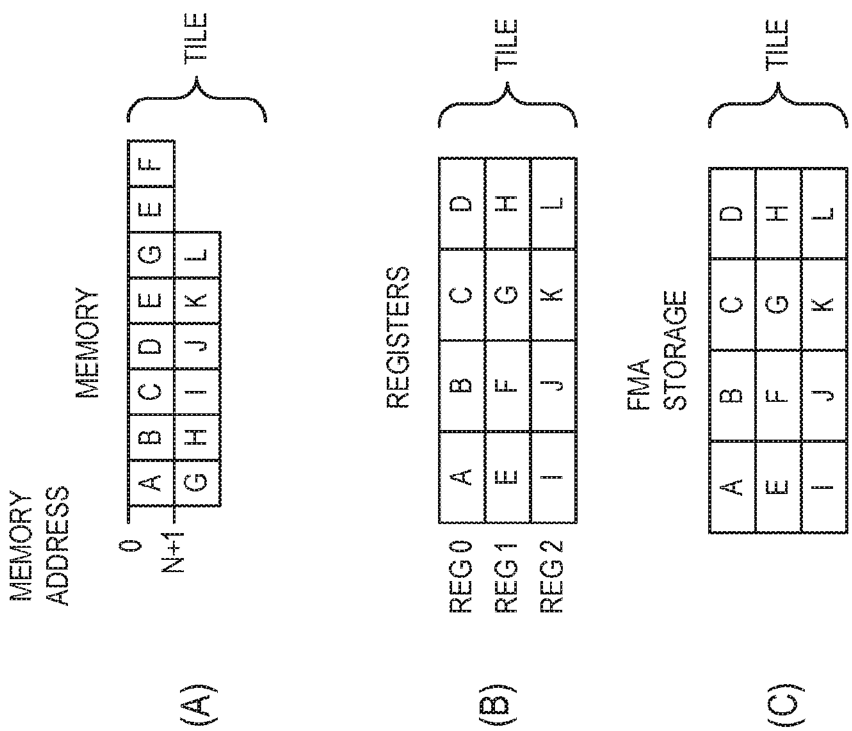
FIG. 2 illustrates several examples of matrix storage.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILESTORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiple accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIF metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64 byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64 byte rows, there would be 16 rows, so in this example, the last 6 rows would also be zeroed.

In some embodiments, a context restore (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating point exceptions, with the masking of the exceptions controlled by a control and/or status register.

To support restarting instructions after these events, the instructions store information in the start registers detailed below.

II. Matrix (Tile) Operation Systems

A. Exemplary Hardware Support

Figure 3:
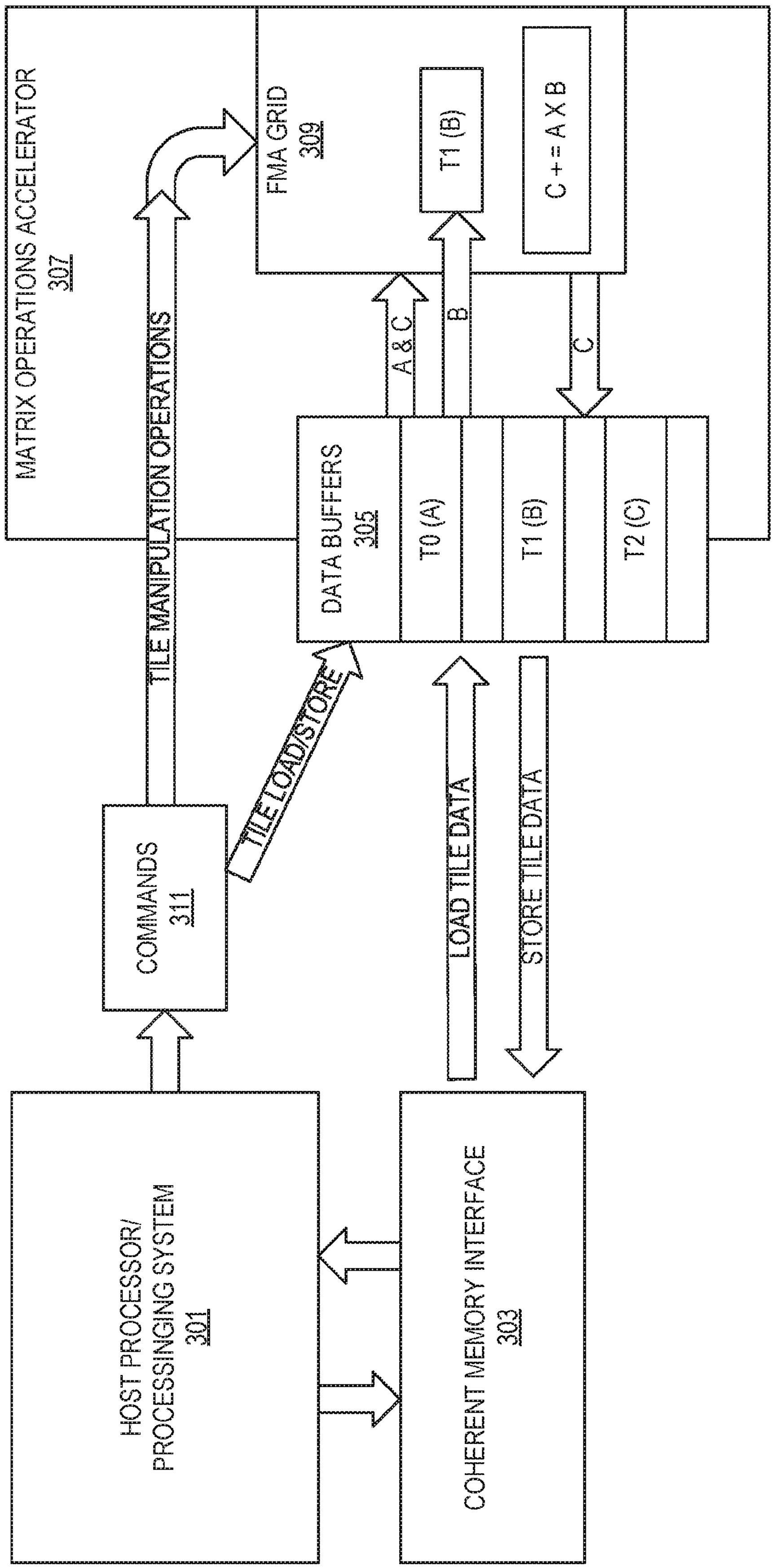
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
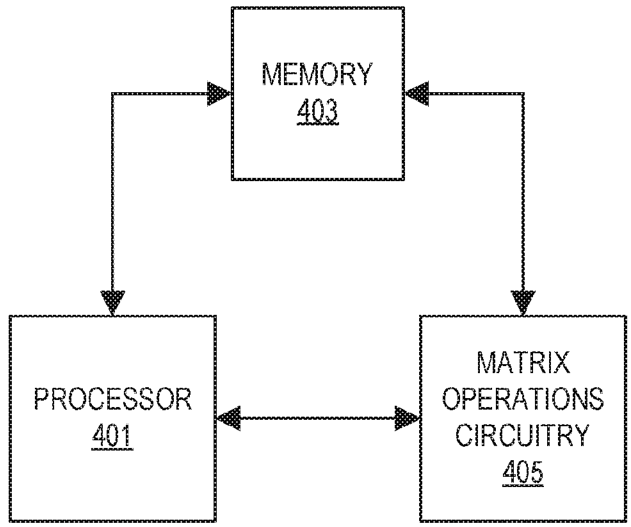
FIGS. 4 and 5 show different embodiments of how memory is shared using a matrix operations accelerator.
Figure 5:
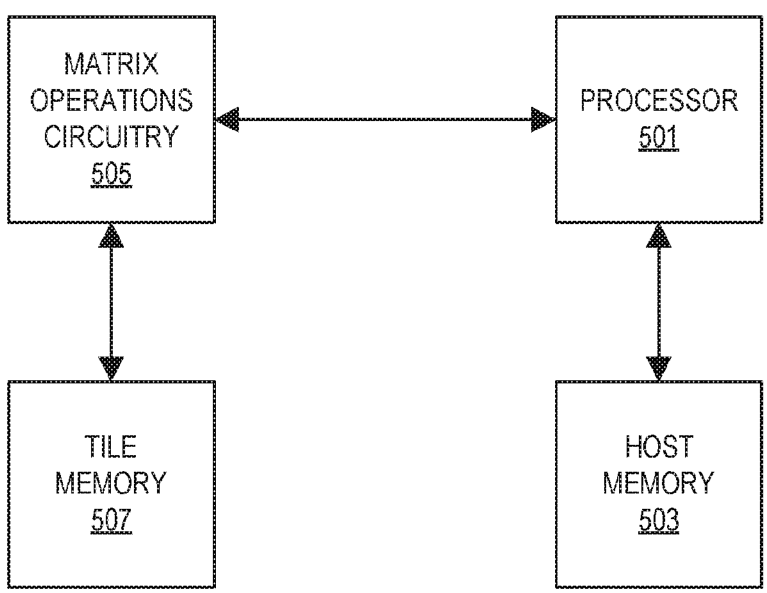

In this example, a coherent memory interface 303 is coupled to the host processor/processing system 301 and matrix operations accelerator 405 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory, but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

The matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset are stored in the FMA grid 309. As shown, T1 is housed and T0 and T2 are not. Note that A, B, and C refer to the matrices of these tiles which may or may not take up the entire space of the tile.

Figure 6:
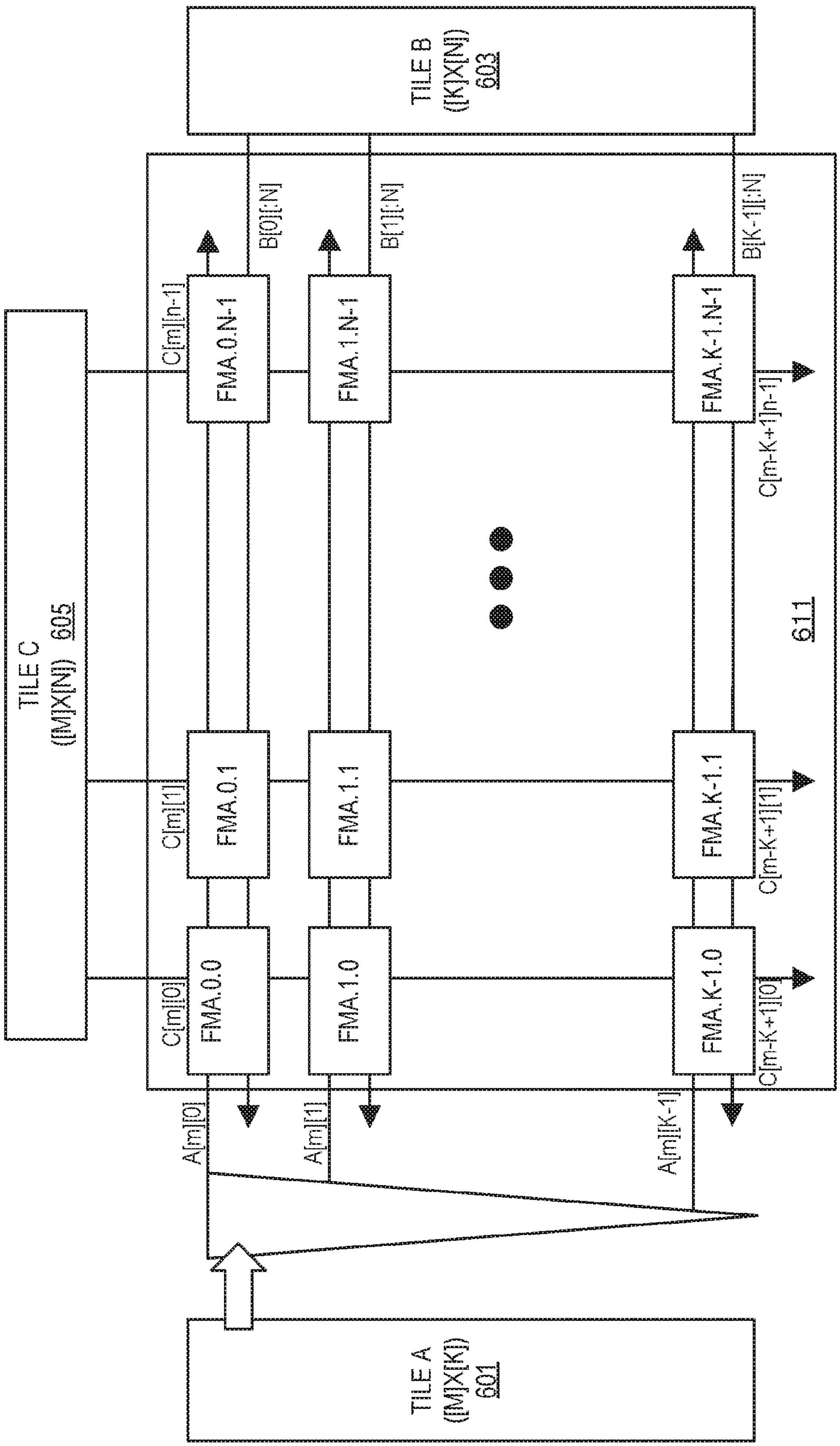
FIG. 6 illustrates an embodiment of matrix multiply accumulate operation using tiles ("TMMA")

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transposed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
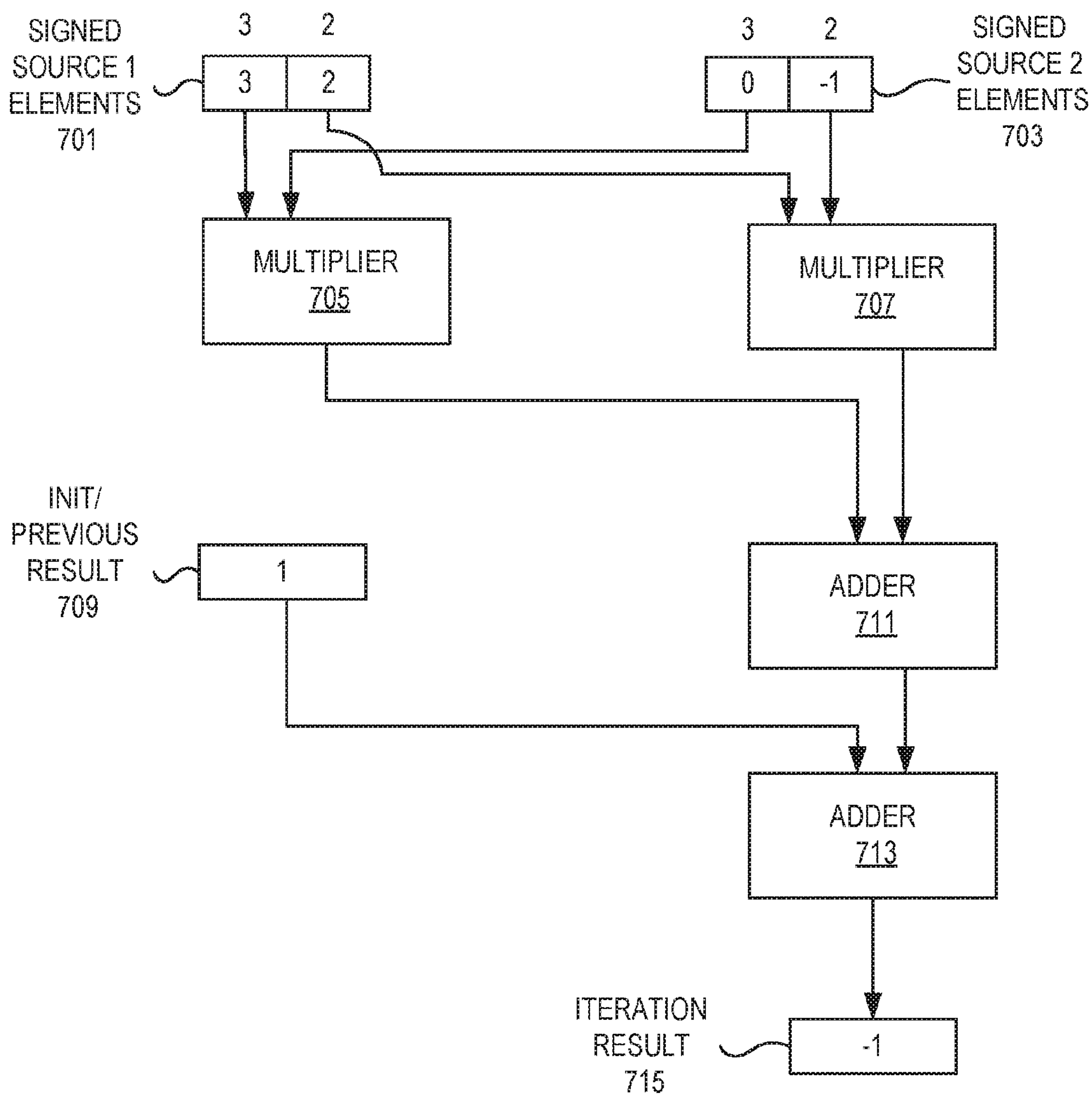
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating point) while the third signed source 709 could have 64-bit packed data elements (e.g., double precision floating point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709, or passed on to the next iteration, if there is one. In some embodiments, a writemask is applied to this storage such that if a corresponding writemask (bit) is set, the storage happens, and, if not set, the storage does not happen.

Figure 8:
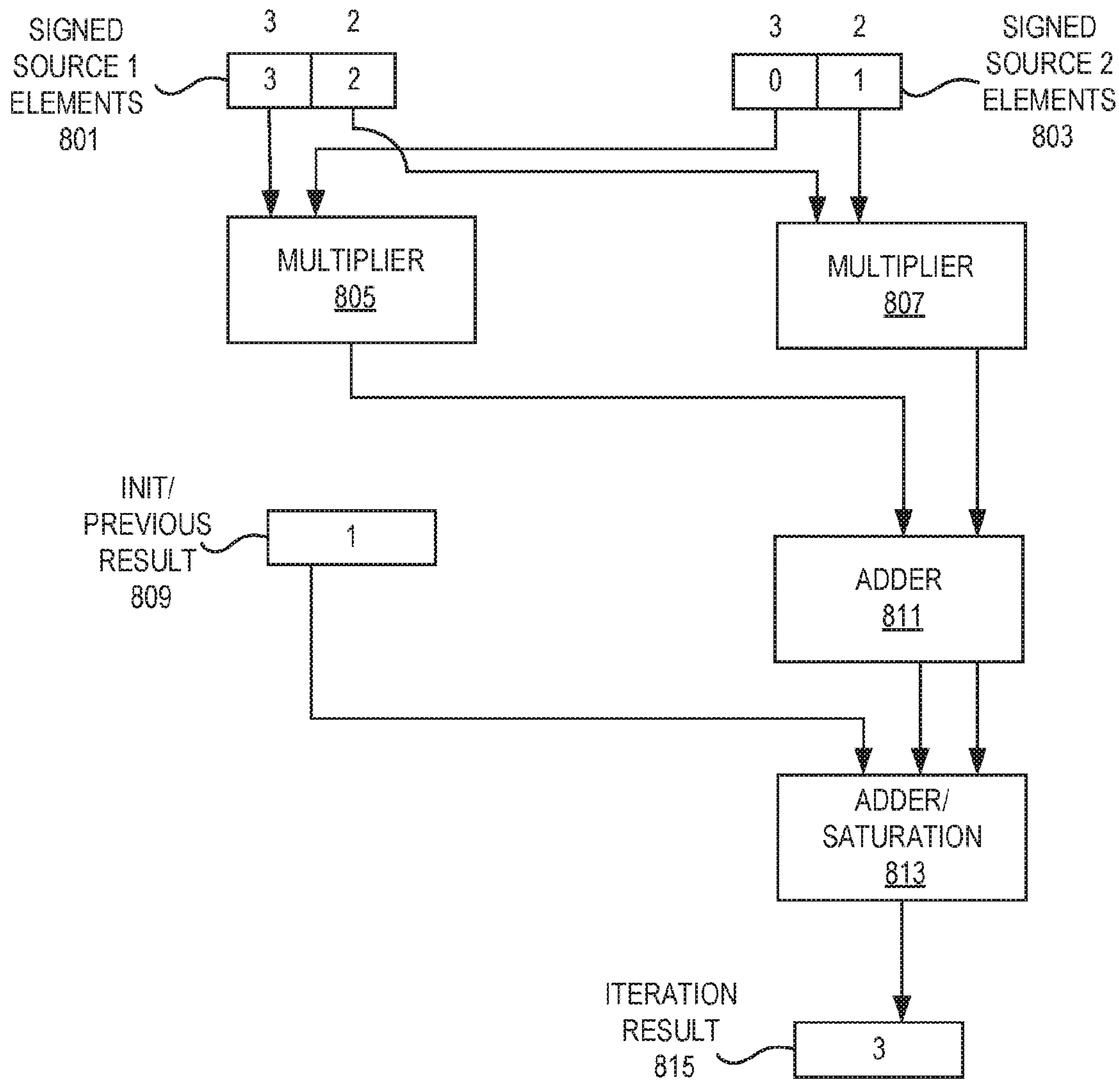
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating point) the third signed source 809 could have 64-bit packed data elements (e.g., double precision floating point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, these multiplier circuits 805 and 807 are reused for other packed data elements positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 811.

Addition/saturation (accumulator) circuitry 811 preserves a sign of an operand when the addition results in a value that is too big. In particular, saturation evaluation occurs on the infinite precision result between the multi-way-add and the write to the destination or next iteration. When the accumulator 811 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from −128 (=−2^7) to 127(=2^7-1)).

The result of the addition and saturation check is stored into the signed result 815 in a packed data element position that corresponds to the packed data element position used from the signed third source 809, or passed on to the next iteration if there is one. In some embodiments, a writemask is applied to this storage such that if a corresponding writemask (bit) is set, the storage happens, and, if not set, the storage does not happen.

Figure 9:
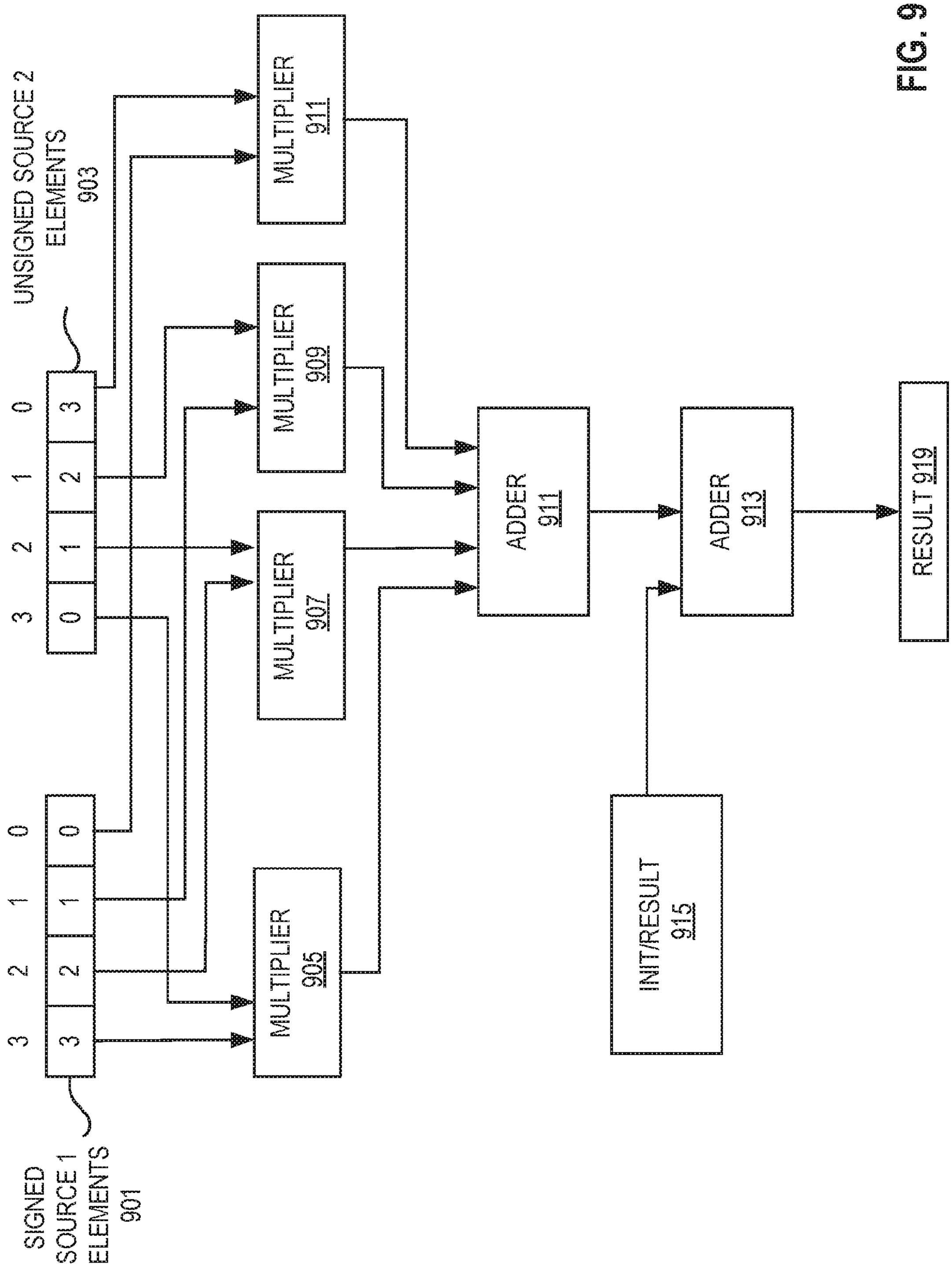
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 907, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 911.

The result of the addition of the results of the multiplications is added to the data from most significant packed data element position of the signed source 3 915 (using a different adder 913 or the same adder 911).

Finally, the result 919 of the second addition is either stored into the signed destination in a packed data element position that corresponds to the packed data element position used from the signed third source 915, or passed to the next iteration. In some embodiments, a writemask is applied to this storage such that if a corresponding writemask (bit) is set, the storage happens, and, if not set, the storage does not happen.

Figure 10:
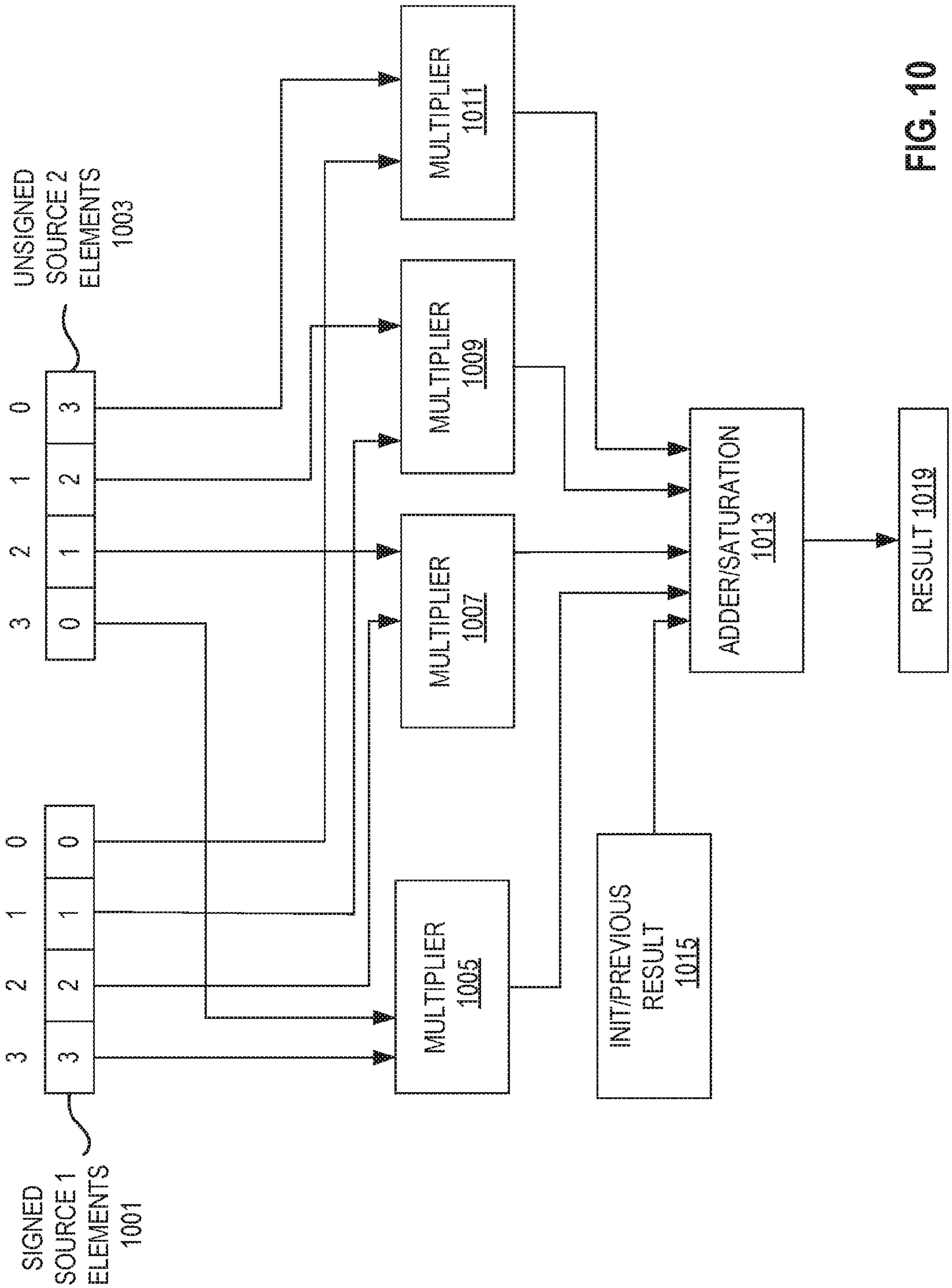
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 1001) and a second unsigned source (source 2 1003) each have four packed data elements. Each of these packed data elements stores data such as floating point or integer data. A third signed source (initial or previous result 1015) has a packed data element of which stores signed data. The sizes of the first and second sources 1001 and 1003 are a quarter of the third signed source 1015. For example, the first and second sources 1001 and 1003 could have 16-bit packed data elements (e.g., word) and the third signed source 1015 could have 64-bit packed data elements (e.g., double precision floating point or 64-bit integer).

In this illustration, the four most significant packed data element positions of the first and second sources 1001 and 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first and second sources 1001 and 1003 are multiplied using a multiplier circuit 1007, data from second most significant packed data element positions of the first and second sources 1001 and 1003 are multiplied using a multiplier circuit 1007, data from third most significant packed data element positions of the first and second sources 1001 and 1003 are multiplied using a multiplier circuit 1009, and data from the least significant packed data element positions of the first and second sources 1001 and 1003 are multiplied using a multiplier circuit 1011. In some embodiments, the signed packed data elements of the first source 1001 are sign extended and the unsigned packed data elements of the second source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of the signed third source 1015. The result of the addition of the results of the multiplications is added to the data from most significant packed data element position of the signed source 3 1015 using addition/saturation circuitry 1013.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from the signed third source 1015, or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-integer or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
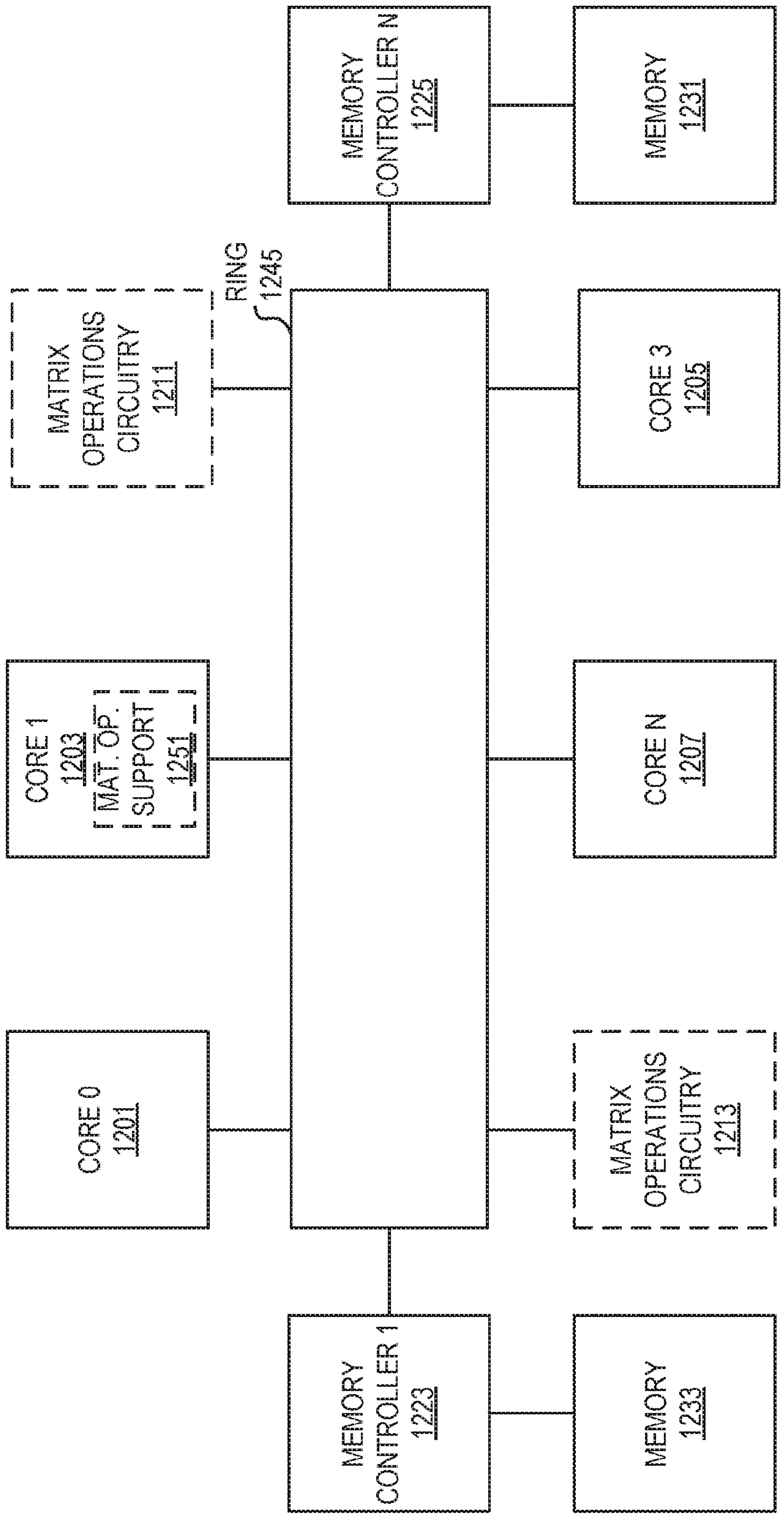
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, a plurality of entities are coupled with a ring interconnect 1245.

A plurality of cores 1201, 1203, 1205, and 1207 provide non-tile based instruction support. In some embodiments, matrix operations circuitry is provided in a core 1203, and in other embodiments matrix operations circuitry 1211 and 1213 is accessible on the ring interconnect 1245.

Additionally, one or more memory controllers 1223-1225 are provided to communicate with memory 1233 and 1231 on behalf of the cores and/or matrix operations circuitry.

Figure 13:
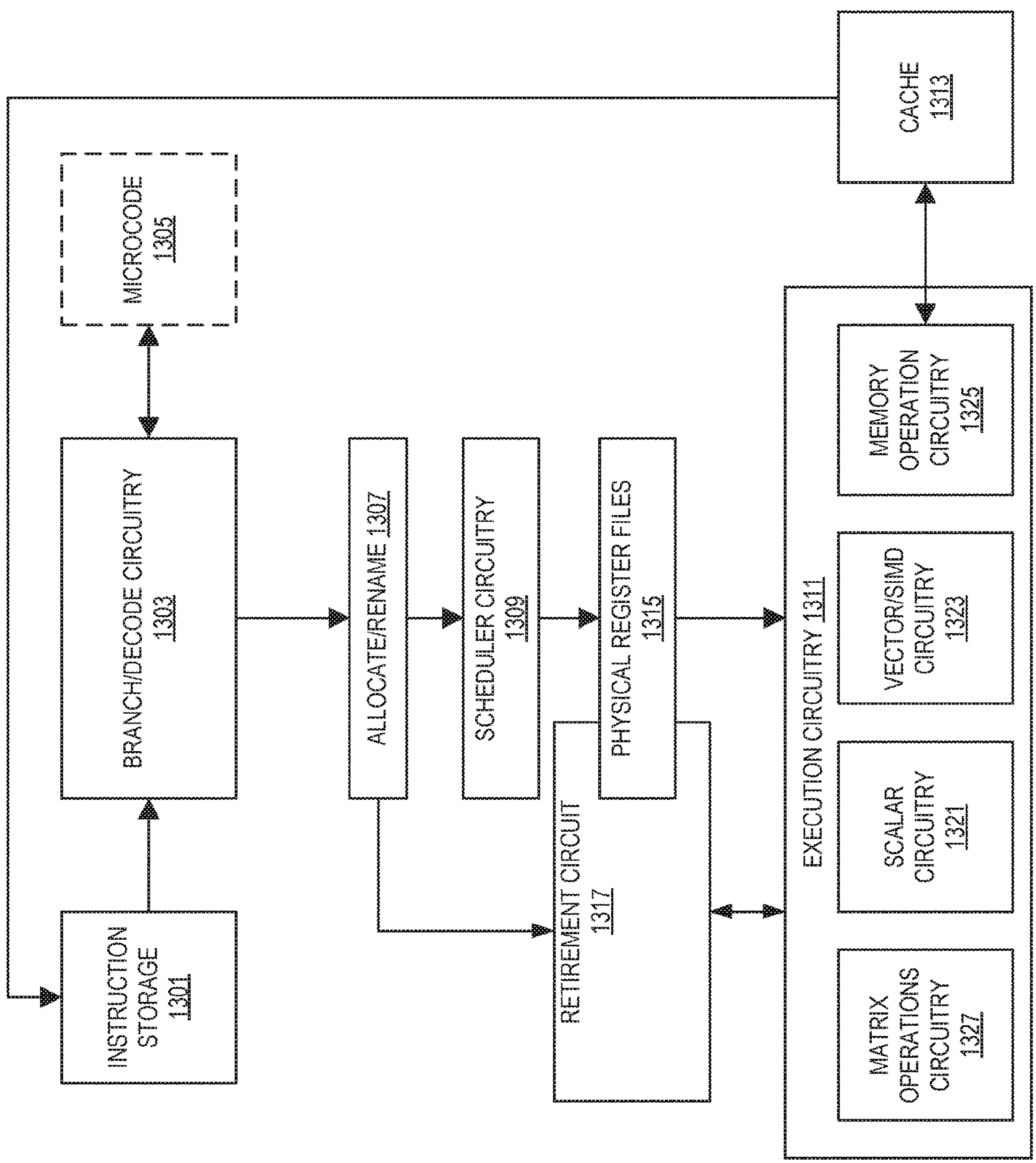
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to a rename/allocator circuitry 1307 which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler unit(s) scheduler circuitry 1309 is coupled to, or includes, physical register file(s) 1315. Each of the physical register file(s) 1315 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuit(s) 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 a set of one or more execution circuits 1321, 1323, and 1327 and a set of one or more memory access circuits 1325. The execution circuits 1321, 1323, and 1327 perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the rename/allocator circuitry 1307 performs an allocation stage and renaming stage; 4) the scheduler circuitry 1309 performs a schedule stage; 5) physical register file(s) (coupled to, or included in, the scheduler circuitry 1307 and rename/allocate circuitry 1307 and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
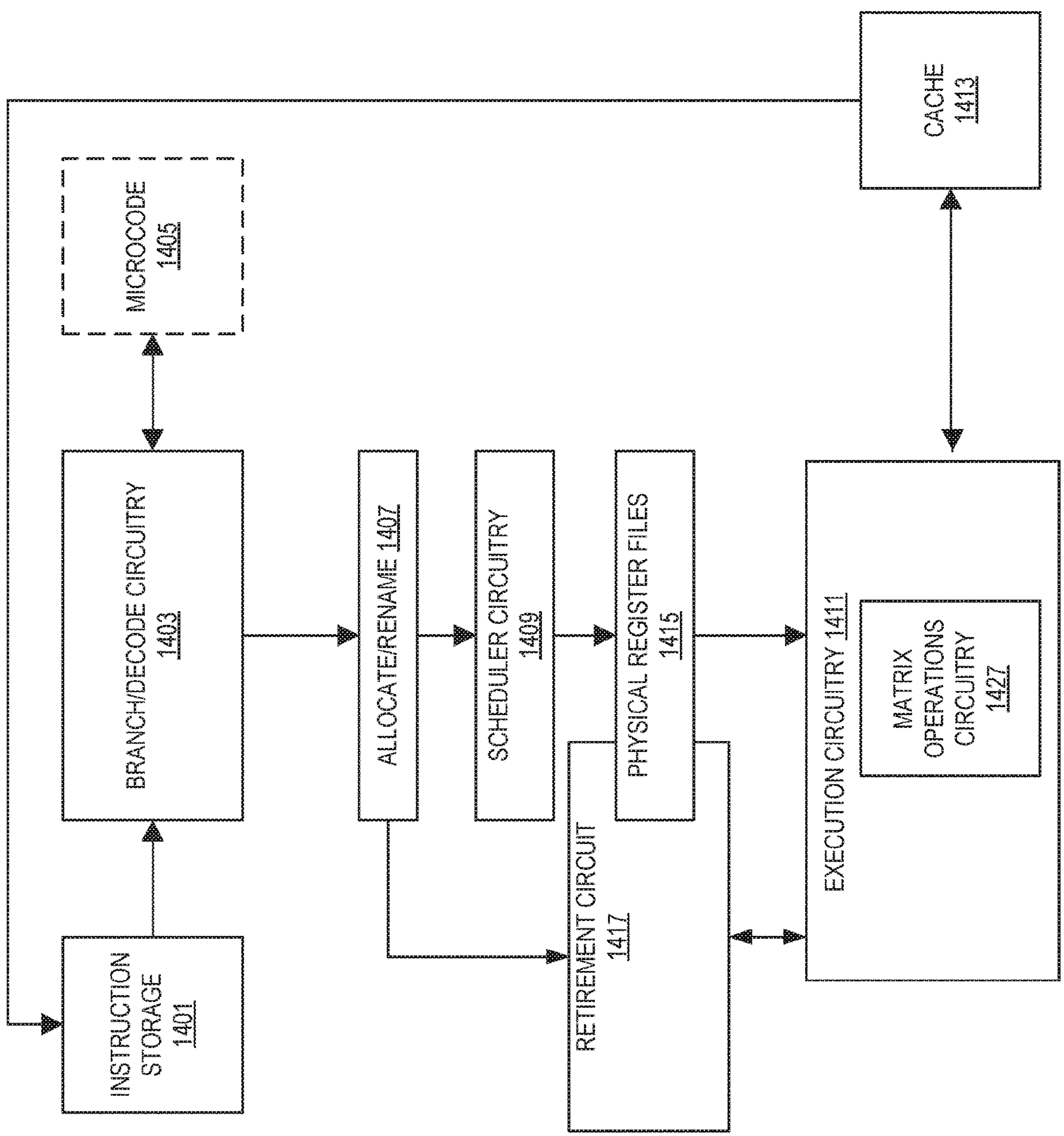
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to a rename/allocator circuitry 1407 which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuit(s) 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425. The execution circuits 1427 perform matrix (tile) operations detailed herein.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the rename/allocator circuitry 1407 performs an allocation stage and renaming stage; 4) the scheduler circuitry 1409 performs a schedule stage; 5) physical register file(s) (coupled to, or included in, the scheduler circuitry 1407 and rename/allocate circuitry 1407 and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

B. Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T*B^T=(BA)^T$, where superscript T means transpose. Reading column major data as row major data results in the matrix looking like the transpose matrix.

In some embodiments, row-major semantics are utilized in hardware, and column major data is to swap the operand order with the result being transposes of matrix, but for subsequent column-major reads from memory it is the correct, non-transposed matrix.

For example, if there are two column-major matrices to multiply:

a b g i k ag+bh ai+bj ak+bl
c d * h j l= cg+dh ci+dj ck+dl e f eg+fh ei+fj ek+fl (3×2) (2×3) (3×3)

The input matrices would be stored in linear memory (column-major) as:

a c e b d f and g h i j k l.

Reading those matrices as row-major with dimensions 2×3 and 3×2, they would appear as:

a c e and g h b d f i j k l

Swapping the order and matrix multiplying:

| | | | |
|---|---|---|---|
| g h | * | a c e | ag + bh cg + dh eg + fh |
| i j | | b d f= | ai + bj ci + dj ei + fj |
| k l | | | ak + bl ck + dl ek + fl |

the transpose matrix is out and can then be stored in in row-major order:

| | | | | | | | | |
|---|---|---|---|---|---|---|---|---|
| ag + bh | cg + dh | eg + fh | ai + bj | ci + dj | ei + fj | ak + bl | ck + dl | ek + fl |

and used in subsequent column major computations, it is the correct un-transposed matrix:

| | | |
|---|---|---|
| ag + bh | ai + bj | ak + bl |
| cg + dh | ci + dj | ck + dl |
| eg + fh | ei + fj | ek + fl |

III. Exemplary Usage

FIG. 16 illustrates an example of usage of matrices (tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the A matrix 1603 (tmm2) is re-used twice as it multiplied by two tiles from the B matrix 1605. Pointers to load a new A tile and two new B tiles from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Example 1 An apparatus comprising: matrix operations circuitry to execute one or more decoded matrix operation instructions on data stored in two-dimensional data structures; and storage to store the two-dimensional data structures.

Example 2 The apparatus of example 1, wherein the storage is a plurality of packed data registers and the two-dimensional data structures are overlaid on these registers.

Example 3 The apparatus of example 1, wherein the storage is a plurality of packed data registers and memory, and the two-dimensional data structures are overlaid on these registers and memory.

Example 4 The apparatus of any of examples 1-3, wherein the matrix operations circuitry is a plurality of chained fused multiply accumulate circuits.

Example 5 The apparatus of example 4, wherein each of the chained fused multiply accumulate circuits is to include storage for a portion of a two-dimensional data structure that the fused multiply accumulate circuit is to operate on.

Example 6 The apparatus of any of examples 1-5, wherein matrix operations circuitry supports element matrix multiply, subtract, and add instructions.

Example 7 The apparatus of any of examples 1-6, wherein matrix operations circuitry supports dot product and multiply accumulate operations.

Example 8 The apparatus of any of examples 1-7, wherein matrix operations circuitry supports matrix transpose and diagonal operations.

Example 9 A system comprising: a host processor; a matrix operations accelerator coupled to the host processor, wherein the matrix operations accelerator is to perform matrix operations on two-dimensional data structures using a computational grid based on commands received from the host processor.

Example 10 The system of example 9, wherein the matrix operations accelerator further comprises a plurality of data buffers to buffer matrix data in two-dimensional data structures.

Example 11 The system of any of examples 9-10, wherein the computational grid is to house at least one of the buffered matrix data from the plurality of data buffers during a matrix manipulation operation.

Example 12 The system of any of examples 9-11, wherein the data buffers are a plurality of registers.

Example 13 The system of example 12, wherein the registers are a plurality of packed data registers and the two-dimensional data structures are overlaid on these registers.

Example 14 The system of example 12, wherein the storage is a plurality of packed data registers and memory, and the two-dimensional data structures are overlaid on these registers and the memory.

Example 15 The system of any of examples 9-14, wherein the matrix operations circuitry is a plurality of chained fused multiply add circuits.

Example 16 The system of example 15, wherein each of the chained fused multiply add circuits is to include storage for a portion of a two-dimensional data structure that the fused multiply add circuit is to operate on.

Example 17 The system of any of examples 9-15, further comprising a coherent memory interface coupled to the matrix operations accelerator and host processor to provide access to shared memory between the host processor and matrix operations accelerator.

Figure 17:
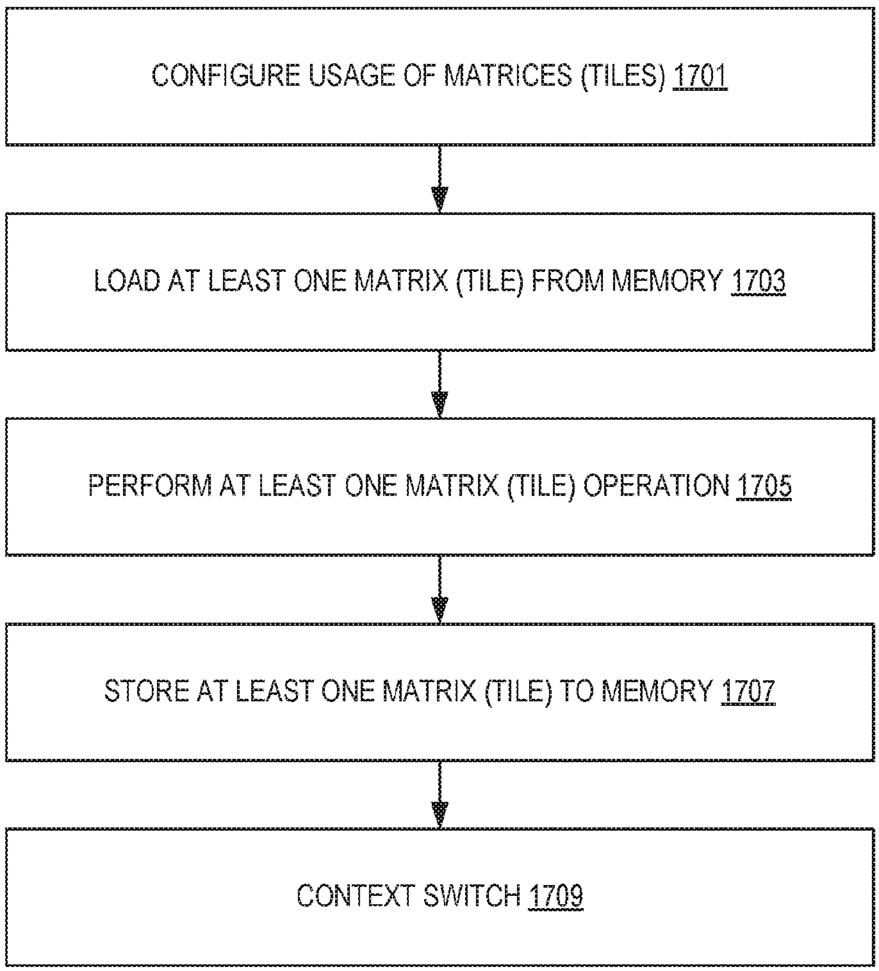
FIG. 17 illustrates an embodiment a method of usage of matrices (tiles)

FIG. 17 illustrates an embodiment of usage of matrices (tiles). At 1701, tile usage is configured. For example, a TILECONFIG instruction is executed to configure tile usage including setting a numbers of rows and columns per tile. Typically, at least one matrix (tile) is loaded from memory at 1703.

IV. Exemplary Instructions

A. Tile Configuration

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L*N) will typically not work if M and L are not the same.

Detailed herein are embodiments of a matrix (tile) configuration ("TILECONFIG") instruction and its execution.

Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

i. Exemplary Execution

Figure 18:
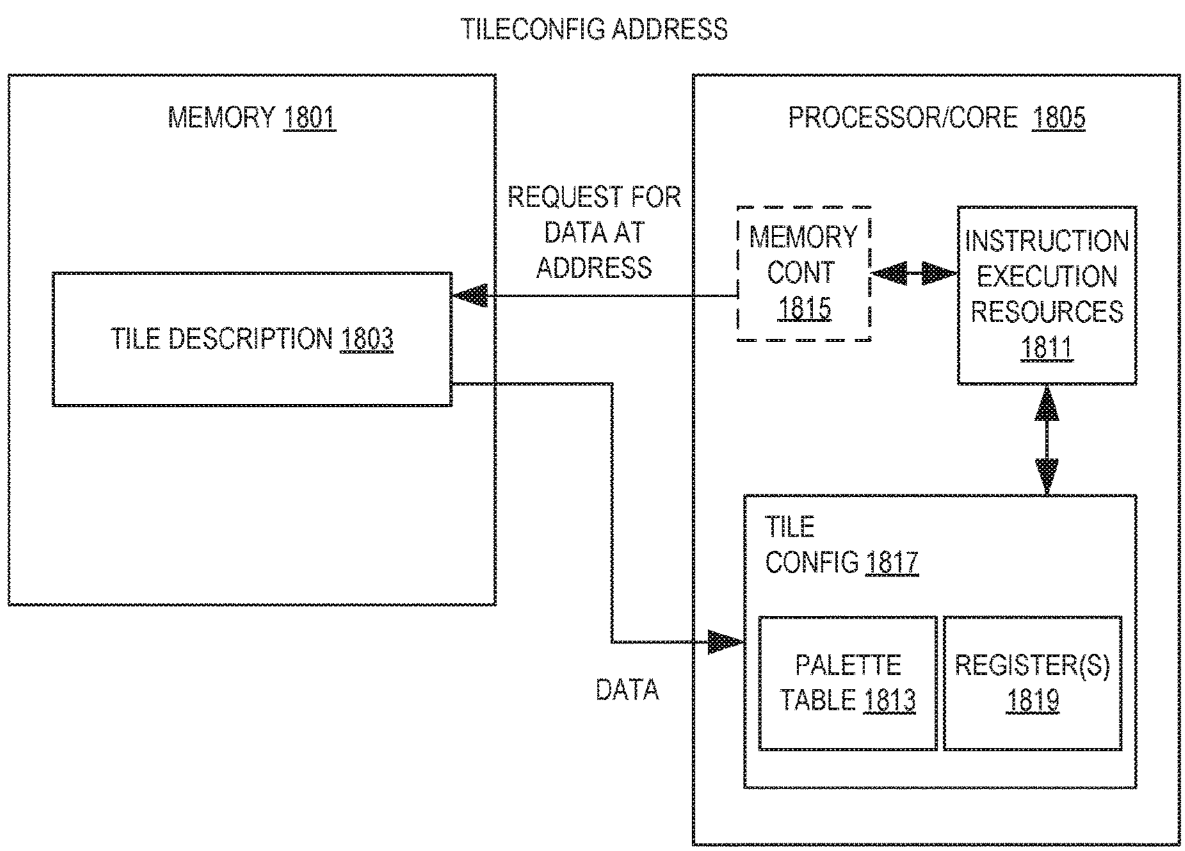
FIG. 18 illustrates an exemplary execution of a TILECONFIG instruction.

FIG. 18 illustrates an exemplary execution of a TILECONFIG instruction. The TILECONFIG instruction format includes fields for an opcode and a memory address.

As illustrated, the TILECONFIG instruction uses the address as a pointer to a memory 1801 location containing the description of the matrices (tiles) to be supported 1803.

Execution circuitry 1811 of a processor/core 1805 performs the TILECONFIG by retrieving the description 1803 from memory 1801 via a memory controller 1815, configuring tiles for a palette (setting the number of rows and columns) in a tile configuration 1817, and marking that matrix support is in use. In particular, instruction execution resources 1811 are configured to use tiles as specified by setting tile configurations 1817. The instruction execution resources may also include a machine specific register or configuration register to indicate tile usage.

Tile configurations 1817 are set to indicate parameters per tile as indicated by the tile description 1803 via the execution of the TILECONFIG instruction. The set parameters are the number of rows and columns per tile. Additional values such as in-use and start values are also set. The tile configurations 1817 utilize one or more registers 1819 to store tile usage and configuration information.

ii. Exemplary Tile Storage

Figure 19A:
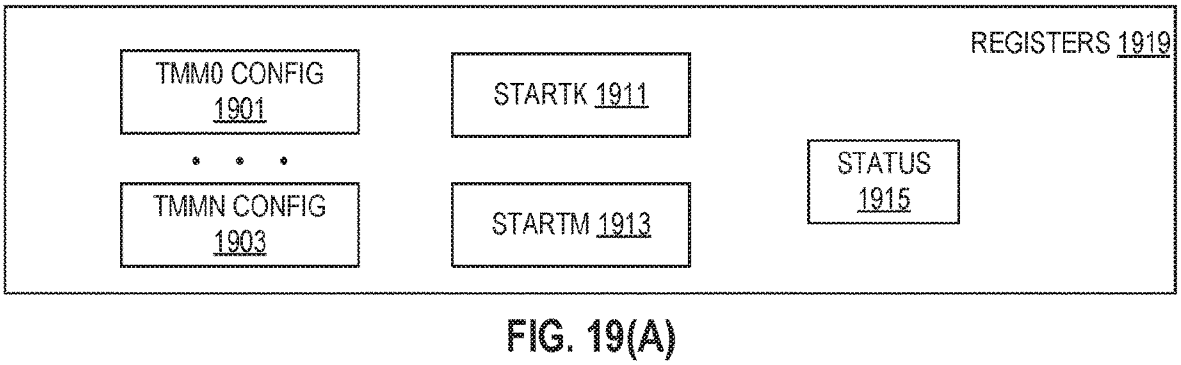
FIGS. 19(A)-(D) illustrate examples of register(s)

FIGS. 19(A)-(D) illustrate examples of register(s) 1819. FIG. 19(A) illustrates a plurality of registers 1819. As shown each tile (TMM0 1901 . . . TMMN 1903) has a separate register with each register storing a row and column size for that particular tile. StartK and StartM are stored in separate registers 1911 and 1913. One or more status registers 1915 are set (e.g., TILES_CONFIGURED=1) to indicate tiles are configured for use.

Figure 19B:
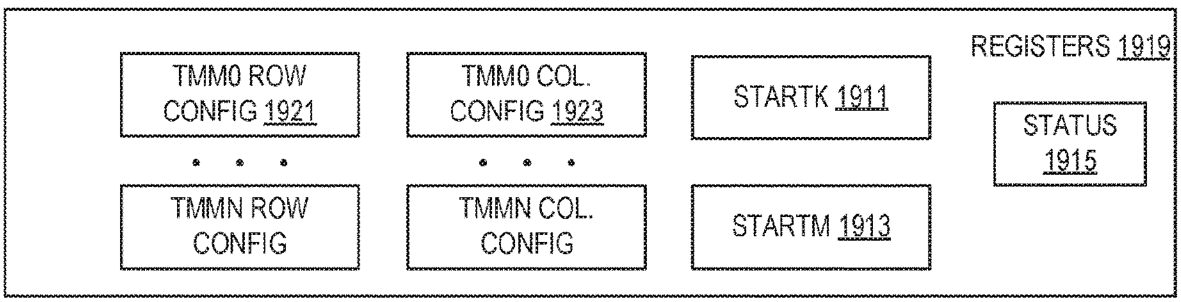

FIG. 19(B) illustrates a plurality of registers 1819. As shown each tile has separate registers for its rows and columns. For example, TMM0 rows configuration 1921, TMM0 columns configuration 1923, StartK and StartM are stored in separate registers '1911 and 1913. One or more status registers 1915 are set (e.g., TILES_CONFIGURED=1) to indicate tiles are configured for use.

Figure 19C:
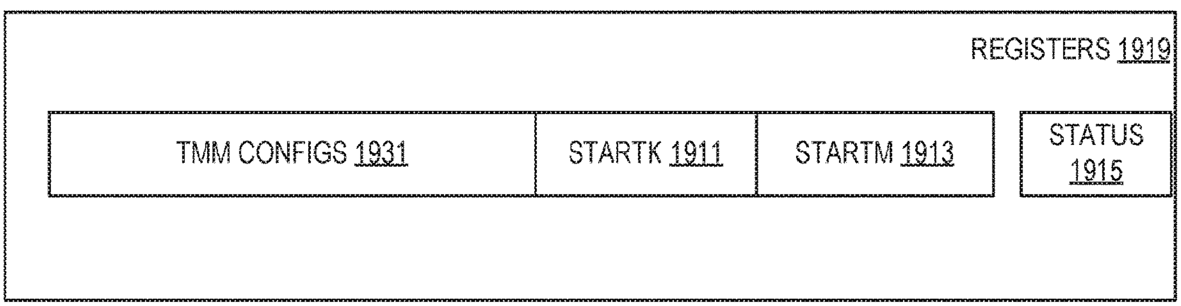

FIG. 19(C) illustrates a single register 1819. As shown, this register stores tile configurations (rows and columns per tile) 1931, StartK 1933, and StartM 1933 are stored in single register as packed data registers. One or more status registers 1915 are set (e.g., TILES_CONFIGURED=1) to indicate tiles are configured for use.

Figure 19D:
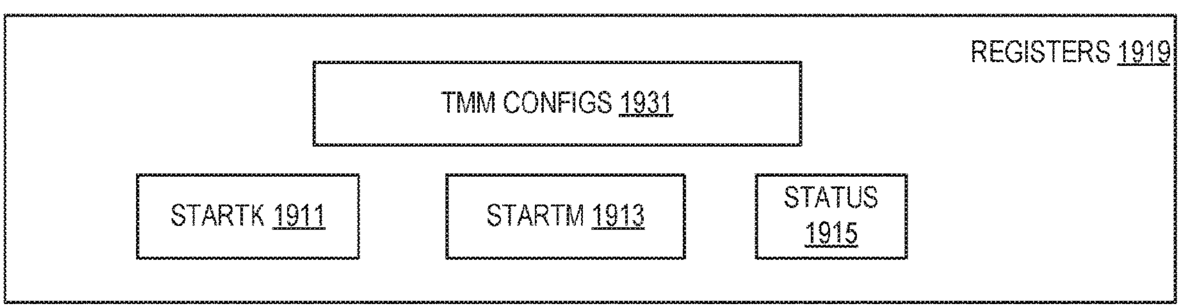

FIG. 19(D) illustrates a plurality of registers 1819. As shown, a single register stores tile configurations (rows and columns per tile) 1931. StartK and StartM are stored in separate registers 1911 and 1913. One or more status registers 1915 are set (e.g., TILES_CONFIGURED=1) to indicate tiles are configured for use.

Other combinations are contemplated such as combining the start registers into a single register where they are shown separately, etc.

iii. Exemplary Stored Matrix (Tile) Description

Figure 20:
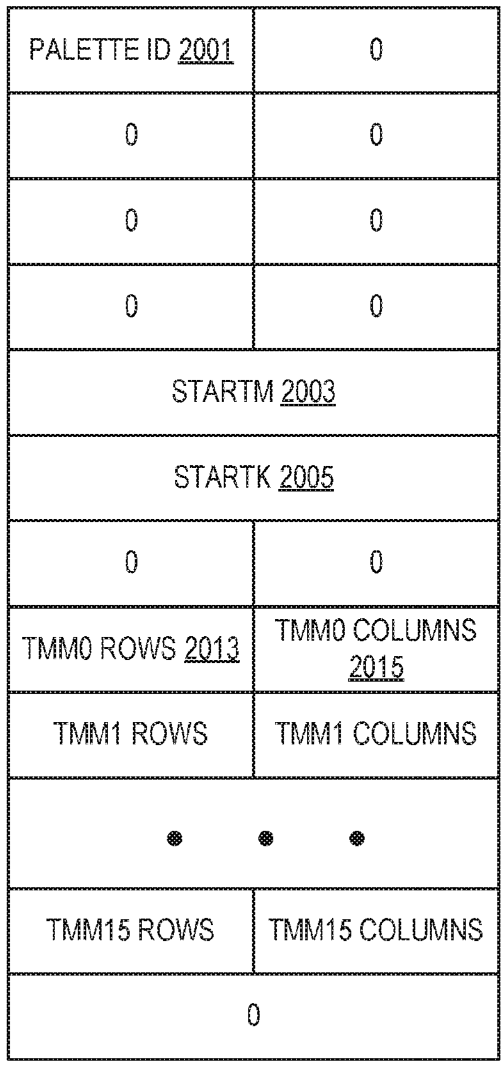
FIG. 20 illustrates an embodiment of a description of the matrices (tiles) to be supported.

FIG. 20 illustrates an embodiment of a description of the matrices (tiles) to be supported. In this example, each field is a byte. In byte[0], a palette ID 2001 is stored. The palette ID is used to index a palette table 1813 which stores, per palette ID, a number of bytes in a tile, and bytes per row of the tiles that are associated with this ID as defined by the configuration. Bytes 1-7 are reserved and are typically zero.

Bytes 8-9 store a value for a "startM" register 2003 and bytes 10-11 store a value for a "startK" register 2005. To support restarting instructions after these events, the instructions store information these registers. The startM indicates a row that should be used for restart. The startK indicates a position in the inner-product for relevant operations. The position in the row (the column) is not needed. Two-dimensional operations like the element-wise addition/subtraction/multiplication only use startM. Three-dimensional operations use values from both startM and startK. Typically, operations that only require startM will zero startK when writing startM.

Any time an interrupted tile instruction is not restarted, in some embodiments, it is the responsibility of software to zero the startM and startK values. For example, unmasked floating point exception handlers might decide to finish the operation in software and change the program counter value to another instruction, usually the next instruction. In this case the software exception handler must zero the startM and startK values in the exception frame presented to it by the operating system before resuming the program. The operating system will subsequently reload those values.

Bytes 16-17 store the number of rows 2013 and columns 2015 for tile 0, bytes 18-19 store the number of rows and columns for tile 1, etc. In other words, each 2 byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to the INIT state with 0 rows, 0 columns.

Finally, the configuration in memory typically ends with an ending delineation such as all zeros for several consecutive bytes.

IV. Exemplary Format(s)

An embodiment of a format for a TILECONFIG instruction is TILECONFIG Address. In some embodiments, TILECONFIG is the opcode mnemonic of the instruction. Address is a pointer to a matrix (tile) description in memory. In some embodiments, the address field is a R/M value (such as 2446).

In embodiments, encodings of the instruction include a scale-index-base (SIB) type memory addressing operand that indirectly identifies multiple indexed destination locations in memory (e.g., field 2450). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

v. Exemplary Method(s) of Execution

Figure 21:
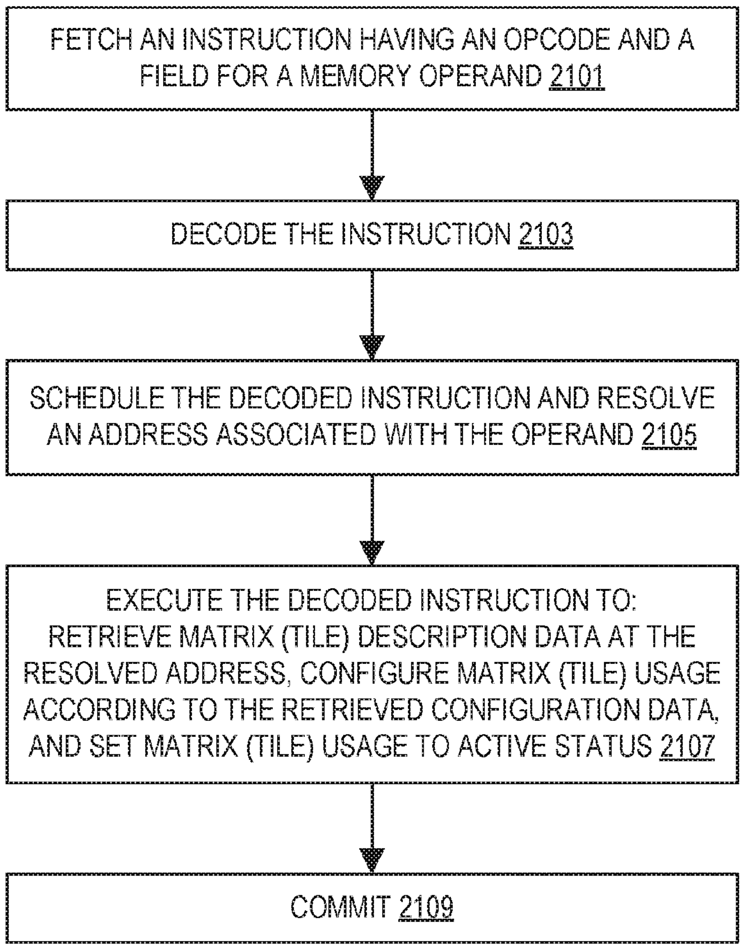
FIG. 21 illustrates an embodiment of method performed by a processor to process a TILECONFIG instruction.

FIG. 21 illustrates an embodiment of method performed by a processor to process a TILECONFIG instruction.

At 2101, an instruction is fetched. For example, a TILECONFIG instruction is fetched. An embodiment of the TILECONFIG instruction includes fields for an opcode and a memory address operand.

The fetched instruction is decoded at 2103. For example, the fetched TILECONFIG instruction is decoded by decode circuitry such as that detailed herein.

A description found at the memory address of the memory address operand is are retrieved at 2105 and the decoded instruction is scheduled (as needed).

At 2107, the decoded instruction is executed by execution circuitry (hardware) such as that detailed herein. For the TILECONFIG instruction, the execution will cause execution circuitry to configure usage of tiles in a tile configuration (setting the number of rows and columns) and marking that matrix (tile) support is in use (active). For example, configuration one or more registers 1819. Tile support usage (e.g., "TILES_CONFIGURED") is typically indicated by setting a bit in a status, control, or machine specific register. In particular, instruction execution resources 1811 are configured to use tiles as specified by the retrieved configuration.

In some embodiments, the instruction is committed or retired at 2109.

Figure 22:
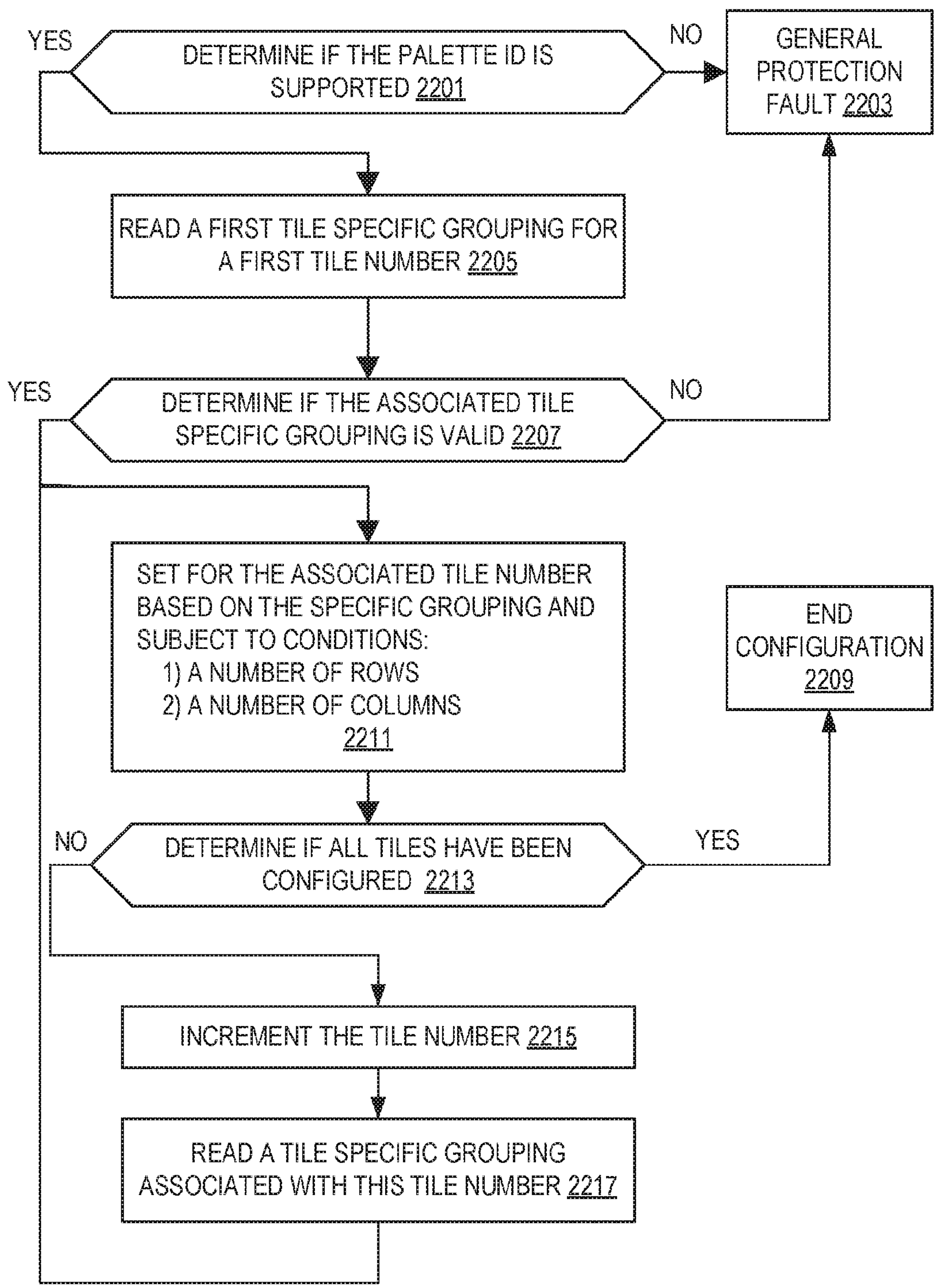
FIG. 22 illustrates a more detailed description of an execution of a TILECONFIG instruction using memory addressing.

FIG. 22 illustrates a more detailed description of an execution of a TILECONFIG instruction using memory addressing. Typically, this is performed by execution circuitry such as that detailed above after the description has been retrieved from memory. While not illustrated, in some embodiments, a check is first performed to determine if tiles are supported. Support is usually found by a CPUID check.

At 2201, a determination of if the palette ID is supported is made. For example, does the CPUID state that this ID is supported? If not, then a general protection fault occurs at 2203.

At 2205, a first tile specific grouping is read. For example, the number of rows and columns for tile 0 (T0) is read.

A determination of if the read grouping is valid is made at 2207. For example, if one the number of rows or columns (not both) is set 0, then the grouping is not valid and the configuration halts and tiles are not considered to be in use at 2203. Invalid groups occur, for example, when one of rows or columns (not both) are zero. Additionally, when a value for the number of rows is greater than the maximum of rows supported (this is found by dividing the tile byte size of the palette ID with the number of bytes per row for the palette ID as found in the palette table) as fault occurs. Another potential fault is when there are more names than supported.

If the read grouping is valid, then the tile associated with the read grouping is configured to use the number of rows and columns specified by the grouping in a tile configuration at 2211. The size of the elements in the tile are set by the palette table entry for the palette ID.

A determination of if all tiles of the retrieved configuration have been configured is made at 2213. For example, have all of the possible tile names been processed? In some embodiments, when the rows and columns for a particular tile are both 0, then all tiles have been processed.

When all tiles have not been configured, at 2215, the tile number is incremented such that the next tile in the configuration will be evaluated.

At 2217, the incremented tile's grouping is read. For example, the number of rows and columns for tile 1 (T1) is read. A determination of if the read grouping is valid is made at 2207, etc.

When all tiles have been configured, then the instruction completes at 2209. The tiles will be marked as being in use for matrix operations, for example, by setting an in-use indicator in a register.

vi. Exemplary Pseudocode

FIG. 23 illustrates exemplary pseudocode for an execution of a TILECONFIG instruction.

vii. Examples

Example 1 A processor comprising decode circuitry to decode an instruction having fields for an opcode and a memory address; and execution circuitry to execute the decoded instruction to set a tile configuration for the processor to utilize tiles in matrix operations based on a description retrieved from the memory address, wherein a tile a set of 2-dimensional registers.

Example 2 The processor of example 1, wherein the configuration comprises a palette identifier and details regarding a number of rows and columns per tile of the palette.

Example 3 The processor of example 1, wherein the palette identifier is an index into a palette table defining a number of bytes per tile and bytes per row of the tile.

Example 4 The processor of any of examples 1-4, wherein the configuration is stored in a single packed data register.

Example 5 The processor of any of examples 1-4, wherein the configuration is stored in a plurality of packed data registers, one packed data register per configured tile.

Example 6 The processor of any of examples 1-5, wherein the execution circuitry to general a fault upon a value of a number of rows for a tile being zero and a number of columns for the row being non-zero.

Example 7 The processor of any of examples 1-6, wherein the description is 64 bytes in size.

Example 8 A method comprising: decoding an instruction having fields for an opcode and a memory address; and executing the decoded instruction to set a tile configuration for the processor to utilize tiles in matrix operations based on a description retrieved from the memory address, wherein a tile a set of 2-dimensional registers.

Example 9 The method of example 8, wherein the configuration comprises a palette identifier and details regarding a number of rows and columns per tile of the palette.

Example 10 The method of example 8, wherein the palette identifier is an index into a palette table defining a number of bytes per tile and bytes per row of the tile.

Example 11 The method of any of examples 8-10, wherein the configuration is stored in a single packed data register.

Example 12 The method of any of examples 8-10, wherein the configuration is stored in a plurality of packed data registers, one packed data register per configured tile.

Example 13 The method of any of examples 8-12, further comprising:

faulting upon a value of a number of rows for a tile being zero and a number of columns for the row being non-zero.

Example 14 The method of any of examples 8-13, wherein the description is 64 bytes in size.

Example 15 A non-transitory machine-readable medium storing an instruction which causes a processor to perform a method, the method comprising: decoding an instruction having fields for an opcode and a memory address; and executing the decoded instruction to set a tile configuration for the processor to utilize tiles in matrix operations based on a description retrieved from the memory address, wherein a tile a set of 2-dimensional registers.

Example 16 The non-transitory machine-readable medium of example 15, wherein the configuration comprises a palette identifier and details regarding a number of rows and columns per tile of the palette.

Example 17 The non-transitory machine-readable medium of example 15, wherein the palette identifier is an index into a palette table defining a number of bytes per tile and bytes per row of the tile.

Example 18 The non-transitory machine-readable medium of any of examples 15-17, wherein the configuration is stored in a single packed data register.

Example 19 The non-transitory machine-readable medium of any of examples 15-17, wherein the configuration is stored in a plurality of packed data registers, one packed data register per configured tile.

Example 20 The non-transitory machine-readable medium of any of examples 15-19, further comprising: faulting upon a value of a number of rows for a tile being zero and a number of columns for the row being non-zero.

Example 21 The non-transitory machine-readable medium of any of examples 15-20, wherein the description is 64 bytes in size.

B. Tile Load

As noted above, a common operation is to load a time from memory prior to performing an operation on it. Detailed herein are embodiments of a matrix (tile) load ("TILELOAD") instruction and its execution. A TILELOAD instruction is an improvement a computer itself as it provides for support to move data from one matrix (tile) to another matrix (tile) with a single instruction. In particular, the execution of the TILELOAD instruction causes data from memory to be loaded into a destination matrix (tile). The size of the data values to be loaded varies depending on the instruction and tile support. Exemplary sizes included, but are not limited to, 16-bit, 32-bit, 64-bit, 128-bit, 256-bit, etc. Typically, the data stored in memory is strided.

i. Exemplary Execution

Figure 24:
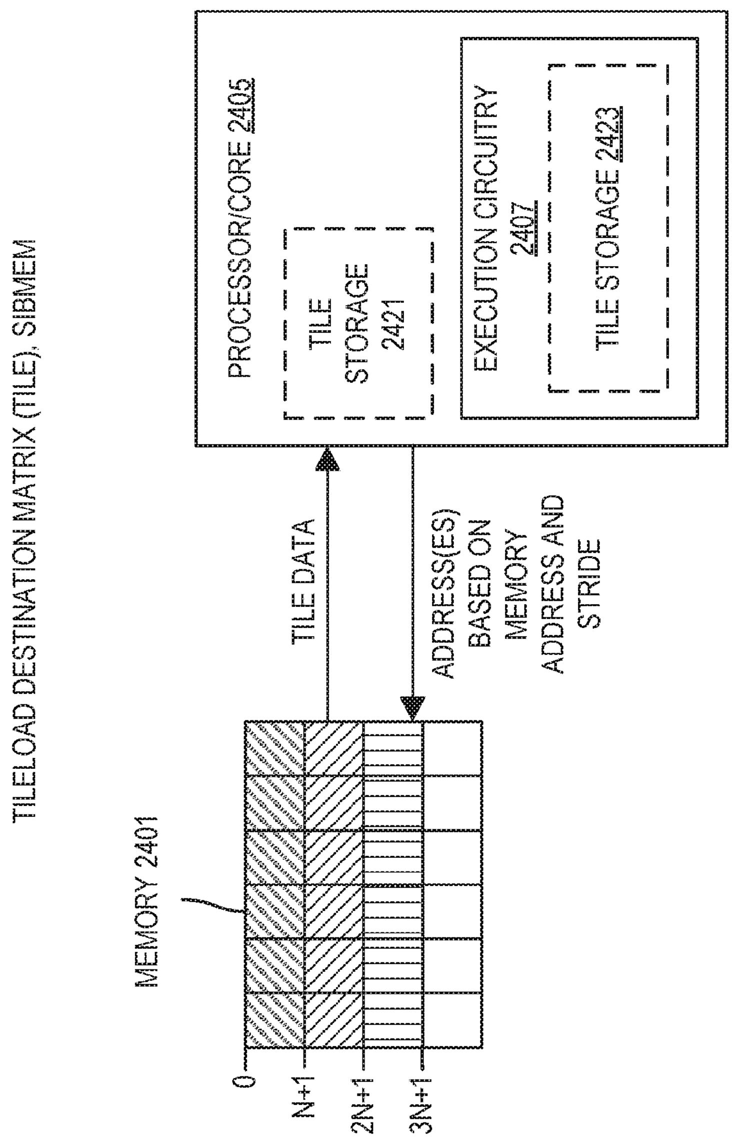
FIG. 24 illustrates an exemplary execution of a TILELOAD instruction.

FIG. 24 illustrates an exemplary execution of a TILELOAD instruction. The TILELOAD instruction format includes fields for an opcode, a source memory address (shown as "SIBMEM" in the figure), and an identifier of a destination matrix (tile) operand (shown as "Destination Matrix (Tile)" in the figure).

As shown, the source is memory 2401. A plurality of data elements (shaded) is to be loaded from memory into a destination matrix (tile). The source address of the memory are provided by the initial memory address of the instruction (e.g., base plus displacement) and the stride value. (e.g., index<<scale). In most embodiments, the execution circuitry is a memory (store) execution circuit. In some embodiments, the memory (store) execution circuit is also utilized for non-matrix (tile) memory operations.

The "stride" comes from an index register as indicated in the memory addressing scheme. The stride indicates an amount of memory to go from one group of data elements of memory to another group of data elements that are a "stride" away from the group. Depending upon the implementation, the stride is either from an address corresponding to an initial data element of a group to an initial data element of a subsequent group in memory, or from an address corresponding to a last data element of a group to an initial data element of a subsequent group in memory. Typically, strides are used to delineate rows, however, that in not necessarily true. The source memory address information includes a scale, index (stride value), and base (SIB). In a SIB addressing scheme, the stride is the index (I) shifted by the scale (S).

The destination matrix (tile) operand field represents a destination matrix (tile) to be stored in tile storage. A matrix (tile) may be stored in storage 2423 within execution circuitry in a collection of registers or other storage, or in storage external to execution resources 2421.

As shown, execution circuitry 2407 of a processor, accelerator, or core 2405 executes a decoded TILELOAD instruction to store the source data of the source memory 2401 into matrix (tile) storage 2421 or 2423. The source addresses of the memory are provided by the initial memory address of the instruction (e.g., base plus displacement) and the stride value. (e.g., index<<scale). In most embodiments, the execution circuitry is a memory (load) execution circuit. In some embodiments, the memory (load) execution circuit is also utilized for non-matrix (tile) memory operations.

ii. Exemplary Format(s)

An embodiment of a format for a TILELOAD instruction is TILELOAD{B/W/D/Q} TMM1, SIBMEM. In some embodiments, TILELOAD{B/W/D/Q} is the opcode mnemonic of the instruction where B/W/D/Q represent data element sizes (byte, word, double word, quadword) of the source and destination. TMM1 is a field for identifying a destination matrix (tile) operand. SIBMEM is a field storing address information for the initial memory address to be used for the destination. In some embodiments, the SIBMEM includes the use of a R/M value (such as 8246), SIB Byte 8250, and displacement 8262. In some embodiments, the destination matrix (tile) field is REG 8244, and the data element size is found in 8265.

In embodiments, encodings of the instruction include a scale-index-base (SIB) type memory addressing operand that indirectly identifies multiple indexed destination locations in memory (e.g., field 8250). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 25:
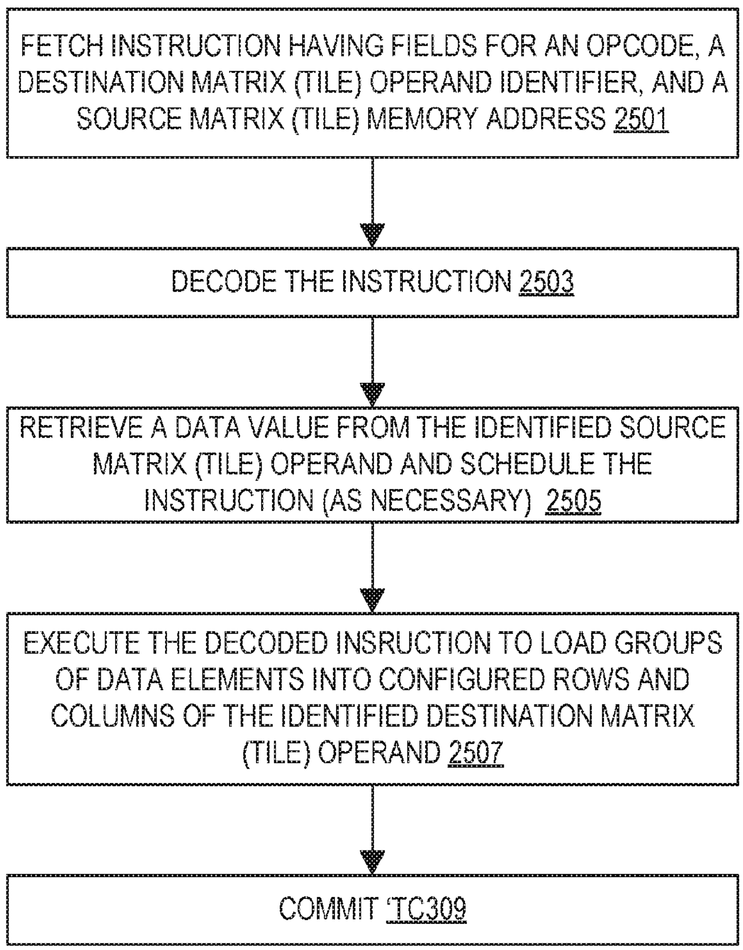
FIG. 25 illustrates an embodiment of method performed by a processor to process a TILELOAD instruction

FIG. 25 illustrates an embodiment of method performed by a processor to process a TILELOAD instruction.

At 2501, an instruction is fetched. For example, a TILELOAD instruction is fetched. The TILELOAD instruction includes fields for an opcode, a source memory address, a stride value, and a destination matrix (tile) operand. In some embodiments, the instruction is fetched from an instruction cache. The opcode of the TILELOAD instruction indicates a load of rows from memory into a destination matrix (tile) operand is to occur.

The fetched instruction is decoded at 2503. For example, the fetched TILELOAD instruction is decoded by decode circuitry such as that detailed herein.

Data values associated with the strided source memory address of the decoded instruction are retrieved at 2505 and the decoded instruction is scheduled (as needed).

At 2507, the decoded instruction is executed by execution circuitry (hardware) such as that detailed herein. For the TILELOAD instruction, the execution will cause execution circuitry to a load groups of strided data elements from memory into configured rows and columns of the destination matrix (tile) operand.

In some embodiments, the instruction is committed or retired at 2509.

Figure 26:
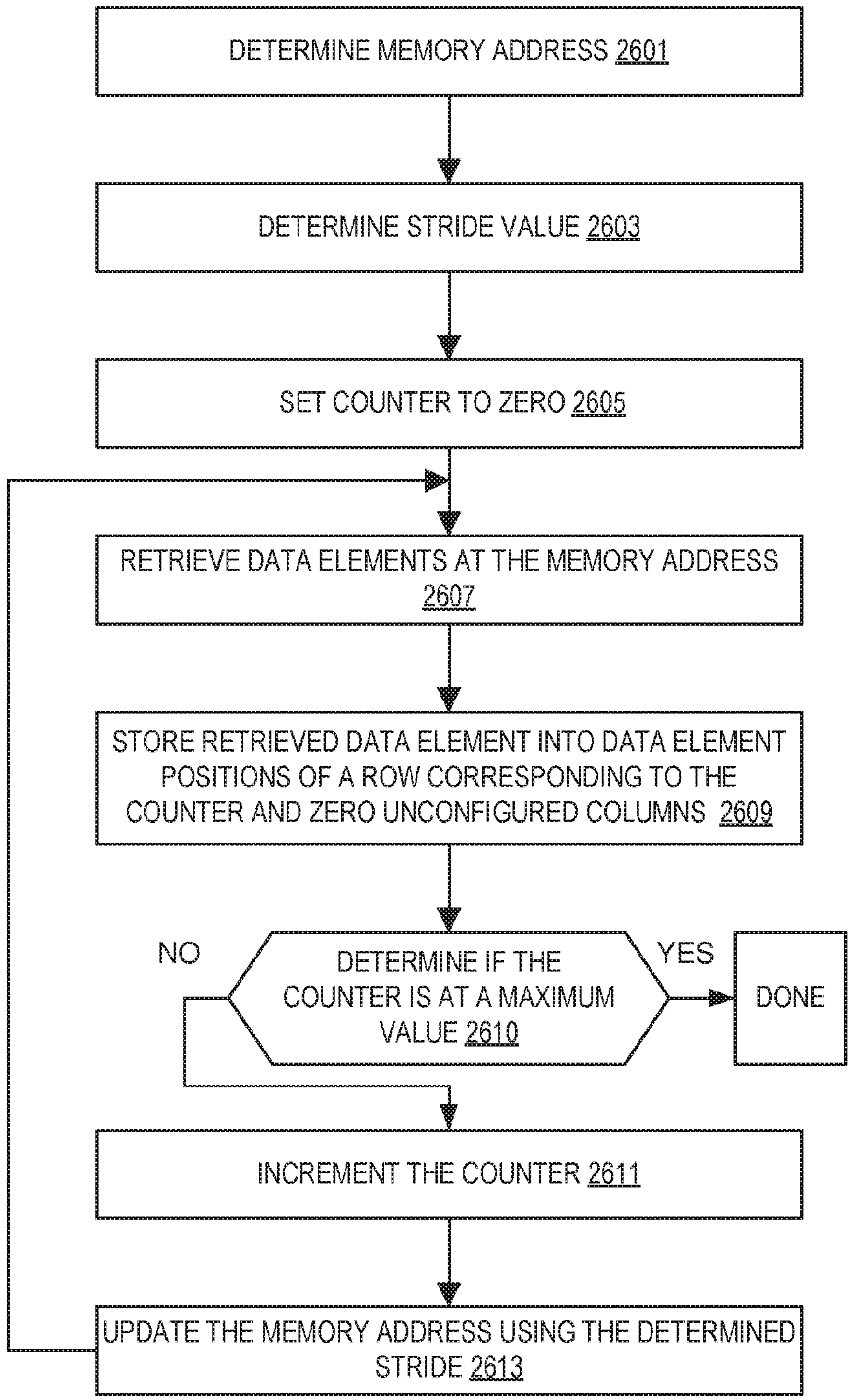
FIG. 26 illustrates a more detailed description of an execution of a TILELOAD instruction.

FIG. 26 illustrates a more detailed description of an execution of a TILELOAD instruction. Typically, this is performed by execution circuitry such as that detailed above.

At 2601, an initial memory address is determined. For example, using SIB addressing, the base provided by the instruction is added to the displacement value.

At 2603, an initial stride is determined. For example, using SIB addressing, the index provided by the instruction shifted by the scale value of the instruction.

A counter used in the load operation is set to zero at 2605. The use of the counter allows for the load to be restarted at a particular row.

Data elements of the memory address are retrieved at 2607. For example, in an initial iteration, data elements at memory [initial memory address] are retrieved.

The retrieved data elements are loaded in a configured row of the destination matrix (tile) operand corresponding to the counter value at 2609. For example, for the initial iteration, row[counter=0, no stride] is filled with these data elements. In some embodiments, unconfigured columns are zeroed.

A determination of if the counter is at a maximum value is made at 2610. For example, is the counter less than the number of rows in the destination? Note that if the counter is initially set to 1, then this is a check if the counter is less than or equal to the number of rows in the destination.

If not, then the load is done and all unconfigured rows are zeroed. If the counter is not maxed out, then the counter is incremented at 2611. For example, the counter is increased by 1 which indicates the next row of the destination is to be loaded.

The memory address using the determined stride is updated at 2613. For example, the memory address used in the previous retrieval is updated to account for the row position (counter) and stride (e.g., counter*stride is added to the previously used address).

In some embodiments, if tiles are not configured for use, a fault is generated before any execution takes place.

To restart, the execution picks up from the last row to be loaded. No zeroing is done.

iv. Exemplary Pseudocode

FIGS. 27(A)-(C) illustrate examples of pseudocode representing a method of executing a TILELOAD instruction using words, doublewords, and quadwords.

v. Examples

Example 1 A processor comprising: decode circuitry to decode an instruction having fields for an opcode, a destination matrix operand identifier, and source memory information; and execution circuitry to execute the decoded instruction to load groups of strided data elements from memory into configured rows of the identified destination matrix operand to memory.

Example 2 The processor of example 1, wherein the opcode defines a size of each data element of the destination matrix operand.

Example 3 The processor of example 2, wherein the size of each data element of the destination matrix operand is a doubleword.

Example 4 The processor of example 2, wherein the size of each data element of the destination matrix operand is a word.

Example 5 The processor of any of examples 1-4, wherein the execution circuitry is to store each configured row into the identified destination matrix operand and update a counter value as each row is stored.

Example 6 The processor of any of examples 1-5, wherein the identified destination matrix operand is a plurality of registers configured to represent a matrix.

Example 7 The processor of any of examples 1-6, wherein the source memory information includes a scale, an index, a base, and a displacement.

Example 8 A method comprising: decoding an instruction having fields for an opcode, a destination matrix operand identifier, and source memory information; and executing the decoded instruction to load groups of strided data elements from memory into configured rows of the identified destination matrix operand to memory.

Example 9 The method of example 8, wherein the opcode defines a size of each data element of the destination matrix operand.

Example 10 The method of example 9, wherein the size of each data element of the destination matrix operand is a doubleword.

Example 11 The method of example 9, wherein the size of each data element of the destination matrix operand is a word.

Example 12 The method of any of examples 8-11, wherein the execution circuitry is to load each configured row of the identified destination matrix operand and update a counter value as each row is loaded.

Example 13 The method of any of examples 8-12, wherein the identified destination matrix operand is a plurality of registers configured to represent a matrix.

Example 14 The method of any of examples 8-13, wherein the source memory information includes a scale, an index, a base, and a displacement.

Example 15 A non-transitory machine-readable medium storing an instruction which causes a processor to perform a method, the method comprising: decoding an instruction having fields for an opcode, a destination matrix operand identifier, and source memory information; and executing the decoded instruction to load groups of strided data elements from memory into configured rows of the identified destination matrix operand to memory.

Example 16 The non-transitory machine-readable medium of example 15, wherein the opcode defines a size of each data element of the destination matrix operand.

Example 17 The non-transitory machine-readable medium of example 16, wherein the size of each data element of the destination matrix operand is a doubleword.

Example 18 The non-transitory machine-readable medium of example 16, wherein the size of each data element of the destination matrix operand is a word.

Example 19 The non-transitory machine-readable medium of any of examples 15-18, wherein the execution circuitry is to load each configured row of the identified destination matrix operand and update a counter value as each row is loaded.

Example 20 The non-transitory machine-readable medium of any of examples 15-19, wherein the identified destination matrix operand is a plurality of registers configured to represent a matrix.

Example 21 The non-transitory machine-readable medium of any of examples 15-20, wherein the source memory information includes a scale, an index, a base, and a displacement.

Example 22 A system comprising: a processor; and an accelerator coupled to the processor, the accelerator including: decode circuitry to decode an instruction having fields for an opcode, a destination matrix operand identifier, and source memory information, and execution circuitry to execute the decoded instruction to load groups of strided data elements from memory into configured rows of the identified destination matrix operand to memory.

Example 23 The system of example 22, wherein the execution circuitry is to load each configured row of the identified destination matrix operand and update a counter value as each row is stored.

Example 24 The system of any of examples 22-23, wherein the identified source destination operand is a plurality of registers configured to represent a matrix.

Example 25 The system of any of examples 22-24, wherein the source memory information includes a scale, an index, a base, and a displacement.

C. Tile Store

As discussed above, matrices (tiles) may need to loaded from and stored to memory as there is typically not enough on die storage to indefinitely hold them. Detailed herein are embodiments of a matrix (tile) store ("TILESTORE") instruction and its execution. A TILESTORE instruction is an improvement a computer itself as it provides for support to move data from one matrix (tile) to another matrix (tile) with a single instruction. In particular, the execution of the TILESTORE instruction causes data from source matrix (tile) to be stored in memory. The size of the data values to be stored varies depending on the instruction and tile support. Exemplary sizes included, but are not limited to, 16-bit, 32-bit, 64-bit, 128-bit, 256-bit, etc.

i. Exemplary Execution

Figure 28:
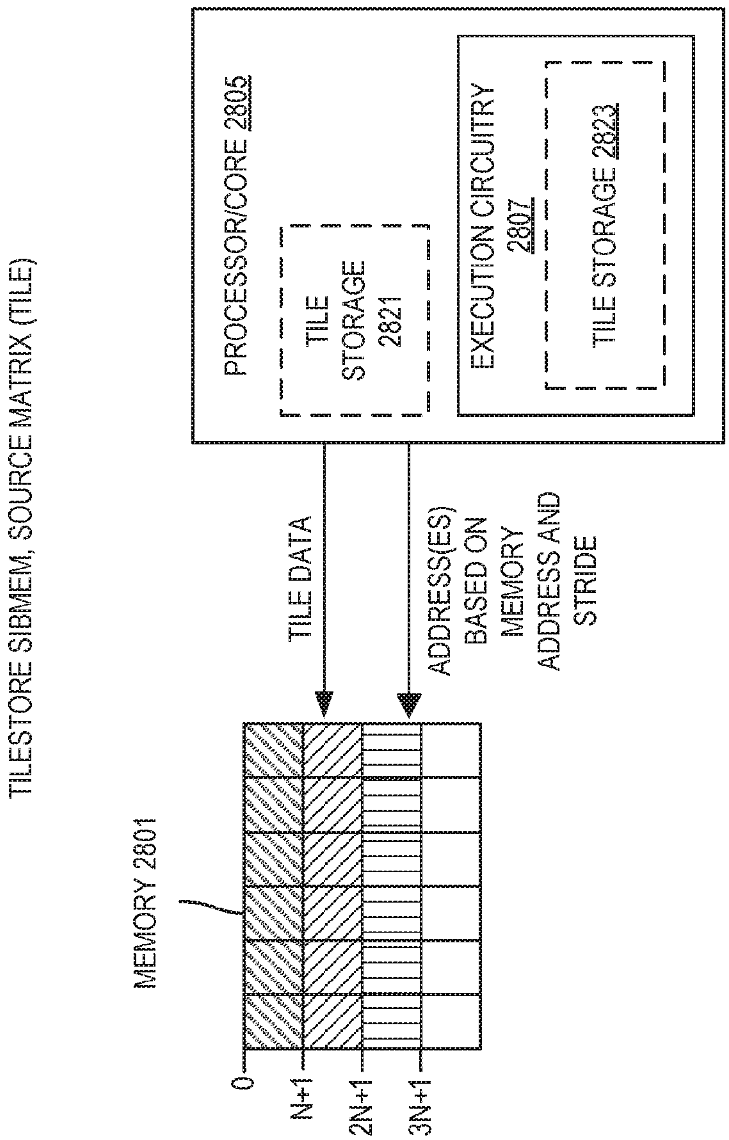
FIG. 28 illustrates an exemplary execution of a TILESTORE instruction.

FIG. 28 illustrates an exemplary execution of a TILESTORE instruction. The TILESTORE instruction format includes fields for an opcode, a destination memory address information (shown as "SIBMEM" in the figure), and an identifier of source matrix (tile) operand (shown as "Source Matrix (Tile)" in the figure).

As shown, the destination is memory 2801. A plurality of data elements is to be stored from a source matrix (tile) in memory.

The source matrix (tile) operand field represents a source matrix (tile) to be stored in tile storage. The source matrix (tile) may be stored in storage 2823 within execution circuitry in a collection of registers or other storage, or in storage external to execution resources 2821.

As shown, execution circuitry 2807 of a processor, accelerator, or core 2805 executes a decoded TILESTORE instruction to store the source data into the destination memory 2801 from configured rows of the source matrix (tile) storage 2821 or 2823. The destination addresses of the memory are provided by the initial memory address of the instruction (e.g., base plus displacement) and the stride value. (e.g., index<<scale). In most embodiments, the execution circuitry is a memory (store) execution circuit. In some embodiments, the memory (store) execution circuit is also utilized for non-matrix (tile) memory operations.

The "stride" comes from an index register as indicated in the memory addressing scheme. The stride indicates an amount of memory to go from one group of data elements of memory to be stored to another group of data elements that are a "stride" away from the group. Depending upon the implementation, the stride is either from an address corresponding to an initial data element of a group to an initial data element of a subsequent group in memory, or from an address corresponding to a last data element of a group to an initial data element of a subsequent group in memory. Typically, strides are used to delineate rows, however, that is not necessarily true. The destination memory address information includes a scale, index (stride value), and base (SIB). In a SIB addressing scheme, the stride is the index (I) shifted by the scale (S).

ii. Exemplary Format(s)

An embodiment of a format for a TILESTORE instruction is TILESTORE{B/W/D/Q} SIBMEM, TMM1. In some embodiments, TILESTORE{B/W/D/Q} is the opcode mnemonic of the instruction where B/W/D/Q represent data element sizes (byte, word, double word, quadword) of the source and destination. TMM1 is a field for identifying a source matrix (tile) operand. SIBMEM is a field storing address information for the initial memory address to be used for the destination. In some embodiments, the SIBMEM includes the use of a R/M value (such as 8246), SIB Byte 8250, and displacement 8262. In some embodiments, the source matrix (tile) field is REG 8244, and the data element size is found in 8265.

In embodiments, encodings of the instruction include a scale-index-base (SIB) type memory addressing operand that indirectly identifies multiple indexed destination locations in memory (e.g., field 8250). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 29:
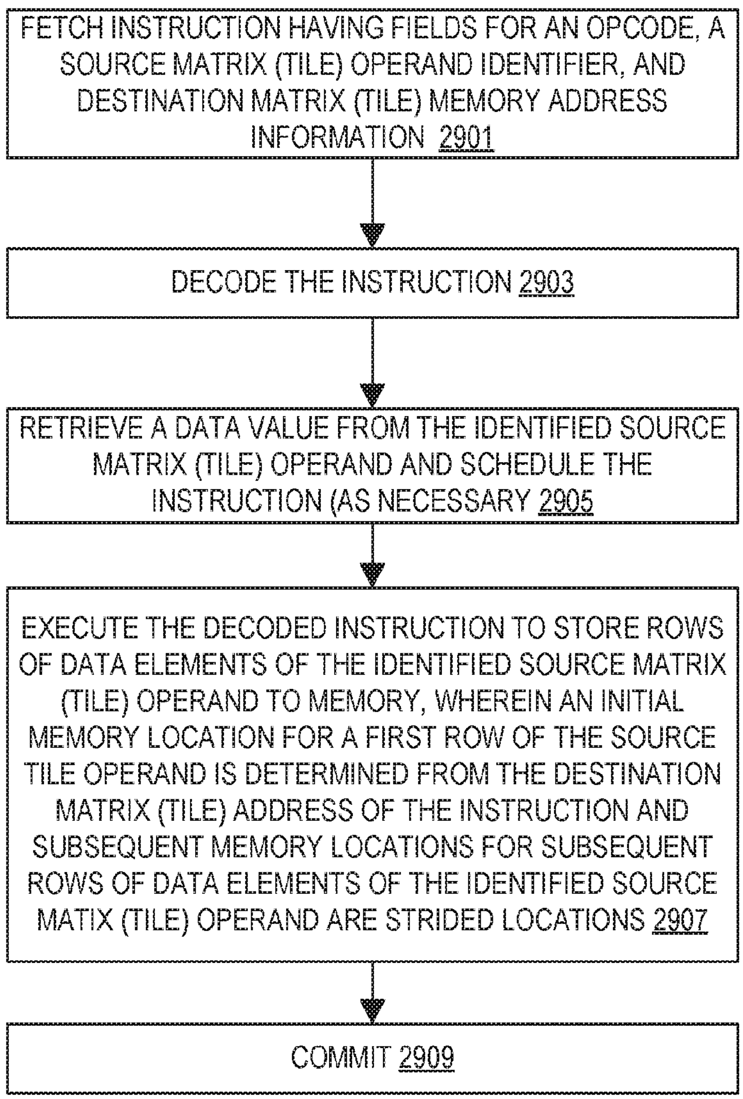
FIG. 29 illustrates an embodiment of method performed by a processor to process a TILESTORE instruction.

FIG. 29 illustrates an embodiment of method performed by a processor to process a TILESTORE instruction.

At 2901, an instruction is fetched. For example, a TILESTORE instruction is fetched. The TILESTORE instruction includes fields for an opcode, destination memory information, and an identifier of a source matrix (tile) operand. In some embodiments, the instruction is fetched from an instruction cache. The opcode of the TILESTORE instruction indicates a store of rows of data into memory from a source matrix (tile) operand is to occur.

The fetched instruction is decoded at 2903. For example, the fetched TILESTORE instruction is decoded by decode circuitry such as that detailed herein.

Data values associated with the source matrix (tile) of the decoded instruction are retrieved at 2905 and the decoded instruction is scheduled (as needed).

At 2907, the decoded instruction is executed by execution circuitry (hardware) such as that detailed herein. For the TILESTORE instruction, the execution will cause execution circuitry to a store groups of data elements into memory from configured rows and columns of the source matrix (tile) operand based on memory address information provided by the instruction.

In some embodiments, the instruction is committed or retired at 2909.

Figure 30:
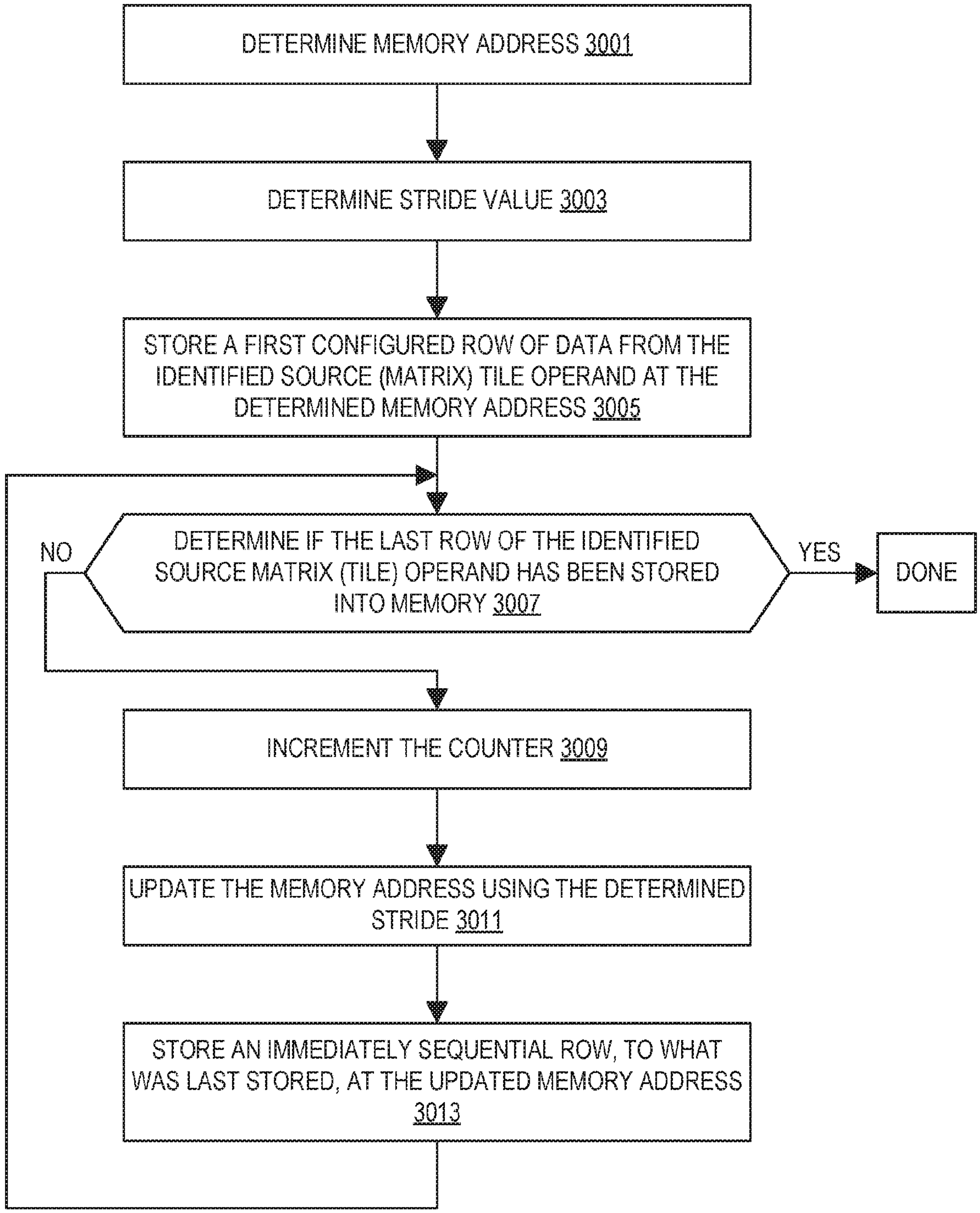
FIG. 30 illustrates a more detailed description of an execution of a TILESTORE instruction.

FIG. 30 illustrates a more detailed description of an execution of a TILESTORE instruction. Typically, this is performed by execution circuitry such as that detailed above.

At 3001, an initial memory address is determined. For example, using SIB addressing, the base provided by the instruction is added to the displacement value.

At 3003, an initial stride is determined. For example, using SIB addressing, the index provided by the instruction is shifted by the scale value of the instruction. Additionally, a counter used in the store operation is set to zero. The use of the counter allows for the store to be restarted at a particular row.

Data elements of a first configured row of the source matrix (tile) are stored in memory at 3005. For example, in an initial iteration, data elements of a first configured row (not including columns that were not configured for use) are stored at memory [initial memory address].

A determination of if the last row of the source has been stored is made at 3007. For example, is the counter less than the number of rows in the destination? Note that if the counter is initially set to 1, then this is a check if the counter is less than or equal to the number of rows in the destination.

If yes, then the store is done. If the counter is not maxed out, then the counter is incremented at 3009. For example, the counter is increased by 1 which indicates the next row of the source is to be stored.

The memory address using the determined stride is updated at 3011. For example, the memory address used in the previous retrieval is updated to account for the row position (counter) and stride (e.g., counter*stride is added to the previously used address).

An immediately sequential row of the source matrix (tile) to what has last stored is stored at the updated memory address at 3013.

In some embodiments, if tiles are not configured for use, a fault is generated before any execution takes place. To restart, the execution picks up from the last row to be stored.

iv. Exemplary Pseudocode

FIGS. 31(A)-(C) illustrate examples of pseudocode representing methods of executing a TILESTORE instruction using words, doublewords, and quadwords.

v. Examples

Example 1 A processor comprising: decode circuitry to decode an instruction having fields for an opcode, a source matrix operand identifier, and destination memory information; and execution circuitry to execute the decoded instruction to store each data element of configured rows of the identified source matrix operand to memory based on the destination memory information.

Example 2 The processor of claim 1, wherein the opcode defines a size of each data element of the source matrix operand.

Example 3 The processor of example 2, wherein the size of each data element of the source matrix operand is a doubleword.

Example 4 The processor of example 2, wherein the size of each data element of the source matrix operand is a word.

Example 5 The processor of any of examples 1-4, wherein the execution circuitry is to store each configured row of the identified source matrix operand and update a counter value as each row is stored.

Example 6 The processor of any of examples 1-5, wherein the identified source matrix operand is a plurality of registers configured to represent a matrix.

Example 7 The processor of any of examples 1-6, wherein the destination memory information includes a scale, an index, a base, and a displacement.

Example 8 A method comprising: decoding an instruction having fields for an opcode, a source matrix operand identifier, and destination memory information; and executing the decoded instruction to store each data element of configured rows of the identified source matrix operand to memory based on the destination memory information.

Example 9 The method of example 8, wherein the opcode defines a size of each data element of the source matrix operand.

Example 10 The method of example 9, wherein the size of each data element of the source matrix operand is a doubleword.

Example 11 The method of example 9, wherein the size of each data element of the source matrix operand is a word.

Example 12 The method of any of examples 8-11, wherein the execution circuitry is to store each configured row of the identified source matrix operand and update a counter value as each row is stored.

Example 13 The method of any of examples 8-12, wherein the identified source matrix operand is a plurality of registers configured to represent a matrix.

Example 14 The method of any of examples 8-13, wherein the destination memory information includes a scale, an index, a base, and a displacement.

Example 15 A non-transitory machine-readable medium storing an instruction which causes a processor to perform a method, the method comprising: decoding an instruction having fields for an opcode, a source matrix operand identifier, and destination memory information; and executing the decoded instruction to store each data element of configured rows of the identified source matrix operand to memory based on the destination memory information.

Example 16 The non-transitory machine-readable medium of example 15, wherein the opcode defines a size of each data element of the source matrix operand.

Example 17 The non-transitory machine-readable medium of example 16, wherein the size of each data element of the source matrix operand is a doubleword.

Example 18 The non-transitory machine-readable medium of example 16, wherein the size of each data element of the source matrix operand is a word.

Example 19 The non-transitory machine-readable medium of any of examples 15-18, wherein the execution circuitry is to store each configured row of the identified source matrix operand and update a counter value as each row is stored.

Example 20 The non-transitory machine-readable medium of any of examples 15-19, wherein the identified source matrix operand is a plurality of registers configured to represent a matrix.

Example 21 The non-transitory machine-readable medium of any of examples 15-20, wherein the destination memory information includes a scale, an index, a base, and a displacement.

Example 22 A system comprising: a processor; and an accelerator coupled to the processor, the accelerator including: decode circuitry to decode an instruction having fields for an opcode, a source matrix operand identifier, and destination memory information, and execution circuitry to execute the decoded instruction to store each data element of configured rows of the identified source matrix operand to memory based on the destination memory information.

Example 23 The system of example 22, wherein the execution circuitry is to store each configured row of the identified source matrix operand and update a counter value as each row is stored.

Example 24 The system of any of examples 22-23, wherein the identified source matrix operand is a plurality of registers configured to represent a matrix.

Example 25 The system of any of examples 22-24, wherein the destination memory information includes a scale, an index, a base, and a displacement.

D. Tile Diagonal

Detailed herein are embodiments of a matrix (tile) diagonal ("TILEDIAGONAL") instruction and its execution. A TILEDIAGONAL instruction is an improvement to a computer itself as it provides for support to populate the main diagonal of a matrix (tile) with a single instruction. In particular, the execution of the TILEDIAGONAL instruction causes execution circuitry to store the identified source operand to every element along the main diagonal of the destination matrix (tile) and zeros all other elements in configured rows. The size of the data values to be stored varies depending on the instruction and tile support. Exemplary sizes include, but are not limited to, 16-bit, 32-bit, 64-bit, 128-bit, 256-bit, etc. In some embodiments, elements of the destination matrix (tile) that are not on the diagonal are zeroed. This instruction may be used, for example, to generate a diagonal matrix, scalar matrix, or identity matrix.

i. Exemplary Execution

Figure 32:
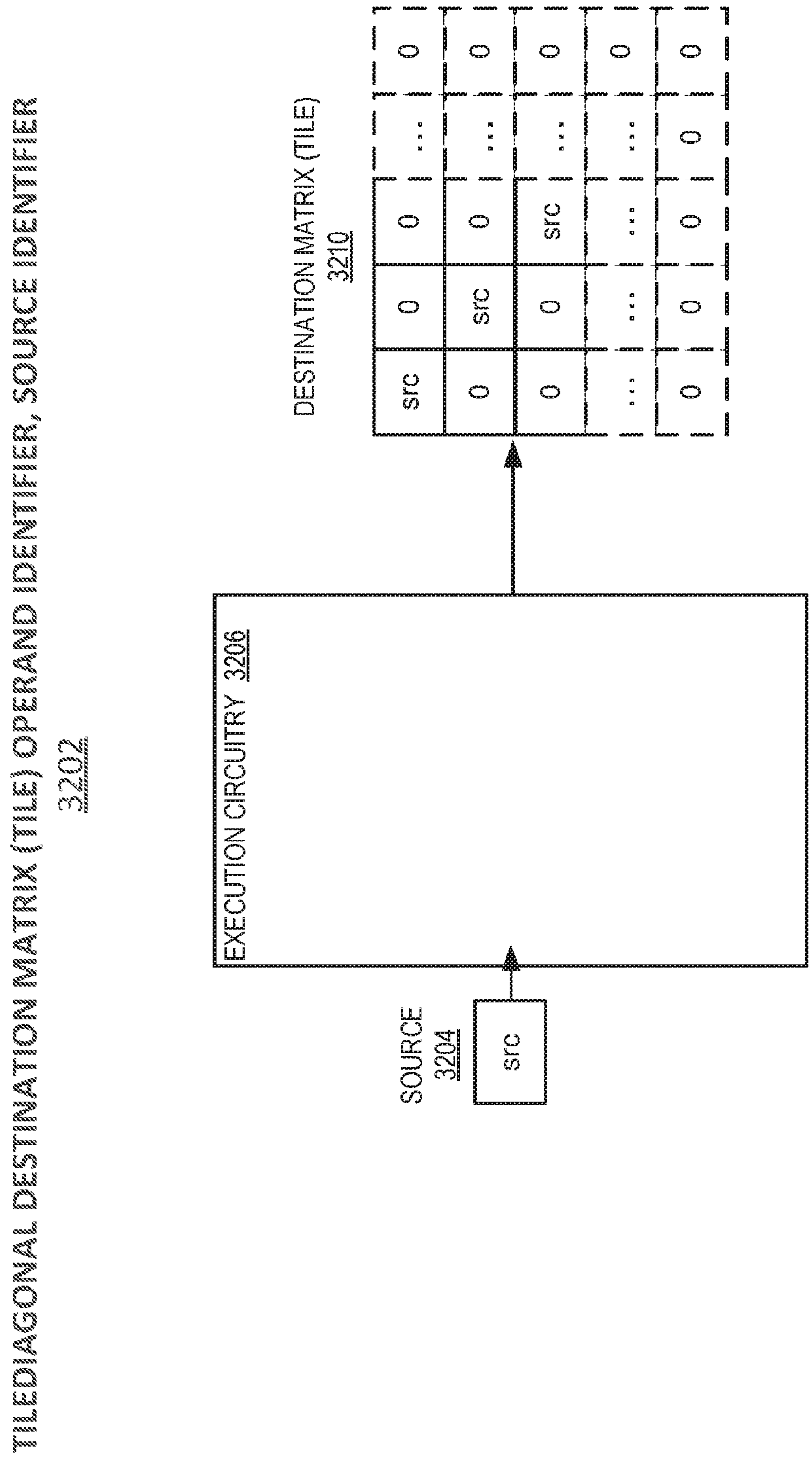
FIG. 32 illustrates an exemplary execution of a TILEDIAGONAL instruction.

FIG. 32 illustrates an exemplary execution of a TILEDIAGONAL instruction. The TILEDIAGONAL instruction 3202 format includes fields for an opcode, a source operand identifier, and a destination matrix (tile) operand identifier (shown as "DESTINATION MATRIX (TILE)").

The source operand 3204, as shown, identifies a register such as, for example, a general purpose register of a processor's register file. The destination matrix (tile) operand fields represent a destination matrix (tile) 3210. As detailed earlier, a matrix (tile) may be stored in a collection of registers, locations in memory (e.g., as strided rows), or in other storage accessible to execution circuitry.

As shown, execution circuity 3206 executes a decoded TILEDIAGONAL instruction to store an identified source operand 3204 to every element along the main diagonal of destination matrix (tile) 3210.

Also shown are remaining (unconfigured) columns and rows being set to zero, which is done in some embodiments. In some embodiments, a matrix (tile) is configured to use only a subset of the rows and columns possible. For example, a matrix (tile) may have up to 16 rows and columns to use, but only uses 4 of each. The configuration of each matrix (tile) is typically done by the execution of a configuration instruction prior to matrix (tile) usage. In this example, there are N columns and M rows possible.

ii. Exemplary Format(s)

An embodiment of a format for a TILEDIAGONAL instruction is TILEDIAGONAL DESTINATION MATRIX (TILE) IDENTIFIER, SOURCE OPERAND IDENTIFIER. In some embodiments, TILEDIAGONAL [A] {B/W/D/Q} is the opcode mnemonic of the instruction where B/W/D/Q is an optional field to represent data element sizes (byte, word, double word, quadword) of the source scalar value and the destination matrix (tile) elements, and where A is an optional prefix that indicates that an antidiagonal is to be generated, rather than a main diagonal. DESTINATION MATRIX (TILE) IDENTIFIER is a field for the destination matrix (tile) operand. SOURCE OPERAND IDENTIFIER is a field for the source operand identifier. In some embodiments, the SOURCE OPERAND IDENTIFIER field is a R/M value (such as 82 46), the destination matrix (tile) field is REG 8244, and the data element size is found in 8265.

In some embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64 {x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 33:
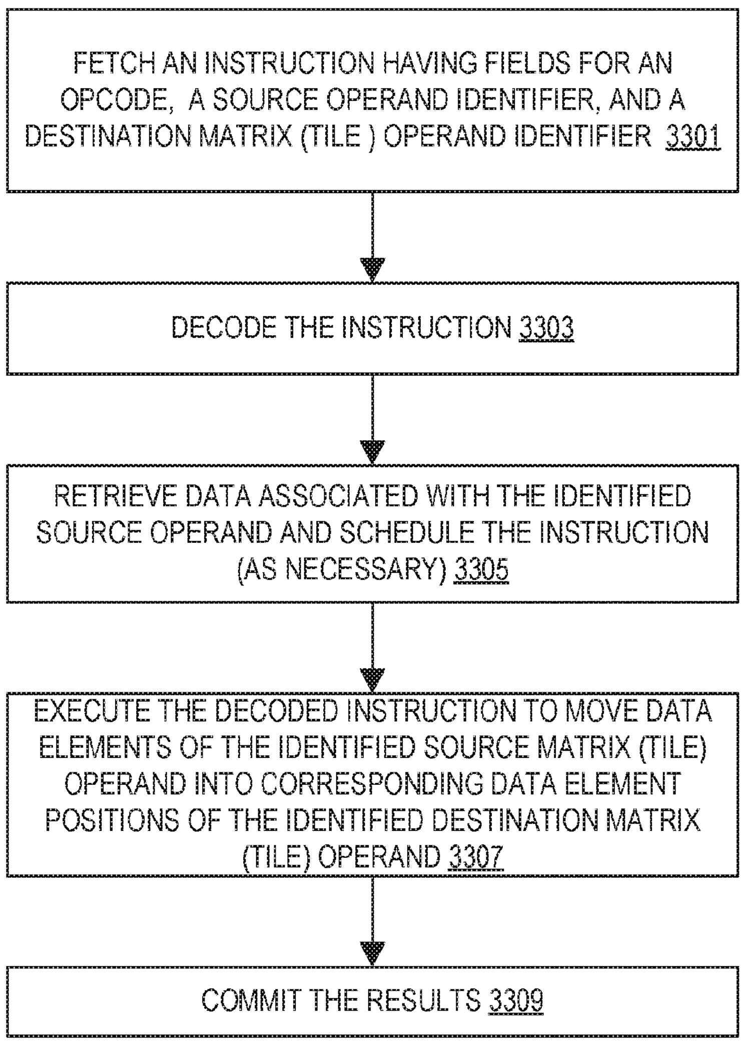
FIG. 33 illustrates an embodiment of method performed by a processor to process a TILEDIAGONAL instruction.

FIG. 33 illustrates an embodiment of method performed by a processor to process a TILEDIAGONAL instruction.

At 3301, an instruction is fetched. For example, a TILEDIAGONAL instruction is fetched. The TILEDIAGONAL instruction includes fields for an opcode, a source operand identifier, and a destination matrix (tile) operand identifier. In some embodiments, the instruction is fetched from an instruction cache. The opcode of the TILEDIAGONAL instruction indicates populating a main diagonal of an identified destination matrix (tile) operand is to occur, and a size of the data to be stored (written).

The fetched instruction is decoded at 3303. For example, the fetched TILEDIAGONAL instruction is decoded by decode circuitry such as that detailed herein.

Data values associated with the identified source operand of the decoded instruction are retrieved at 3305 and the decoded instruction is scheduled (as needed). For example, when the identified source operand is a memory location, the data from the indicated memory location is retrieved.

At 3307, the decoded instruction is executed by execution circuitry (hardware) such as that detailed herein. For the TILEDIAGONAL instruction, the execution will cause execution circuitry to store (write) the identified source operand to every element along the main diagonal of the destination matrix (tile). In some embodiments, unconfigured elements of rows of the destination matrix (tile) are zeroed as are elements not on the diagonal.

In some embodiments, the instruction is committed or retired at 3309.

Figure 34:
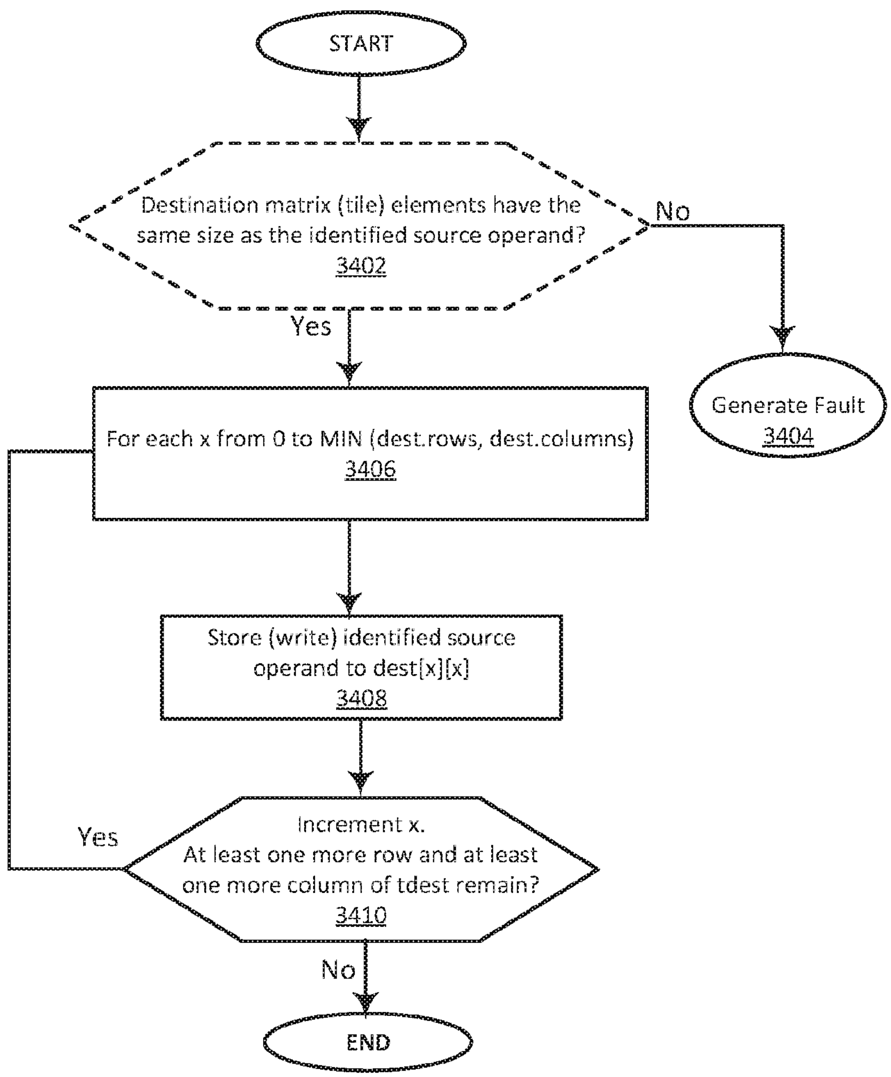
FIG. 34 illustrates a more detailed description of an execution of a TILEDIAGONAL instruction.

FIG. 34 illustrates a more detailed description of an execution of a TILEDIAGONAL instruction. Typically, this is performed by execution circuitry such as that detailed above.

At 3402, a determination is made as to whether the destination matrix (tile) elements have the same size as the identified source operand. If not, then a fault is raised at 3404. 3402 is optional, as signified by its dashed borders in FIG. 34 (dashed borders are used herein to identify optional items.)

If a positive determination is made at 3402, the execution circuitry at 3406 loops with loop index x equal to zero (0) to the Minimum of (dest.rows and dest.columns). For example, if the destination matrix (tile) has four rows and five columns, x will go from zero to four. On each loop iteration, at 3408, the execution circuitry stores (writes) the identified source operand to the destination matrix (tile) at element [x] [x]. At 3410 the execution circuit increments x, and determines whether at least one more row and at least one more column of the destination matrix (tile) remain. If so, the execution circuit returns to the start of the loop at 3406. If it is determined at 3410 that there is not at least one remaining row and at least one remaining column, the process ends. In this way, the execution circuit, over the course of the loop, stores (writes) the identified source operand to every element along the main diagonal of the destination matrix (tile).

iv. Exemplary Pseudocode

FIG. 35 is exemplary pseudocode describing an embodiment of a method performed by a processor to process a TILEDIAGONALD instruction. As shown in pseudocode 3502, the TILEDIAGONALD instruction includes an opcode, a source operand identifier SRC, and a destination operand TDEST to identify a destination matrix (tile). As shown, the pseudocode 3502 first causes the execution circuitry to generate a fault if any of three error checks fails. Then the pseudocode causes the processor to loop for a number of LOOP ITERATIONS equaling the MINIMUM of the number of rows and the number of columns of the destination matrix (tile). At each iteration, the processor sets the double word at destination element [x] [x] to the value of the source operand. The TILEDIAGONALD opcode includes a “D” suffix, indicating that the elements of the destination matrix (tile) are each the size of a doubleword. Pseudocode 3504 operates similarly to pseudocode 3502, but has a “W” suffix, indicating that its destination matrix (tile) elements are each two bytes in size.

v. Examples

Example 1 A processor comprising: decode circuitry to decode an instruction having fields for an opcode, a source operand identifier, and a destination matrix operand identifier; and execution circuitry to execute the decoded instruction to write the identified source operand to each element along a main diagonal of the identified destination matrix operand.

Example 2 The processor of example 1, wherein the opcode defines a size of each data element of the destination matrix operand.

Example 3 The processor of example 2, wherein the size of each data element of the destination matrix operand is a doubleword.

Example 4 The processor of example 2, wherein the size of each data element of the destination matrix operand is a word.

Example 5 The processor of any of examples 1-4, wherein the execution circuitry is further to zero any remaining columns of the identified destination matrix operand and unconfigured rows of the identified destination matrix operand.

Example 6 The processor of any of examples 1-5, wherein the destination matrix operand is a plurality of registers to represent a matrix.

Example 7 The processor of any of examples 1-5, wherein the execution circuitry is to fault upon a determination of one of: the identified source operand having a different number of bytes than each element of the identified destination matrix operand, each element of the destination matrix operand having a different size than a size identifier included in the opcode, and the identified destination matrix operand having zero configured elements.

Example 8 A method comprising: decoding an instruction having fields for an opcode, a source operand identifier, and a destination matrix operand identifier; and executing the decoded instruction to write the identified source operand to each element along a main diagonal of the identified destination matrix operand.

Example 9 The method of example 8, wherein the opcode defines a size of each data element of the destination matrix operand.

Example 10 The method of example 9, wherein the size of each data element of the destination matrix operands is a doubleword.

Example 11 The method of example 9, wherein the size of each data element of the destination matrix operands is a word.

Example 12 The method of any of examples 8-11, further comprising zeroing any remaining columns of the identified destination matrix operand and unconfigured rows of the identified destination matrix operand.

Example 13 The method of any of examples 8-12, wherein the identified destination matrix operand is a plurality of registers to represent a matrix.

Example 14 The method of any of examples 8-13, further comprising faulting upon a determination of one of: the identified source operand having a different number of bytes than each element of the identified destination matrix operand, each element of the destination matrix operand having a different size than a size identifier included in the opcode, and the identified destination matrix operand having zero configured elements.

Example 15 A non-transitory machine-readable medium storing an instruction which causes a processor to perform a method, the method comprising: decoding an instruction having fields for an opcode, a source operand identifier, and a destination matrix operand identifier; and executing the decoded instruction to write the identified source operand to each element along a main diagonal of the identified destination matrix operand.

Example 16 The non-transitory machine-readable medium of example 15, wherein the opcode defines a size of each data element of the destination matrix operand.

Example 17 The non-transitory machine-readable medium of example 16, wherein the size of each data element of the destination matrix operand is a doubleword.

Example 18 The non-transitory machine-readable medium of example 16, wherein the size of each data element of the destination matrix operand is a word.

Example 19 The non-transitory machine-readable medium of any of examples 15-18, wherein the method further comprises zeroing any remaining columns of the identified destination matrix operand and unconfigured rows of the identified destination matrix operand.

Example 20 The non-transitory machine-readable medium of any of examples 15-19, wherein the identified destination matrix operand is a plurality of registers to represent a matrix.

Example 21 The non-transitory machine-readable medium of any of examples 15-20, wherein the method further comprises faulting upon a determination of one of: the identified source operand having a different number of bytes than each element of the identified destination matrix operand, each element of the destination matrix operand having a different size than a size identifier included in the opcode, and the identified destination matrix operand having zero configured elements.

Example 22 A system comprising: a processor; and an accelerator coupled to the processor, the accelerator including: decode circuitry to decode an instruction having fields for an opcode, a source operand identifier, and a destination matrix operand identifier; and execution circuitry to execute the decoded instruction to write the identified source operand to each element along a main diagonal of the identified destination matrix operand.

Example 23 The system of example 22, wherein the opcode defines a size of each data element of the destination matrix operand.

Example 32 The system of any of examples 22-23, wherein the execution circuitry is further to zero any remaining columns of the identified destination matrix operand and unconfigured rows of the identified destination matrix operand.

Example 33 The system of any of examples 22-32, wherein the destination matrix operand is a plurality of registers to represent a matrix.

E. Tile Transpose

A common matrix operation is transpose. An example of a particular usage is to change format from row to column major and back. Detailed herein are embodiments of a TILETRANSPOSE instruction and its execution. A TILETRANSPOSE instruction is an improvement to a computer itself as it provides for support to transpose data within a matrix (tile) with a single instruction. In particular, the execution of the TILETRANSPOSE instruction causes the rows of a source matrix (tile) to be written as the columns of a destination matrix (tile). The size of the data values to be stored varies depending on the instruction and tile support. Exemplary sizes include, but are not limited to, 16-bit, 32-bit, 64-bit, 128-bit, 256-bit, etc. In some embodiments, elements of rows of the destination matrix (tile) that do not have corresponding columns in the source matrix (tile) are zeroed.

i. Exemplary Execution

Figure 36:
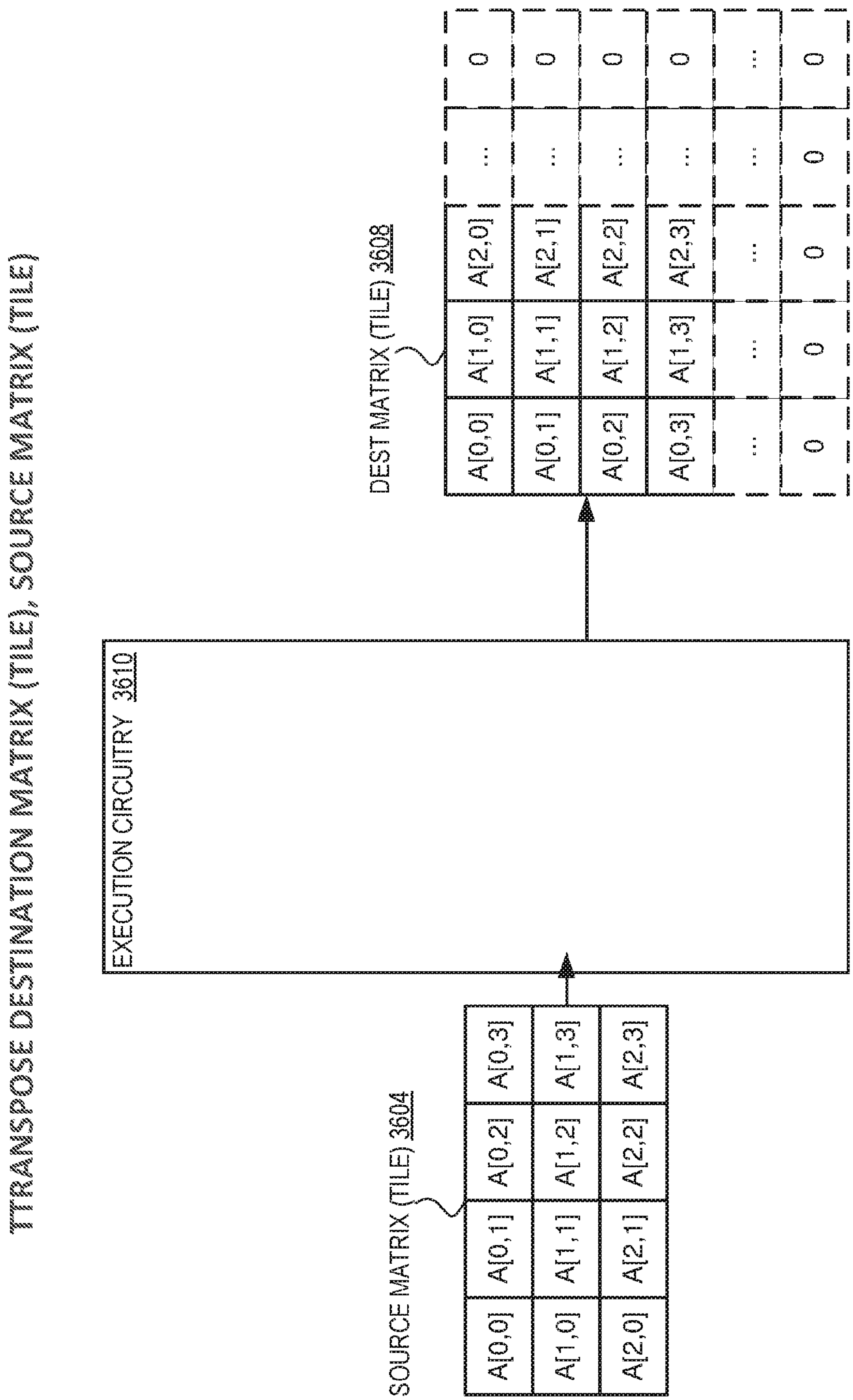
FIG. 36 illustrates an exemplary execution of a TILETRANSPOSE instruction.

FIG. 36 illustrates an exemplary execution of a TILETRANSPOSE instruction. The TILETRANSPOSE instruction format includes fields for an opcode, a source matrix (tile) operand (shown as "SOURCE MATRIX (TILE)"), and a destination matrix (tile) operand (shown as "DESTINATION MATRIX (TILE)").

The source matrix (tile) operand and destination matrix (tile) operand fields represent a source matrix (tile) 3604 and a destination matrix (tile) 3608. As detailed earlier, a matrix (tile) may be stored in a collection of registers, locations in memory, or in other storage accessible to execution circuitry.

As shown, execution circuitry 3610 executes a decoded TILETRANSPOSE instruction to transpose the source data of the source matrix (tile) operand 3604 into configured rows of the destination matrix (tile) operand 3608.

Also shown are remaining (unconfigured) columns and rows being set to zero which is done in some embodiments. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible.

ii. Exemplary Format(s)

An embodiment of a format for a TILETRANSPOSE instruction is TILETRANSPOSE{B/W/D/Q} TMM1, TMM2. In some embodiments, TILETRANSPOSE{B/W/D/Q} is the opcode mnemonic of the instruction where B/W/D/Q represent data element sizes (byte, word, double word, quadword) of the source and destination. TMM1 is a field for the destination matrix (tile) operand identifier. TMM2 is a field for a source matrix (tile) operand identifier. In some embodiments, the TMM2 field is a R/M value (such as 8246), the TMM1 field is REG 8244, and the data element size is found in 8265.

In embodiments, encodings of the instruction include a scale-index-base (SIB) type memory addressing operand that indirectly identifies multiple indexed destination locations in memory (e.g., field 8250). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 37:
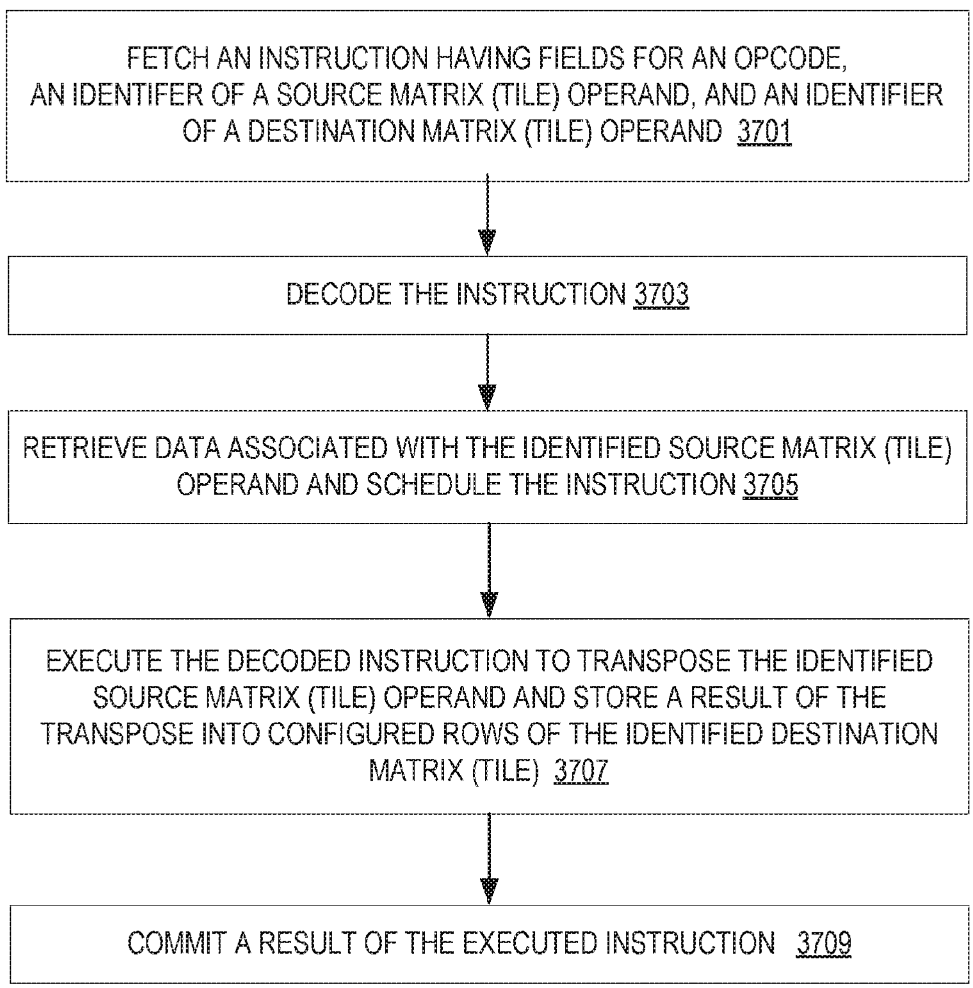
FIG. 37 illustrates an embodiment of method performed by a processor to process a TILETRANSPOSE instruction.

FIG. 37 illustrates an embodiment of method performed by a processor to process a TILETRANSPOSE instruction.

At 3701, an instruction is fetched. For example, a TILETRANSPOSE instruction is fetched. The TILETRANSPOSE instruction includes fields for an opcode, a source matrix (tile) operand identifier, and a destination matrix (tile) operand identifier. In some embodiments, the instruction is fetched from an instruction cache. The opcode of the TILETRANSPOSE instruction indicates a transposition of the data from the identified source matrix (tile) operand to corresponding packed data element positions of the identified destination matrix (tile) operand is to occur, and a size of the data to be transposed.

The fetched instruction is decoded at 3703. For example, the fetched TILETRANSPOSE instruction is decoded by decode circuitry such as that detailed herein.

Data values associated with the source matrix (tile) operand of the decoded instruction are retrieved at 3705 and the decoded instruction is scheduled (as needed). For example, when the source matrix (tile) operand is a memory location, the data from the indicated memory location is retrieved.

At 3707, the decoded instruction is executed by execution circuitry (hardware) such as that detailed herein. For the TILETRANSPOSE instruction, the execution will cause execution circuitry to transpose the source data of the source matrix (tile) operand into the destination matrix (tile) operand. In some embodiments, unconfigured elements of rows of the destination matrix (tile) are zeroed. In some embodiments, instead of a write, the identified source matrix (tile) operand is renamed to be the identified destination matrix (tile) operand. This eliminates the need to do a transposition and instead uses a logical renaming.

In some embodiments, the instruction is committed or retired at 3709.

Figure 38:
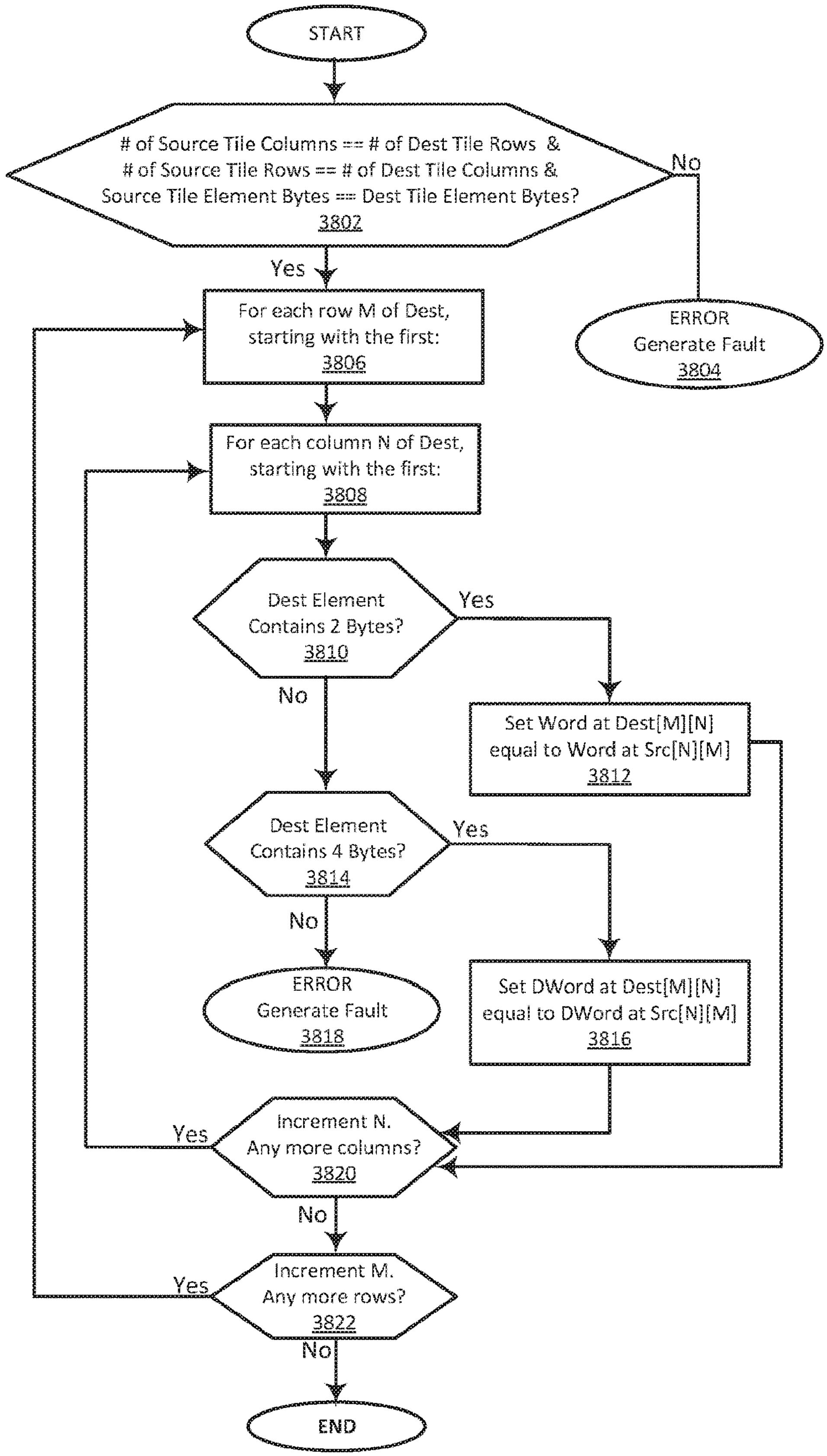
FIG. 38 illustrates a more detailed description of an execution of a TILETRANSPOSE instruction.

FIG. 38 illustrates a more detailed description of an execution of a TILETRANSPOSE instruction. Typically, this is performed by execution circuitry such as that detailed above.

At 3802, a determination of whether ALL of the following is true is made: 1) Does the number of columns in the source matrix (tile) equal the number of rows in the destination matrix (tile); 2) Does the number of rows in the source matrix (tile) equal the number of columns of the destination matrix (tile); and 3) Do the source and destination matrix (tile) operands have data elements of the same size? When any of these is not true, then a fault is generated at 3804.

When all of these conditions are true, then the execution circuitry at 3806 loops over each row M of the destination matrix (tile), starting with the first row. For each row, the execution circuitry executes an inner loop at 3808, looping over each column N of the destination tile, starting with the first column. For each of the elements of the inner loop, the execution circuitry determines at 3810 whether the destination tile element contains 2 bytes. If so, the execution circuitry at 3812 sets the word at destination[M][N] to the value of the word at source[N][M]. But, when the execution circuit at 3810 determines that the destination tile element does not contain 2 bytes, the execution circuit at 3814 determines whether the destination tile element contains 4 bytes. If so, the execution circuitry at 3816 sets the doubleword at destination[M][N] to the value of the doubleword at source[N][M]. As shown, when the execution circuit at 3814 determines that the destination tile element does not contain 4 bytes, a fault is generated at 3818.

After setting an element of the destination tile at either one of 3812 and 3816, the execution circuit at 3820 determines whether any columns remain in the loop, and, if so, processing of the inner loop returns to 3808. But when the determination at 3820 indicates that no rows remain, the execution circuitry at 3822 determines whether any rows remain in the loop, and, if so, processing returns to the outer loop at 3806. But, when the determination at 3822 indicates that no rows remain, the process ends.

iv. Exemplary Pseudocode

FIG. 39 is exemplary pseudocode describing an embodiment of a method performed by a processor to process a TILETRANSPOSED instruction. As shown in pseudocode 3902, the TILETRANSPOSED instruction includes an opcode, a source operand TSRC to identify a source matrix (tile), and a destination operand TDEST to identify a destination matrix (tile). As shown, the pseudocode 3902 first causes the execution circuitry to generate a fault if any of three error checks fails. Then the pseudocode causes the processor to loop over each row j and each column k of the destination tile. At each element, the processor sets the double word at destination tile[j][k] to the value of the double word at source tile[k][j]. The TILETRANSPOSED opcode includes a "D" suffix, indicating that the elements of the destination matrix (tile) are each the size of a doubleword. Pseudocode 3904 operates similarly to pseudocode 3902, but has a "W" suffix, indicating that its destination matrix (tile) elements are each two bytes in size.

v. Examples

Example 1 A processor comprising: decode circuitry to decode an instruction having fields for an opcode, a source matrix operand identifier, and a destination matrix operand identifier; and execution circuitry to execute the decoded instruction to transpose each row of elements of the identified source matrix operand into a corresponding column of the identified destination matrix operand.

Example 2 The processor of example 1, wherein the opcode defines a size of each data element of the source and destination matrix operands.

Example 3 The processor of example 2, wherein the size of each data element of the source and destination matrix operands is a doubleword.

Example 4 The processor of example 2, wherein the size of each data element of the source and destination matrix operands is a word.

Example 5 The processor of any of examples 1-4, wherein the execution circuitry is to transpose each row of the identified source matrix operand to a corresponding column of the identified destination matrix operand and zero any remaining columns of the identified destination matrix operand and unconfigured rows of the identified destination matrix operand.

Example 6 The processor of any of examples 1-5, wherein the source matrix operand is a plurality of registers to represent a matrix.

Example 7 The processor of any of examples 1-5, wherein the execution circuitry is to fault upon a determination of one of: the identified source operand has a different number of rows than a number of columns of the identified destination operand, the identified source operand has a different number of columns than a number of rows in the identified destination operand, and the identified source and destination matrix operands have different sized data elements.

Example 8 A method comprising: decoding an instruction having fields for an opcode, a source matrix operand identifier, and a destination matrix operand identifier; and executing the decoded instruction to transpose data elements of the identified source matrix operand into transposed data element positions of the identified destination matrix operand.

Example 9 The method of example 8, wherein the opcode defines a size of each data element of the source and destination matrix operands.

Example 10 The method of example 9, wherein the size of each data element of the source and destination matrix operands is a doubleword.

Example 11 The method of example 9, wherein the size of each data element of the source and destination matrix operands is a word.

Example 12 The method of any of examples 8-11, wherein each row of elements of the identified source matrix operand is transposed into a corresponding column of the identified destination matrix operand, the method further comprising zeroing any remaining columns of the identified destination matrix operand and unconfigured rows of the identified destination matrix operand.

Example 13 The method of any of examples 8-12, wherein the source matrix operand is a plurality of registers to represent a matrix.

Example 14 The method of any of examples 8-13, further comprising: faulting upon a determination of one of: the identified source operand has a different number of rows than a number of columns in the identified destination operand, the identified source operand has a different number of columns than a number of rows in the identified destination operand, and the identified source and destination matrix operands have different sized data elements.

Example 15 A non-transitory machine-readable medium storing an instruction which causes a processor to perform a method, the method comprising: decoding an instruction having fields for an opcode, a source matrix operand identifier, and a destination matrix operand identifier; and executing the decoded instruction to transpose data elements of the identified source matrix operand into transposed data element positions of the identified destination matrix operand.

Example 16 The non-transitory machine-readable medium of example 15, wherein the opcode defines a size of each data element of the source and destination matrix operands.

Example 17 The non-transitory machine-readable medium of example 16, wherein the size of each data element of the source and destination matrix operands is a doubleword.

Example 18 The non-transitory machine-readable medium of example 16, wherein the size of each data element of the source and destination matrix operands is a word.

Example 19 The non-transitory machine-readable medium of any of examples 15-18, wherein each row of elements of the identified source matrix operand is transposed into a corresponding column of the identified destination matrix operand, the method further comprising zeroing any remaining columns of the identified destination matrix operand and unconfigured rows of the identified destination matrix operand.

Example 20 The non-transitory machine-readable medium of any of examples 15-19, wherein the source matrix operand is a plurality of registers to represent a matrix.

Example 21 The non-transitory machine-readable medium of any of examples 15-20, further comprising: faulting upon a determination of one of: the identified source operand has a different number of rows than a number of columns of the identified destination operand, the identified source operand has a different number of columns than a number of rows in the identified destination operand, and the identified source and destination matrix operands have different sized data elements.

Example 22 A system comprising: a processor; and an accelerator coupled to the processor, the accelerator including: decode circuitry to decode an instruction having fields for an opcode, a source matrix operand identifier, and a destination matrix operand identifier; and execution circuitry to execute the decoded instruction to transpose each row of elements of the identified source matrix operand into a corresponding column of the identified destination matrix operand.

Example 23 The system of example 22, wherein the opcode defines a size of each data element of the source and destination matrix operands.

Example 24 The system of any of examples 22-23, wherein the execution circuitry is to transpose each row of the identified source matrix operand to a corresponding column of the identified destination matrix operand and zero any remaining columns of the identified destination matrix operand and unconfigured rows of the identified destination matrix operand.

Example 25 The system of any of examples 22-24, wherein the source matrix operand is a plurality of registers to represent a matrix.

F. Tile Move i. Exemplary Execution

Detailed herein are embodiments of a matrix (tile) move ("TILEMOVE") instruction and its execution. A TILEMOVE instruction is an improvement a computer itself as it provides for support to move data from one matrix (tile) to another matrix (tile) with a single instruction. In particular, the execution of the TILEMOVE instruction causes all data from a source matrix (tile) to be stored into a corresponding data element position of a destination matrix (tile). The size of the data values to be stored varies depending on the instruction and tile support. Exemplary sizes included, but are not limited to, 16-bit, 32-bit, 64-bit, 128-bit, 256-bit, etc. In some embodiments, elements of rows of the destination matrix (tile) that do not have corresponding columns in the source matrix (tile) are zeroed.

Figure 40:
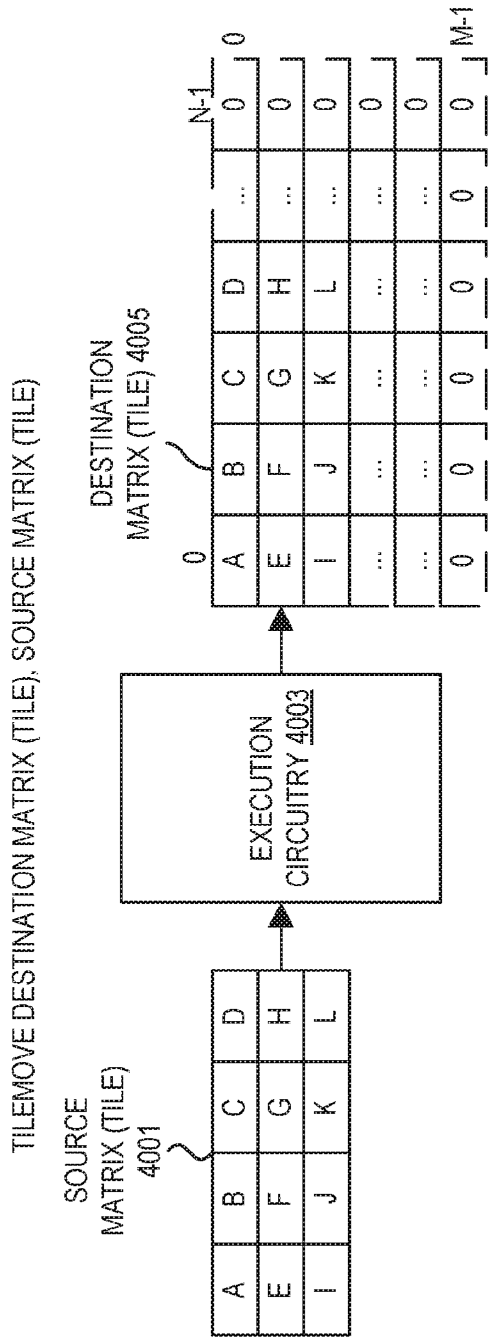
FIG. 40 illustrates an exemplary execution of a TILEMOVE instruction.

FIG. 40 illustrates an exemplary execution of a TILEMOVE instruction. The TILEMOVE instruction format includes fields for an opcode, a source matrix (tile) operand identifier (shown as "SOURCE MATRIX (TILE)"), and a destination matrix (tile) operand identifier (shown as "DESTINATION MATRIX (TILE)").

The source and destination matrix (tile) operand fields represent a source matrix (tile) 4001 and a destination matrix (tile) 4005. As detailed earlier, a matrix (tile) may be stored in a collection of registers, locations in memory (e.g., as strided rows), or in other storage accessible to execution circuitry.

As shown, execution circuitry 4003 executes a decoded TILEMOVE instruction to move the source data of the source matrix (tile) operand 4001 into corresponding data element positions of the destination matrix (tile) operand 4005.

Also shown are remaining (unconfigured) columns and rows being set to zero which is done in some embodiments. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible.

ii. Exemplary Format(s)

An embodiment of a format for a TILEMOVE instruction is TILEMOVE{B/W/D/Q} TMM1, TMM2. In some embodiments, TILEMOVE{B/W/D/Q} is the opcode mnemonic of the instruction where B/W/D/Q represent data element sizes (byte, word, double word, quadword) of the source and destination. TMM1 is a field for the destination matrix (tile) operand identifier. TMM2 is a field for a source matrix (tile) operand identifier. In some embodiments, the TMM2 field is a R/M value (such as 2846), the TMM1 field is REG 8244, and the data element size is found in 82865.

In embodiments, encodings of the instruction include a scale-index-base (SIB) type memory addressing operand that indirectly identifies multiple indexed destination locations in memory (e.g., field 8250). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 416-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 416-bit (e.g., YMM) register (vm64y) or a 512-bit (e.g., ZMM) register (vm64z).

iii. Exemplary Method(s) of Execution

Figure 41:
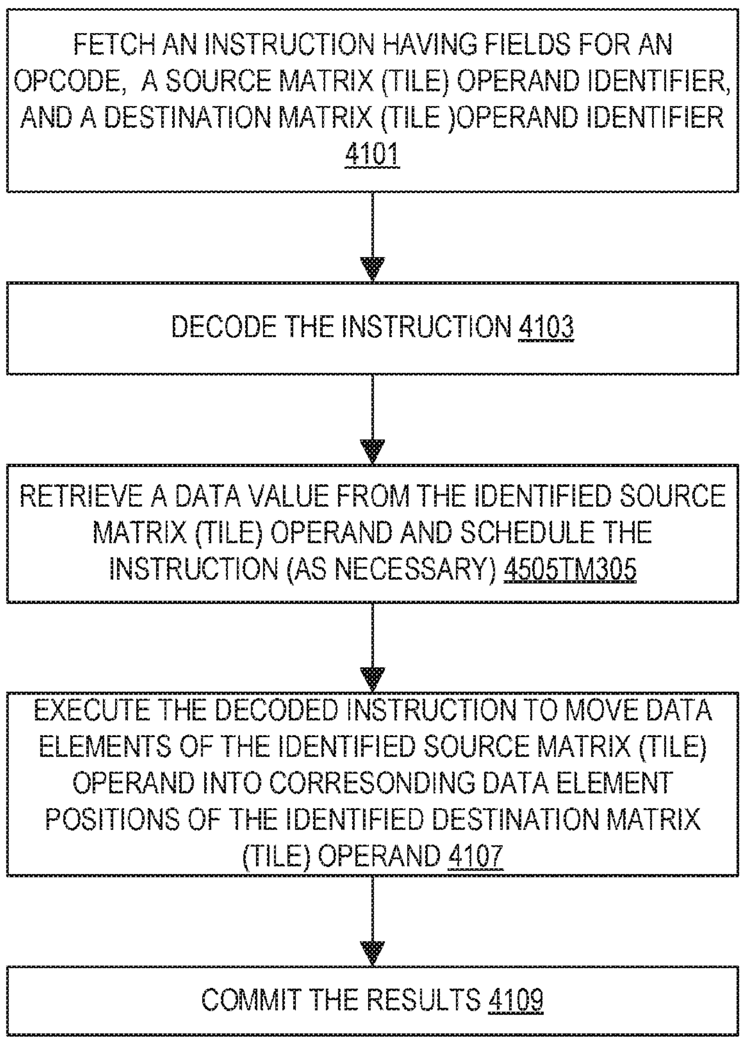
FIG. 41 illustrates an embodiment of method performed by a processor to process a TILEMOVE instruction.

FIG. 41 illustrates an embodiment of method performed by a processor to process a TILEMOVE instruction.

At 4101, an instruction is fetched. For example, a TILEMOVE instruction is fetched. The TILEMOVE instruction includes fields for an opcode, a source matrix (tile) operand identifier, and a destination matrix (tile) operand identifier. In some embodiments, the instruction is fetched from an instruction cache. The opcode of the TILEMOVE instruction indicates a move of the data from the identified source matrix (tile) operand to corresponding packed data element positions of the identified destination matrix (tile) operand is to occur, and a size of the data to be moved.

The fetched instruction is decoded at 4103. For example, the fetched TILEMOVE instruction is decoded by decode circuitry such as that detailed herein.

Data values associated with the source matrix (tile) operand of the decoded instruction are retrieved at 4105 and the decoded instruction is scheduled (as needed). For example, when the source matrix (tile) operand is a memory location, the data from the indicated memory location is retrieved.

At 4107, the decoded instruction is executed by execution circuitry (hardware) such as that detailed herein. For the TILEMOVE instruction, the execution will cause execution circuitry to move (write) every configured element position of the identified destination matrix (tile) operand with data from corresponding element positions of the identified source matrix (tile) operand. In some embodiments, unconfigured elements of rows of the destination matrix (tile) are zeroed. In some embodiments, instead of a write, the identified source matrix (tile) operand is renamed to be the identified destination matrix (tile) operand. This eliminates the need to do a move and instead uses a logical renaming.

In some embodiments, the instruction is committed or retired at 4109.

Figure 42:
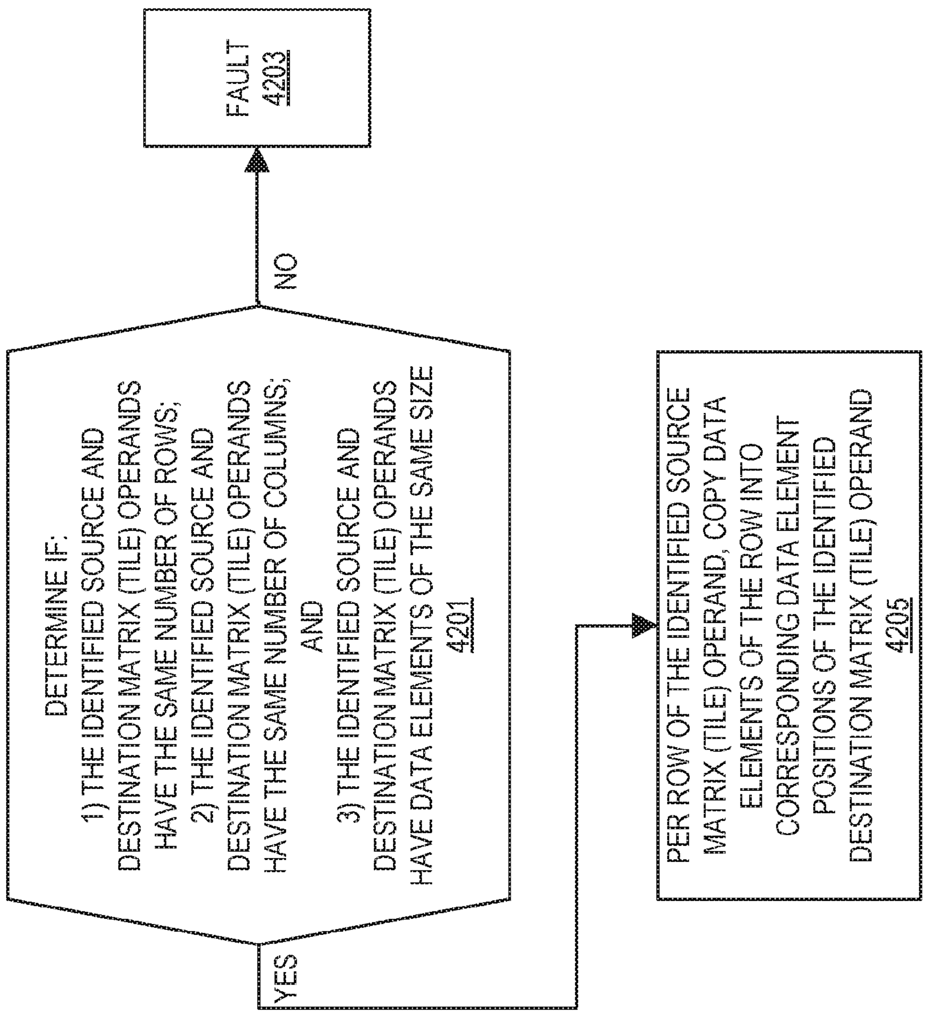
FIG. 42 illustrates a more detailed description of an execution of a TILEMOVE instruction.

FIG. 42 illustrates a more detailed description of an execution of a TILEMOVE instruction. Typically, this is performed by execution circuitry such as that detailed above.

At 4201, a determination of if one of the following is true is made: 1) Do the identified source and destination matrix (tile) operands have the same number of rows?; 2) Do the identified source and destination matrix (tile) operands have the same number of columns?; and 3) Do the identified source and destination matrix (tile) operands have data elements of the same size? If any of these is not true, then a fault is raised at 4203.

If all of these conditions are true, then the execution circuitry moves (writes), for each configured row of the identified destination matrix (tile) operand, data values from a corresponding row of the identified source matrix (tile) operand in corresponding data element positions (columns) at 4205. In some embodiments, unconfigured elements of rows of the destination matrix (tile) that do not have corresponding columns in the source matrix (tile) are zeroed.

iv. Exemplary Pseudocode

FIG. 43 illustrates exemplary pseudocode for the execution of a TILEMOVE instruction.

v. Examples

Example 1 A processor comprising: decode circuitry to decode an instruction having fields for an opcode, a source matrix operand identifier, and a destination matrix operand identifier; and execution circuitry to execute the decoded instruction to move each data element of the identified source matrix operand to corresponding data element position of the identified destination matrix operand.

Example 2 The processor of example 1, wherein the opcode defines a size of each data element of the source and destination matrix operands.

Example 3 The processor of example 2, wherein the size of each data element of the source and destination matrix operands is a doubleword.

Example 4 The processor of example 2, wherein the size of each data element of the source and destination matrix operands is a word.

Example 5 The processor of any of examples 1-4, wherein the execution circuitry is to move each row of the identified source matrix operand to a corresponding row of the destination matrix operand and zero any remaining columns of the identified destination matrix operand and unconfigured rows of the identified destination matrix operand.

Example 6 The processor of any of examples 1-5, wherein the source matrix operand is a plurality of registers to represent a matrix.

Example 7 The processor of any of examples 1-5, wherein the execution circuitry to fault upon a determination of one of: the identified source and destination matrix operands have different number of rows, the identified source and destination matrix operands have different number of columns, and the identified source and destination matrix operands have different sized data elements.

Example 8 A method comprising: decoding an instruction having fields for an opcode, a source matrix operand identifier, and a destination matrix operand identifier; and executing the decoded instruction to move each data element of the identified source matrix operand to corresponding data element position of the identified destination matrix operand.

Example 9 The method of example 8, wherein the opcode defines a size of each data element of the source and destination matrix operands.

Example 10 The method of example 9, wherein the size of each data element of the source and destination matrix operands is a doubleword.

Example 11 The method of example 9, wherein the size of each data element of the source and destination matrix operands is a word.

Example 12 The method of any of examples 8-11, wherein each row of the identified source matrix operand is moved to a corresponding row of the destination matrix operand and zero any remaining columns of the identified destination matrix operand and unconfigured rows of the identified destination matrix operand.

Example 13 The method of any of examples 8-12, wherein the source matrix operand is a plurality of registers to represent a matrix.

Example 14 The method of any of examples 8-13, further comprising: faulting upon a determination of one of: the identified source and destination matrix operands have different number of rows, the identified source and destination matrix operands have different number of columns, and the identified source and destination matrix operands have different sized data elements.

Example 15 A non-transitory machine-readable medium storing an instruction which causes a processor to perform a method, the method comprising: decoding an instruction having fields for an opcode, a source matrix operand identifier, and a destination matrix operand identifier; and executing the decoded instruction to move each data element of the identified source matrix operand to corresponding data element position of the identified destination matrix operand.

Example 16 The non-transitory machine-readable medium of example 15, wherein the opcode defines a size of each data element of the source and destination matrix operands.

Example 17 The non-transitory machine-readable medium of examples 16, wherein the size of each data element of the source and destination matrix operands is a doubleword.

Example 18 The non-transitory machine-readable medium of example 16, wherein the size of each data element of the source and destination matrix operands is a word.

Example 19 The non-transitory machine-readable medium of any of examples 15-18, wherein each row of the identified source matrix operand is moved to a corresponding row of the destination matrix operand and zero any remaining columns of the identified destination matrix operand and unconfigured rows of the identified destination matrix operand.

Example 20 The non-transitory machine-readable medium of any of examples 15-19, wherein the source matrix operand is a plurality of registers to represent a matrix.

Example 21 The non-transitory machine-readable medium of any of examples 15-20, further comprising: faulting upon a determination of one of: the identified source and destination matrix operands have different number of rows, the identified source and destination matrix operands have different number of columns, and the identified source and destination matrix operands have different sized data elements.

Example 22 A system comprising: a processor; and an accelerator coupled to the processor, the accelerator including: decode circuitry to decode an instruction having fields for an opcode, a source matrix operand identifier, and a destination matrix operand identifier; and execution circuitry to execute the decoded instruction to move each data element of the identified source matrix operand to corresponding data element position of the identified destination matrix operand.

Example 23 The system of example 22, wherein the opcode defines a size of each data element of the source and destination matrix operands.

Example 40 The system of any of examples 22-23, wherein the execution circuitry is to move each row of the identified source matrix operand to a corresponding row of the destination matrix operand and zero any remaining columns of the identified destination matrix operand and unconfigured rows of the identified destination matrix operand.

Example 40 The system of any of examples 22-40, wherein the source matrix operand is a plurality of registers to represent a matrix.

G. Tile Broadcast

Detailed herein are embodiments of a matrix (tile) broadcast ("TILEBROADCAST") instruction and its execution. A TILEBROADCAST instruction is an improvement a computer itself as it provides for support to broadcasting a data value into a matrix (tile) with a single instruction. In particular, an execution of the TILEBROADCAST instruction causes a data value from a source (e.g., a memory location or a register) to be stored into each configured data element position of a destination matrix (tile). This type of operation is referred to as a "broadcast." The size of the data value to be stored varies depending on the instruction and tile support. Exemplary sizes included, but are not limited to, 16-bit, 32-bit, 64-bit, 128-bit, 256-bit, etc.

i. Exemplary Execution

Figure 44:
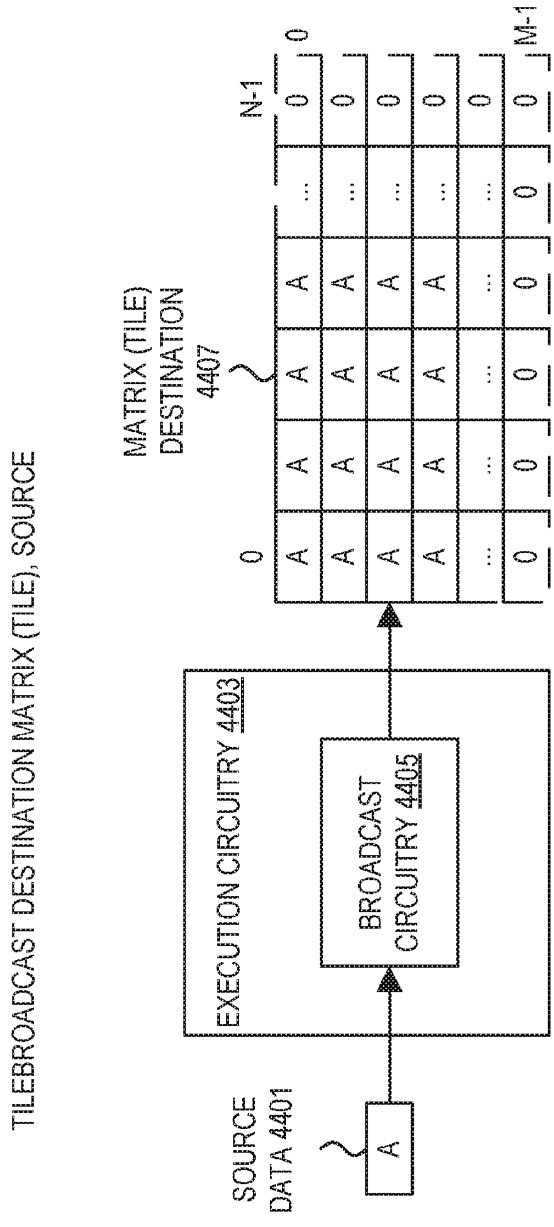
FIG. 44 illustrates an exemplary execution of a TILEBROADCAST instruction.

FIG. 44 illustrates an exemplary execution of a TILEBROADCAST instruction. The TILEBROADCAST instruction format includes fields for an opcode, a source operand identifier (shown as "SOURCE"), and a destination matrix (tile) operand identifier (shown as "DESTINATION MATRIX (TILE)").

The source operand field represents a location of a source operand 4401 storing a source data value to be broadcast. This location may be a memory location (e.g., an address in memory such as a disk or RAM) or a register.

The destination matrix (tile) operand field represents a destination matrix (tile) 4407 to store the data from the data of the source operand. As detailed earlier, a matrix (tile) may be stored in a collection of registers, locations in memory (e.g., as strided rows), or within other storage accessible to execution circuitry.

As shown, execution circuitry 4403 uses broadcast circuitry 4405 to execute a decoded TILEBROADCAST instruction to store the source data of the source operand 4401 into each data element position of the matrix (tile) destination operand 4407. In some embodiments, the broadcast circuitry 4405 is a crossbar switch. In this example, a value "A" is stored in each data element position of the matrix (tile) destination operand 4407.

Also shown are remaining (unconfigured) columns and rows being set to zero which is done in some embodiments. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible.

ii. Exemplary Format(s)

An embodiment of a format for a TILEBROADCAST instruction is TILEBROADCAST TMM1, m32. In some embodiments, TILEBROADCAST{B/W/D/Q} is the opcode mnemonic of the instruction where B/W/D/Q represent data element sizes (byte, word, double word, quadword) of the destination. TMM1 is a field for a destination matrix (tile) operand identifier. m32 is a field for a source operand identifier such as a register and/or memory. In some embodiments, the m32 field is a R/M value (such as 8246), the destination matrix (tile) field is REG 8244, and the data element size is found in 8265.

In embodiments, encodings of the instruction include a scale-index-base (SIB) type memory addressing operand that indirectly identifies multiple indexed destination locations in memory (e.g., field 8250). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 45:
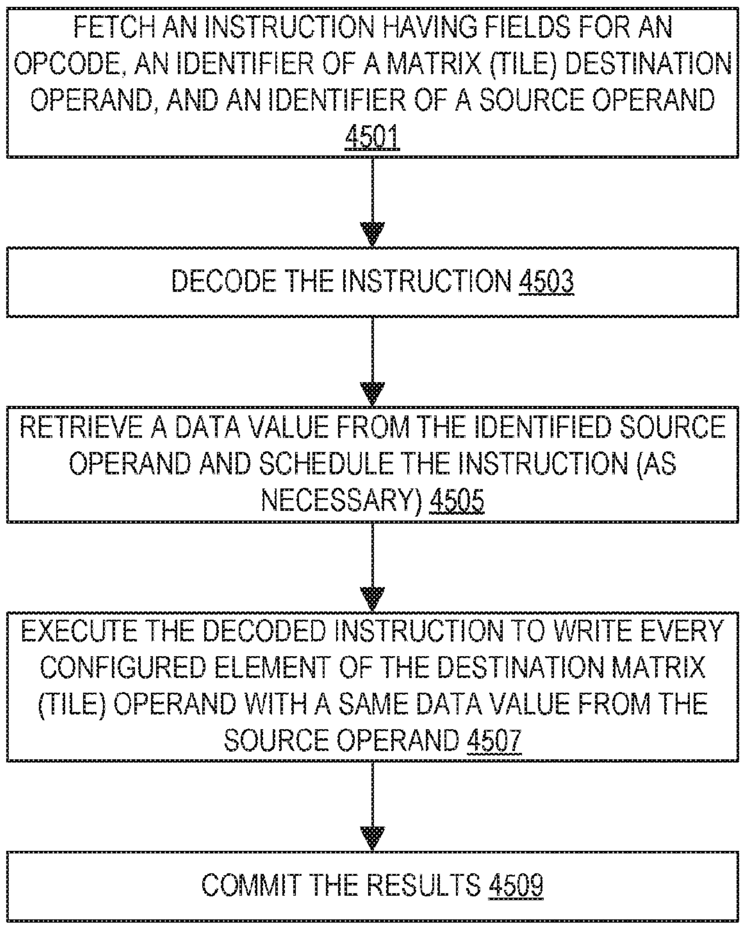
FIG. 45 illustrates an embodiment of method performed by a processor to process a TILEBROADCAST instruction.

FIG. 45 illustrates an embodiment of method performed by a processor to process a TILEBROADCAST instruction.

At 4501, an instruction is fetched. For example, a TILEBROADCAST instruction is fetched. The TILEBROADCAST instruction includes fields for an opcode, a source operand, identifier, and a destination matrix (tile) operand identifier. In some embodiments, the instruction is fetched from an instruction cache. The identified destination operand consists of matrix of packed data. The opcode of the TILEBROADCAST instruction indicates a broadcast of the data from the identified source operand to the configured packed data element positions of the identified destination matrix (tile) operand is to occur. In some embodiments, unconfigured data element positions are set to zero.

The fetched instruction is decoded at 4503. For example, the fetched TILEBROADCAST instruction is decoded by decode circuitry such as that detailed herein.

Data values associated with the identified source operand of the decoded instruction are retrieved at 4505 and the decoded instruction is scheduled (as needed). For example, when the identified source operand is a memory operand, the data from the indicated memory location is retrieved.

At 4507, the decoded instruction is executed by execution circuitry (hardware) such as that detailed herein. For the TILEBROADCAST instruction, the execution will cause execution circuitry to write every configured element position of the identified destination matrix (tile) operand with data from the identified source operand. In some embodiments, unconfigured packed data element positions of the identified destination matrix (tile) operand are zeroed. For example, if the destination matrix (tile) is configured to only use 4 rows and 4 columns, but the identified destination matrix (tile) operand could store 16 rows and 16 columns, then data element positions from the fifth row and up are set to zero and all columns from the fifth and up are set to zero. A configuration for a matrix (tile) may be stored in one or more registers.

In some embodiments, the instruction is committed or retired at 4509.

Figure 46:
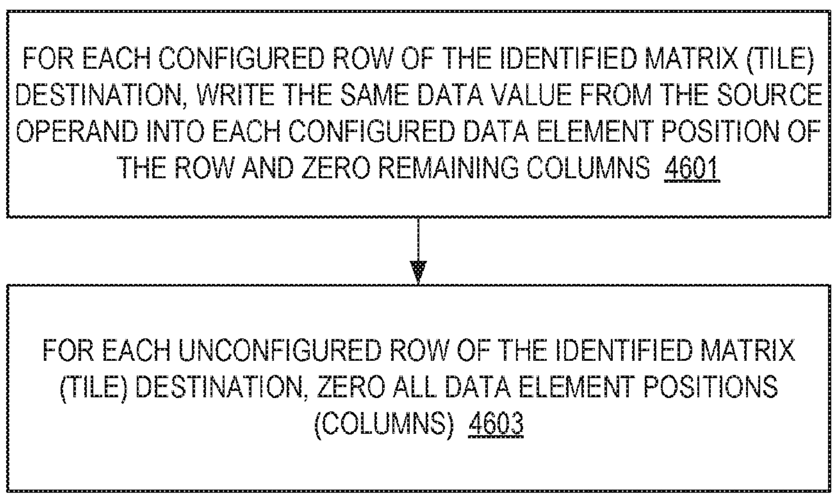
FIG. 46 illustrates a more detailed description of an execution of a TILEBROADCAST instruction.

FIG. 46 illustrates a more detailed description of an execution of a TILEBROADCAST instruction. Typically, this is performed by execution circuitry such as that detailed above.

At 4601, for each configured row of the identified matrix (tile) destination, the same data value from the identified source operand is written into configured data element positions (columns) of the row and unconfigured columns of the row are zeroed.

At 4603, after the zeroing of these data elements, the execution circuitry (e.g., broadcast circuitry described above) writes, for each row of the destination matrix (tile) operand, the data value from the identified source operand into each data element position (column) of the row of the identified destination matrix (tile) operand.

iv. Exemplary Pseudocode

FIG. 47 illustrates examples of pseudocode of methods for executing a TILEBROADCAST instruction.

v. Examples

Example 1 A processor comprising: decode circuitry to decode an instruction having fields for an opcode, an identifier for a source operand, and an identifier for a destination matrix operand; and execution circuitry to execute the decoded instruction to broadcast a single data element from the identified source operand into each configured data element of the identified destination matrix operand.

Example 1 The processor of example 1, wherein the execution circuitry comprises a crossbar switch.

Example 2 The processor of any of examples 1-2, wherein the source operand is stored in memory.

Example 3 The processor of any of examples 1-2, wherein the source operand is stored in a packed data register.

Example 4 The processor of any of examples 1-2, wherein the source operand is stored in a general-purpose data register.

Example 5 The processor of any of examples 1-5, wherein the identified destination matrix operand is a plurality of registers to represent a two-dimensional matrix.

Example 6 The processor of any of examples 1-6, wherein the data elements of the row of data are doubleword in size.

Example 7 The processor of any of examples 1-6, wherein the data elements of the row of data are word in size.

Example 8 The processor of any of examples 1-8, further comprising storage to store a configuration of the identified destination matrix operand.

Example 9 The processor of any of examples 1-9, wherein the configuration is to indicate a number of rows and columns to be used by the identified destination matrix operand.

Example 10 The processor of any of examples 1-10, wherein the execution circuitry is to further zero unconfigured data elements of the identified destination matrix operand.

Example 11 A method comprising: decoding an instruction having fields for an opcode, an identifier for a source operand, and an identifier for a destination matrix operand; and executing the decoded instruction to broadcast a single data element from the identified source operand into each configured data element of the identified destination matrix operand.

Example 12 The method of example 12, wherein the source operand is stored in memory.

Example 13 The method of example 12, wherein the source operand is stored in a register.

Example 14 The method of any of examples 12-14, wherein the identified destination matrix operand is a plurality of registers to represent a two-dimensional matrix.

Example 15 The method of any of examples 12-15, wherein the data elements of the row of data are doubleword in size.

Example 16 The method of any of examples 12-15, wherein the data elements of the row of data are word in size.

Example 17 The method of any of examples 12-17, further comprising: zeroing unconfigured data elements of the identified destination matrix operand.

Example 18 The method of any of examples 12-18, further comprising: translating the instruction from a first instruction set to a second instruction set prior to decoding.

Example 19 A non-transitory machine-readable medium storing an instruction which causes a processor to perform a method, the method comprising: decoding the instruction having fields for an opcode, an identifier for a source operand, and an identifier for a destination matrix operand; and executing the decoded instruction to broadcast a single data element from the identified source operand into each configured data element of the identified destination matrix operand.

Example 20 The non-transitory machine-readable medium of example 19, wherein the source operand is stored in memory.

Example 21 The non-transitory machine-readable medium of example 19, wherein the source operand is stored in a register.

Example 22 The non-transitory machine-readable medium of any of examples 19-21, wherein the identified destination matrix operand is a plurality of registers to represent a two-dimensional matrix.

Example 23 The non-transitory machine-readable medium of any of examples 19-22, further comprising: zeroing unconfigured data elements of the identified destination matrix operand.

Example 24 The non-transitory machine-readable medium of any of examples 19-23, further comprising: translating the instruction from a first instruction set to a second instruction set prior to decoding.

Example 25 A system comprising: a processor; an accelerator coupled to the processor, the accelerator including: decode circuitry to decode an instruction having fields for an opcode, an identifier for a source operand, and an identifier for a destination matrix operand; and execution circuitry to execute the decoded instruction to broadcast a single data element from the identified source operand into each configured data element of the identified destination matrix operand.

H. Tile Row Broadcast

Detailed herein are embodiments of a tile row broadcast ("TILEROWBROADCAST") instruction and its execution. A TILEROWBROADCAST instruction is an improvement a computer itself as it provides for support to broadcasting a data value into a matrix (tile) with a single instruction. In particular, an execution of the TILEROWBROADCAST instruction causes a read of a row of data from memory and a write of the read row to every row of the destination matrix (tile) identified by the instruction. This type of operation is referred to as a "broadcast." The size of the data value to be stored varies depending on the instruction and tile support. Exemplary sizes included, but are not limited to, 16-bit, 32-bit, 64-bit, 128-bit, 256-bit, etc.

i. Exemplary Execution

Figure 48:
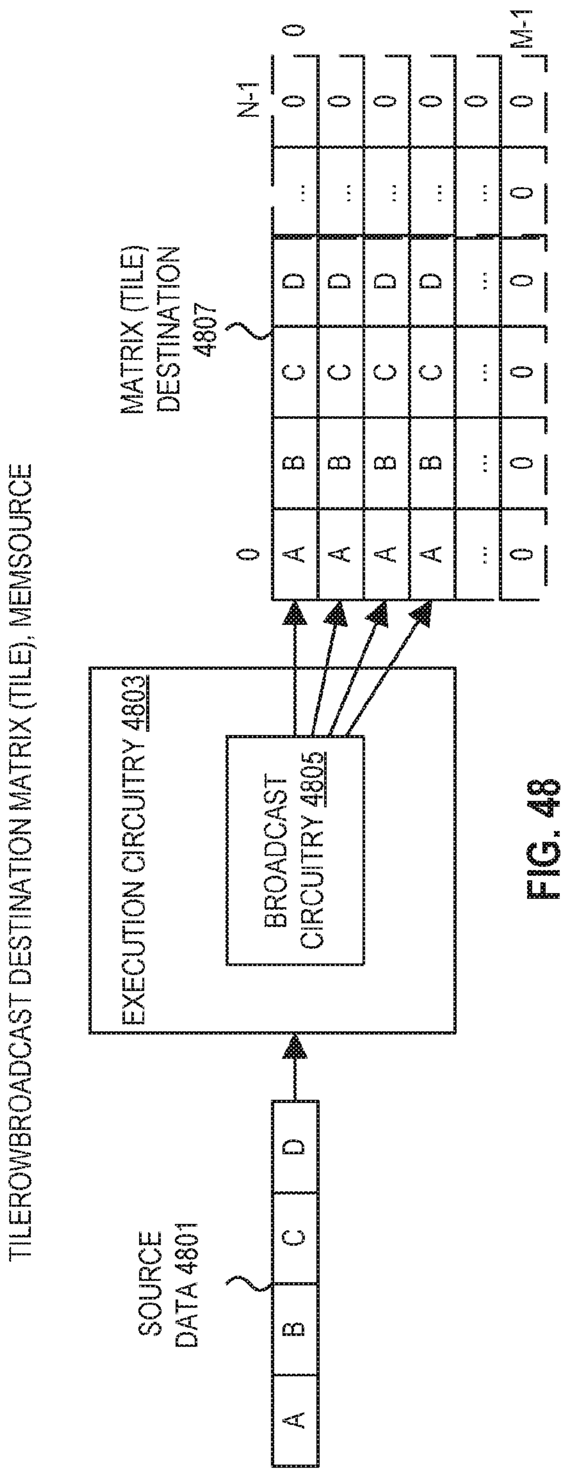
FIG. 48 illustrates an exemplary execution of a TILEROWBROADCAST instruction.

FIG. 48 illustrates an exemplary execution of a TILEROWBROADCAST instruction. The TILEROWBROADCAST instruction format includes fields for an opcode, a memory source operand identifier (shown as "MEMSOURCE"), and a destination matrix (tile) operand identifier (shown as "DESTINATION MATRIX (TILE)").

The source operand field represents a location of a source operand 4801 storing a source data value to be broadcast. This location is a memory location (e.g., an address in memory such as a disk or RAM).

The destination matrix (tile) operand field represents a destination matrix (tile) 4807 to store the data from the data of the source operand. As detailed earlier, a matrix (tile) may be stored in a collection of registers, locations in memory (e.g., as strided rows), or within other storage accessible to execution circuitry.

As shown, execution circuitry 4803 uses broadcast circuitry 4805 to execute a decoded TILEROWBROADCAST instruction to store a row source data of memory (source operand 4801) into each row of the matrix (tile) destination operand 4807. In some embodiments, the broadcast circuitry 4805 is a crossbar switch. In this example, the values "A," "B," "C," and "D" of a "row" in memory are stored as a row in corresponding data element positions of each row of the matrix (tile) destination operand 4807. Also shown is remaining columns being set to zero which is done in some embodiments.

Also shown is remaining (unconfigured) columns and rows being set to zero which is done in some embodiments. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible.

ii. Exemplary Format(s)

An embodiment of a format for a TILEROWBROADCAST instruction is TILEROWBROADCAST DST, SRC. In some embodiments, TILEROWBROADCAST{B/W/D/Q} is the opcode mnemonic of the instruction where B/W/D/Q represent data element sizes (byte, word, double word, quadword) of the destination. DST is a field for a destination matrix (tile) operand identifier. SRC is a field for a source operand identifier such as a memory location. In some embodiments, the SRC field is a R/M value (such as 8246), the destination matrix (tile) field is REG 8244, and the data element size is found in 8265.

In embodiments, encodings of the instruction include a scale-index-base (SIB) type memory addressing operand that indirectly identifies multiple indexed destination locations in memory (e.g., field 8250). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 49:
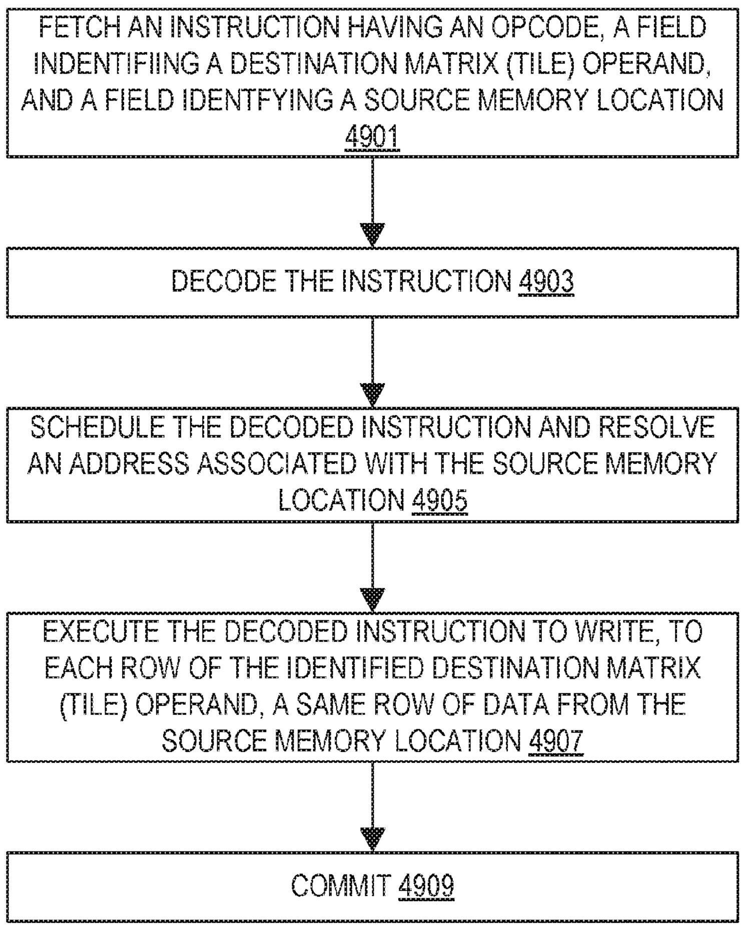
FIG. 49 illustrates an embodiment of method performed by a processor to process a TILEROWBROADCAST instruction.

FIG. 49 illustrates an embodiment of method performed by a processor to process a TILEROWBROADCAST instruction.

At 4901, an instruction is fetched. For example, a TILEROWBROADCAST instruction is fetched. The TILEROWBROADCAST instruction includes fields for an opcode, a source operand, identifier, and a destination matrix (tile) operand identifier. In some embodiments, the instruction is fetched from an instruction cache. The identified destination operand consists of matrix of packed data. The opcode of the TILEROWBROADCAST instruction indicates a broadcast of the row data from the identified source operand to each configured row (in packed data element positions) of the identified destination matrix (tile) operand is to occur. In some embodiments, unconfigured data element positions are set to zero.

The fetched instruction is decoded at 4903. For example, the fetched TILEROWBROADCAST instruction is decoded by decode circuitry such as that detailed herein.

Data values associated with the identified source operand of the decoded instruction are retrieved at 4905 and the decoded instruction is scheduled (as needed). For example, when the identified source operand is a memory operand, the data from the indicated memory location is retrieved.

At 4907, the decoded instruction is executed by execution circuitry (hardware) such as that detailed herein. For the TILEROWBROADCAST instruction, the execution will cause execution circuitry to write each configured row of the identified destination matrix (tile) operand with the same row of data from the identified source operand. In some embodiments, unconfigured packed data element positions of the identified destination matrix (tile) operand are zeroed. For example, if the destination matrix (tile) is configured to only use 4 rows and 4 columns, but the identified destination matrix (tile) operand could store 16 rows and 16 columns, then data element positions from the fifth row and up are set to zero and all columns from the fifth and up are set to zero. A configuration for a matrix (tile) may be stored in one or more registers.

In some embodiments, the instruction is committed or retired at 4909.

Figure 50:
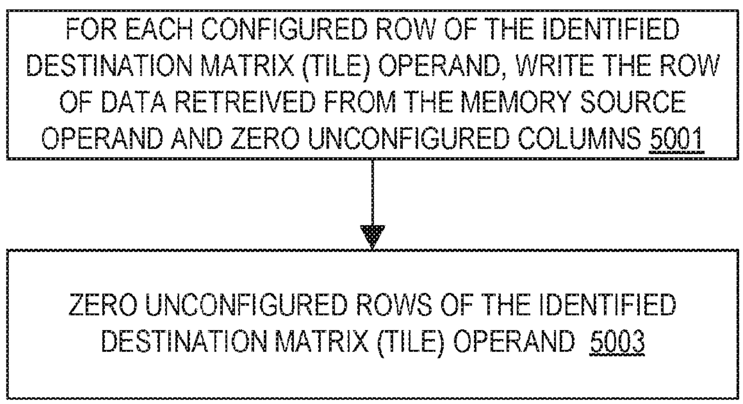
FIG. 50 illustrates a more detailed description of an execution of a TILEROWBROADCAST instruction.

FIG. 50 illustrates a more detailed description of an execution of a TILEROWBROADCAST instruction. Typically, this is performed by execution circuitry such as that detailed above.

At 5001, each read element from the identified source is copied as its own whole temporary row.

At 5003, each temporary row is written into consecutive configured rows of the identified destination matrix (tile) operand and unconfigured columns of these rows are zeroed.

At 5005, unconfigured rows of the identified destination matrix (tile) operand are zeroed.

iv. Exemplary Pseudocode

FIG. 51 illustrates examples of pseudocode of methods for executing a TILECOLBROADCAST instruction.

v. Examples

Example 1 A processor comprising: decode circuitry to decode an instruction having fields for an opcode, an identifier for a source operand, and an identifier for a destination matrix operand; and execution circuitry to execute the decoded instruction to broadcast a row of data from the identified source operand into each configured row of the identified destination matrix operand.

Example 2 The processor of example 1, wherein the execution circuitry comprises a crossbar switch.

Example 3 The processor of any of examples 1-2, wherein the source operand is stored in memory.

Example 4 The processor of any of examples 1-2, wherein the source operand is stored in a packed data register.

Example 5 The processor of any of examples 1-4, wherein the execution circuitry is further to zero unconfigured columns of the identified destination matrix operand that were written to by the row of data.

Example 6 The processor of any of examples 1-5, wherein the identified destination matrix operand is a plurality of registers to represent a two-dimensional matrix.

Example 7 The processor of any of examples 1-6, wherein the data elements of the row of data are doubleword in size.

Example 8 The processor of any of examples 1-7, wherein the data elements of the row of data are word in size.

Example 9 A method comprising: decoding an instruction having fields for an opcode, an identifier for a source operand, and an identifier for a destination matrix operand; and executing the decoded instruction to broadcast a row of data from the identified source operand into each configured row of the identified destination matrix operand.

Example 10 The method of example 9, wherein the source operand is stored in memory.

Example 11 The method of example 9, wherein the source operand is stored in a packed data register.

Example 12 The method of any of examples 9-11, further comprising: zeroing unconfigured columns of the identified destination matrix operand that were written to by the row of data.

Example 13 The method of any of examples 9-12, wherein the identified destination matrix operand is a plurality of registers to represent a two-dimensional matrix.

Example 14 The method of any of examples 9-13, wherein the data elements of the row of data are doubleword in size.

Example 15 The method of any of examples 9-13, wherein the data elements of the row of data are word in size.

Example 16 A non-transitory machine-readable medium storing an instruction which causes a processor to perform a method, the method comprising: decoding an instruction having fields for an opcode, an identifier for a source operand, and an identifier for a destination matrix operand; and executing the decoded instruction to broadcast a row of data from the identified source operand into each configured row of the identified destination matrix operand.

Example 17 The non-transitory machine-readable medium of example 16, wherein the source operand is stored in memory.

Example 18 The non-transitory machine-readable medium of example 16, wherein the source operand is stored in a packed data register.

Example 19 The non-transitory machine-readable medium of any of examples 16-18, further comprising: zeroing unconfigured columns of the identified destination matrix operand that were written to by the row of data.

Example 20 The non-transitory machine-readable medium of any of examples 16-19, wherein the identified destination matrix operand is a plurality of registers to represent a two-dimensional matrix.

Example 21 The non-transitory machine-readable medium of any of examples 16-20, wherein the data elements of the row of data are doubleword in size.

Example 22 The non-transitory machine-readable medium of any of examples 16-20, wherein the data elements of the row of data are word in size.

Example 23 A system comprising: a processor; an accelerator coupled to the processor, the accelerator including: decode circuitry to decode an instruction having fields for an opcode, an identifier for a source operand, and an identifier for a destination matrix operand; and execution circuitry to execute the decoded instruction to broadcast a row of data from the identified source operand into each configured row of the identified destination matrix operand.

Example 24 The system of example 23, wherein the execution circuitry is further to zero columns of the identified destination matrix operand that were written to by the row of data.

Example 25 The system of any of example 23-24, wherein the identified destination matrix operand is a plurality of registers to represent a two-dimensional matrix.

I. Tile Column Broadcast

Detailed herein are embodiments of a tile column broadcast ("TILECOLBROADCAST") instruction and its execution. A TILECOLBROADCAST instruction is an improvement a computer itself as it provides for support to broadcasting a data value into a matrix (tile) with a single instruction. In particular, an execution of the TILECOLBROADCAST instruction causes a read of a column of data from memory and a write to every configured column of the destination matrix (tile) identified by the instruction. This type of operation is referred to as a "broadcast." The size of the data value to be stored varies depending on the instruction and tile support. Exemplary sizes included, but are not limited to, 16-bit, 32-bit, 64-bit, 128-bit, 256-bit, etc.

i. Exemplary Execution

Figure 52:
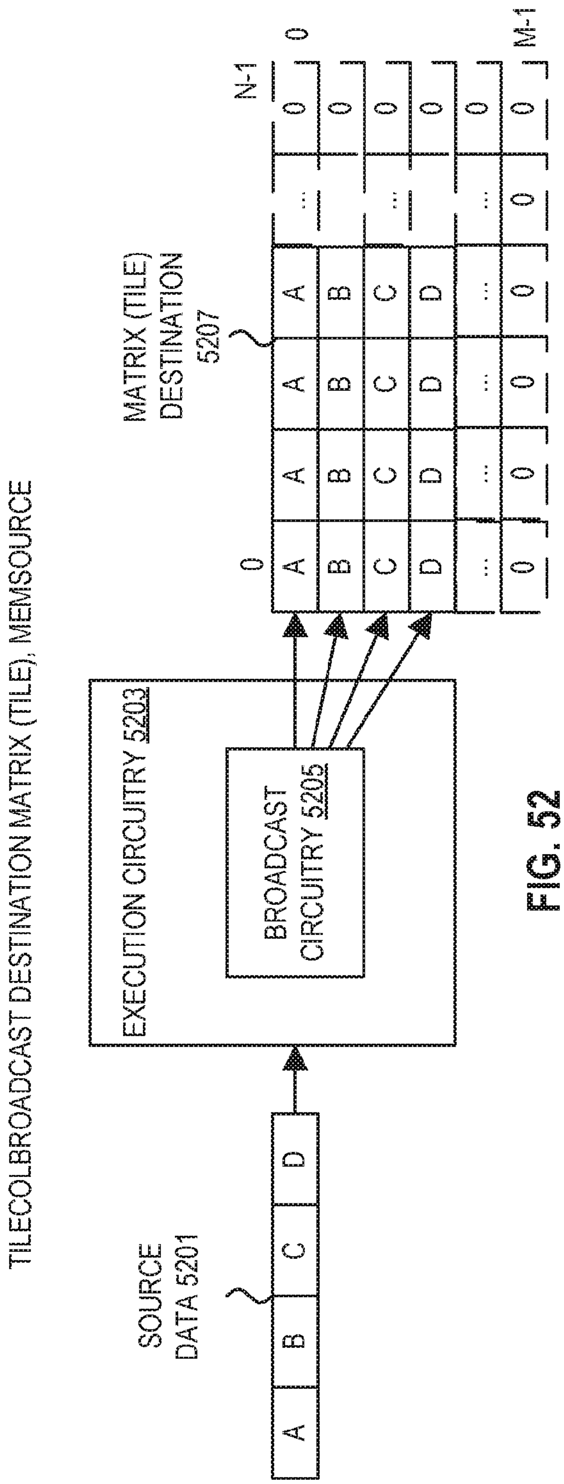
FIG. 52 illustrates an exemplary execution of a TILECOLBROADCAST instruction.

FIG. 52 illustrates an exemplary execution of a TILECOLBROADCAST instruction. The TILECOLBROADCAST instruction format includes fields for an opcode, a memory source operand identifier (shown as "MEM-SOURCE"), and a destination matrix (tile) operand identifier (shown as "DESTINATION MATRIX (TILE)").

The source operand field represents a location of a source operand 5201 storing a source data value to be broadcast. This location is a memory location (e.g., an address in memory such as a disk or RAM).

The destination matrix (tile) operand field represents a destination matrix (tile) 5207 to store the data from the data of the source operand. As detailed earlier, a matrix (tile) may be stored in a collection of registers, locations in memory (e.g., as strided rows), or within other storage accessible to execution circuitry.

As shown, execution circuitry 5203 uses broadcast circuitry 5205 to execute a decoded TILECOLBROADCAST instruction to store a column source data of memory (source operand 5201) into each column of the matrix (tile) destination operand 5207. In some embodiments, the broadcast circuitry 5205 is a crossbar switch. In this example, the values "A," "B," "C," and "D" of a "column" in memory are stored as a column in corresponding data element positions of each column of the matrix (tile) destination operand 5207.

Also shown are remaining (unconfigured) columns and rows being set to zero which is done in some embodiments. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible.

ii. Exemplary Format(s)

An embodiment of a format for a TILECOLBROADCAST instruction is TILECOLBROADCAST DST, SRC. In some embodiments, TILECOLBROADCAST{B/W/D/Q} is the opcode mnemonic of the instruction where B/W/D/Q represent data element sizes (byte, word, double word, quadword) of the destination. DST is a field for a destination matrix (tile) operand identifier. SRC is a field for a source operand identifier such as a memory location. In some embodiments, the SRC field is a R/M value (such as 8246), the destination matrix (tile) field is REG 8244, and the data element size is found in 8265.

In embodiments, encodings of the instruction include a scale-index-base (SIB) type memory addressing operand that indirectly identifies multiple indexed destination locations in memory (e.g., field 8250). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 53:
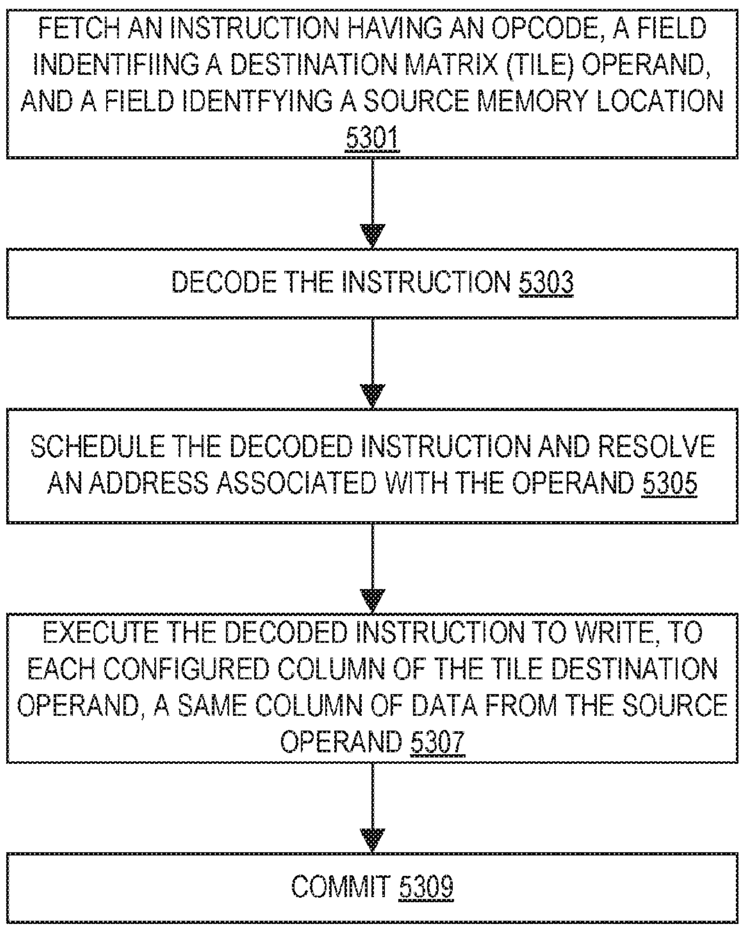
FIG. 53 illustrates an embodiment of method performed by a processor to process a TILECOLBROADCAST instruction.

FIG. 53 illustrates an embodiment of method performed by a processor to process a TILECOLBROADCAST instruction.

At 5301, an instruction is fetched. For example, a TILECOLBROADCAST instruction is fetched. The TILECOLBROADCAST instruction includes fields for an opcode, a source operand, identifier, and a destination matrix (tile) operand identifier. In some embodiments, the instruction is fetched from an instruction cache. The identified destination operand consists of matrix of packed data. The opcode of the TILECOLBROADCAST instruction indicates a broadcast of the column data from the identified source operand to each configured column (in packed data element positions) of the identified destination matrix (tile) operand is to occur. In some embodiments, unconfigured data element positions are set to zero.

The fetched instruction is decoded at 5303. For example, the fetched TILECOLBROADCAST instruction is decoded by decode circuitry such as that detailed herein.

Data values associated with the identified source operand of the decoded instruction are retrieved at 5305 and the decoded instruction is scheduled (as needed). For example, when the identified source operand is a memory operand, the data from the indicated memory location is retrieved.

At 5307, the decoded instruction is executed by execution circuitry (hardware) such as that detailed herein. For the TILECOLBROADCAST instruction, the execution will cause execution circuitry to write each configured column of the identified destination matrix (tile) operand with the same column of data from the identified source operand. In some embodiments, columns and rows of the destination matrix (tile) that were not configured are zeroed.

In some embodiments, the instruction is committed or retired at 5309.

Figure 54:
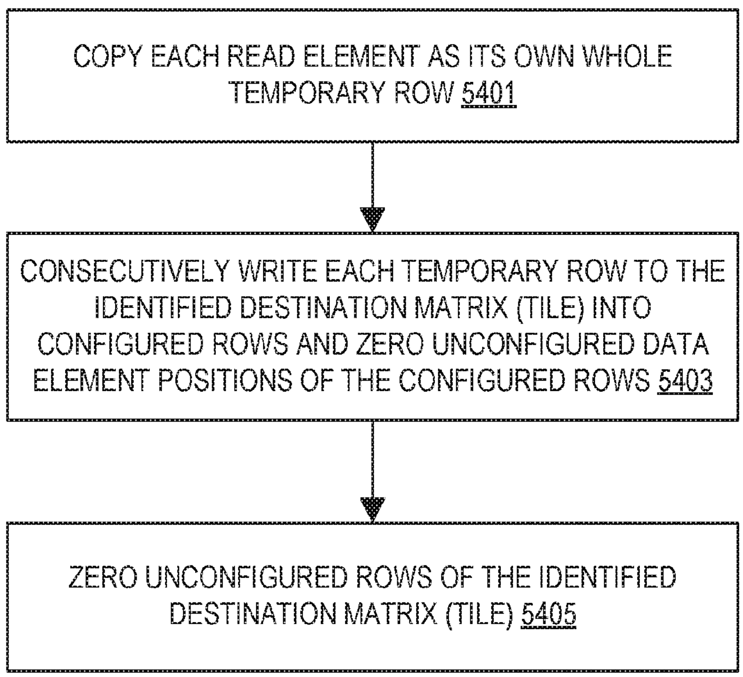
FIG. 54 illustrates a more detailed description of an execution of a TILECOLBROADCAST instruction.

FIG. 54 illustrates a more detailed description of an execution of a TILECOLBROADCAST instruction. Typically, this is performed by execution circuitry such as that detailed above.

At 5401, each read data element from the identified source operand is copied into a temporary row. For example, rows of "A," "B," "C," and "D" are created.

At 5403, the execution circuitry (e.g., broadcast circuitry described above) writes each temporary row to the configured rows of the identified destination matrix (tile) operand and zeros unconfigured columns of the configured rows.

At 5405, the execution circuitry zeros unconfigured rows of the identified destination matrix (tile) operand.

iv. Exemplary Pseudocode

FIG. 55 illustrates examples of pseudocode of methods for executing a TILECOLBROADCAST instruction.

v. Examples

Example 1 A processor comprising: decode circuitry to decode an instruction having fields for an opcode, an identifier for a source operand, and an identifier for a destination matrix operand; and execution circuitry to execute the decoded instruction to broadcast a column of data from the identified source operand into each configured column of the identified destination matrix operand.

Example 2 The processor of example 1, wherein the execution circuitry comprises a crossbar switch.

Example 3 The processor of any of examples 1-2, wherein the source operand is stored in memory.

Example 4 The processor of examples 1-2, wherein the source operand is stored in a packed data register.

Example 5 The processor of any of examples 1-2, wherein the execution circuitry is further to zero unconfigured columns of the identified destination matrix operand that were written to by the row of data.

Example 6 The processor of any of examples 1-5, wherein the identified destination matrix operand is a plurality of registers to represent a two-dimensional matrix.

Example 7 The processor of any of examples 1-6, wherein the execution circuitry is to create a temporary row of each data element of the identified source operand and store each temporary row as a column of the identified destination matrix operand.

Example 8 The processor of any of examples 1-7, wherein the data elements of the row of data are doubleword in size.

Example 9 The processor of any of examples 1-7, wherein the data elements of the row of data are word in size.

Example 10 A method comprising: decoding an instruction having fields for an opcode, an identifier for a source operand, and an identifier for a destination matrix operand; and executing the decoded instruction to broadcast a column of data from the identified source operand into each configured column of the identified destination matrix operand.

Example 11 The method of example 10, wherein the source operand is stored in memory.

Example 12 The method of example 10, wherein the source operand is stored in a packed data register.

Example 13 The method of any of examples 10-12, further comprising zeroing unconfigured columns of the identified destination matrix operand that were written to by the row of data.

Example 14 The method of any of examples 10-13, wherein the identified destination matrix operand is a plurality of registers to represent a two-dimensional matrix.

Example 15 The method of any of examples 10-14, further comprising creating a temporary row of each data element of the identified source operand and store each temporary row as a column of the identified destination matrix operand.

Example 16 The method of any of examples 10-15, wherein the data elements of the row of data are doubleword in size.

Example 17 The method of any of examples 10-15, wherein the data elements of the row of data are word in size.

Example 18 A non-transitory machine-readable medium storing an instruction which causes a processor to perform a method, the method comprising: decoding an instruction having fields for an opcode, an identifier for a source operand, and an identifier for a destination matrix operand; and executing the decoded instruction to broadcast a column of data from the identified source operand into each configured column of the identified destination matrix operand.

Example 19 The non-transitory machine-readable medium of example 18, wherein the source operand is stored in memory.

Example 20 The non-transitory machine-readable medium of example 18, wherein the source operand is stored in a packed data register.

Example 21 The non-transitory machine-readable medium of any of examples 18-20, further comprising zeroing unconfigured columns of the identified destination matrix operand that were written to by the row of data.

Example 22 The non-transitory machine-readable medium of any of examples 18-21, wherein the identified destination matrix operand is a plurality of registers to represent a two-dimensional matrix.

Example 23 The non-transitory machine-readable medium of any of examples 18-22, further comprising creating a temporary row of each data element of the identified source operand and store each temporary row as a column of the identified destination matrix operand.

Example 24 The non-transitory machine-readable medium of any of examples 18-23, wherein the data elements of the row of data are doubleword in size.

Example 25 A system comprising: a processor; an accelerator coupled to the processor, the accelerator including: decode circuitry to decode an instruction having fields for an opcode, an identifier for a source operand, and an identifier for a destination matrix operand; and execution circuitry to execute the decoded instruction to broadcast a column of data from the identified source operand into each configured column of the identified destination matrix operand.

J. Tile Zero

There are times when a matrix of all zeros is desirable for a given operation. Detailed herein are embodiments of a matrix (tile) zeroing ("TILEZERO") instruction and its execution to generate that matrix. A TILEZERO instruction is an improvement a computer itself as it provides for support to zero data of a matrix (tile). In particular, the execution of the TILEZERO instruction causes all data from a source matrix (tile) to be set to zero.

i. Exemplary Execution

Figure 56:
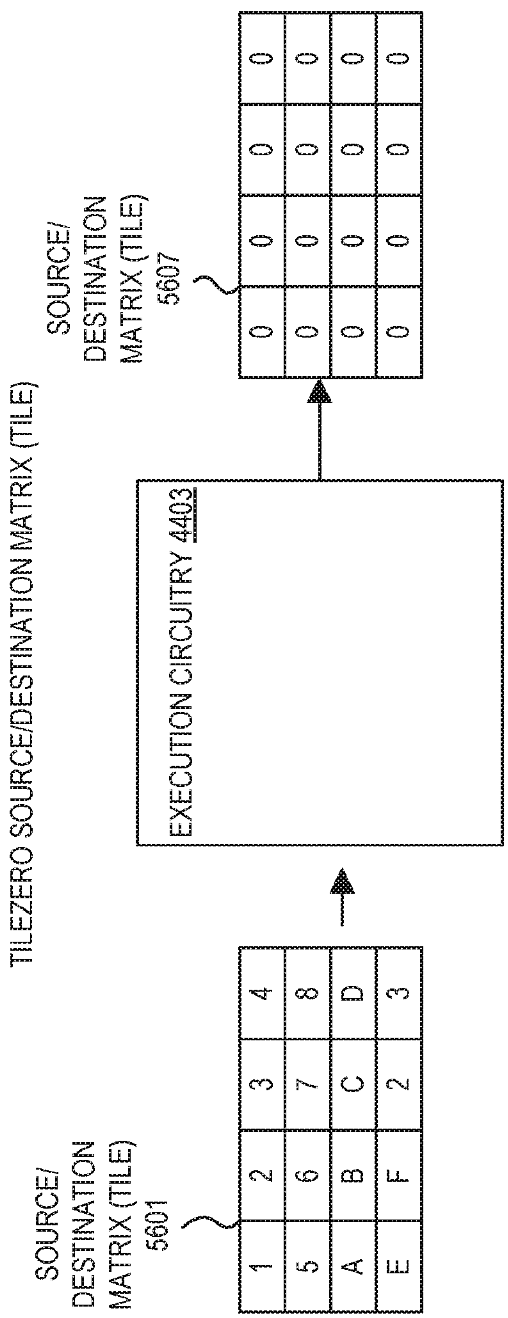
FIG. 56 illustrates an exemplary execution of a TILEZERO instruction.

FIG. 56 illustrates an exemplary execution of a TILEZERO instruction. The TILEZERO instruction format includes fields for an opcode and a source/destination matrix (tile) operand (shown as "SOURCE/DESTINATION MATRIX (TILE)").

The source/destination matrix (tile) operand field represents a source matrix (tile) 5601 and an updated version of the source matrix (tile) as the destination 5607. As detailed earlier, a matrix may be stored in a collection of registers (tile), locations in memory, or in other storage accessible to execution circuitry.

As shown, execution circuity 5603 executes a decoded TILEZERO instruction to zero the source data of the source matrix (tile) operand 5601 and store that data in the source matrix (tile) operand as a destination of the instruction 5607.

ii. Exemplary Format(s)

An embodiment of a format for a TILEZERO instruction is TILEZERO TMM1. In some embodiments, TILEZERO is the opcode mnemonic of the instruction. SRC is a field for a source matrix (tile) operand. In some embodiments, the SRC/DST field is a R/M value (such as 2746) and in others the field is REG 2744.

In embodiments, encodings of the instruction include a scale-index-base (SIB) type memory addressing operand that indirectly identifies multiple indexed destination locations in memory (e.g., field 2750). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 576-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 576-bit (e.g., YMM) register (vm64y) or a 512-bit (e.g., ZMM) register (vm64z).

iii. Exemplary Method(s) of Execution

Figure 57:
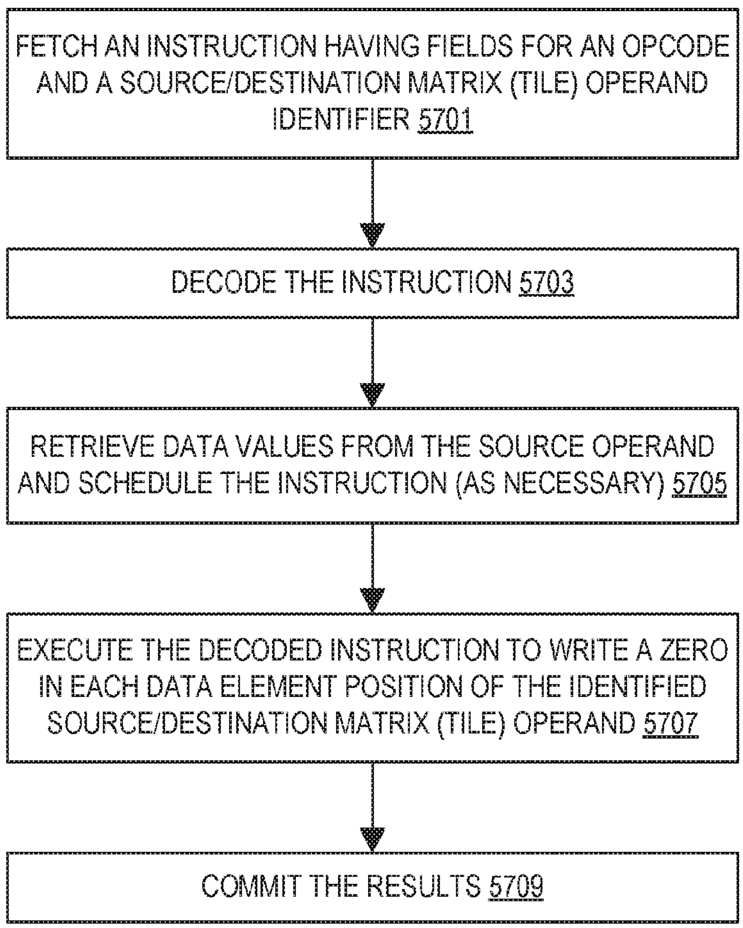
FIG. 57 illustrates an embodiment of method performed by a processor to process a TILEZERO instruction.

FIG. 57 illustrates an embodiment of method performed by a processor to process a TILEZERO instruction.

At 5701, an instruction is fetched. For example, a TILEZERO instruction is fetched. The TILEZERO instruction includes fields for an opcode and a source/destination matrix (tile) operand. In some embodiments, the instruction is fetched from an instruction cache. The opcode of the TILEZERO instruction indicates a zeroing of the data from the source/destination matrix (tile) operand is to occur.

The fetched instruction is decoded at 5703. For example, the fetched TILEZERO instruction is decoded by decode circuitry such as that detailed herein.

Data values associated with the source/destination matrix (tile) operand of the decoded instruction are retrieved at 5705 and the decoded instruction is scheduled (as needed).

At 5707, the decoded instruction is executed by execution circuitry (hardware) such as that detailed herein. For the TILEZERO instruction, the execution will cause execution circuitry to write every element position of the source/destination matrix (tile) operand with a zero. In some embodiments, each row of the source/destination matrix (tile) operand is set to zero at a time. In some embodiments, an actual writing of zeroes does not occur, rather, a status bit for the matrix (tile) is set to indicate that all of the data is zero.

In some embodiments, the instruction is committed or retired at 5709.

iv. Exemplary Pseudocode

FIG. 58 depicts pseudocode of a method of execution of a TILEZERO instruction.

v. Examples

Example 1 A processor comprising: decode circuitry to decode an instruction having fields for an opcode and a source/destination matrix operand identifier; and execution circuitry to execute the decoded instruction to zero each data element of the identified source/destination matrix.

Example 2 The processor of example 1, wherein the execution circuitry is to zero each row of the source/destination matrix operand.

Example 3 The processor of any of examples 1-2, wherein the source/destination matrix operand is a plurality of registers configured to represent a matrix.

Example 4 The processor of any of examples 1-2, wherein the execution circuitry to fault upon a determination the source/destination matrix operand identifier is not configured as a matrix.

Example 5 The processor of any of examples 1 and 3-5, wherein the execution circuitry is to set a status bit regarding the identified source/destination matrix as being zero.

Example 6 A method comprising: decoding an instruction having fields for an opcode and a source/destination matrix operand identifier; and executing the decoded instruction to zero each data element of the identified source/destination matrix.

Example 7 The method of example 6, wherein the zeroing is done a row of the source/destination matrix operand at a time.

Example 8 The method of any of examples 6-7, wherein the source/destination matrix operand is a plurality of registers configured to represent a matrix.

Example 9 The method of any of examples 6-8, further comprising faulting upon a determination the source/destination matrix operand identifier is not configured as a matrix.

Example 10 The method of any of examples 6 and 8-9, further comprising setting a status bit regarding the identified source/destination matrix as being zero.

Example 11 A non-transitory machine-readable medium storing an instruction which causes a processor to perform a method, the method comprising: decoding an instruction having fields for an opcode and a source/destination matrix operand identifier; and executing the decoded instruction to zero each data element of the identified source/destination matrix.

Example 12 The non-transitory machine-readable medium of example 11, wherein the zeroing is done a row of the source/destination matrix operand at a time.

Example 13 The non-transitory machine-readable medium of any of examples 11-12, wherein the source/destination matrix operand is a plurality of registers configured to represent a matrix.

Example 14 The non-transitory machine-readable medium of any of examples 11-13, further comprising faulting upon a determination the source/destination matrix operand identifier is not configured as a matrix.

Example 15 The non-transitory machine-readable medium of any of examples 11 and 13-14, further comprising setting a status bit regarding the identified source/destination matrix as being zero.

Example 16 A system comprising: a processor; and an accelerator coupled to the processor, the accelerator including: decode circuitry to decode an instruction having fields for an opcode and a source/destination matrix operand identifier; and execution circuitry to execute the decoded instruction to zero each data element of the identified source/destination matrix.

Example 17 The system of example 16, wherein the execution circuitry is to zero each row of the source/destination matrix operand.

Example 18 The system of any of examples 16-17, wherein the source/destination matrix operand is a plurality of registers configured to represent a matrix.

Example 19 The system of any of examples 16-18, wherein the execution circuitry to fault upon a determination the source/destination matrix operand identifier is not configured as a matrix.

K Tile Add

Detailed herein are embodiments of a matrix (tile) addition ("TILEADD") instruction and its execution. A TILEADD instruction is an improvement to a computer itself as it provides for support to add matrices (tiles) of data values with a single instruction. In particular, the execution of the TILEADD instruction causes elementwise addition of elements of a first source matrix (tile) with corresponding elements of a second source matrix (tile) and storage of the result in corresponding data element positions of a destination matrix (tile). The size of the data values in the source and destination matrices varies depending on the instruction and tile support. Exemplary sizes include, but are not limited to, 16-bit, 32-bit, 64-bit, 128-bit, and 256-bit. In some embodiments, elements of rows of the destination matrix (tile) that do not have corresponding elements in the source matrices (tiles) are zeroed.

i. Exemplary Execution

Figure 59:
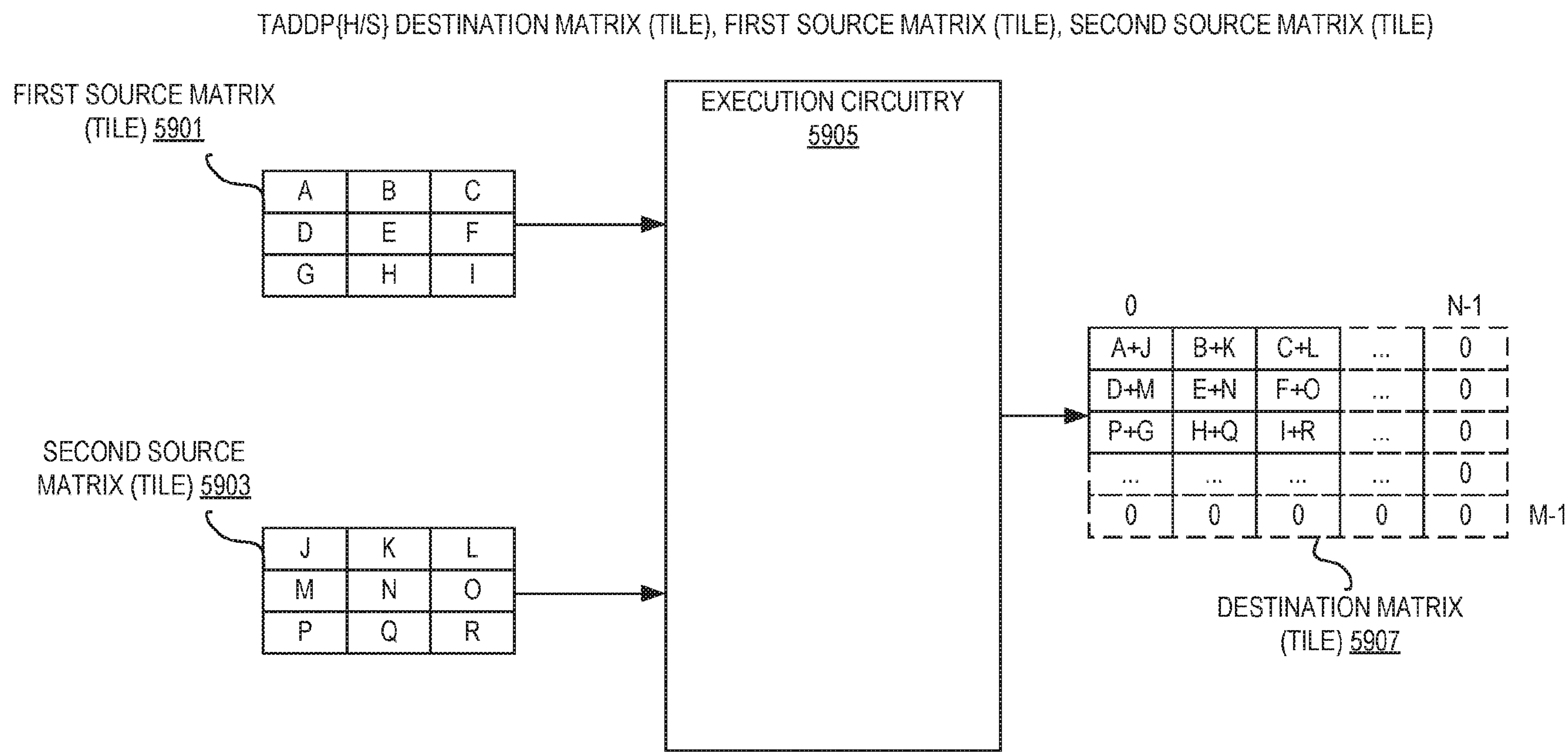
FIG. 59 illustrates an exemplary execution of a TILEADD instruction.

FIG. 59 illustrates an exemplary execution of a TILEADD instruction. The TILEADD instruction format includes fields for an opcode (e.g., shown as "TADDP{H,S}" in the figure), a destination operand (e.g., shown as "DESTINATION MATRIX (TILE)" in the figure) and two source operands (e.g., shown as "FIRST SOURCE MATRIX (TILE)" and "SECOND SOURCE MATRIX (TILE)" in the figure).

The source and destination matrix (tiles) operand fields represent a first source matrix (tile) 5901, a second source matrix (tile) 5903, and a destination matrix (tile) 5907. As detailed earlier, a matrix (tile) may be stored in a collection of registers, locations in memory (for example, as strided rows), or in other storage accessible to execution circuitry.

As shown, execution circuitry 5905 executes a decoded TADD instruction to perform elementwise addition of the elements of the first source matrix (tile) 5901 and the second source matrix (tile) 5903 and stores the result in corresponding data element positions of the destination matrix (tile) 5907. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible. Each of the first source matrix (tile) 5901 and the second source matrix (tile) 5903 uses 3 rows and 3 columns. Although the example of FIG. 59 illustrates an example of adding two 3×3 matrices, in general, a TILEADD instruction can operate on any two matrices (tiles) having the same dimensions (that is, source matrices (tiles) having a same number of columns N and a same number of rows M).

In some embodiments, execution circuitry 5905 uses a grid of fused multiply adders (FMAs) to execute a decoded TILEADD instruction by storing the result of adding the two source matrix (tile) operands into corresponding data element positions of the destination matrix (tile) 5907. In particular, the grid of FMAs generates, for each data element position[row, column] of a first source matrix (tile) 5901, a sum of the value at that data element position and the value at a corresponding data element position[row, column] of the second source matrix (tile) 5903. In reference to the example source matrix (tile) operands 5901, 5903, the execution circuitry 5905 generates a sum of the values first source matrix (tile) 5901 position[0,0] and second source matrix (tile) 5903 position[0,0] (A+J) and stores the result in the position[0,0] of the destination matrix (tile) 5907, generates a sum of the values first source matrix (tile) 5901 position

[0,1] and second source matrix (tile) 5903 position[0,1] (B+K) and stores the result in the position[0,1] of the destination matrix (tile) 5907, and so forth.

ii. Exemplary Format(s)

An embodiment of a format for a TILEADD instruction is TADDP IH/S TMM1, TMM2, TMM3. In some embodiments, TADDP IH/SI is the opcode mnemonic of the instruction, where the S or H identifier indicates whether the source matrices (tile) comprise single-precision (PS) or half-precision (PH) floating-point data values. TMM1 is a field for the destination matrix (tile) operand. TMM2 and TMM3 are fields for the matrix (tile) source operands. In some embodiments, the TMM3 field is a R/M value (such as 8246), the TMM1 field is REG 8244, and the data element size is found in 8265.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 60:
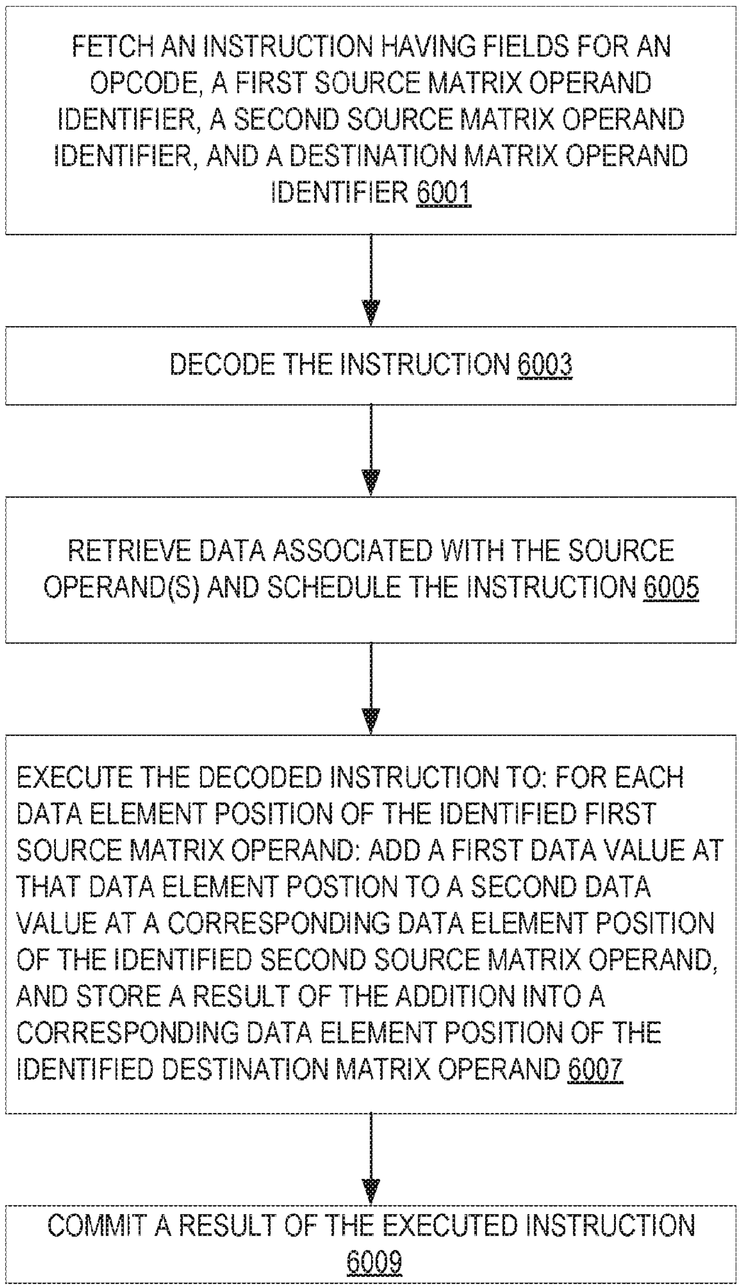
FIG. 60 illustrates an embodiment of method performed by a processor to process a TILEADD instruction.

FIG. 60 illustrates an embodiment of method performed by a processor to process a TILEADD instruction.

At 6001, an instruction is fetched. For example, a TILEADD instruction is fetched. The TILEADD instruction includes fields for an opcode, a first and a second source matrix (tile) operand identifier, and a destination matrix (tile) operand identifier. In some embodiments, the instruction is fetched from an instruction cache. The source operands and destination operand consist of packed data. The opcode of the TILEADD instruction indicates that a sum of the source operands is to be generated. In an embodiment, the opcode further indicates whether the source operands consist of half-precision floating-point values or single-precision floating-point values.

The fetched instruction is decoded at 6003. For example, the fetched TILEADD instruction is decoded by decode circuitry such as that detailed herein.

Data values associated with the source matrix (tile) operands of the decoded instruction are retrieved at 6005 and the decoded instruction is schedule (as needed). For example, when one or more of the source matrix (tile) operands are memory operands, the data from the indicated memory location is retrieved.

At 6007, the decoded instruction is executed by execution circuitry (hardware) such as that detailed herein. For the TILEADD instruction, the execution will cause execution circuitry to perform an elementwise matrix addition operation on the source data. In some embodiments, the execution of a decoded matrix addition operation instruction causes an execution circuit to, for each data element position of the first source matrix operand: add a first data value at that data element position to a second data value at a corresponding data element position of the second source matrix operand, and store a result of the addition into a corresponding data element position of the destination matrix operand.

In some embodiments, a fault is generated when a number of data element rows associated with the first source matrix (tile) operand is different than a number of data element rows associated with the second source matrix (tile) operand or is different than a number of data element rows associated with the destination matrix (tile) operand. Similarly, a fault is generated when a number of data element columns associated with the first source matrix (tile) operand is different than a number of data element columns associated with the second source matrix (tile) operand or is different than a number of data element columns associated with the destination matrix (tile) operand. As described elsewhere herein, the dimensions for each matrix, element size for the data elements each matrix, and other configuration can be set by executing a TILECONFIG instruction.

As described elsewhere herein, successful execution of a TILECONFIG instruction enables subsequent TILE operators and sets a state variable indicating that the corresponding code is in a region with TILES configured. In some embodiments, a fault is generated as part of executing a TILE ADD instruction if the TILES mode is determined to be inactive. For example, the execution circuitry can check whether the state variable set as part of the successful execution of a TILECONFIG instruction indicates that a TILES mode is active.

In some embodiments, the instruction is committed or retired at 6009.

FIG. 61 illustrates an example process describing a method performed by a processor to process a TILEADD instruction. For example, process 6101 illustrates an example method for performing a TILEADD operation when the source matrix (tile) operands contain half-precision elements. Process 6201 illustrates an example method for performing a TILEADD operation when the source matrix (tile) operands contain single-precision elements.

As shown, the process of 6101 determines whether any of the following is true: 1) is a TILES mode not active?; 2) do the destination matrix (tile) operand and the first source matrix (tile) operand have a different number of columns?; 3) do the destination matrix (tile) operand and the second source matrix (tile) operand have a different number of columns?; 4) do the destination matrix (tile) operand and the first source matrix (tile) operand have a different number of row?; 5) do the destination matrix (tile) operand and the second source matrix (tile) operand have a different number of rows?; 6) does the destination matrix (tile) operand have more than a specified maximum number of columns?; 7) does the first source matrix (tile) operand have more than a specified maximum number of columns?; 8) does the second source matrix (tile) operand have more than a specified maximum number of columns? If any of these is true, then a fault is raised.

If none of the conditions above is true, then the execution circuitry writes, for each configured row and column of the identified destination matrix (tile) operand, the sum of corresponding element values from the first source matrix (tile) operand and the second source matrix (tile) operand into a corresponding data element position of the destination matrix (tile) operand. In some embodiments, unconfigured elements of rows of the destination matrix (tile) that do not have corresponding columns in the source matrix (tile) are zeroed.

v. Examples

Example 1 A processor comprising: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: add a first data value at that data element position to a second data value at a corresponding data element position of the identified second source matrix operand, and store a result of the addition into a corresponding data element position of the identified destination matrix operand.

Example 2 The processor of Example 1, wherein the first source matrix operand is a packed data register and the second source matrix operand is a memory location.

Example 3 The processor of Example 1, wherein the first source matrix operand is a packed data register and the second source matrix operand is a packed data register.

Example 4 The processor of any of Examples 1-3, wherein the execution circuitry comprises a plurality of fused-multiply adders.

Example 5 The processor of Example 1, wherein the opcode indicates that each of the first source matrix operand, the second source matrix operand, and the destination matrix operand comprises half-precision floating-point values.

Example 6 The processor of Example 1, wherein the opcode indicates that each of the first source matrix operand, the second source matrix operand, and the destination matrix operand comprises single-precision floating-point values.

Example 7 The processor of any of Examples 1-6, wherein a fault is generated when the first source matrix operand has a different number of data elements than the second source matrix operand.

Example 8 The processor of any of Examples 1-7, wherein a fault is generated when a number of rows associated with the first source matrix operand is different than a number of rows associated with the second source matrix operand.

Example 9 The processor of any of Examples 1-8, wherein a fault is generated when a number of columns associated with the first source matrix operand is different than a number of columns associated with the second source matrix operand.

Example 10 The processor of any of Examples 1-9, wherein the execution circuitry further checks a state variable indicating whether a matrix operations mode is active, and wherein a fault is generated when it is determined that the matrix operations mode is not active.

Example 11 provides a method comprising: decoding an instruction having fields for an opcode, a first source matrix operand identifier, a second source matrix operand identifier, and a destination matrix operand identifier; and executing the decoded instruction to, for each data element position of the identified first source matrix operand: add a first data value at that data element position to a second data value at a corresponding data element position of the identified second source matrix operand, and store a result of the addition into a corresponding data element position of the identified destination matrix operand.

Example 12 The method of Example 11, wherein the first source matrix operand is a packed data register and the second source matrix operand is a memory location.

Example 13 The method of Example 11, wherein the first source matrix operand is a packed data register and the second source matrix operand is a packed data register.

Example 14 The method of any of Examples 11-13, wherein the execution circuitry comprises a plurality of fused-multiply adders.

Example 15 The method of Example 11, wherein the opcode indicates that each of the first source matrix operand, the second source matrix operand, and the destination matrix operand comprises half-precision floating-point values.

Example 16 The method of Example 11, wherein the opcode indicates that each of the first source matrix operand, the second source matrix operand, and the destination matrix operand comprises single-precision floating-point values.

Example 17 The method of any of Examples 11-16, wherein a fault is generated when the first source matrix operand has a different number of data elements than the second source matrix operand.

Example 18 The method of any of Examples 11-17, wherein a fault is generated when a number of rows associated with the first source matrix operand is different than a number of rows associated with the second source matrix operand.

Example 19 The method of Example 11-18, wherein a fault is generated when a number of columns associated with the first source matrix operand is different than a number of columns associated with the second source matrix operand.

Example 20 The method of any of Examples 11-19, wherein executing the decoded instruction includes checking a state variable indicating whether a matrix operations mode is active, and wherein a fault is generated when it is determined that the matrix operations mode is not active.

Example 21 provides a non-transitory machine-readable medium storing an instruction which when executed by a processor causes the processor to perform a method, the method comprising: decoding an instruction having fields for an opcode, a first source matrix operand identifier, a second source matrix operand identifier, and a destination matrix operand identifier, and executing the decoded instruction to, for each data element position of the identified first source matrix operand: add a first data value at that data element position to a second data value at a corresponding data element position of the identified second source matrix operand, and store a result of the addition into a corresponding data element position of the identified destination matrix operand.

Example 22 The non-transitory machine-readable medium of Example 21, wherein the first source matrix operand is a packed data register and the second source matrix operand is a memory location.

Example 23 The non-transitory machine-readable medium of Example 21, wherein the first source matrix operand is a packed data register and the second source matrix operand is a packed data register.

Example 24 The non-transitory machine-readable medium of Example 21, wherein the execution circuitry comprises a plurality of fused-multiply adders.

Example 25 The non-transitory machine-readable medium of Example 21, wherein the opcode indicates that each of the first source matrix operand, the second source matrix operand, and the destination matrix operand comprises half-precision floating-point values.

Example 26 The non-transitory machine-readable medium of Example 21, wherein the opcode indicates that each of the first source matrix operand, the second source matrix operand, and the destination matrix operand contains single-precision floating-point values.

Example 27 The non-transitory machine-readable medium of any of Examples 21-26, wherein a fault is generated when the first source matrix operand has a different number of data elements than the second source matrix operand.

Example 28 The non-transitory machine-readable medium of any of Examples 21-27, wherein a fault is generated when a number of rows associated with the first source matrix operand is different than a number of rows associated with the second source matrix operand.

Example 29 The non-transitory machine-readable medium of any of Examples 21-28, wherein a fault is generated when a number of columns associated with the first source matrix operand is different than a number of columns associated with the second source matrix operand.

Example 30 The non-transitory machine-readable medium of any of Examples 21-29, wherein executing the decoded instruction includes checking a state variable indicating whether a matrix operations mode is active, and wherein a fault is generated when it determines that the matrix operations mode is not active.

Example 31 provides a system comprising: a processor; and an accelerator coupled to the processor, the accelerator including: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: add a first data value at that data element position to a second data value at a corresponding data element position of the identified second source matrix operand, and store a result of the addition into a corresponding data element position of the identified destination matrix operand.

Example 32 The system of Example 31, wherein the first source matrix operand is a packed data register and the second source matrix operand is a memory location.

Example 33 The system of Example 31, wherein the first source matrix operand is a packed data register and the second source matrix operand is a packed data register.

Example 34 The system of any of Examples 31-33, wherein the execution circuitry comprises a plurality of fused-multiply adders.

Example 35 The system of Example 31, wherein the opcode indicates that each of the first source matrix operand, the second source matrix operand, and the destination matrix operand comprises half-precision floating-point values.

Example 36 The system of Example 31, wherein the opcode indicates that each of the first source matrix operand, the second source matrix operand, and the destination matrix operand comprises single-precision floating-point values.

Example 37 The system of any of Examples 31-36, wherein a fault is generated when the first source matrix operand has a different number of data elements than the second source matrix operand.

Example 38 The system of any of Examples 31-37, wherein a fault is generated when a number of rows associated with the first source matrix operand is different than a number of rows associated with the second source matrix operand.

Example 39 The system of any of Examples 31-38, wherein a fault is generated when a number of columns associated with the first source matrix operand is different than a number of columns associated with the second source matrix operand.

Example 40 The system of any of Examples 31-39, wherein the execution circuitry further checks a state variable indicating whether a matrix operations mode is active, and wherein a fault is generated when it is determined that the matrix operations mode is not active.

L. Tile Subtract

Detailed herein are embodiments of a matrix (tile) subtraction ("TILESUB") instruction and its execution. A TILESUB instruction is an improvement to a computer itself as it provides for support to subtract matrices (tiles) of data values with a single instruction. In particular, the execution of the TILESUB instruction causes elementwise subtraction of elements of a second source matrix (tile) from corresponding elements of a first source matrix (tile) and storage of the result in corresponding data element positions of a destination matrix (tile). The size of the data values in the source and destination matrices varies depending on the instruction and tile support. Exemplary sizes include, but are not limited to, 16-bit, 32-bit, 64-bit, 128-bit, and 256-bit. In some embodiments, elements of rows of the destination matrix (tile) that do not have corresponding elements in the source matrices (tiles) are zeroed.

i. Exemplary Execution

Figure 63:
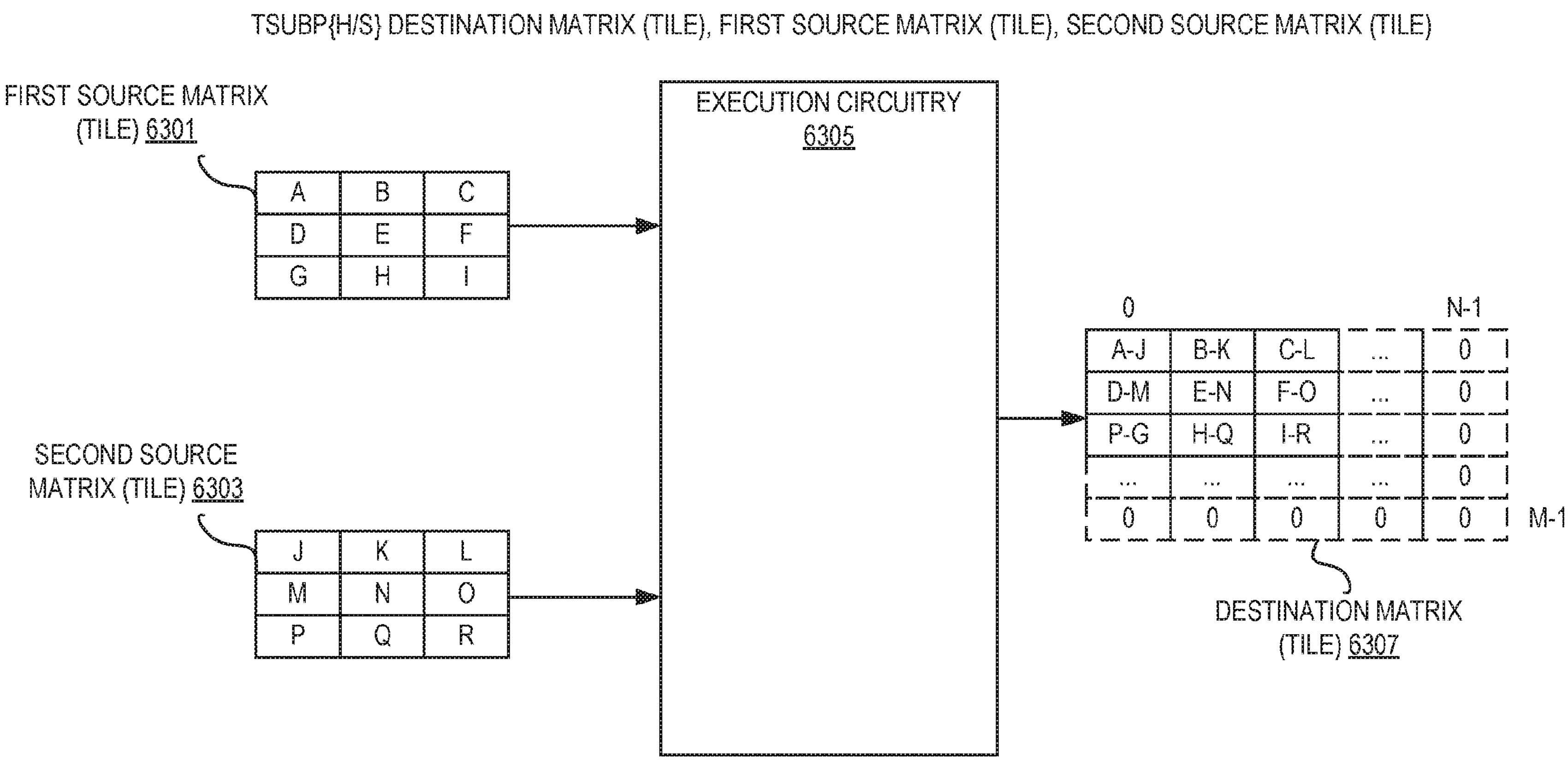
FIG. 63 illustrates an exemplary execution of a TILESUB instruction.

FIG. 63 illustrates an exemplary execution of a TILESUB instruction. The TILESUB instruction format includes fields for an opcode (e.g., shown as "TSUBP{H/S}" in the figure), a destination operand (e.g., shown as "DESTINATION MATRIX (TILE)" in the figure) and two source operands (e.g., shown as "FIRST SOURCE MATRIX (TILE)" and "SECOND SOURCE MATRIX (TILE)" in the figure).

The source and destination matrix (tiles) operand fields represent a first source matrix (tile) 6301, a second source matrix (tile) 6303, and a destination matrix (tile) 6307. As detailed earlier, a matrix (tile) may be stored in a collection of registers, locations in memory (for example, as strided rows), or in other storage accessible to execution circuitry.

As shown, execution circuitry 6305 executes a decoded TSUB instruction to perform elementwise subtraction of the elements of the first source matrix (tile) 6301 and the second source matrix (tile) 6303 and stores the result in corresponding data element positions of the destination matrix (tile) 6307. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible. Each of the first source matrix (tile) 6301 and the second source matrix (tile) 6303 uses 3 rows and 3 columns. Although the example of FIG. 63 illustrates an example of subtracting two 3×3 matrices, in general, a TILESUB instruction can operate on any two matrices (tiles) having the same dimensions (that is, source matrices (tiles) having a same number of columns N and a same number of rows M).

In some embodiments, execution circuitry 6305 uses a grid of fused multiply adders (FMAs) to execute a decoded TILESUB instruction by storing the result of subtracting the two source matrix (tile) operands into corresponding data element positions of the destination matrix (tile) 6307. In particular, the grid of FMAs generates, for each data element position[row, column] of a first source matrix (tile) 6301, a result value indicating the difference between the value at that data element position and the value at a corresponding data element position[row, column] of the second source matrix (tile) 6303. In reference to the example source matrix (tile) operands 6301 and 6303, the execution circuitry 6305 subtracts the value of the second source matrix (tile) 6303 at position[0,0] from the value of the first source matrix (tile) 6301 at position[0,0] (A-J) and stores the result in the position[0,0] of the destination matrix (tile) 6307, subtracts the value of the second source matrix (tile) 6303 position [0,1] from the value of the first source matrix (tile) 6303 at position[0,1] (B-K) and stores the result in the position[0,1] of the destination matrix (tile) 6307, and so forth.

ii. Exemplary Format(s)

An embodiment of a format for a TILESUB instruction is TSUBP{H/S} TMM1, TMM2, TMM3. In some embodiments, TSUBPIH/SI is the opcode mnemonic of the instruction, where the S or H identifier indicates whether the source matrices (tile) comprise single-precision (PS) or half-precision (PH) floating-point data values. TMM1 is a field for the destination matrix (tile) operand. TMM2 and TMM3 are fields for the matrix (tile) source operands. In some embodiments, the TMM3 field is a R/M value (such as 8246), the TMM1 field is REG 8244, and the data element size is found in 8265.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 64:
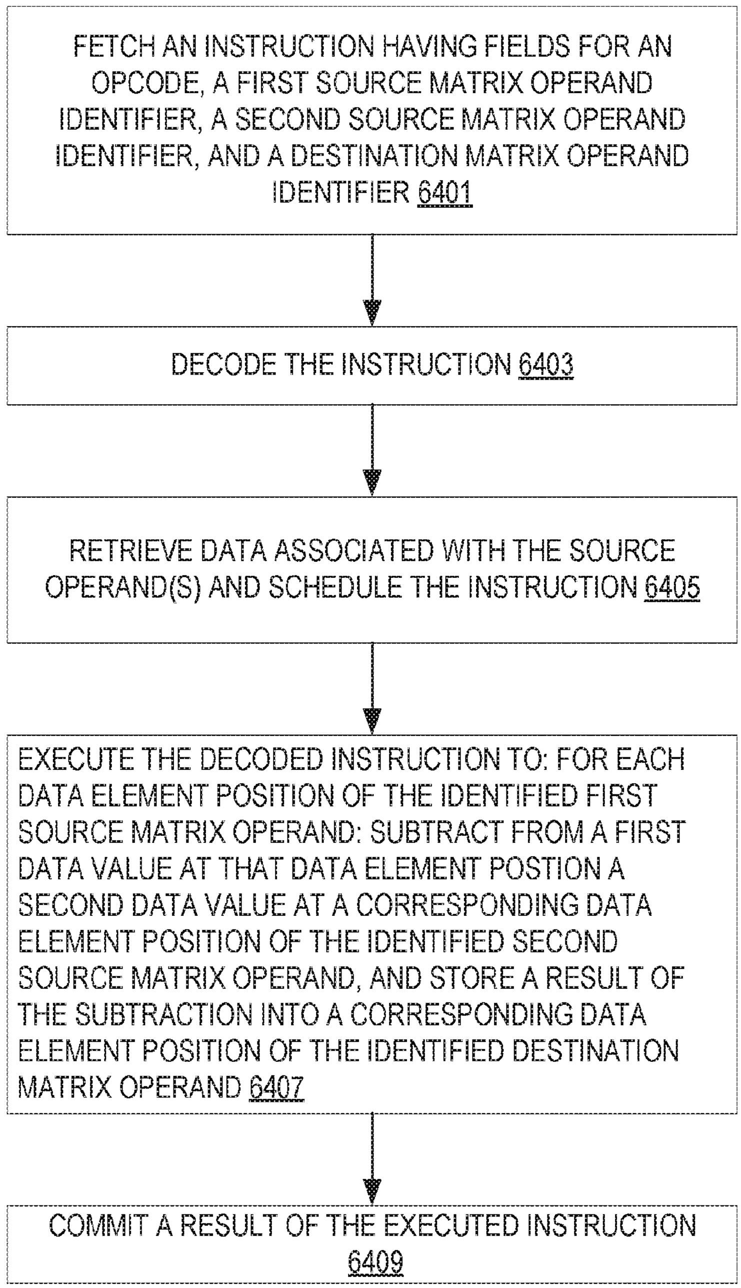
FIG. 64 illustrates an embodiment of method performed by a processor to process a TILESUB instruction.

FIG. 64 illustrates an embodiment of method performed by a processor to process a TILESUB instruction.

At 6401, an instruction is fetched. For example, a TILESUB instruction is fetched. The TILESUB instruction includes fields for an opcode, a first and a second source matrix (tile) operand identifier, and a destination matrix (tile) operand identifier. In some embodiments, the instruction is fetched from an instruction cache. The source operands and destination operand consist of packed data. The opcode of the TILESUB instruction indicates that elementwise subtraction of the source operands is to be generated. In an embodiment, the opcode further indicates whether the source operands consist of half-precision floating-point values or single-precision floating-point values.

The fetched instruction is decoded at 6403. For example, the fetched TILESUB instruction is decoded by decode circuitry such as that detailed herein.

Data values associated with the source matrix (tile) operands of the decoded instruction are retrieved at 6405 and the decoded instruction is schedule (as needed). For example, when one or more of the source matrix (tile) operands are memory operands, the data from the indicated memory location is retrieved.

At 6407, the decoded instruction is executed by execution circuitry (hardware) such as that detailed herein. For the TILESUB instruction, the execution will cause execution circuitry to perform an elementwise matrix subtraction operation on the source data. In some embodiments, the execution of a decoded matrix subtraction operation instruction causes an execution circuit to, for each data element position of the first source matrix operand: subtract from a first data value at that data element position a second data value at a corresponding data element position of the identified second source matrix operand, and store a result of the subtraction into a corresponding data element position of the destination matrix operand.

In some embodiments, a fault is generated when a number of data element rows associated with the first source matrix (tile) operand is different than a number of data element rows associated with the second source matrix (tile) operand or is different than a number of data element rows associated with the destination matrix (tile) operand. Similarly, a fault is generated when a number of data element columns associated with the first source matrix (tile) operand is different than a number of data element columns associated with the second source matrix (tile) operand or is different than a number of data element columns associated with the destination matrix (tile) operand. As described elsewhere herein, the dimensions for each matrix, element size for the data elements each matrix, and other configuration can be set by executing a TILECONFIG instruction.

As described elsewhere herein, successful execution of a TILECONFIG instruction enables subsequent TILE operators and sets a state variable indicating that the corresponding code is in a region with TILES configured. In some embodiments, a fault is generated as part of executing a TILE SUBTRACT instruction if the TILES mode is determined to be inactive. For example, the execution circuitry can check whether the state variable set as part of the successful execution of a TILECONFIG instruction indicates that a TILES mode is active.

In some embodiments, the instruction is committed or retired at 6409.

FIG. 65 illustrates an example process describing a method performed by a processor to process a TILESUB instruction. For example, process 6501 illustrates an example method for performing a TILESUB operation when the source matrix (tile) operands contain half-precision elements. Process 6601 illustrates an example method for performing a TILESUB operation when the source matrix (tile) operands contain single-precision elements.

As shown, the process of 6501 determines whether any of the following is true: 1) is a TILES mode not active?; 2) do the destination matrix (tile) operand and the first source matrix (tile) operand have a different number of columns?; 3) do the destination matrix (tile) operand and the second source matrix (tile) operand have a different number of columns?; 4) do the destination matrix (tile) operand and the first source matrix (tile) operand have a different number of row?; 5) do the destination matrix (tile) operand and the second source matrix (tile) operand have a different number of rows?; 6) does the destination matrix (tile) operand have more than a specified maximum number of columns?; 7) does the first source matrix (tile) operand have more than a specified maximum number of columns?; 8) does the second source matrix (tile) operand have more than a specified maximum number of columns? If any of these is true, then a fault is raised.

If none of the conditions above is true, then the execution circuitry writes, for each configured row and column of the identified destination matrix (tile) operand, the sum of corresponding element values from the first source matrix (tile) operand and the second source matrix (tile) operand into a corresponding data element position of the destination matrix (tile) operand. In some embodiments, unconfigured elements of rows of the destination matrix (tile) that do not have corresponding columns in the source matrix (tile) are zeroed.

FIG. 66 illustrates an example process describing a method performed by a processor to process a TILESUB instruction for single precision data elements.

iv. Examples

Example 1 A processor comprising: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: subtract from a first data value at that data element position a second data value at a corresponding data element position of the identified second source matrix operand, and store a result of the subtraction into a corresponding data element position of the identified destination matrix operand.

Example 2 The processor of Example 1, wherein the first source matrix operand is a packed data register and the second source matrix operand is a memory location.

Example 3 The processor of Example 1, wherein the first source matrix operand is a packed data register and the second source matrix operand is a packed data register.

Example 4 The processor of any of Examples 1-3, wherein the execution circuitry comprises a plurality of fused-multiply adders.

Example 5 The processor of Example 1, wherein the opcode indicates that each of the first source matrix operand, the second source matrix operand, and the destination matrix operand comprises half-precision floating-point values.

Example 6 The processor of Example 1, wherein the opcode indicates that each of the first source matrix operand, the second source matrix operand, and the destination matrix operand comprises single-precision floating-point values.

Example 7 The processor of any of Examples 1-6, wherein a fault is generated when the first source matrix operand has a different number of data elements than the second source matrix operand.

Example 8 The processor of any of Examples 1-7, wherein a fault is generated when a number of rows associated with the first source matrix operand is different than a number of rows associated with the second source matrix operand.

Example 9 The processor of any of Examples 1-8, wherein a fault is generated when a number of columns associated with the first source matrix operand is different than a number of columns associated with the second source matrix operand.

Example 10 The processor of any of Examples 1-9, wherein the execution circuitry further checks a state variable indicating whether a matrix operations mode is active, and wherein a fault is generated when it is determined that the matrix operations mode is not active.

Example 11 provides a method comprising: decoding an instruction having fields for an opcode, a first source matrix operand identifier, a second source matrix operand identifier, and a destination matrix operand identifier; and executing the decoded instruction to, for each data element position of the identified first source matrix operand: subtract from a first data value at that data element position a second data value at a corresponding data element position of the identified second source matrix operand, and store a result of the subtraction into a corresponding data element position of the identified destination matrix operand.

Example 12 The method of Example 11, wherein the first source matrix operand is a packed data register and the second source matrix operand is a memory location.

Example 13 The method of Example 11, wherein the first source matrix operand is a packed data register and the second source matrix operand is a packed data register.

Example 14 The method of any of Examples 11-13, wherein the execution circuitry comprises a plurality of fused-multiply adders.

Example 15 The method of Example 11, wherein the opcode indicates that each of the first source matrix operand, the second source matrix operand, and the destination matrix operand comprises half-precision floating-point values.

Example 16 The method of Example 11, wherein the opcode indicates that each of the first source matrix operand, the second source matrix operand, and the destination matrix operand comprises single-precision floating-point values.

Example 17 The method of any of Examples 11-16, wherein a fault is generated when the first source matrix operand has a different number of data elements than the second source matrix operand.

Example 18 The method of any of Examples 11-17, wherein a fault is generated when a number of rows associated with the first source matrix operand is different than a number of rows associated with the second source matrix operand.

Example 19 The method of Example 11-18, wherein a fault is generated when a number of columns associated with the first source matrix operand is different than a number of columns associated with the second source matrix operand.

Example 20 The method of any of Examples 11-19, wherein executing the decoded instruction includes checking a state variable indicating whether a matrix operations mode is active, and wherein a fault is generated when it is determined that the matrix operations mode is not active.

Example 21 provides a non-transitory machine-readable medium storing an instruction which when executed by a processor causes the processor to perform a method, the method comprising: decoding an instruction having fields for an opcode, a first source matrix operand identifier, a second source matrix operand identifier, and a destination matrix operand identifier, and executing the decoded instruction to, for each data element position of the identified first source matrix operand: subtract from a first data value at that data element position a second data value at a corresponding data element position of the identified second source matrix operand, and store a result of the subtraction into a corresponding data element position of the identified destination matrix operand.

Example 22 The non-transitory machine-readable medium of Example 21, wherein the first source matrix operand is a packed data register and the second source matrix operand is a memory location.

Example 23 The non-transitory machine-readable medium of Example 21, wherein the first source matrix operand is a packed data register and the second source matrix operand is a packed data register.

Example 24 The non-transitory machine-readable medium of Example 21, wherein the execution circuitry comprises a plurality of fused-multiply adders.

Example 25 The non-transitory machine-readable medium of Example 21, wherein the opcode indicates that each of the first source matrix operand, the second source matrix operand, and the destination matrix operand comprises half-precision floating-point values.

Example 26 The non-transitory machine-readable medium of Example 21, wherein the opcode indicates that each of the first source matrix operand, the second source matrix operand, and the destination matrix operand contains single-precision floating-point values.

Example 27 The non-transitory machine-readable medium of any of Examples 21-26, wherein a fault is generated when the first source matrix operand has a different number of data elements than the second source matrix operand.

Example 28 The non-transitory machine-readable medium of any of Examples 21-27, wherein a fault is generated when a number of rows associated with the first source matrix operand is different than a number of rows associated with the second source matrix operand.

Example 29 The non-transitory machine-readable medium of any of Examples 21-28, wherein a fault is generated when a number of columns associated with the first source matrix operand is different than a number of columns associated with the second source matrix operand.

Example 30 The non-transitory machine-readable medium of any of Examples 21-29, wherein executing the decoded instruction includes checking a state variable indicating whether a matrix operations mode is active, and wherein a fault is generated when it determines that the matrix operations mode is not active.

Example 31 provides a system comprising: a processor; and an accelerator coupled to the processor, the accelerator including: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: subtract from a first data value at that data element position a second data value at a corresponding data element position of the identified second source matrix operand, and store a result of the subtraction into a corresponding data element position of the identified destination matrix operand.

Example 32 The system of Example 31, wherein the first source matrix operand is a packed data register and the second source matrix operand is a memory location.

Example 33 The system of Example 31, wherein the first source matrix operand is a packed data register and the second source matrix operand is a packed data register.

Example 34 The system of any of Examples 31-33, wherein the execution circuitry comprises a plurality of fused-multiply adders.

Example 35 The system of Example 31, wherein the opcode indicates that each of the first source matrix operand, the second source matrix operand, and the destination matrix operand comprises half-precision floating-point values.

Example 36 The system of Example 31, wherein the opcode indicates that each of the first source matrix operand, the second source matrix operand, and the destination matrix operand comprises single-precision floating-point values.

Example 37 The system of any of Examples 31-36, wherein a fault is generated when the first source matrix operand has a different number of data elements than the second source matrix operand.

Example 38 The system of any of Examples 31-37, wherein a fault is generated when a number of rows associated with the first source matrix operand is different than a number of rows associated with the second source matrix operand.

Example 39 The system of any of Examples 31-38, wherein a fault is generated when a number of columns associated with the first source matrix operand is different than a number of columns associated with the second source matrix operand.

Example 40 The system of any of Examples 31-39, wherein the execution circuitry further checks a state variable indicating whether a matrix operations mode is active, and wherein a fault is generated when it is determined that the matrix operations mode is not active.

M. Tile Multiply

Detailed herein are embodiments of a matrix (tile) multiplication ("TILEMUL") instruction and its execution. A TILEMUL instruction is an improvement to a computer itself as it provides for support to perform elementwise multiplication of matrices (tiles) of data values with a single instruction. In particular, the execution of the TILEMUL instruction causes elementwise multiplication of elements of a first source matrix (tile) with corresponding elements of a second source matrix (tile) and storage of the result in corresponding data element positions of a destination matrix (tile). The size of the data values in the source and destination matrices varies depending on the instruction and tile support. Exemplary sizes include, but are not limited to, 16-bit, 32-bit, 64-bit, 128-bit, and 256-bit. In some embodiments, elements of rows of the destination matrix (tile) that do not have corresponding elements in the source matrices (tiles) are zeroed.

i. Exemplary Execution

Figure 67:
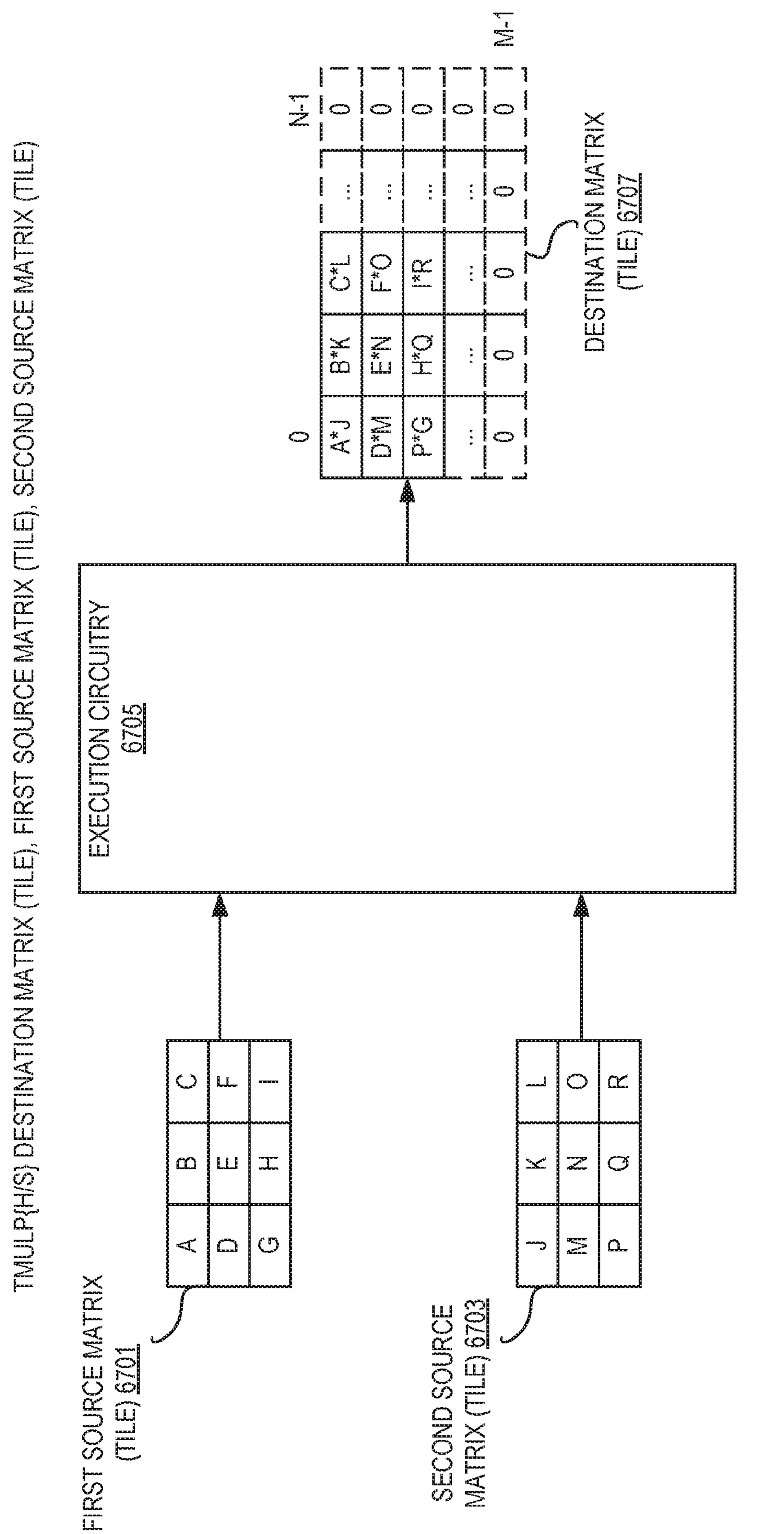
FIG. 67 illustrates an exemplary execution of a TILEMUL instruction.

FIG. 67 illustrates an exemplary execution of a TILEMUL instruction. The TILEMUL instruction format includes fields for an opcode (e.g., shown as "TMULP{H, S}" in the figure), a destination operand (e.g., shown as "DESTINATION MATRIX (TILE)" in the figure) and two source operands (e.g., shown as "FIRST SOURCE MATRIX (TILE)" and "SECOND SOURCE MATRIX (TILE)" in the figure).

The source and destination matrix (tiles) operand fields represent a first source matrix (tile) 6701, a second source matrix (tile) 6703, and a destination matrix (tile) 6707. As detailed earlier, a matrix (tile) may be stored in a collection of registers, locations in memory (for example, as strided rows), or in other storage accessible to execution circuitry.

As shown, execution circuitry 6705 executes a decoded TMUL instruction to perform elementwise multiplication of the elements of the first source matrix (tile) 6701 and the second source matrix (tile) 6703 and stores the result in corresponding data element positions of the destination matrix (tile) 6707. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible. Each of the first source matrix (tile) 6701 and the second source matrix (tile) 6703 uses 3 rows and 3 columns. Although the example of FIG. 67 illustrates an example of performing elementwise multiplication of two 3×3 matrices, in general, a TILEMUL instruction can operate on any two matrices (tiles) having the same dimensions (that is, source matrices (tiles) having a same number of columns N and a same number of rows M).

In some embodiments, execution circuitry 6705 uses a grid of fused multiply adders (FMAs) to execute a decoded TILEMUL instruction by storing the result of performing elementwise multiplication of the two source matrix (tile) operands into corresponding data element positions of the destination matrix (tile) 6707. In particular, the grid of FMAs generates, for each data element position[row, column] of a first source matrix (tile) 6701, a multiplication of the value at that data element position by the value at a corresponding data element position[row, column] of the second source matrix (tile) 6703. In reference to the example source matrix (tile) operands 6701, 6703, the execution circuitry 6705 multiplies the value at first source matrix (tile) 6701 position[0,0] by the value at second source matrix (tile) 6703 position[0,0] (A*J) and stores the result in the position[0,0] of the destination matrix (tile) 6707, multiplies the value at first source matrix (tile) 6701 position[0,1] by the value at second source matrix (tile) 6703 position[0,1] (B*K) and stores the result in the position[0,1] of the destination matrix (tile) 6707, and so forth.

ii. Exemplary Format(s)

An embodiment of a format for a TILEMUL instruction is TMULP{H/S} TMM1, TMM2, TMM3. In some embodiments, TMULP IH/SI is the opcode mnemonic of the instruction, where the S or H identifier indicates whether the source matrices (tile) comprise single-precision (PS) or half-precision (PH) floating-point data values. TMM1 is a field for the destination matrix (tile) operand. TMM2 and TMM3 are fields for the matrix (tile) source operands. In some embodiments, the TMM3 field is a R/M value (such as 8246), the TMM1 field is REG 8244, and the data element size is found in 8265.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 68:
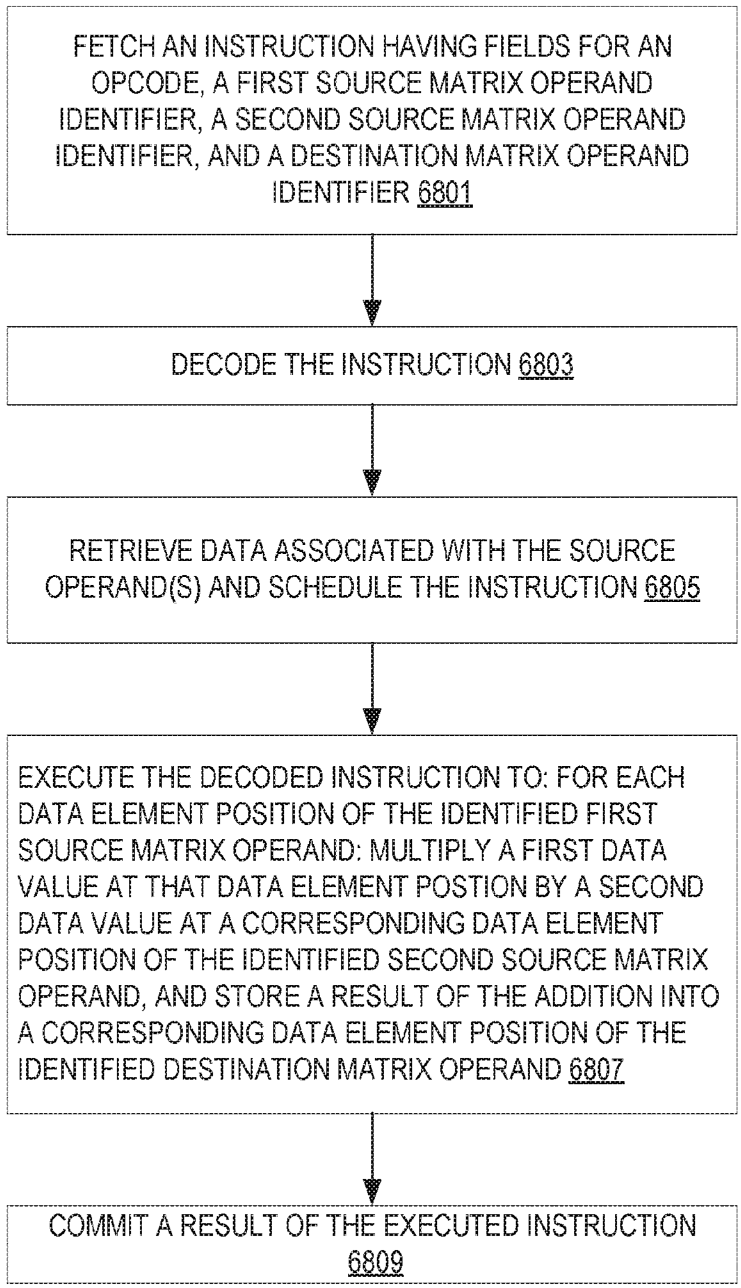
FIG. 68 illustrates an embodiment of a method performed by a processor to process a TILEMUL instruction.

FIG. 68 illustrates an embodiment of method performed by a processor to process a TILEMUL instruction.

At 6801, an instruction is fetched. For example, a TILEMUL instruction is fetched. The TILEMUL instruction includes fields for an opcode, a first and a second source matrix (tile) operand identifier, and a destination matrix (tile) operand identifier. In some embodiments, the instruction is fetched from an instruction cache. The source operands and destination operand consist of packed data. The opcode of the TILEMUL instruction indicates that a sum of the source operands is to be generated. In an embodiment, the opcode further indicates whether the source operands consist of half-precision floating-point values or single-precision floating-point values.

The fetched instruction is decoded at 6803. For example, the fetched TILEMUL instruction is decoded by decode circuitry such as that detailed herein.

Data values associated with the source matrix (tile) operands of the decoded instruction are retrieved at 6805 and the decoded instruction is schedule (as needed). For example, when one or more of the source matrix (tile) operands are memory operands, the data from the indicated memory location is retrieved.

At 6807, the decoded instruction is executed by execution circuitry (hardware) such as that detailed herein. For the TILEMUL instruction, the execution will cause execution circuitry to perform an elementwise matrix multiplication operation on the source data. In some embodiments, the execution of a decoded matrix multiplication operation instruction causes an execution circuit to, for each data element position of the first source matrix operand: multiply a first data value at that data element position by a second data value at a corresponding data element position of the second source matrix operand, and store a result of the multiplication into a corresponding data element position of the destination matrix operand.

In some embodiments, a fault is generated when a number of data element rows associated with the first source matrix (tile) operand is different than a number of data element rows associated with the second source matrix (tile) operand or is different than a number of data element rows associated with the destination matrix (tile) operand. Similarly, a fault is generated when a number of data element columns associated with the first source matrix (tile) operand is different than a number of data element columns associated with the second source matrix (tile) operand or is different than a number of data element columns associated with the destination matrix (tile) operand. As described elsewhere herein, the dimensions for each matrix, element size for the data elements each matrix, and other configuration can be set by executing a TILECONFIG instruction.

As described elsewhere herein, successful execution of a TILECONFIG instruction enables subsequent TILE operators and sets a state variable indicating that the corresponding code is in a region with TILES configured. In some embodiments, a fault is generated as part of executing a TILEMUL instruction if the TILES mode is determined to be inactive. For example, the execution circuitry can check whether the state variable set as part of the successful execution of a TILECONFIG instruction indicates that a TILES mode is active.

In some embodiments, the instruction is committed or retired at 6809.

FIG. 69 illustrates an example process describing a method performed by a processor to process a TILEMUL instruction. For example, process 6901 illustrates an example method for performing a TILEMUL operation when the source matrix (tile) operands contain half-precision elements. Process 7001 as shown in FIG. 70 illustrates an example method for performing a TILEMUL operation when the source matrix (tile) operands contain single-precision elements.

As shown, the process of 6901 determines whether any of the following is true: 1) is a TILES mode not active?; 2) do the destination matrix (tile) operand and the first source matrix (tile) operand have a different number of columns?; 3) do the destination matrix (tile) operand and the second source matrix (tile) operand have a different number of columns?; 4) do the destination matrix (tile) operand and the first source matrix (tile) operand have a different number of row?; 5) do the destination matrix (tile) operand and the second source matrix (tile) operand have a different number of rows?; 6) does the destination matrix (tile) operand have more than a specified maximum number of columns?; 7) does the first source matrix (tile) operand have more than a specified maximum number of columns?; 8) does the second source matrix (tile) operand have more than a specified maximum number of columns? If any of these is true, then a fault is raised.

If none of the conditions above is true, then the execution circuitry writes, for each configured row and column of the identified destination matrix (tile) operand, the sum of corresponding element values from the first source matrix (tile) operand and the second source matrix (tile) operand into a corresponding data element position of the destination matrix (tile) operand. In some embodiments, unconfigured elements of rows of the destination matrix (tile) that do not have corresponding columns in the source matrix (tile) are zeroed.

iv. Examples

Example 1 A processor comprising: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: multiply a first data value at that data element position by a second data value at a corresponding data element position of the identified second source matrix operand, and store a result of the multiplication into a corresponding data element position of the identified destination matrix operand.

Example 2 The processor of Example 1, wherein the first source matrix operand is a packed data register and the second source matrix operand is a memory location.

Example 3 The processor of Example 1, wherein the first source matrix operand is a packed data register and the second source matrix operand is a packed data register.

Example 4 The processor of any of Examples 1-3, wherein the execution circuitry comprises a plurality of fused-multiply adders.

Example 5 The processor of Example 1, wherein the opcode indicates that each of the first source matrix operand, the second source matrix operand, and the destination matrix operand comprises half-precision floating-point values.

Example 6 The processor of Example 1, wherein the opcode indicates that each of the first source matrix operand, the second source matrix operand, and the destination matrix operand comprises single-precision floating-point values.

Example 7 The processor of any of Examples 1-6, wherein a fault is generated when the first source matrix operand has a different number of data elements than the second source matrix operand.

Example 8 The processor of any of Examples 1-7, wherein a fault is generated when a number of rows associated with the first source matrix operand is different than a number of rows associated with the second source matrix operand.

Example 9 The processor of any of Examples 1-8, wherein a fault is generated when a number of columns associated with the first source matrix operand is different than a number of columns associated with the second source matrix operand.

Example 10 The processor of any of Examples 1-9, wherein the execution circuitry further checks a state variable indicating whether a matrix operations mode is active, and wherein a fault is generated when it is determined that the matrix operations mode is not active.

Example 11 provides a method comprising: decoding an instruction having fields for an opcode, a first source matrix operand identifier, a second source matrix operand identifier, and a destination matrix operand identifier; and executing the decoded instruction to, for each data element position of the identified first source matrix operand: multiply a first data value at that data element position by a second data value at a corresponding data element position of the identified second source matrix operand, and store a result of the multiplication into a corresponding data element position of the identified destination matrix operand.

Example 12 The method of Example 11, wherein the first source matrix operand is a packed data register and the second source matrix operand is a memory location.

Example 13 The method of Example 11, wherein the first source matrix operand is a packed data register and the second source matrix operand is a packed data register.

Example 14 The method of any of Examples 11-13, wherein the execution circuitry comprises a plurality of fused-multiply adders.

Example 15 The method of Example 11, wherein the opcode indicates that each of the first source matrix operand, the second source matrix operand, and the destination matrix operand comprises half-precision floating-point values.

Example 16 The method of Example 11, wherein the opcode indicates that each of the first source matrix operand, the second source matrix operand, and the destination matrix operand comprises single-precision floating-point values.

Example 17 The method of any of Examples 11-16, wherein a fault is generated when the first source matrix operand has a different number of data elements than the second source matrix operand.

Example 18 The method of any of Examples 11-17, wherein a fault is generated when a number of rows associated with the first source matrix operand is different than a number of rows associated with the second source matrix operand.

Example 19 The method of Example 11-18, wherein a fault is generated when a number of columns associated with the first source matrix operand is different than a number of columns associated with the second source matrix operand.

Example 20 The method of any of Examples 11-19, wherein executing the decoded instruction includes checking a state variable indicating whether a matrix operations mode is active, and wherein a fault is generated when it is determined that the matrix operations mode is not active.

Example 21 provides a non-transitory machine-readable medium storing an instruction which when executed by a processor causes the processor to perform a method, the method comprising: decoding an instruction having fields for an opcode, a first source matrix operand identifier, a second source matrix operand identifier, and a destination matrix operand identifier, and executing the decoded instruction to, for each data element position of the identified first source matrix operand: multiply a first data value at that data element position to a second data value by a corresponding data element position of the identified second source matrix operand, and store a result of the multiplication into a corresponding data element position of the identified destination matrix operand.

Example 22 The non-transitory machine-readable medium of Example 21, wherein the first source matrix operand is a packed data register and the second source matrix operand is a memory location.

Example 23 The non-transitory machine-readable medium of Example 21, wherein the first source matrix operand is a packed data register and the second source matrix operand is a packed data register.

Example 24 The non-transitory machine-readable medium of Example 21, wherein the execution circuitry comprises a plurality of fused-multiply adders.

Example 25 The non-transitory machine-readable medium of Example 21, wherein the opcode indicates that each of the first source matrix operand, the second source matrix operand, and the destination matrix operand comprises half-precision floating-point values.

Example 26 The non-transitory machine-readable medium of Example 21, wherein the opcode indicates that each of the first source matrix operand, the second source matrix operand, and the destination matrix operand contains single-precision floating-point values.

Example 27 The non-transitory machine-readable medium of any of Examples 21-26, wherein a fault is generated when the first source matrix operand has a different number of data elements than the second source matrix operand.

Example 28 The non-transitory machine-readable medium of any of Examples 21-27, wherein a fault is generated when a number of rows associated with the first source matrix operand is different than a number of rows associated with the second source matrix operand.

Example 29 The non-transitory machine-readable medium of any of Examples 21-28, wherein a fault is generated when a number of columns associated with the first source matrix operand is different than a number of columns associated with the second source matrix operand.

Example 30 The non-transitory machine-readable medium of any of Examples 21-29, wherein executing the decoded instruction includes checking a state variable indicating whether a matrix operations mode is active, and wherein a fault is generated when it determines that the matrix operations mode is not active.

Example 31 provides a system comprising: a processor; and an accelerator coupled to the processor, the accelerator including: decode circuitry to decode an instruction having fields for an opcode, a first source matrix operand identifier, a second source matrix operand identifier, and a destination matrix operand identifier; and execution circuitry to execute the decoded instruction to, for each data element position of the identified first source matrix operand: multiply a first data value at that data element position by a second data value at a corresponding data element position of the identified second source matrix operand, and store a result of the multiplication into a corresponding data element position of the identified destination matrix operand.

Example 32 The system of Example 31, wherein the first source matrix operand is a packed data register and the second source matrix operand is a memory location.

Example 33 The system of Example 31, wherein the first source matrix operand is a packed data register and the second source matrix operand is a packed data register.

Example 34 The system of any of Examples 31-33, wherein the execution circuitry comprises a plurality of fused-multiply adders.

Example 35 The system of Example 31, wherein the opcode indicates that each of the first source matrix operand, the second source matrix operand, and the destination matrix operand comprises half-precision floating-point values.

Example 36 The system of Example 31, wherein the opcode indicates that each of the first source matrix operand, the second source matrix operand, and the destination matrix operand comprises single-precision floating-point values.

Example 37 The system of any of Examples 31-36, wherein a fault is generated when the first source matrix operand has a different number of data elements than the second source matrix operand.

Example 38 The system of any of Examples 31-37, wherein a fault is generated when a number of rows associated with the first source matrix operand is different than a number of rows associated with the second source matrix operand.

Example 39 The system of any of Examples 31-38, wherein a fault is generated when a number of columns associated with the first source matrix operand is different than a number of columns associated with the second source matrix operand.

Example 40 The system of any of Examples 31-39, wherein the execution circuitry further checks a state variable indicating whether a matrix operations mode is active, and wherein a fault is generated when it is determined that the matrix operations mode is not active.

M. Tile Multiply Accumulate

Detailed herein are embodiments of a matrix (tile) multiply accumulate ("TMMA") instruction and its execution. A TMMA instruction is an improvement to a computer itself as it provides for support to perform matrix-matrix multiplication and accumulation (addition) using a single instruction. In particular, an execution of the TMMA instruction causes data from a first source matrix (tile) to be multiplied by data from a second source matrix (tile) and added to data from a destination matrix (tile), and the result of the multiply-add is stored in the destination matrix (tile). The size of the data values to be stored varies depending on the instruction and tile support. Exemplary sizes included, but are not limited to, 16-bit, 32-bit, 64-bit, 128-bit, 256-bit, etc.

i. Exemplary Execution

Figure 71:
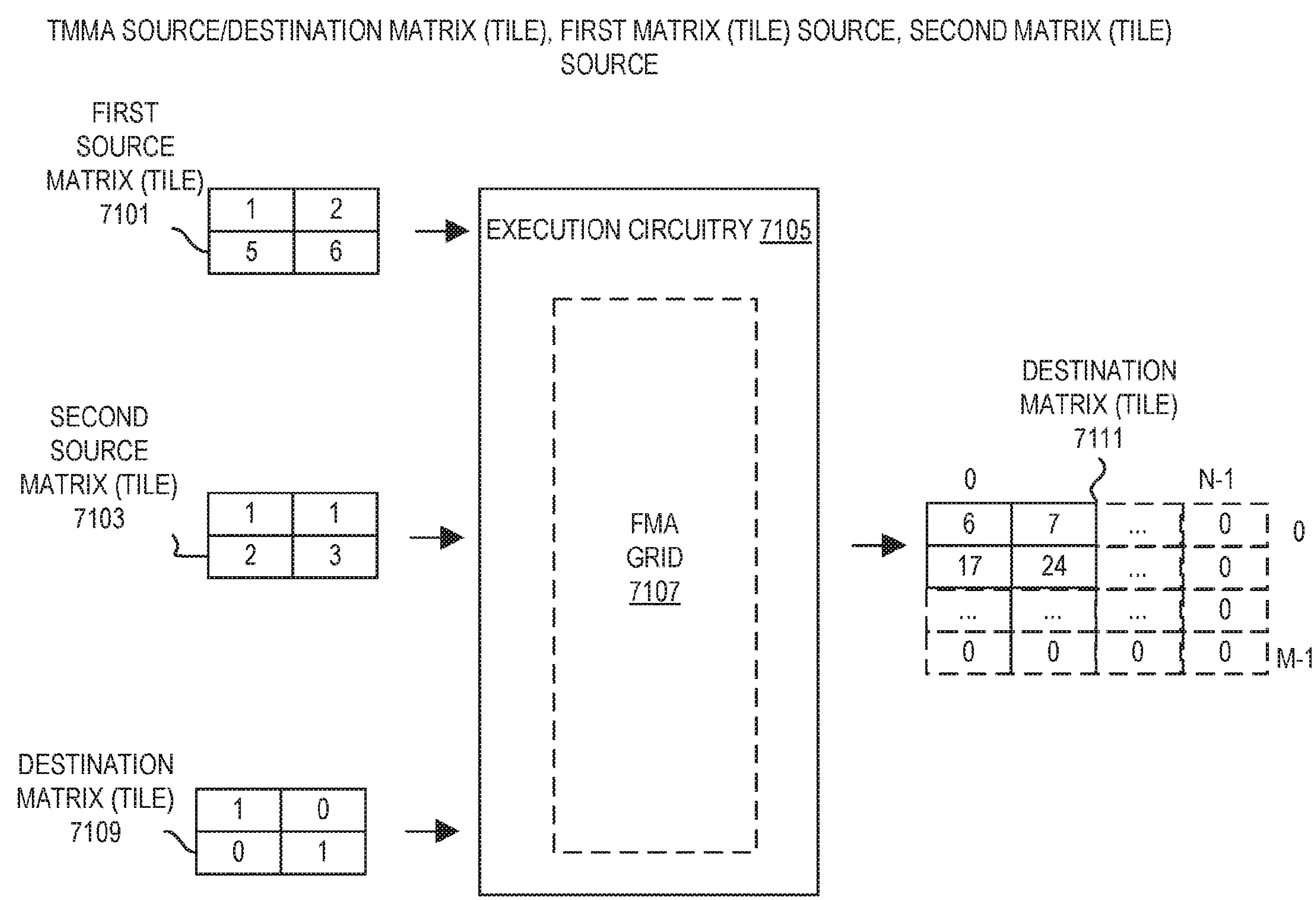
FIG. 71 illustrates an exemplary execution of a TMMA instruction using memory source operand.

FIG. 71 illustrates an exemplary execution of a TMMA instruction using memory source operand. The TMMA instruction format includes fields for an opcode, a destination matrix (tile) operand (shown as "Tile Destination"), an identifier of a first source matrix (tile) operand (shown as "FIRST TILE SOURCE"), an identifier of a second source matrix (tile) operand (shown as "SECOND TILE SOURCE"), and, in some embodiments, an identifier of a counter register. In some implementations, when the second source matrix (tile) operand is in memory, a field for a register to be used in progress tracking is also included.

When one of the sources for the instruction is memory, the memory is accessed according to a scale-index-base (SIB) type memory addressing operand that indirectly identifies multiple indexed destination locations in memory, however, other memory addressing schemes may be utilized. As detailed, each "row" of a matrix (tile) source or destination is a group of elements. In memory, these groups are separated by a "stride" value. As will be detailed, the "index" of the SIB may be utilized to dictate this stride. Depending upon the implementation, the stride is either from an address corresponding to an initial data element of a group to an initial data element of a subsequent group in memory, or from an address corresponding to a last data element of a group to an initial data element of a subsequent group in memory. Typically, strides are used to delineate rows, however, that in not necessarily true.

One or both of the sources for the instruction is a matrix (tile) stored in a plurality register or in matrix (tile) data structure. This source is encoded in the instruction as if it was a single register. When there are two such matrices, both are encoded as if they were single registers.

The final source is the destination matrix (tile) 7109.

While the illustrated matrices (tiles) are shown as 2×2 matrices, this is an arbitrary illustration to help with understanding and different matrix (tile) sizes may be used. The TMMA operation is Source 1*Source 2+Destination. As such, (N×M)*(M×K)+(N×K) matrices are supported.

The matrix (tile) sources 7101 and 7103, and the destination matrix (tile) 7109 are provided to execution circuitry 7105 for the TMMA operation. In some embodiments, a grid of FMAs 7107 is utilized to execute this operation on a per data element position of the matrices (tiles) basis. A grid of FMAs 7107 has previously been described. In some implementations, one or more of the matrix (tile) source 7101 and the destination matrix (tile) 7109 are stored in the grid of FMAs 7107.

The execution circuitry 7105 performs the TMMA by performing a multiply on the sources on a per data element basis (using matrix multiplication of row×column) and adds data from a corresponding data element position of the destination matrix. The result of TMMA is stored into the corresponding data element position of the destination matrix as shown in 7111.

As FIG. 71 is simplified, it does not illustrate the use of a counter register which functions as a progress tracker. The counter is updated as each "row" of the destination is written. This allows for the TMMA operation to be restarted if needed by using the counter to determine where the operation left off. Note also, that in some embodiments, a counter function is not utilized.

ii. Exemplary Format(s)

An embodiment of a format for a TMMA instruction is TMMAP{S,H} TMM1, TMM2, TMM3. In some embodiments, TMMAP {S,H} is the opcode mnemonic of the instruction where S,H represent single precision (S) floating point data elements and half precision floating point data elements. TMM1 is a field for an identifier of a source/destination matrix (tile), and TMM3 is a field for an identifier of a second source matrix (tile), and TMM2 is a field for an identifier of a first source matrix (tile). In some embodiments, the TMM2 identifier is field R/M value (such as 8246), TMM3 is field VVVV 8220, the source/destination matrix (tile) identifier is field 8244. Note, if a counter is not used, SRC3 is not included in the instruction format.

iii. Exemplary Method(s) of Execution

Figure 72:
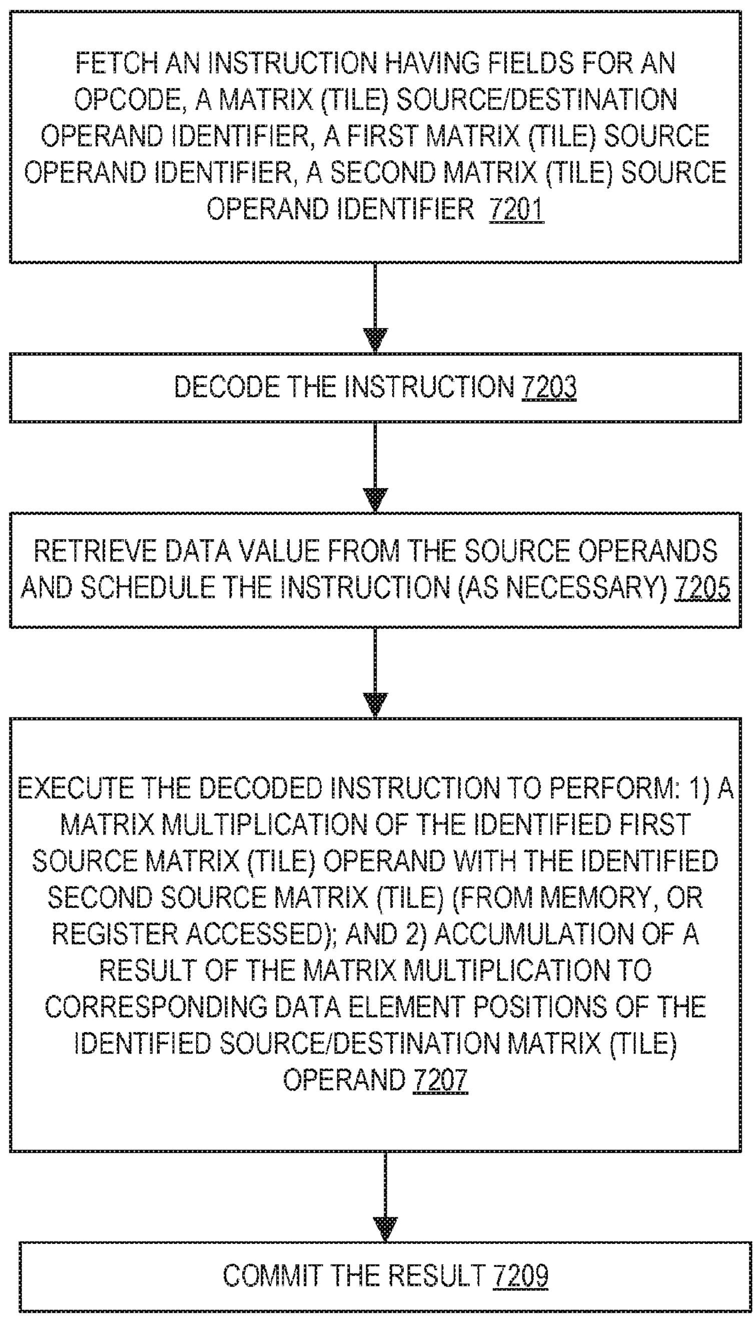
FIG. 72 illustrates an embodiment of a method performed by a processor to process a TMMA instruction.

FIG. 72 illustrates an embodiment of method performed by a processor to process a TMMA instruction.

At 7201, an instruction is fetched. For example, a TMMA instruction is fetched. An embodiment of the TMMA instruction includes fields for an opcode, a destination matrix (tile) operand identifier, a first source matrix (tile) operand identifier, and a second source matrix (tile) operand identifier (e.g., stored in memory, or accessed as a register). In some embodiments, a register to store a counter value identifier is also included.

The fetched instruction is decoded at 7203. For example, the fetched TMMA instruction is decoded by decode circuitry such as that detailed herein.

Data values associated with the sources are retrieved at 7205 and the decoded instruction is scheduled (as needed).

At 7207, the decoded instruction is executed by execution circuitry (hardware) such as that detailed herein. For the TMMA instruction, the execution will cause execution circuitry to perform: 1) a matrix multiplication of the identified first source matrix (tile) operand with the identified second source matrix (tile) (from memory, or register accessed); and 2) add a result of the matrix multiplication to corresponding data element positions of the identified destination matrix (tile) operand. In some embodiments, data element positions of the identified destination matrix (tile) operand that were not subject to an addition are zeroed (unconfigured columns).

In some embodiments, the instruction is committed or retired at 7209.

Figure 73:
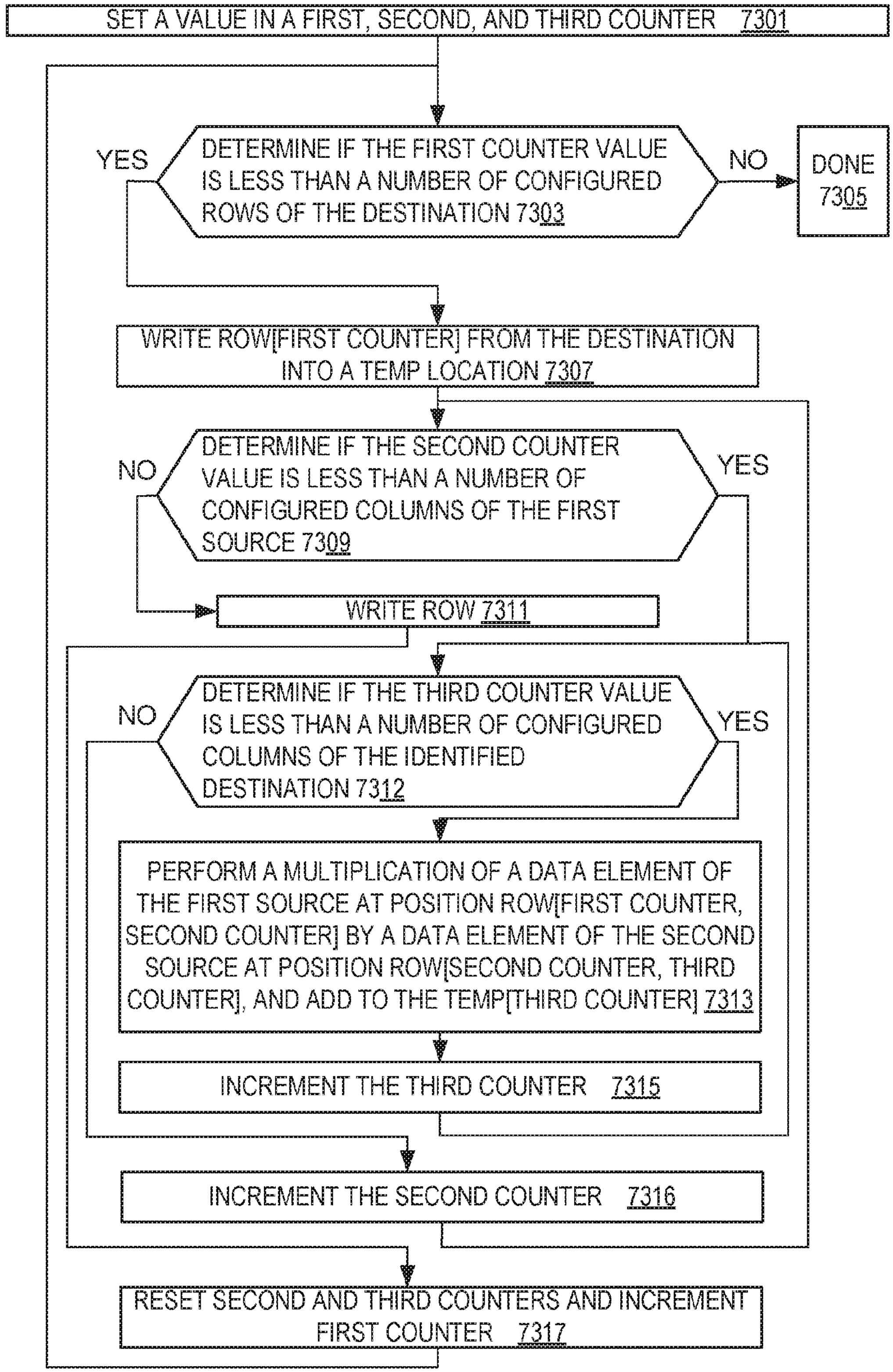
FIG. 73 illustrates a more detailed description of an execution of a TMMA instruction using register addressing.

FIG. 73 illustrates a more detailed description of an execution of a TMMA instruction using register addressing. Typically, this is performed by execution circuitry such as that detailed above.

At 7301, a value in a first, second, and third counter are set. For example, startK and startM are set. Typically, this was done during configuration, but upon a first instance of this instruction these are usually set to 0.

A determination of if the first counter value (e.g., startM) is less than a number of configured rows of the destination is made at 7303. If not, then the instruction has completed and all unconfigured rows are zeroed at 7305.

If yes, then a row from the destination is written into a temporary location at 7307. This row is at position[first counter] (or the value of startM).

A determination of if the second counter value (e.g., startK) is less than a number of configured columns of the first source is made at 7309.

If no, then the row of the temporary location is written to the destination in a corresponding row position at 7311. Typically, unconfigured columns of that row are also zeroed. The second and third counters are reset, and the first counter is incremented at 7317. Essentially, the next row is set to be processed beginning at 7303 again.

If yes, then there is potentially more work to do for that row. A determination of if the third counter value (e.g., n) is less than a number of configured columns of the destination is made at 7312. If yes, then a multiplication of a data element of the first source at position row[first counter, second counter] by a data element of the second source at position row[second counter, third counter] is made, and a result of that multiplication is added to the temporary value at position temporary [third counter] at 7313. The third counter is incremented at 7315 to move the loop along and the determination of 7312 is made again.

If not, then the second counter is incremented at 7316 and the determination of 7309 is made again.

iv. Exemplary Pseudocode

FIG. 74 illustrates pseudocode for a method of implementing a TMMPS instruction. The FMAOP may be a negated version when the opcode calls for it (TNMMPS).

v. Examples

Example 1 A processor comprising: decode circuitry to decode an instruction having fields for an opcode, an identifier for a first source matrix operand, an identifier of a second source matrix operand, and an identifier for a source/destination matrix operand; and execution circuitry to execute the decoded instruction to multiply the identified first source matrix operand by the identified second source matrix operand, add a result of the multiplication to the identified source/destination matrix operand, and store a result of the addition in the identified source/destination matrix operand.

Example 2 The processor of example 1, wherein the execution circuitry comprises a grid of mused multiply accumulators.

Example 3 The processor of any of examples 1-2, wherein identified second source matrix operand is stored in memory.

Example 4 The processor of any of examples 1-3, wherein the multiplication is per row of the identified first source matrix operand and per column of the identified second source matrix operand.

Example 5 The processor of any of examples 1-4, wherein at least one of the operands is a plurality of registers configured to represent a matrix.

Example 6 The processor of any of examples 1-5, wherein the data elements are single precision floating point data elements.

Example 7 The processor of any of examples 1-5, wherein the data elements are half precision floating point data elements.

Example 8 A method comprising: decoding an instruction having fields for an opcode, an identifier for a first source matrix operand, an identifier of a second source matrix operand, and an identifier for a source/destination matrix operand; and executing the decoded instruction to multiply the identified first source matrix operand by the identified second source matrix operand, add a result of the multiplication to the identified source/destination matrix operand, and store a result of the addition in the identified source/destination matrix operand.

Example 9 The method of example 8, wherein the executing uses a grid of mused multiply accumulators.

Example 10 The method of any of examples 8-9, wherein identified second source matrix operand is stored in memory.

Example 11 The method of any of examples 8-10, wherein the multiplication is per row of the identified first source matrix operand and per column of the identified second source matrix operand.

Example 12 The method of any of examples 8-11, wherein at least one of the operands is a plurality of registers configured to represent a matrix.

Example 13 The method of any of examples 8-12, wherein the data elements are single precision floating point data elements.

Example 14 The method of any of examples 8-12, wherein the data elements are half precision floating point data elements.

Example 15 A non-transitory machine-readable medium storing an instruction which causes a processor to perform a method, the method comprising: decoding an instruction having fields for an opcode, an identifier for a first source matrix operand, an identifier of a second source matrix operand, and an identifier for a source/destination matrix operand; and executing the decoded instruction to multiply the identified first source matrix operand by the identified second source matrix operand, add a result of the multiplication to the identified source/destination matrix operand, and store a result of the addition in the identified source/destination matrix operand.

Example 16 The non-transitory machine-readable medium of example 15, wherein the executing uses comprises a grid of mused multiply accumulators.

Example 17 The non-transitory machine-readable medium of any of examples 15-16, wherein identified second source matrix operand is stored in memory.

Example 18 The non-transitory machine-readable medium of any of examples 15-17, wherein the multiplication is per row of the identified first source matrix operand and per column of the identified second source matrix operand.

Example 19 The non-transitory machine-readable medium of any of examples 15-18, wherein at least one of the operands is a plurality of registers configured to represent a matrix.

Example 20 The non-transitory machine-readable medium of any of examples 15-19, wherein the data elements are single precision floating point data elements.

Example 21 The non-transitory machine-readable medium of any of examples 15-19, wherein the data elements are half precision floating point data elements.

Example 22 A system comprising: a processor; and an accelerator coupled to the processor, the accelerator including: decode circuitry to decode an instruction having fields for an opcode, an identifier for a first source matrix operand, an identifier of a second source matrix operand, and an identifier for a source/destination matrix operand; and execution circuitry to execute the decoded instruction to multiply the identified first source matrix operand by the identified second source matrix operand, add a result of the multiplication to the identified source/destination matrix operand, and store a result of the addition in the identified source/destination matrix operand and zero unconfigured columns of identified source/destination matrix operand.

Example 23 The system of example 22, wherein the execution circuitry comprises a grid of mused multiply accumulators.

Example 24 The system of any of examples 22-23, wherein at least one of the operands is a plurality of registers configured to represent a matrix.

N. Tile Negated Multiply Accumulate

Detailed herein are embodiments of a matrix (tile) negated multiply accumulate ("TNMMA") instruction and its execution. A TNMMA instruction is an improvement to a computer itself as it provides for support to perform matrix-matrix multiplication and negated accumulation (subtraction) using a single instruction. In particular, an execution of the TNMMA instruction causes data from a first source matrix (tile) to be multiplied by data from a second source matrix (tile) and subtracted from data from a destination matrix (tile), and the result of the multiply-subtract is stored in the destination matrix (tile). The size of the data values to be stored varies depending on the instruction and tile support. Exemplary sizes included, but are not limited to, 16-bit, 32-bit, 64-bit, 128-bit, 256-bit, etc.

i. Exemplary Execution

Figure 75:
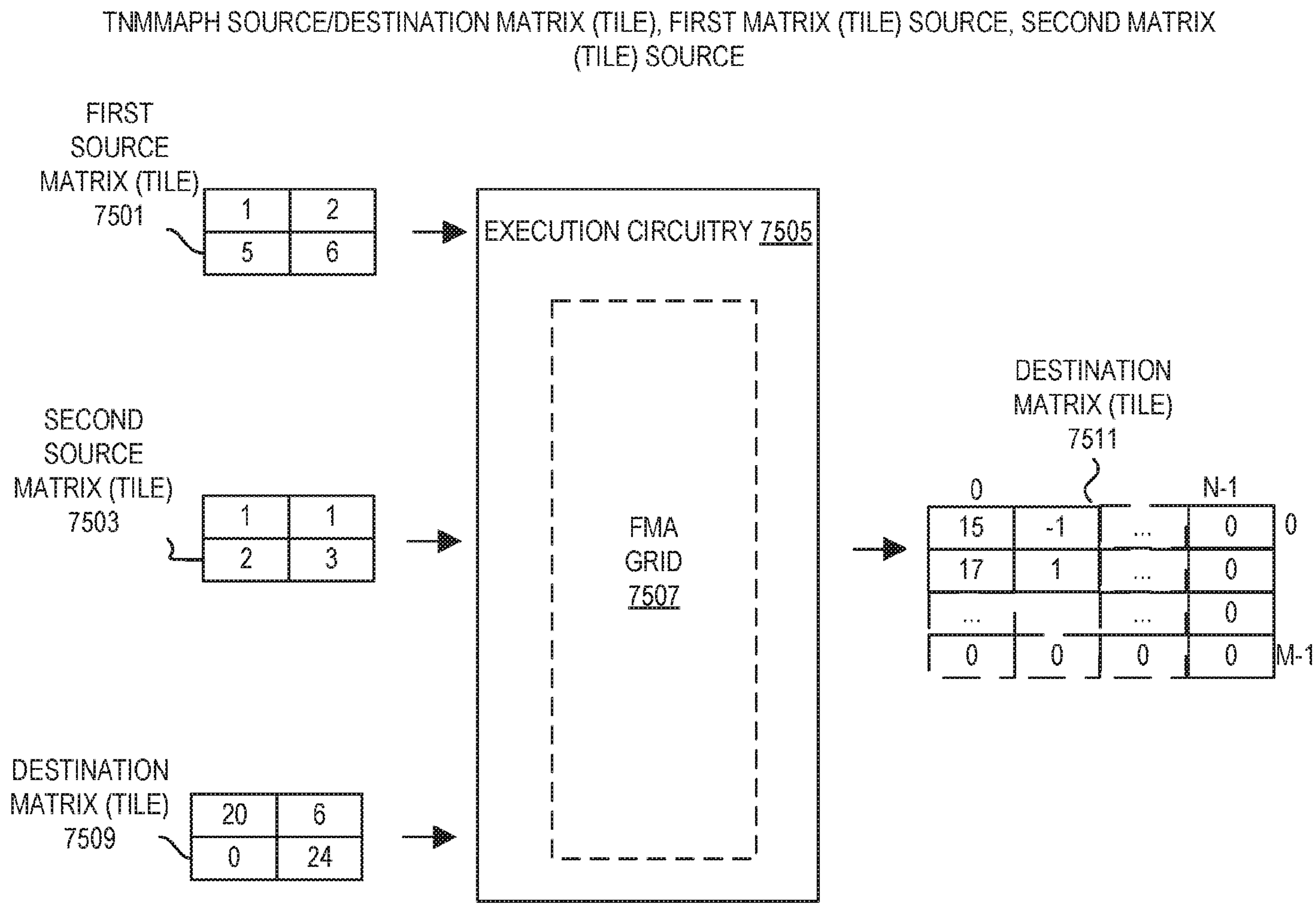
FIG. 75 illustrates an exemplary execution of a TNMMA instruction using memory source operand.

FIG. 75 illustrates an exemplary execution of a TNMMA instruction using memory source operand. The TNMMA instruction format includes fields for an opcode, a source/destination matrix (tile) operand (shown as "Tile Destination"), an identifier of a first source matrix (tile) operand (shown as "FIRST TILE SOURCE"), an identifier of a second source matrix (tile) operand (shown as "SECOND TILE SOURCE"), and, in some embodiments, an identifier of a counter register. In some implementations, when the second source matrix (tile) operand is in memory, a field for a register to be used in progress tracking is also included.

When one of the sources for the instruction is memory, the memory is accessed according to a scale-index-base (SIB) type memory addressing operand that indirectly identifies multiple indexed destination locations in memory, however, other memory addressing schemes may be utilized. As detailed, each "row" of a matrix (tile) source or destination is a group of elements. In memory, these groups are separated by a "stride" value. As will be detailed, the "index" of the SIB may be utilized to dictate this stride. Depending upon the implementation, the stride is either from an address corresponding to an initial data element of a group to an initial data element of a subsequent group in memory, or from an address corresponding to a last data element of a group to an initial data element of a subsequent group in memory. Typically, strides are used to delineate rows, however, that in not necessarily true.

One or both of the sources for the instruction is a matrix (tile) stored in a plurality register or in matrix (tile) data structure. This source is encoded in the instruction as if it was a single register. When there are two such matrices, both are encoded as if they were single registers.

The final source is the destination matrix (tile) 7509.

While this illustrated matrices (tiles) are shown as 2×2 matrices, this is an arbitrary illustration to help with understanding and different matrix (tile) sizes may be used. The TNMMA operation is Source 1*Source 2+Destination As such, (N×K)−(N×M)*(M×K) matrices are supported.

The matrix (tile) sources 7501 and 7503, and the destination matrix (tile) 7509 are provided to execution circuitry 7505 for the TNMMA operation. In some embodiments, a grid of FMAs 7507 is utilized to execute this operation on a per data element position of the matrices (tiles) basis. A grid of FMAs 7507 has previously been described. In some implementations, one or more of the matrix (tile) source 7501 and the destination matrix (tile) 7509 are stored in the grid of FMAs 7507.

The execution circuitry 7505 performs the TNMMA by performing a multiply on the sources on a per data element basis (using matrix multiplication of row×column) and a subtract from a corresponding data element position of the destination matrix. The result of TNMMA is stored into the corresponding data element position of the destination matrix as shown in 7511.

As FIG. 75 is simplified, it does not illustrate the use of a counter register which functions as a progress tracker. The counter is updated as each "row" of the destination is written. This allows for the TNMMA operation to be restarted if needed by using the counter to determine where the operation left off. Note also, that in some embodiments, a counter function is not utilized.

ii. Exemplary Format(s)

An embodiment of a format for a TNMMA instruction is TNMMA{S,H} TMM1, TMM2, TMM3. In some embodiments, TNMMAP {S,H} is the opcode mnemonic of the instruction where S,H represent single precision (S) floating point data elements and half precision floating point data elements. TMM1 is a field for an identifier of a source/destination matrix (tile), and TMM3 is a field for an identifier of a second source matrix (tile), and TMM2 is a field for an identifier of a first source matrix (tile). In some embodiments, the TMM2 identifier is field R/M value (such as 8246), TMM3 is field VVVV 8220, the source/destination matrix (tile) identifier is field 8244. Note, if a counter is not used, SRC3 is not included in the instruction format.

iii. Exemplary Method(s) of Execution

Figure 76:
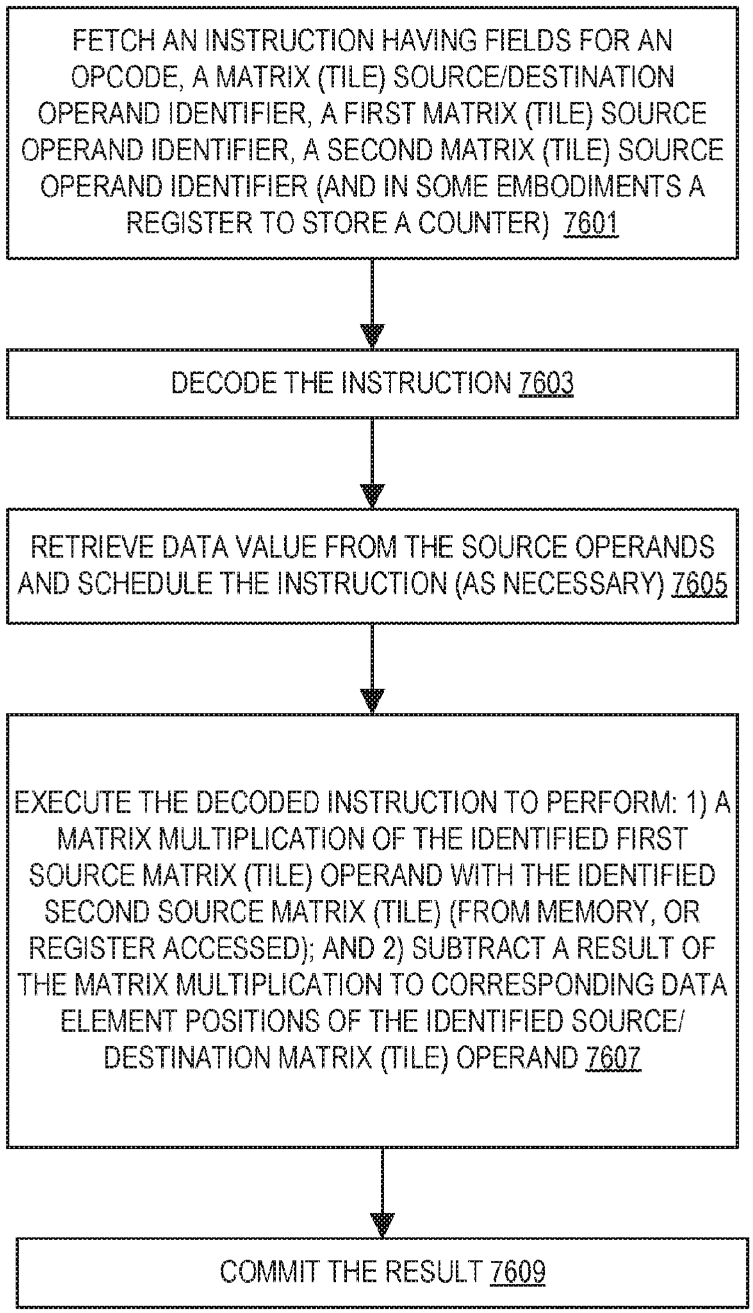
FIG. 76 illustrates an embodiment of method performed by a processor to process a TNMMA instruction.

FIG. 76 illustrates an embodiment of method performed by a processor to process a TNMMA instruction.

At 7601, an instruction is fetched. For example, a TNMMA instruction is fetched. An embodiment of the TNMMA instruction includes fields for an opcode, a source/destination matrix (tile) operand identifier, a first source matrix (tile) operand identifier, and a second source matrix (tile) operand identifier (e.g., stored in memory, or accessed as a register). In some embodiments, a register to store a counter value identifier is also included.

The fetched instruction is decoded at 7603. For example, the fetched TNMMA instruction is decoded by decode circuitry such as that detailed herein.

Data values associated with the sources are retrieved at 7605 and the decoded instruction is scheduled (as needed).

At 7607, the decoded instruction is executed by execution circuitry (hardware) such as that detailed herein. For the TNMMA instruction, the execution will cause execution circuitry to perform: 1) a matrix multiplication of the identified first source matrix (tile) operand with the identified second source matrix (tile) (from memory, or register accessed); and 2) subtract a result of the matrix multiplication from corresponding data element positions of the identified destination matrix (tile) operand. In some embodiments, data element positions of the identified source/destination matrix (tile) operand that were not subject to a subtraction are zeroed (unconfigured columns).

In some embodiments, the instruction is committed or retired at 7609.

Figure 77:
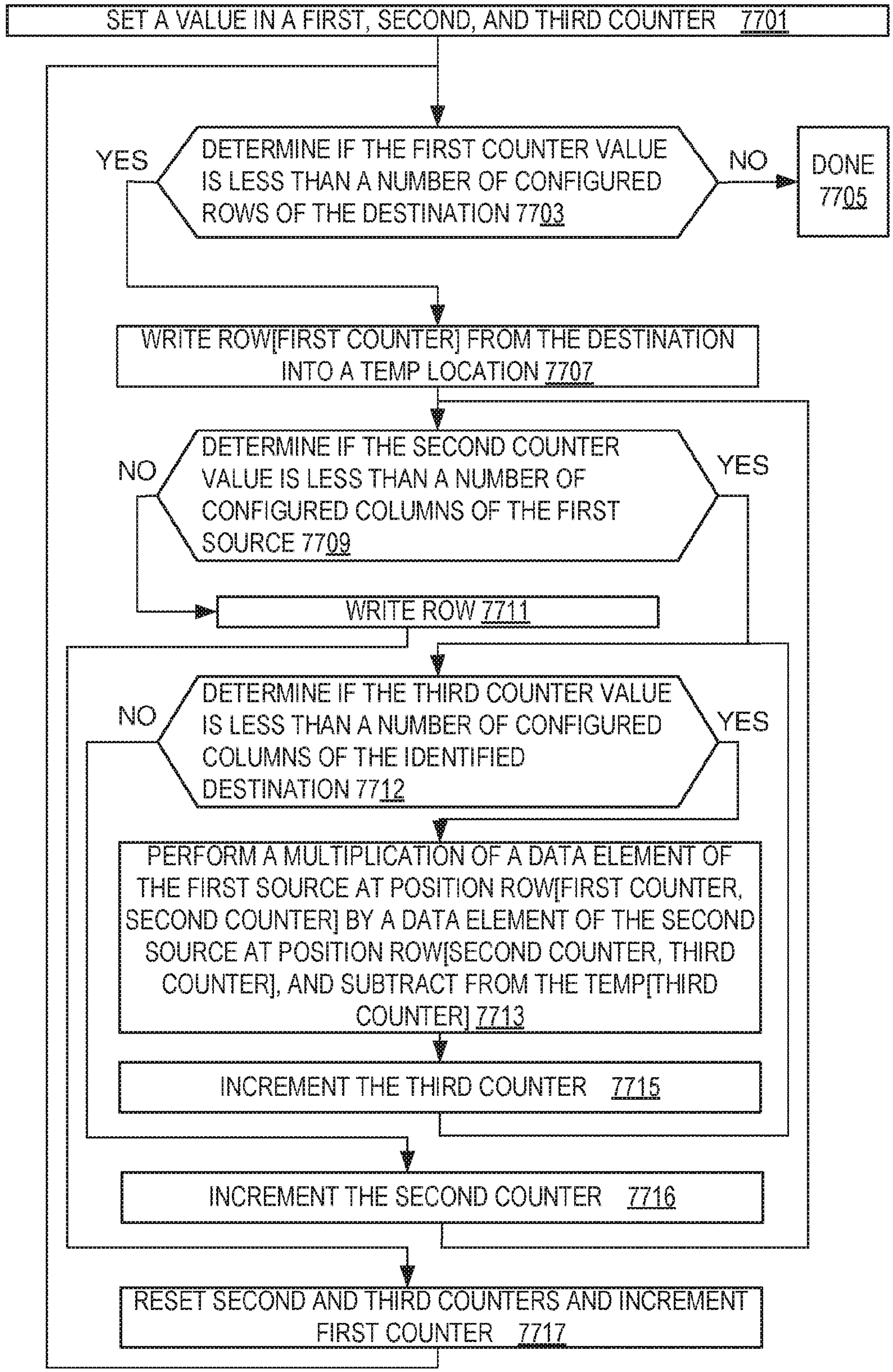
FIG. 77 illustrates a more detailed description of an execution of a TNMMA instruction using register addressing.

FIG. 77 illustrates a more detailed description of an execution of a TNMMA instruction using register addressing. Typically, this is performed by execution circuitry such as that detailed above At 7701, a value in a first, second, and third counter are set. For example, startK and startM are set. Typically, this was done during configuration, but upon a first instance of this instruction these are usually set to 0.

A determination of if the first counter value (e.g., startM) is less than a number of configured rows of the destination is made at 7703. If not, then the instruction has completed and all unconfigured rows are zeroed at 7705.

If yes, then a row from the destination is written into a temporary location at 7707. This row is at position[first counter] (or the value of startM).

A determination of if the second counter value (e.g., startK) is less than a number of configured columns of the first source is made at 7709.

If no, then the row of the temporary location is written to the destination in a corresponding row position at 7711. Typically, unconfigured columns of that row are also zeroed. The second and third counters are reset, and the first counter is incremented at 7717. Essentially, the next row is set to be processed beginning at 7703 again.

If yes, then there is potentially more work to do for that row. A determination of if the third counter value (e.g., n) is less than a number of configured columns of the destination is made at 7712. If yes, then a multiplication of a data element of the first source at position row[first counter, second counter] by a data element of the second source at position row[second counter, third counter] is made, and a result of that multiplication is subtracted from the temporary value at position temporary [third counter] at 7713. The third counter is incremented at 7715 to move the loop along and the determination of 7712 is made again.

If not, then the second counter is incremented at 7716 and the determination of 7709 is made again.

iv. Examples

Example 1 A processor comprising: decode circuitry to decode an instruction having fields for an opcode, an identifier for a first source matrix operand, an identifier of a second source matrix operand, and an identifier for a source/destination matrix operand; and execution circuitry to execute the decoded instruction to multiply the identified first source matrix operand by the identified second source matrix operand, subtract a result of the multiplication to the identified source/destination matrix operand, and store a result of the subtraction in the identified source/destination matrix operand.

Example 2 The processor of example 1, wherein the execution circuitry comprises a grid of mused multiply accumulators.

Example 3 The processor of any of examples 1-2, wherein identified second source matrix operand is stored in memory.

Example 4 The processor of any of examples 1-3, wherein the multiplication is per row of the identified first source matrix operand and per column of the identified second source matrix operand.

Example 5 The processor of any of examples 1-4, wherein at least one of the operands is a plurality of registers configured to represent a matrix.

Example 6 The processor of any of examples 1-5, wherein the data elements are single precision floating point data elements.

Example 7 The processor of any of examples 1-5, wherein the data elements are half precision floating point data elements.

Example 8 A method comprising: decoding an instruction having fields for an opcode, an identifier for a first source matrix operand, an identifier of a second source matrix operand, and an identifier for a source/destination matrix operand; and executing the decoded instruction to multiply the identified first source matrix operand by the identified second source matrix operand, subtract a result of the multiplication to the identified source/destination matrix operand, and store a result of the subtraction in the identified source/destination matrix operand.

Example 9 The method of example 8, wherein the executing uses a grid of mused multiply accumulators.

Example 10 The method of any of examples 8-9, wherein identified second source matrix operand is stored in memory.

Example 11 The method of any of examples 8-10, wherein the multiplication is per row of the identified first source matrix operand and per column of the identified second source matrix operand.

Example 12 The method of any of examples 8-11, wherein at least one of the operands is a plurality of registers configured to represent a matrix.

Example 13 The method of any of examples 8-12, wherein the data elements are single precision floating point data elements.

Example 14 The method of any of examples 8-12, wherein the data elements are half precision floating point data elements.

Example 15 A non-transitory machine-readable medium storing an instruction which causes a processor to perform a method, the method comprising: decoding an instruction having fields for an opcode, an identifier for a first source matrix operand, an identifier of a second source matrix operand, and an identifier for a source/destination matrix operand; and executing the decoded instruction to multiply the identified first source matrix operand by the identified second source matrix operand, subtract a result of the multiplication to the identified source/destination matrix operand, and store a result of the subtraction in the identified source/destination matrix operand.

Example 16 The non-transitory machine-readable medium of example 15, wherein the executing uses comprises a grid of mused multiply accumulators.

Example 17 The non-transitory machine-readable medium of any of examples 15-16, wherein identified second source matrix operand is stored in memory.

Example 18 The non-transitory machine-readable medium of any of examples 15-17, wherein the multiplication is per row of the identified first source matrix operand and per column of the identified second source matrix operand.

Example 19 The non-transitory machine-readable medium of any of examples 15-18, wherein at least one of the operands is a plurality of registers configured to represent a matrix.

Example 20 The non-transitory machine-readable medium of any of examples 15-19, wherein the data elements are single precision floating point data elements.

Example 21 The non-transitory machine-readable medium of any of examples 15-19, wherein the data elements are half precision floating point data elements.

Example 22 A system comprising: a processor; and an accelerator coupled to the processor, the accelerator including: decode circuitry to decode an instruction having fields for an opcode, an identifier for a first source matrix operand, an identifier of a second source matrix operand, and an identifier for a source/destination matrix operand; and execution circuitry to execute the decoded instruction to multiply the identified first source matrix operand by the identified second source matrix operand, subtract a result of the multiplication to the identified source/destination matrix operand, and store a result of the subtraction in the identified source/destination matrix operand and zero unconfigured columns of identified source/destination matrix operand.

Example 23 The system of example 22, wherein the execution circuitry comprises a grid of mused multiply accumulators.

Example 24 The system of any of examples 22-23, wherein at least one of the operands is a plurality of registers configured to represent a matrix.

O. Tile Dot Product

Detailed herein are embodiments of matrix (tile) dot product ("TILEDOTPRODUCT") instructions and their execution. A TILEDOTPRODUCT instruction is an improvement to a computer itself as it provides for support to perform dot product operations involving two matrices (tiles) of data values with a single instruction. In particular, the execution of a TILEDOTPRODUCT instruction causes performance of dot product operations on elements from two source matrices (tiles) of data values and accumulation of the result into corresponding data element positions of a destination matrix (tile). The size of the data elements in the source matrices (tiles) varies depending on the instruction and tile support. Exemplary sizes of the data elements contained in the source matrices (tiles) include, but are not limited to, 4-bit, 8-bit, 16-bit, 32-bit, 64-bit, 128-bit, 256-bit, and so forth. In some embodiments, elements of rows and columns of the destination matrix (tile) that do not have corresponding elements in the source matrices (tiles) are zeroed.

i. Exemplary Execution

Figure 78:
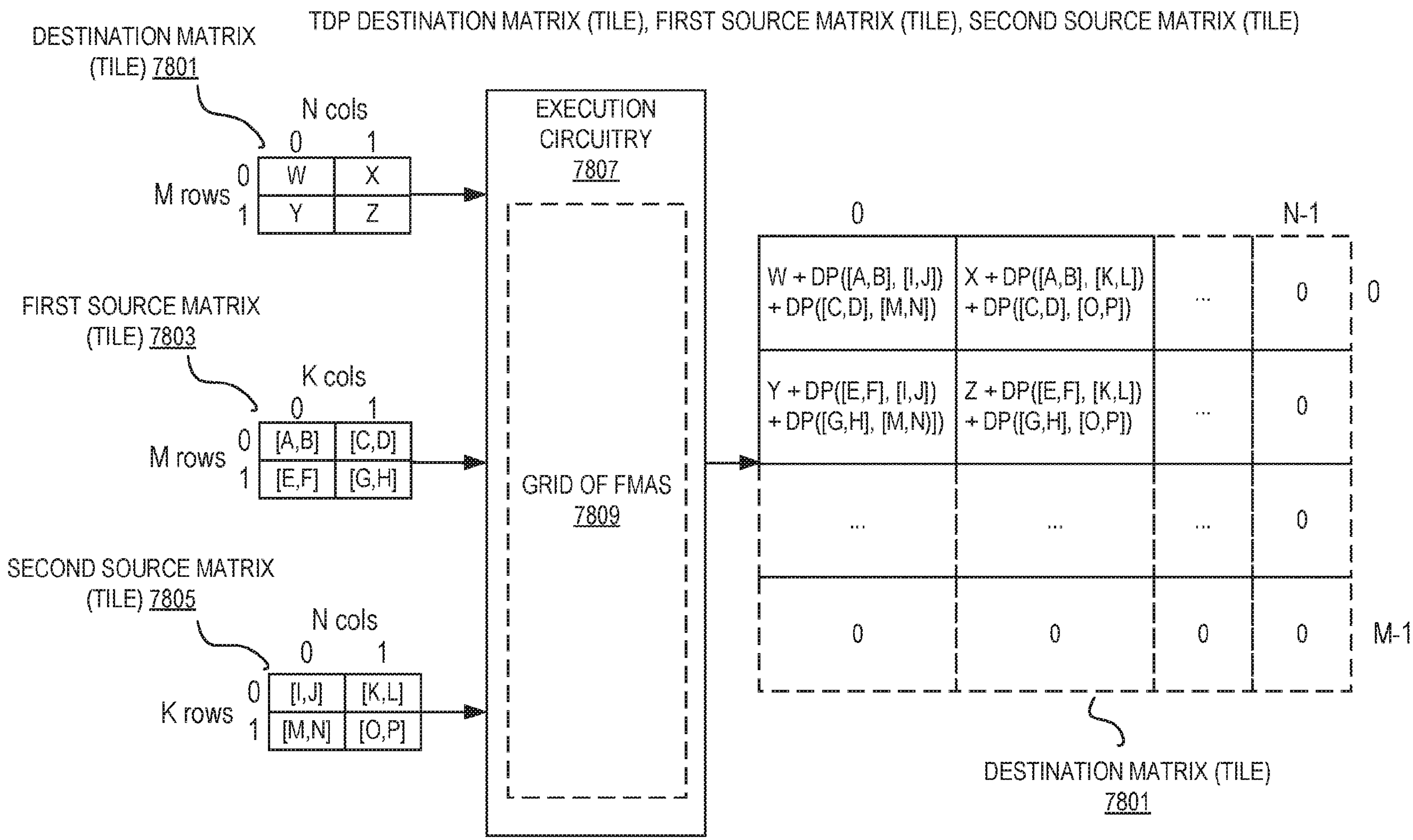
FIG. 78 illustrates an exemplary execution of a TILEDOTPRODUCT instruction.

FIG. 78 illustrates an exemplary execution of a TILEDOTPRODUCT instruction. The TILEDOTPRODUCT instruction format includes fields for an opcode (e.g., shown as "TDP" in the figure), a destination accumulator operand (e.g., shown as "DESTINATION MATRIX (TILE)" in the figure), and two source operands (e.g., shown as "FIRST SOURCE MATRIX (TILE)" and "SECOND SOURCE MATRIX (TILE)" in the figure). In an embodiment, the destination accumulator operand is used to accumulate the data resulting from performing dot product operations on elements of the first and second source matrix (tile) operands. An example destination matrix (tile) operand 7801 is shown in FIG. 78, initially storing a matrix of doubleword-sized data elements.

The two source matrix (tile) operand fields represent a first source matrix (tile) operand 7803 and a second source matrix (tile) operand 7805, respectively. As detailed earlier, a matrix (tile) may be stored in a collection of registers, locations in memory (for example, as strided rows), or in storage accessible to execution circuitry.

In FIG. 78, each of the destination matrix (tile) accumulator operand 7801, the first source matrix (tile) operand 7803, and the second source matrix (tile) operand 7805 comprises a 2×2 matrix of data elements. The dimensions of the matrices in FIG. 78 are used for illustrative purposes only; in general, a TILEDOTPRODUCT instruction can operate on any two source matrix (tile) operands where the number of columns associated with a first matrix (tile) operand is the same as the number of rows of a second matrix (tile) operand (that is, where the dimensions of a first matrix (tile) operand is M rows×K columns and the dimensions of a second matrix (tile) operand is K rows×N columns, as shown in FIG. 78). The destination matrix (tile) accumulator operand in this example has M rows×N columns such that the number of rows in the destination matrix (tile) is the same as the number of rows in the first matrix (tile) operand and the number of columns in the destination matrix (tile) is the same as the number of columns in the second matrix (tile) operand.

As shown, execution circuitry 7807 uses a grid of fused multiply adders (FMAs) 7809 to execute a decoded TILEDOTPRODUCT instruction by performing dot product operations on elements of the two source matrix (tile) operands 7803 and 7805 and accumulating the result into corresponding data element positions of the destination matrix (tile) accumulator operand 7801.

Referring to the example destination matrix (tile) accumulator operand 7801 and source matrix (tile) operands 7803 and 7805, the execution circuitry 7807 generates dot product values using the first row of the first source matrix (tile) operand 'TDP103 and the first column of the second source matrix (tile) operand 7805 and accumulates the result in the [0,0] data element position of the destination matrix (tile) operand 7801. In FIG. 78, for example, the [0,0] data element position of the destination matrix (tile) operand 'TDP101 accumulates the initially stored value W with dot product values computed using the first row of the first source matrix (tile) operand 7803 (the elements [A,B] and [C,D]) and the first column of the second source matrix (tile) operand 7805 (the elements [I,J] and [M,N]), that is, W+DP ([A,B], [I,J])+DP ([C,D], [M,N]).

The execution circuitry 7807 further computes dot product values using the first row of the first source matrix (tile) operand 7803 and the second column of the second source matrix (tile) operand 7805 and accumulates the result in the [0,1] data element position of the destination matrix (tile) operand 7801. The execution circuitry 7807 further generates dot product values using the second row of the first source matrix (tile) operand 7803 and the first column of the second matrix (tile) operand 7805 and accumulates the result in the [1,0] data element position of the destination matrix (tile) operand 7801. The execution circuitry 7807 further generates dot product values using the second row of the first source matrix (tile) operand 7803 and the second column of the second source matrix (tile) operand 7805 and accumulates the result in the [1,1] data element position of the destination matrix (tile) operand 7801.

ii. Exemplary Format(s)

One embodiment of a format for a TILEDOTPRODUCT instruction is TDPWSSDS TMM1, TMM2, TMM3. In some embodiments, TDPWSSDS is the opcode mnemonic of the instruction, where the "TDP" part of the mnemonic indicates a TILEDOTPRODUCT operation and the "WSSDS" part of the mnemonic indicates that the instruction computes the dot product of source matrix (tile) operands comprising signed word-sized elements and accumulates the result into a destination matrix (tile) comprising doubleword-sized elements with saturation. In this instruction format and the instruction formats below, TMM1 is a field for the destination matrix (tile) operand. TMM2 and TMM3 are fields for the matrix (tile) source operands. In some embodiments, the TMM3 field is a R/M value (such as 8246), the TMM1 field is REG 8244, and the data element size is found in 8265.

Another embodiment of a format for a TILEDOTPRODUCT instruction is TDPWSSQS TMM1, TMM2, TMM3. In some embodiments, TDPWSSQS is the opcode mnemonic of the instruction, where the "WSSQS" part of the mnemonic indicates that the instruction computes the dot product of source matrix (tile) operands comprising signed word-sized elements and accumulates the result into a destination matrix (tile) comprising quadword-sized elements with saturation.

Another embodiment of a format for a TILEDOTPRODUCT instruction is TDPB[SS/UU/US/SU]DS TMM1, TMM2, TMM3. In some embodiments, TDPB[SS/UU/US/SU]DS is the opcode mnemonic of the instruction, where the "B" and "D" parts of the mnemonic indicate that the instruction computes the dot product of source matrix (tile) operands comprising byte-sized elements and accumulates the result into a destination matrix (tile) accumulator operand comprising doubleword-sized elements with saturation.

In an embodiment, the [SS/UU/US/SU] part of the mnemonic in the instruction above, and similarly in the instructions below, indicates whether each of the two source matrix (tile) operands comprises signed or unsigned data values. The first letter of the [SS/UU/US/SU] mnemonic part corresponds to the first source matrix (tile) operand and the second letter corresponds to the second source matrix (tile) operand. For example, "SS" indicates that both source matrix (tile) operands are signed, "UU" indicates that both source matrix (tile) operands are unsigned, "US" indicates that the first source matrix (tile) operand is unsigned and the second source matrix (tile) operand is signed, and "SU" indicates that the first source matrix (tile) operand is signed and the second source matrix (tile) operand is unsigned. The destination matrix (tile) operand is signed if either of the first source matrix (tile) operand or second source matrix (tile) is signed; otherwise, the destination matrix (tile) is unsigned when both source matrix (tile) operands are unsigned. If either of the source matrix (tile) operands is signed, the result output saturation is signed saturation; otherwise, the result output saturation is unsigned saturation.

Another embodiment of a format for a TILEDOTPRODUCT instruction is TDP8B[SS/UU/US/SU]4BITDS TMM1, TMM2, TMM3. In some embodiments, TDP8B[SS/UU/US/SU]4BITDS is the opcode mnemonic of the instruction, where the "8B" and "4BITD" identifiers indicate that the instruction computes the dot product of doubleword source matrix (tile) operands, one operand containing byte-sized elements and the other operand containing 4-bit (nibble) sized elements and accumulates the result into a destination matrix (tile) comprising doubleword-sized elements.

Another embodiment of a format for a TILEDOTPRODUCT instruction is TDP4BIT[S,U][S,U]DS TMM1, TMM2, TMM3. In some embodiments, TDP4BIT[S,U][S,U]DS is the opcode mnemonic of the instruction, where the "4BIT" and "D" parts of the mnemonic indicate that the instruction computes the dot product of doubleword source matrix (tile) operands, each source matrix (tile) operand comprising 4-bit (nibble) sized elements and accumulates the result into a destination matrix (tile) comprising doubleword-sized elements.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. Exemplary Method(s) of Execution

Figure 79:
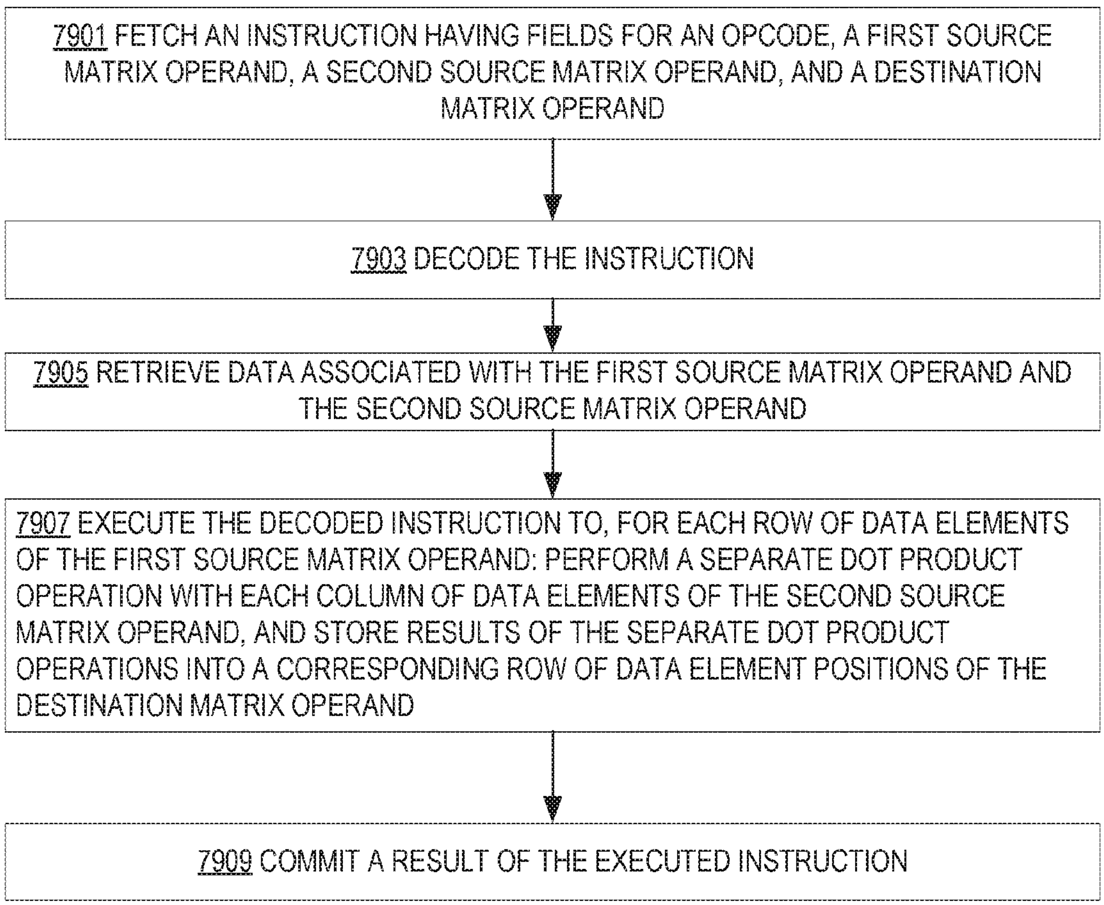
FIG. 79 illustrates an embodiment of method performed by a processor to process a matrix (tile) dot product instruction.

FIG. 79 illustrates an embodiment of method performed by a processor to process a matrix (tile) dot product instruction.

At 7901, an instruction is fetched. For example, a TILEDOTPRODUCT instruction is fetched. The TILEDOTPRODUCT instruction includes fields for an opcode, a first and a second source matrix (tile) operand, and a destination matrix (tile) operand. In some embodiments, the instruction further includes a field for a writemask. In some embodiments, the instruction is fetched from an instruction cache. The source operands and destination operand consist of packed data. The opcode of the TILEDOTPRODUCT instruction indicates that a dot product operation is to be performed on the source matrix (tile) operands. In some embodiments, the opcode further indicates whether each of the first source matrix (tile) operand and second source matrix (tile) operand consist signed or unsigned values. In some embodiments, the opcode further indicates a size (for example, a specified number of bits, bytes, quadwords, doublewords, and so forth) of the matrix (tile) data values comprising each of the first source matrix (tile) operand, the second source matrix (tile) operand, and the destination matrix (tile) operand.

The fetched instruction is decoded at 7903. For example, the fetched TILEDOTPRODUCT instruction is decoded by decode circuitry such as that detailed herein.

Data values associated with the source matrix (tile) operands of the decoded instruction are retrieved at 7905 and the decoded instruction is scheduled (as needed). For example, when one or more of the source matrix (tile) operands are memory operands, the data from the indicated memory location is retrieved.

At 7907, the decoded instruction is executed by execution circuitry (hardware) such as that detailed herein. For the TILEDOTPRODUCT instruction, the execution causes execution circuitry to perform a dot product operation on source data. In some embodiments, the execution of a decoded matrix dot product instruction causes an execution circuit to: compute a result by performing dot product operations on elements from the first source matrix and the second source matrix operand; and accumulate the result into elements of the destination matrix operand.

In some embodiments, a fault is generated when one or more of the following is true: a number of columns associated with the first source matrix operand is different than a number of rows associated with the second source matrix operand; a number of rows associated with the destination matrix (tile) operand is different than a number of rows associated with the first source matrix (tile) operand; and a number of columns associated with the destination matrix (tile) operand is different than a number of columns associated with the second source matrix (tile) operand.

In some embodiments, the instruction is committed or retired at 7909.

Figure 80:
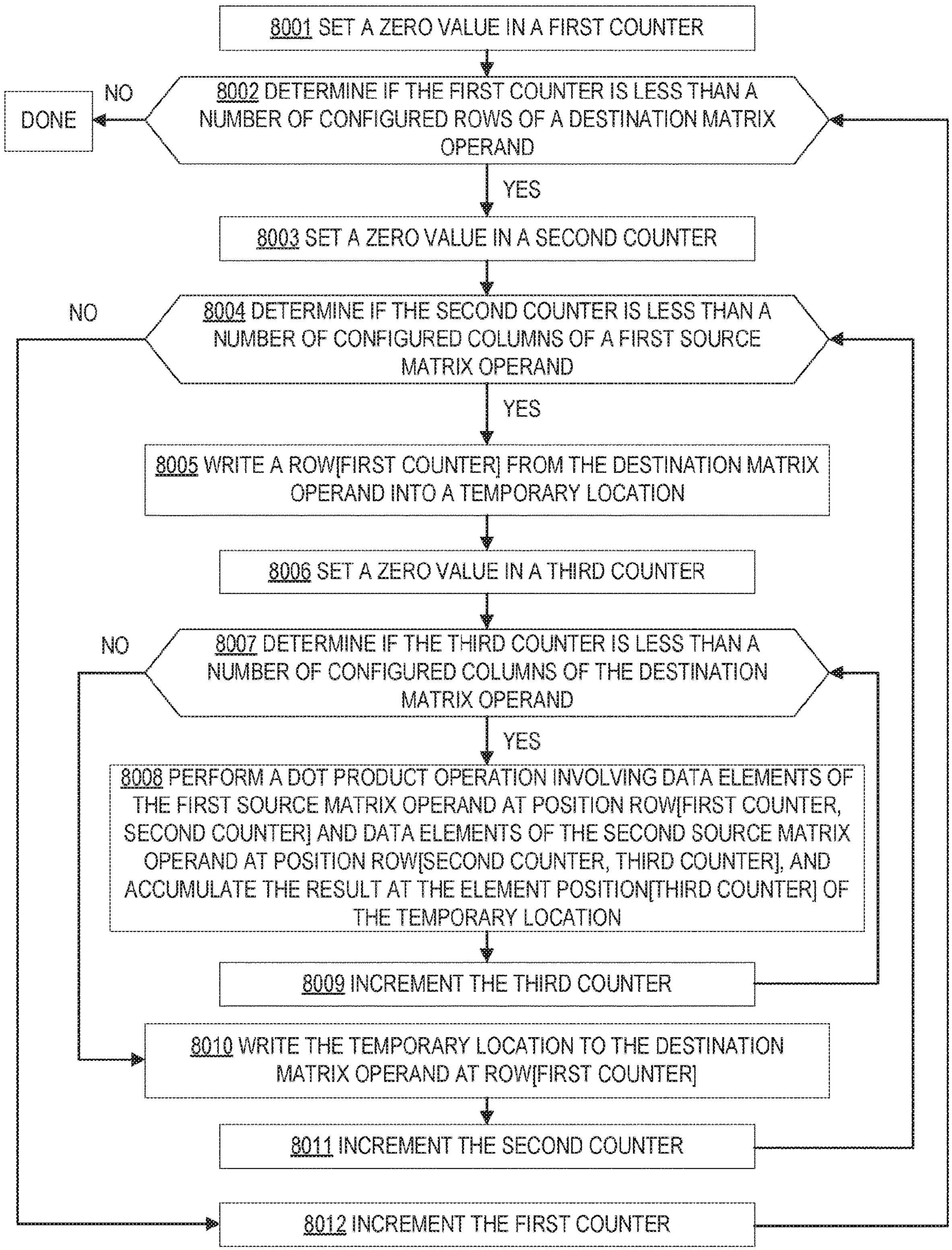
FIG. 80 illustrates additional details related to an example method performed by a processor to execute a TILEDOTPRODUCT instruction.

FIG. 80 illustrates additional detailed related to an example method performed by a processor to execute a TILEDOTPRODUCT instruction, where the instruction has fields for a first source matrix (tile) operand, a second source matrix (tile) operand, and a destination matrix (tile) accumulator operand.

At 8001, execution circuitry sets a first counter with the value zero. At 8002, it is determined whether the first counter is less than a number of configured rows of the destination matrix (tile) operand. If the first counter is not less than the number of configured rows of the destination matrix (tile) operand, the process ends.

At 8003, if the first counter is less than the number of configured rows of the destination matrix (tile) operand, a second counter is set with the value zero. At 8004, it is determined whether the second counter is less than a number of configured columns of a first source matrix (tile) operand. If not, the first counter is incremented at 8012 and the process returns to 8002.

At 8005, if the second counter is less than a number of configured columns of the first source matrix (tile) operand, a row from the destination matrix (tile) operand identified by the first counter is written to a temporary location. For example, if the first counter is currently set to zero, then row[first counter] identifies the first row of the destination matrix (tile) operand. Similarly, if the first counter is currently set to one, then row[first counter] identifies the second row of the destination matrix (tile) accumulator operand, and so forth. At 8006, a third counter is set with the value zero.

At 8007, it is determined whether the third counter is less than a number of configured columns of the destination matrix operand. If the third counter is not less than the number of configured columns of the destination matrix (tile) accumulator operand, at 8010, the data values stored at the temporary location are written to a row of the destination matrix (tile) operand identified by the first counter (that is, the row[first counter] of the destination matrix(tile) operand). At 8011, the second counter is incremented and the process returns to 8004.

If the third counter is less than the number of configured columns of the destination matrix (tile) accumulator operand, at 8008, the execution circuitry performs a dot product operation involving data elements of the first source matrix (tile) operand at position row[first counter, second counter] and data elements of the second source matrix (tile) operand at position row[second counter, third counter] and accumulates the result at the element position[third counter] of the temporary location. In reference to FIG. 78, and assuming each of the first counter, the second counter, and the third counter is currently set to zero, a dot product operation is performed at 8008 involving the data elements of the first source matrix (tile) operand 7802 at position row[0,0] (the element values [A,B]) and data elements of the second source matrix (tile) operand 7803 at position row[0,0] (the element values [I,J]) and accumulates the result at the element position[0] of the temporary location (currently storing the value W from the row[0,0] of the destination matrix (tile) accumulator operand 7801).

At 8009, the third counter is incremented and the process returns to 8007. The result of the process described in FIG. 80 is the performance of dot product operations on elements from the first source matrix (tile) operand and the second source matrix (tile) operand and the accumulation of the results into elements of the destination matrix (tile) accumulator operand, as illustrated in the destination matrix (tile) operand 7801 of FIG. 78.

FIGS. 81A-81G illustrate example methods for performing TILEDOTPRODUCT operations, as described above. For example, the steps shown in 8101 and 8103 illustrate an example process for performing a TILEDOTPRODUCT operation involving source matrices of signed word-sized elements accumulated into doubleword-sized elements with saturation (for example, based on an instruction of the example format TDPWSSDS TMM1, TMM2, TMM3). In particular, 8101 illustrates an example helper process DPWSS(c, x, y) used to perform a multiply and add operation on doubleword arguments. As shown in the accompanying process 8103, the multiply and add operation illustrated in 8101 is used as part of the dot product calculations performed on the rows and columns of the source matrix (tile) operands.

The steps of 8103 indicate that a fault is generated if any of the following is true: the matrix (tile) architecture is not currently configured; the number of columns in the first source matrix (tile) is different than the number of rows in the second source matrix (tile); the number of rows in the destination matrix (tile) is different than the number of rows in the first source matrix (tile); the number of columns in the destination matrix (tile) is different than the number of columns in the second source matrix (tile); or the number of rows or the number of columns in the second source matrix (tile) exceeds a configured limit.

The process of 8103 further proceeds to iterate through the rows and columns of the destination matrix (tile) and source matrices (tiles). In particular, the example process computes a result by performing dot product operations on elements from a first source matrix (tile) operand ("tsrc1") and a second source matrix (tile) operand ("tsrc2") and accumulates the result into elements of the destination matrix (tile) accumulator operand ("tsrcdest").

The example processes shown in FIGS. 81B-81G illustrate processes performed to implement other example TILEDOTPRODUCT instruction formats. For example, the processes shown in 8105 and 8107 in FIGS. 81B-81C illustrate an example a helper function DPWSSQ(c, x, y) performing a multiply and add operation on quadword arguments. The example shown in 8107 illustrates a process for performing a TILEDOTPRODUCT operation involving matrices of signed word-sized elements accumulated into doubleword-sized elements (for example, based on an instruction in the format TDPWSSQS TMM1, TMM2, TMM3, as described above).

The processes shown in 8109 in FIG. 81D illustrates an example a helper function DPBD(c, x, y) used to perform a multiply and add operation on doubleword arguments. The example shown in 8111 illustrates a process for performing a TILEDOTPRODUCT operation involving matrices of byte-sized elements accumulated into doubleword-sized elements (for example, based on an instruction in the format TDPB[SS,UU,US,SU]DS TMM1, TMM2, TMM3, as described above).

The processes shown in 8113 in FIGS. 81E-81F illustrates a process for performing a TILEDOTPRODUCT operation involving doubleword source matrix (tile) operands, where one operand contains byte-sized elements and the other operand contains 4-bit (nibble) sized elements and the result is accumulated into a destination matrix (tile) comprising doubleword-sized elements (for example, based on an instruction in the format TDP8B[SS,UU,US,SU]4BITDS TMM1, TMM2, TMM3, as described above).

The processes shown in 8115 in FIG. 81G illustrates a process for performing a TILEDOTPRODUCT operation involving doubleword source matrix (tile) operands, where each operand contains 4-bit (nibble) sized elements and the result is accumulated into a destination matrix (tile) comprising doubleword-sized elements (for example, based on an instruction in the format TDP4BIT[SS,UU,US,SU]DS TMM1, TMM2, TMM3, as described above).

iv. Examples

Example 1 A processor comprising: decode circuitry to decode an instruction having fields for a first source matrix operand, a second source matrix operand, and a destination matrix operand; and execution circuitry to execute the decoded instruction to: compute a result by performing dot product operations on elements from the first source matrix operand and the second source matrix operand, and accumulate the result into data element positions of the destination matrix operand.

Example 2 The processor of Example 1, wherein the elements of the first source matrix operand and the second source matrix operand are signed word elements, and wherein the elements of the destination matrix operand are signed doublewords.

Example 3 The processor of Example 1, wherein the elements of the first source matrix operand and the second source matrix operand are signed word-sized elements, and wherein the elements of the destination matrix operand are signed quadword-sized elements.

Example 4 The processor of Example 1, wherein the elements of the first source matrix operand and the second source matrix operand are byte-sized elements, and wherein the elements of the destination matrix operand are doubleword-sized elements.

Example 5 The processor of Example 1, wherein the elements of the first source matrix operand are byte-sized elements and the elements of the second source matrix operand are 4-bit-sized elements, and wherein the elements of the destination matrix are doubleword-sized elements.

Example 6 The processor of Example 1, wherein the elements of the first source matrix operand and the elements of the second source matrix operand are 4-bit-sized elements, and wherein the elements of the destination matrix are doubleword-sized elements.

Example 7 The processor of any of Examples 1-6, wherein the result is computed with saturation.

Example 8 The processor of any of Examples 1-7, wherein the execution circuitry comprises a plurality of fused-multiply adders.

Example 9 The processor of any of Examples 1-8, wherein the instruction indicates that least one of the first source matrix operand the second source matrix operand contains unsigned data values.

Example 10 The processor of any of Examples 1-9, wherein a fault is generated when the first source matrix operand has a number of columns that is different number than a number of rows the second source matrix operand.

Example 11 The processor of any of Examples 1-10, wherein a fault is generated when a number of rows of the destination matrix operand is different than a number of rows of the first source matrix operand.

Example 12 The processor of any of Examples 1-11, wherein a fault is generated when a number of columns of the destination matrix operand is different than a number of columns of the second source matrix operand.

Example 13 A method comprising: decoding an instruction having fields for a first source matrix operand, a second source matrix operand, and a destination matrix operand; and executing the decoded instruction to: compute a result by performing dot product operations on elements from the first source matrix operand and the second source matrix operand, and accumulate the result into data element positions of the destination matrix operand.

Example 14 The method of Example 13, wherein the elements of the first source matrix operand and the second source matrix operand are signed word elements, and wherein the elements of the destination matrix operand are signed doublewords.

Example 15 The method of Example 13, wherein the elements of the first source matrix operand and the second source matrix operand are signed word-sized elements, and wherein the elements of the destination matrix operand are signed quadword-sized elements.

Example 16 The method of Example 13, wherein the elements of the first source matrix operand and the second source matrix operand are byte-sized elements, and wherein the elements of the destination matrix operand are doubleword-sized elements.

Example 17 The method of Example 13, wherein the elements of the first source matrix operand are byte-sized elements and the elements of the second source matrix operand are 4-bit-sized elements, and wherein the elements of the destination matrix are doubleword-sized elements.

Example 18 The method of Example 13, wherein the elements of the first source matrix operand and the elements of the second source matrix operand are 4-bit-sized elements, and wherein the elements of the destination matrix are doubleword-sized elements.

Example 19 The method of any of Examples 13-18, wherein the result is computed with saturation.

Example 20 The method of any of Examples 13-19, wherein the execution circuitry comprises a plurality of fused-multiply adders.

Example 21 The method of any of Examples 13-20, wherein the instruction indicates that least one of the first source matrix operand the second source matrix operand contains unsigned data values.

Example 22 The method of any of Examples 13-21, wherein a fault is generated when the first source matrix operand has a number of columns that is different number than a number of rows the second source matrix operand.

Example 23 The method of any of Examples 13-22, wherein a fault is generated when a number of rows of the destination matrix operand is different than a number of rows of the first source matrix operand.

Example 24 The method of any of Examples 13-23, wherein a fault is generated when a number of columns of the destination matrix operand is different than a number of columns of the second source matrix operand.

Example 25 provides a non-transitory machine-readable medium storing an instruction which when executed by a processor causes the processor to perform a method, the method comprising: decoding an instruction having fields for a first and a second packed data source operand, and a packed data destination operand; and executing the decoded instruction to: compute a result by performing dot product operations on elements from the first source matrix operand and the second source matrix operand, and accumulate the result into data element positions of the destination matrix operand.

Example 26 The non-transitory machine-readable medium of Example 25, wherein the elements of the first source matrix operand and the second source matrix operand are signed word elements, and wherein the elements of the destination matrix operand are signed doublewords.

Example 27 The non-transitory machine-readable medium of Example 25, wherein the elements of the first source matrix operand and the second source matrix operand are signed word-sized elements, and wherein the elements of the destination matrix operand are signed quadword-sized elements.

Example 28 The non-transitory machine-readable medium of Example 25, wherein the elements of the first source matrix operand and the second source matrix operand are byte-sized elements, and wherein the elements of the destination matrix operand are doubleword-sized elements.

Example 29 The non-transitory machine-readable medium of Example 25, wherein the elements of the first source matrix operand are byte-sized elements and the elements of the second source matrix operand are 4-bit-sized elements, and wherein the elements of the destination matrix are doubleword-sized elements.

Example 30 The non-transitory machine-readable medium of Example 25, wherein the elements of the first source matrix operand and the elements of the second source matrix operand are 4-bit-sized elements, and wherein the elements of the destination matrix are doubleword-sized elements.

Example 31 The non-transitory machine-readable medium of any of Examples 25-30, wherein the result is computed with saturation.

Example 32 The non-transitory machine-readable medium of any of Examples 25-31, wherein the execution circuitry comprises a plurality of fused-multiply adders.

Example 33 The non-transitory machine-readable medium of any of Examples 25-32, wherein the instruction indicates that least one of the first source matrix operand the second source matrix operand contains unsigned data values.

Example 34 The non-transitory machine-readable medium of any of Examples 25-33, wherein a fault is generated when the first source matrix operand has a number of columns that is different number than a number of rows the second source matrix operand.

Example 35 The non-transitory machine-readable medium of any of Examples 25-34, wherein a fault is generated when a number of rows of the destination matrix operand is different than a number of rows of the first source matrix operand.

Example 36 The non-transitory machine-readable medium of any of Examples 25-35, wherein a fault is generated when a number of columns of the destination matrix operand is different than a number of columns of the second source matrix operand.

Example 37 provides a system comprising: a processor; and an accelerator coupled to the processor, the accelerator including: decode circuitry to decode an instruction having fields for a first source matrix operand, a second source matrix operand, and a destination matrix operand; and execution circuitry to execute the decoded instruction to: compute a result by performing dot product operations on elements from the first source matrix operand and the second source matrix operand, and accumulate the result into data element positions of the destination matrix operand.

Example 38 The system of Example 37, wherein the elements of the first source matrix operand and the second source matrix operand are signed word elements, and wherein the elements of the destination matrix operand are signed doublewords.

Example 39 The system of Example 37, wherein the elements of the first source matrix operand and the second source matrix operand are signed word-sized elements, and wherein the elements of the destination matrix operand are signed quadword-sized elements.

Example 40 The system of Example 37, wherein the elements of the first source matrix operand and the second source matrix operand are byte-sized elements, and wherein the elements of the destination matrix operand are doubleword-sized elements.

Example 41 The system of Example 37, wherein the elements of the first source matrix operand are byte-sized elements and the elements of the second source matrix operand are 4-bit-sized elements, and wherein the elements of the destination matrix are doubleword-sized elements.

Example 42 The system of Example 37, wherein the elements of the first source matrix operand and the elements of the second source matrix operand are 4-bit-sized elements, and wherein the elements of the destination matrix are doubleword-sized elements.

Example 43 The system of any of Examples 37-42, wherein the result is computed with saturation.

Example 44 The system of any of Examples 37-43, wherein the execution circuitry comprises a plurality of fused-multiply adders.

Example 45 The system of any of Examples 37-44, wherein the instruction indicates that least one of the first source matrix operand the second source matrix operand contains unsigned data values.

Example 46 The system of any of Examples 37-45, wherein a fault is generated when the first source matrix operand has a number of columns that is different number than a number of rows the second source matrix operand.

Example 47 The system of any of Examples 37-46, wherein a fault is generated when a number of rows of the destination matrix operand is different than a number of rows of the first source matrix operand.

Example 48 The system of any of Examples 37-47, wherein a fault is generated when a number of columns of the destination matrix operand is different than a number of columns of the second source matrix operand.

V. Detailed Exemplary Systems, Processors, and Emulation

Detailed herein are examples of hardware, software, etc. to execute the above described instructions. For example, what is described below details aspects of instruction execution including various pipeline stages such as fetch, decode, schedule, execute, retire, etc.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

A. Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

Figures 82A, 82B, 82C:
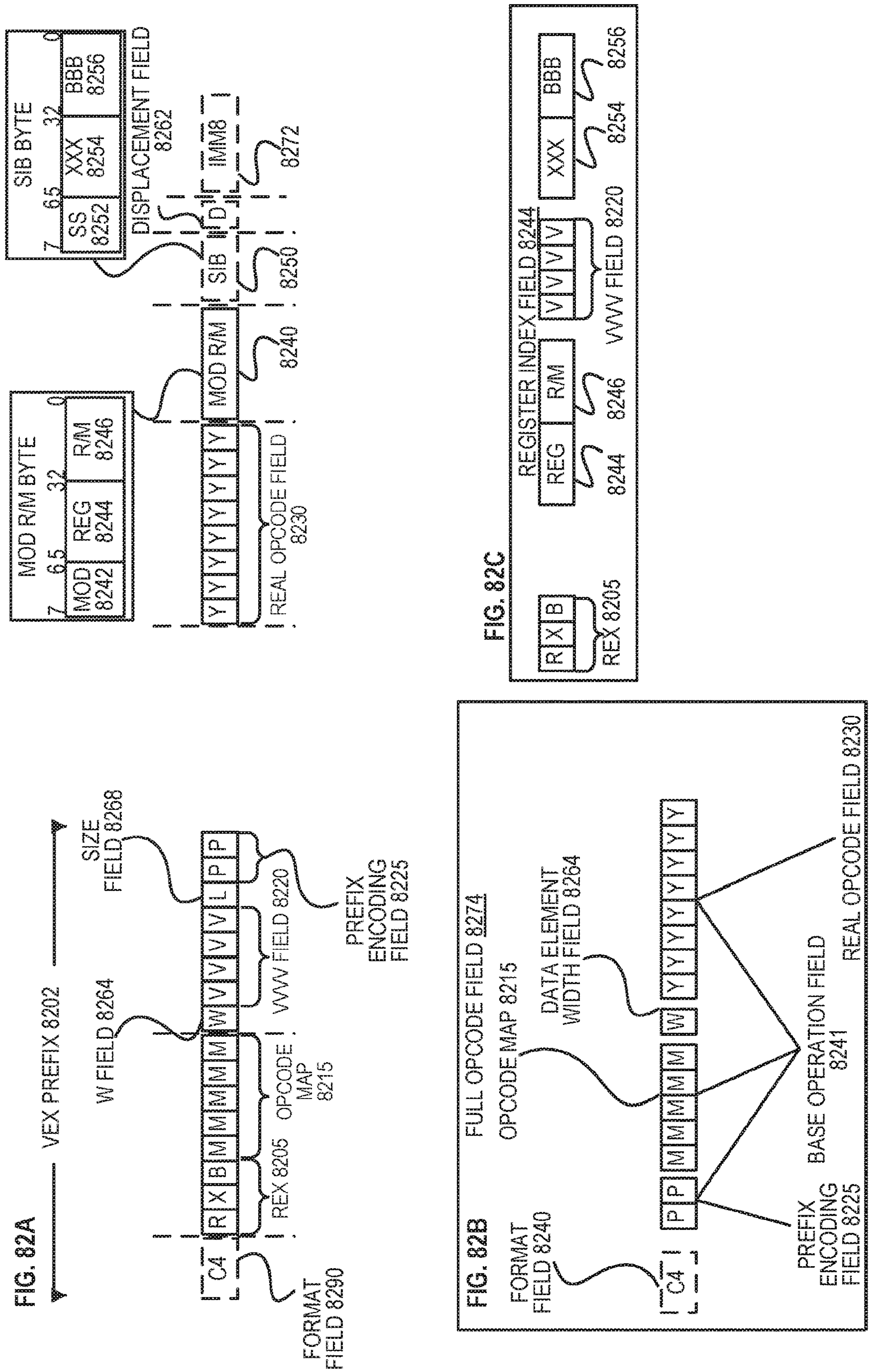
FIGS. 82(A)-(C) illustrate an exemplary instruction format.

FIG. 82A illustrates an exemplary instruction format including a VEX prefix 8202, real opcode field 8230, Mod R/M byte 8240, SIB byte 8250, displacement field 8262, and IMM8 8272. FIG. 82B illustrates which fields from FIG. 82A make up a full opcode field 8274 and a base operation field 8241. FIG. 82C illustrates which fields from FIG. 82A make up a register index field 8244.

VEX Prefix (Bytes 0-2) 8202 is encoded in a three-byte form. The first byte is the Format Field 8290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 8205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 8215 (VEX byte 1, bits [4:0]-mmmmm) includes content to encode an implied leading opcode byte. W Field 8264 (VEX byte 2, bit [7]-W)—is represented by the notation VEX.W, and provides different functions depending on the instruction. The role of VEX.vvvv 8220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 8268 Size field (VEX byte 2, bit [2]-L)=0, it indicates 128 bit vector; if VEX.L=1, it indicates 256 bit vector. Prefix encoding field 8225 (VEX byte 2, bits [1:0]-pp) provides additional bits for the base operation field 8241.

Real Opcode Field 8230 (Byte 3) is also known as the opcode byte. Part of the opcode is specified in this field.

MOD R/M Field 8240 (Byte 4) includes MOD field 8242 (bits [7-6]), Reg field 8244 (bits [5-3]), and R/M field 8246 (bits [2-0]). The role of Reg field 8244 may include the following: encoding either the destination register operand or a source register operand (the rrr of Rrrr), or be treated as an opcode extension and not used to encode any instruction operand. The role of R/M field 8246 may include the following: encoding the instruction operand that references a memory address, or encoding either the destination register operand or a source register operand.

Scale, Index, Base (SIB)—The content of Scale field 8250 (Byte 5) includes SS8252 (bits [7-6]), which is used for memory address generation. The contents of SIB.xxx 8254 (bits [5-3]) and SIB.bbb 8256 (bits [2-0]) have been previously referred to with regard to the register indexes Xxxx and Bbbb.

The Displacement Field 8262 and the immediate field (IMM8) 8272 contain data.

B. Exemplary Register Architecture

Figure 83:
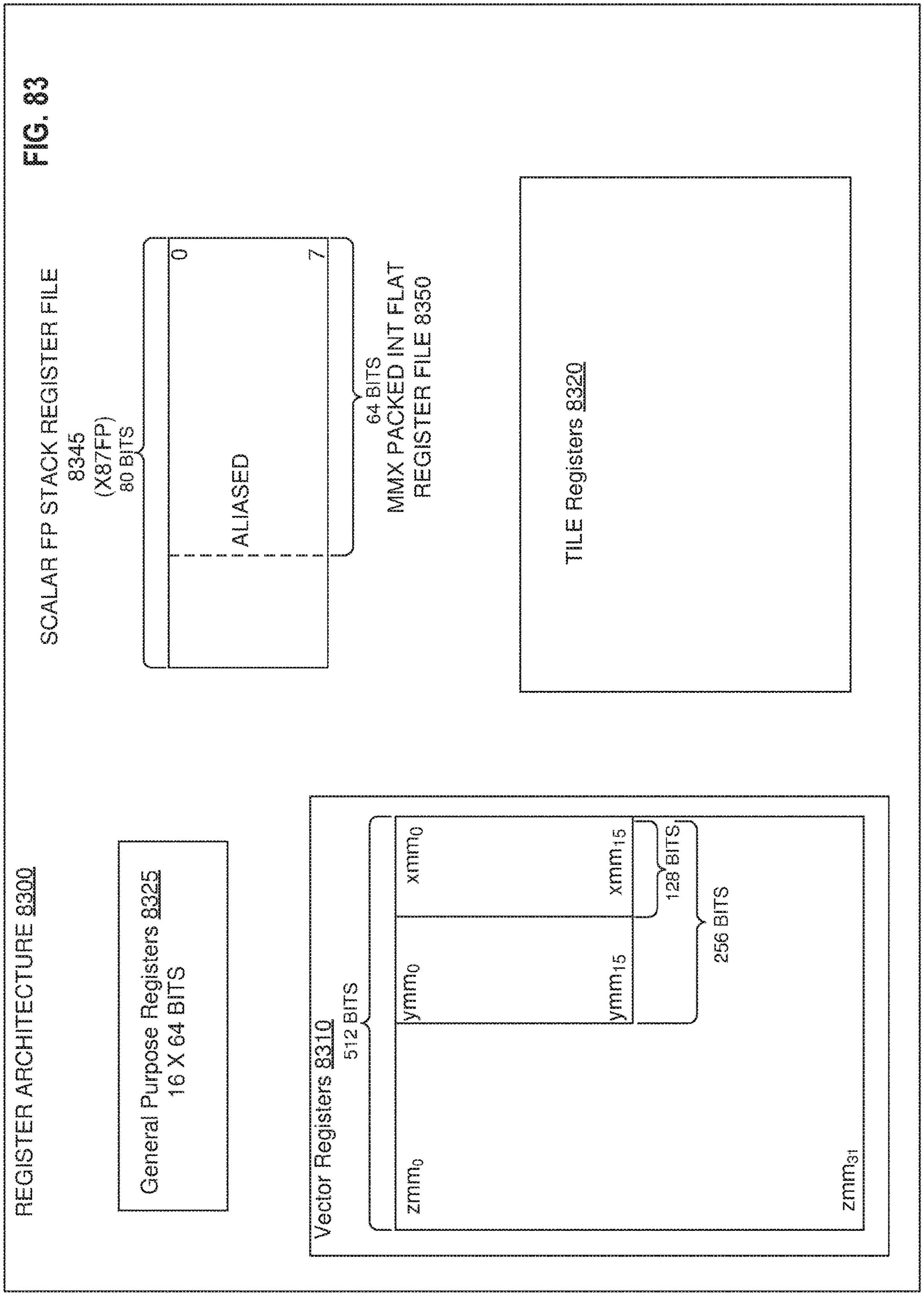
FIG. 83 is a block diagram of a register architecture according to one embodiment of the invention.

FIG. 83 is a block diagram of a register architecture 8300 according to one embodiment of the invention. In the embodiment illustrated, there are 32 vector registers 8310 that are 512 bits wide; these registers are referenced as zmm0 through zmm31. The lower order 256 bits of the lower 86 zmm registers are overlaid on registers ymm0-15. The lower order 128 bits of the lower 86 zmm registers (the lower order 128 bits of the ymm registers) are overlaid on registers xmm0-15.

General-purpose registers 8325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 8345, on which is aliased the MMX packed integer flat register file 8350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

In some embodiments, tiles 8320 are supported using an overlay over physical registers. For example, a tile may utilize 16 1,024-bit registers, 32 512-bit registers, etc. depending on the implementation.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

C. Exemplary Core Architectures

In-Order and Out-of-Order Core Block Diagram

Figure 84A:
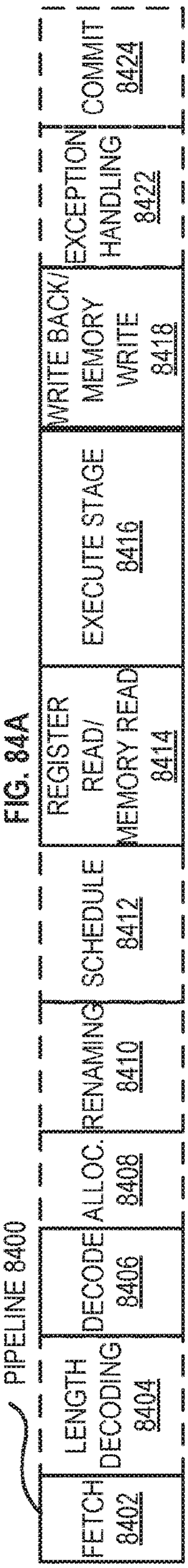
FIGS. 84(A)-(B) illustrate the in-order pipeline and in-order core.
Figure 84B:
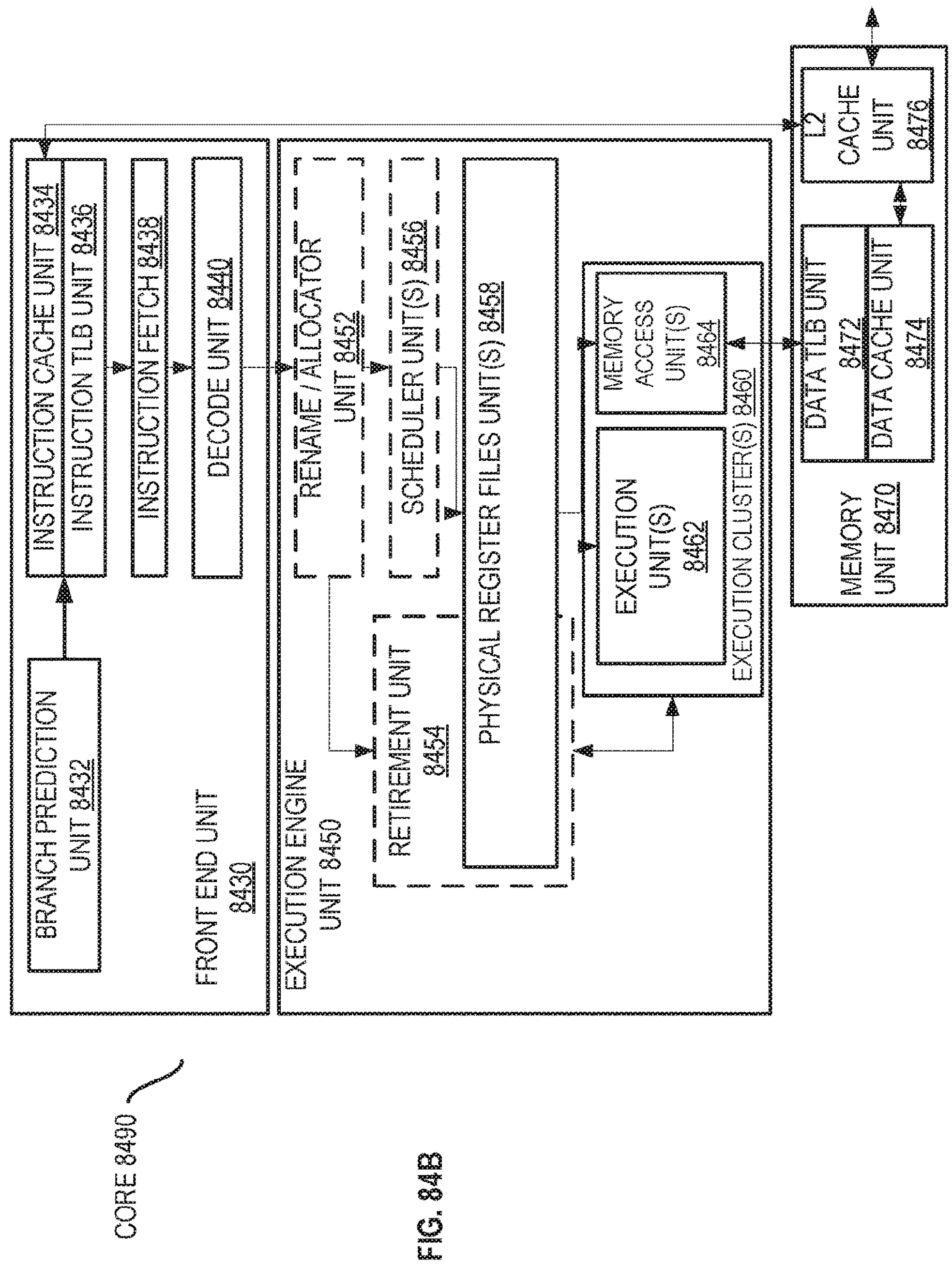

FIG. 84A is a block diagram illustrating both an exemplary in-order pipeline and an exemplary register renaming, out-of-order issue/execution pipeline according to embodiments of the invention. FIG. 84B is a block diagram illustrating both an exemplary embodiment of an in-order architecture core and an exemplary register renaming, out-of-order issue/execution architecture core to be included in a processor according to embodiments of the invention. The solid lined boxes in FIGS. 84A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 84A, a processor pipeline 8400 includes a fetch stage 8402, a length decode stage 8404, a decode stage 8406, an allocation stage 8408, a renaming stage 8410, a scheduling (also known as a dispatch or issue) stage 8412, a register read/memory read stage 8414, an execute stage 8416, a write back/memory write stage 8418, an exception handling stage 8422, and a commit stage 8424.

FIG. 84B shows processor core 8490 including a front end unit 8430 coupled to an execution engine unit 8450, and both are coupled to a memory unit 8470. The core 8490 may be a reduced instruction set computing (RISC) core, a complex instruction set computing (CISC) core, a very long instruction word (VLIW) core, or a hybrid or alternative core type. As yet another option, the core 8490 may be a special-purpose core, such as, for example, a network or communication core, compression engine, coprocessor core, general purpose computing graphics processing unit (GPGPU) core, graphics core, or the like.

The front end unit 8430 includes a branch prediction unit 8432 coupled to an instruction cache unit 8434, which is coupled to an instruction translation lookaside buffer (TLB) 8436, which is coupled to an instruction fetch unit 8438, which is coupled to a decode unit 8440. The decode unit 8440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 8440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 8490 includes a microcode ROM or other medium that stores microcode for certain macroinstructions (e.g., in decode unit 8440 or otherwise within the front end unit 8430). The decode unit 8440 is coupled to a rename/allocator unit 8452 in the execution engine unit 8450.

The execution engine unit 8450 includes the rename/allocator unit 8452 coupled to a retirement unit 8454 and a set of one or more scheduler unit(s) 8456. The scheduler unit(s) 8456 represents any number of different schedulers, including reservations stations, central instruction window, etc. The scheduler unit(s) 8456 is coupled to the physical register file(s) unit(s) 8458. Each of the physical register file(s) units 8458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 8458 comprises a vector registers unit and a scalar registers unit. These register units may provide architectural vector registers, vector mask registers, and general purpose registers. The physical register file(s) unit(s) 8458 is overlapped by the retirement unit 8454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 8454 and the physical register file(s) unit(s) 8458 are coupled to the execution cluster(s) 8460. The execution cluster(s) 8460 includes a set of one or more execution units 8462 and a set of one or more memory access units 8464. The execution units 8462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 8456, physical register file(s) unit(s) 8458, and execution cluster(s) 8460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 8464). It should also be understood that where separate pipelines are used, one or more of these pipelines may be out-of-order issue/execution and the rest in-order.

The set of memory access units 8464 is coupled to the memory unit 8470, which includes a data TLB unit 8472 coupled to a data cache unit 8474 coupled to a level 2 (L2)

cache unit 8476. In one exemplary embodiment, the memory access units 8464 may include a load unit, a store address unit, and a store data unit, each of which is coupled to the data TLB unit 8472 in the memory unit 8470. The instruction cache unit 8434 is further coupled to a level 2 (L2) cache unit 8476 in the memory unit 8470. The L2 cache unit 8476 is coupled to one or more other levels of cache and eventually to a main memory.

By way of example, the exemplary register renaming, out-of-order issue/execution core architecture may implement the pipeline 8400 as follows: 1) the instruction fetch 8438 performs the fetch and length decoding stages 8402 and 8404; 2) the decode unit 8440 performs the decode stage 8406; 3) the rename/allocator unit 8452 performs the allocation stage 8408 and renaming stage 8410; 4) the scheduler unit(s) 8456 performs the schedule stage 8412; 5) the physical register file(s) unit(s) 8458 and the memory unit 8470 perform the register read/memory read stage 8414; the execution cluster 8460 perform the execute stage 8416; 6) the memory unit 8470 and the physical register file(s) unit(s) 8458 perform the write back/memory write stage 8418; 7) various units may be involved in the exception handling stage 8422; and 8) the retirement unit 8454 and the physical register file(s) unit(s) 8458 perform the commit stage 8424.

The core 8490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 8490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 8434/8474 and a shared L2 cache unit 8476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 85B:
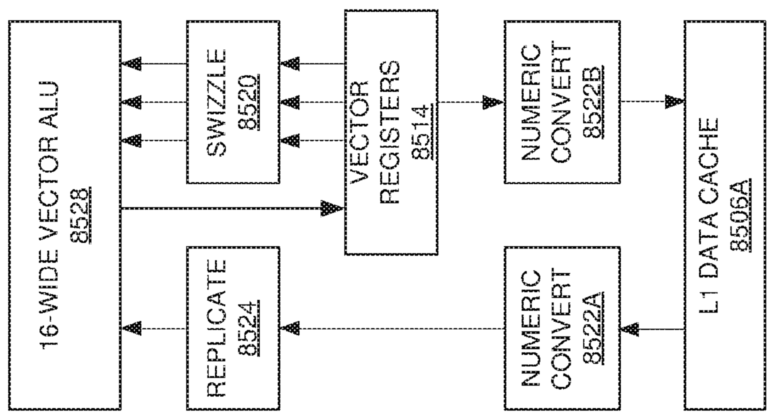
FIGS. 85(A)-(B) illustrate a block diagram of a more specific exemplary in-order core architecture, which core would be one of several logic blocks (including other cores of the same type and/or different types) in a chip.
Figure 85A:
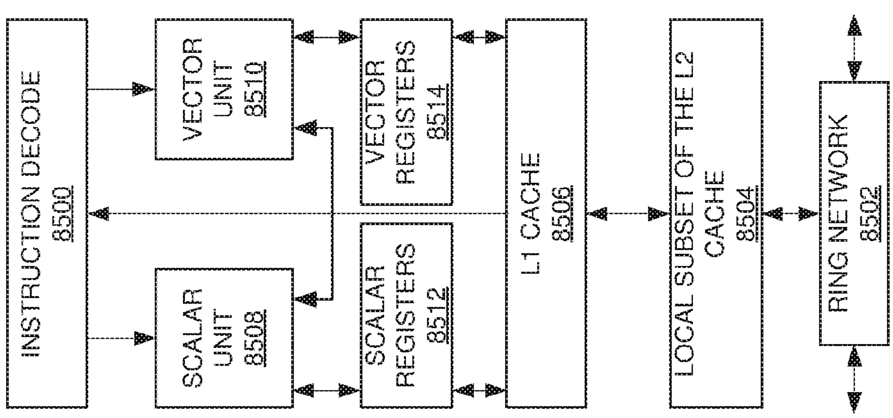

FIGS. 85A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 85A is a block diagram of a single processor core, along with its connection to the on-die interconnect network 8502 and with its local subset of the Level 2 (L2) cache 8504, according to embodiments of the invention. In one embodiment, an instruction decoder 8500 supports the x86 instruction set with a packed data instruction set extension. An L1 cache 8506 allows low-latency accesses to cache memory into the scalar and vector units. While in one embodiment (to simplify the design), a scalar unit 8508 and a vector unit 8510 use separate register sets (respectively, scalar registers 8512 and vector registers 8514) and data transferred between them is written to memory and then read back in from a level 1 (L1) cache 8506, alternative embodiments of the invention may use a different approach (e.g., use a single register set or include a communication path that allow data to be transferred between the two register files without being written and read back).

The local subset of the L2 cache 8504 is part of a global L2 cache that is divided into separate local subsets, one per processor core. Each processor core has a direct access path to its own local subset of the L2 cache 8504. Data read by a processor core is stored in its L2 cache subset 8504 and can be accessed quickly, in parallel with other processor cores accessing their own local L2 cache subsets. Data written by a processor core is stored in its own L2 cache subset 8504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 85B is an expanded view of part of the processor core in FIG. 85A according to embodiments of the invention. FIG. 85B includes an L1 data cache 8506A part of the L1 cache 8504, as well as more detail regarding the vector unit 8510 and the vector registers 8514. Specifically, the vector unit 8510 is a 86-wide vector processing unit (VPU) (see the 16-wide ALU 8528), which executes one or more of integer, single-precision float, and double-precision float instructions. The VPU supports swizzling the register inputs with swizzle unit 8520, numeric conversion with numeric convert units 8522A-B, and replication with replication unit 8524 on the memory input.

Processor with integrated memory controller and graphics

Figure 86:
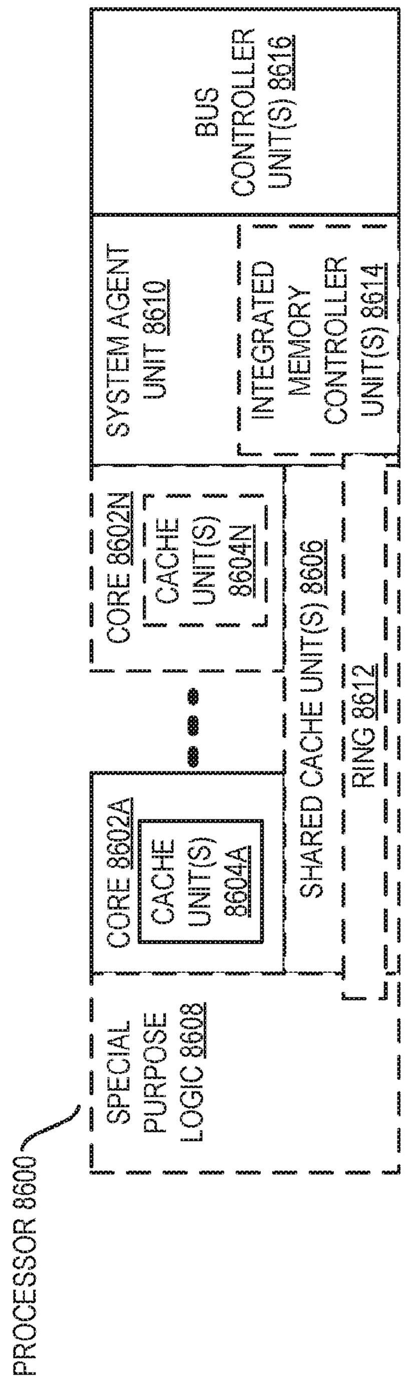
FIG. 86 is a block diagram of a processor 8600 that may have more than one core, may have an integrated memory controller, and may have integrated graphics according to embodiments of the invention.

FIG. 86 is a block diagram of a processor 8600 that may have more than one core, may have an integrated memory controller, and may have integrated graphics according to embodiments of the invention. The solid lined boxes in FIG. 86 illustrate a processor 8600 with a single core 8602A, a system agent 8610, a set of one or more bus controller units 8616, while the optional addition of the dashed lined boxes illustrates an alternative processor 8600 with multiple cores 8602A-N, a set of one or more integrated memory controller unit(s) 8614 in the system agent unit 8610, and special purpose logic 8608.

Thus, different implementations of the processor 8600 may include: 1) a CPU with the special purpose logic 8608 being integrated graphics and/or scientific (throughput) logic (which may include one or more cores), and the cores 8602A-N being one or more general purpose cores (e.g., general purpose in-order cores, general purpose out-of-order cores, a combination of the two); 2) a coprocessor with the cores 8602A-N being a large number of special purpose cores intended primarily for graphics and/or scientific (throughput); and 3) a coprocessor with the cores 8602A-N being a large number of general purpose in-order cores. Thus, the processor 8600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 8600 may be a part of and/or may be implemented on one or more substrates using any of a number of process technologies, such as, for example, BiCMOS, CMOS, or NMOS.

The memory hierarchy includes one or more levels of cache within the cores 8604A-N, a set or one or more shared cache units 8606, and external memory (not shown) coupled to the set of integrated memory controller units 8614. The set of shared cache units 8606 may include one or more mid-level caches, such as level 2 (L2), level 3 (L3), level 4 (L4), or other levels of cache, a last level cache (LLC), and/or combinations thereof. While in one embodiment a ring based interconnect unit 8612 interconnects the integrated graphics logic 8608, the set of shared cache units 8606, and the system agent unit 8610/integrated memory controller unit(s) 8614, alternative embodiments may use any number of well-known techniques for interconnecting such units. In one embodiment, coherency is maintained between one or more cache units 8606 and cores 8602-A-N.

In some embodiments, one or more of the cores 8602A-N are capable of multithreading. The system agent 8610 includes those components coordinating and operating cores 8602A-N. The system agent unit 8610 may include for example a power control unit (PCU) and a display unit. The PCU may be or include logic and components needed for regulating the power state of the cores 8602A-N and the integrated graphics logic 8608. The display unit is for driving one or more externally connected displays.

The cores 8602A-N may be homogenous or heterogeneous in terms of architecture instruction set; that is, two or more of the cores 8602A-N may be capable of execution the same instruction set, while others may be capable of executing only a subset of that instruction set or a different instruction set.

D. Exemplary Computer Architectures

FIGS. 87-90 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 87:
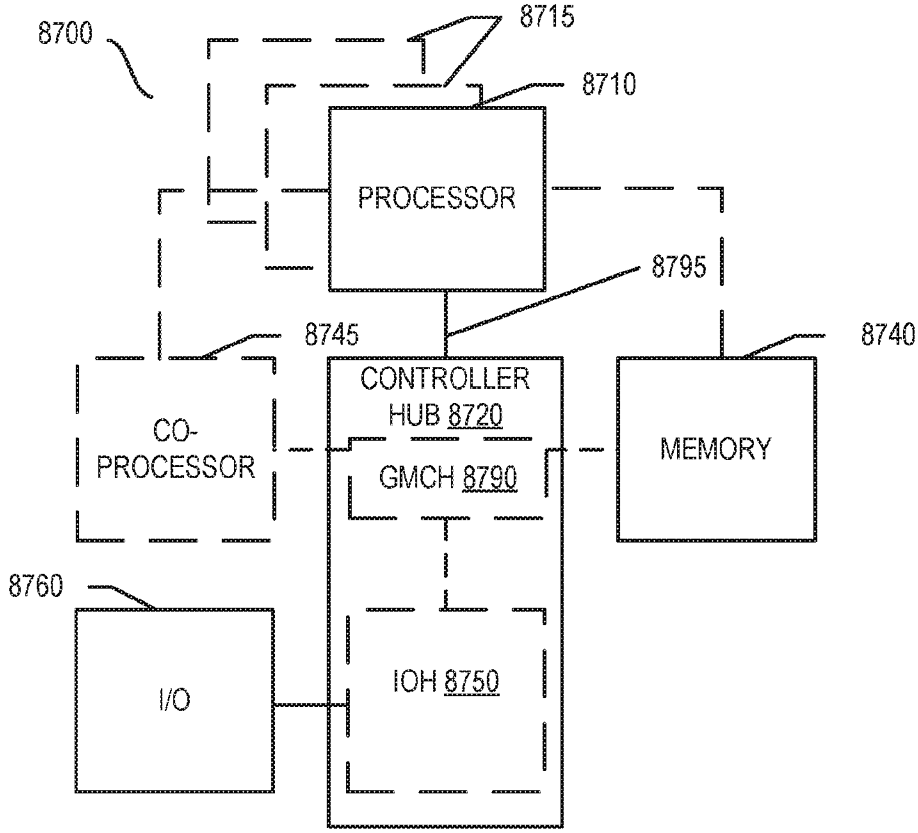
FIGS. 87-90 are block diagrams of exemplary computer architectures.

Referring now to FIG. 87, shown is a block diagram of a system 8700 in accordance with one embodiment of the present invention. The system 8700 may include one or more processors 8710, 8715, which are coupled to a controller hub 8720. In one embodiment, the controller hub 8720 includes a graphics memory controller hub (GMCH) 8790 and an Input/Output Hub (IOH) 8750 (which may be on separate chips); the GMCH 8790 includes memory and graphics controllers to which are coupled memory 8740 and a coprocessor 8745; the IOH 8750 is couples input/output (I/O) devices 8760 to the GMCH 8790. Alternatively, one or both of the memory and graphics controllers are integrated within the processor (as described herein), the memory 8740 and the coprocessor 8745 are coupled directly to the processor 8710, and the controller hub 8720 in a single chip with the IOH 8750.

The optional nature of additional processors 8715 is denoted in FIG. 87 with broken lines. Each processor 8710, 8715 may include one or more of the processing cores described herein and may be some version of the processor 8600.

The memory 8740 may be, for example, dynamic random access memory (DRAM), phase change memory (PCM), or a combination of the two. For at least one embodiment, the controller hub 8720 communicates with the processor(s) 8710, 8715 via a multi-drop bus, such as a frontside bus (FSB), point-to-point interface, or similar connection 8795.

In one embodiment, the coprocessor 8745 is a special-purpose processor, such as, for example, a high-throughput MIC processor, a network or communication processor, compression engine, graphics processor, GPGPU, embedded processor, or the like. In one embodiment, controller hub 8720 may include an integrated graphics accelerator.

There can be a variety of differences between the physical resources 8710, 87155 in terms of a spectrum of metrics of merit including architectural, microarchitectural, thermal, power consumption characteristics, and the like.

In one embodiment, the processor 8710 executes instructions that control data processing operations of a general type. Embedded within the instructions may be coprocessor instructions. The processor 8710 recognizes these coprocessor instructions as being of a type that should be executed by the attached coprocessor 8745. Accordingly, the processor 8710 issues these coprocessor instructions (or control signals representing coprocessor instructions) on a coprocessor bus or other interconnect, to coprocessor 8745. Coprocessor(s) 8745 accept and execute the received coprocessor instructions.

Figure 88:
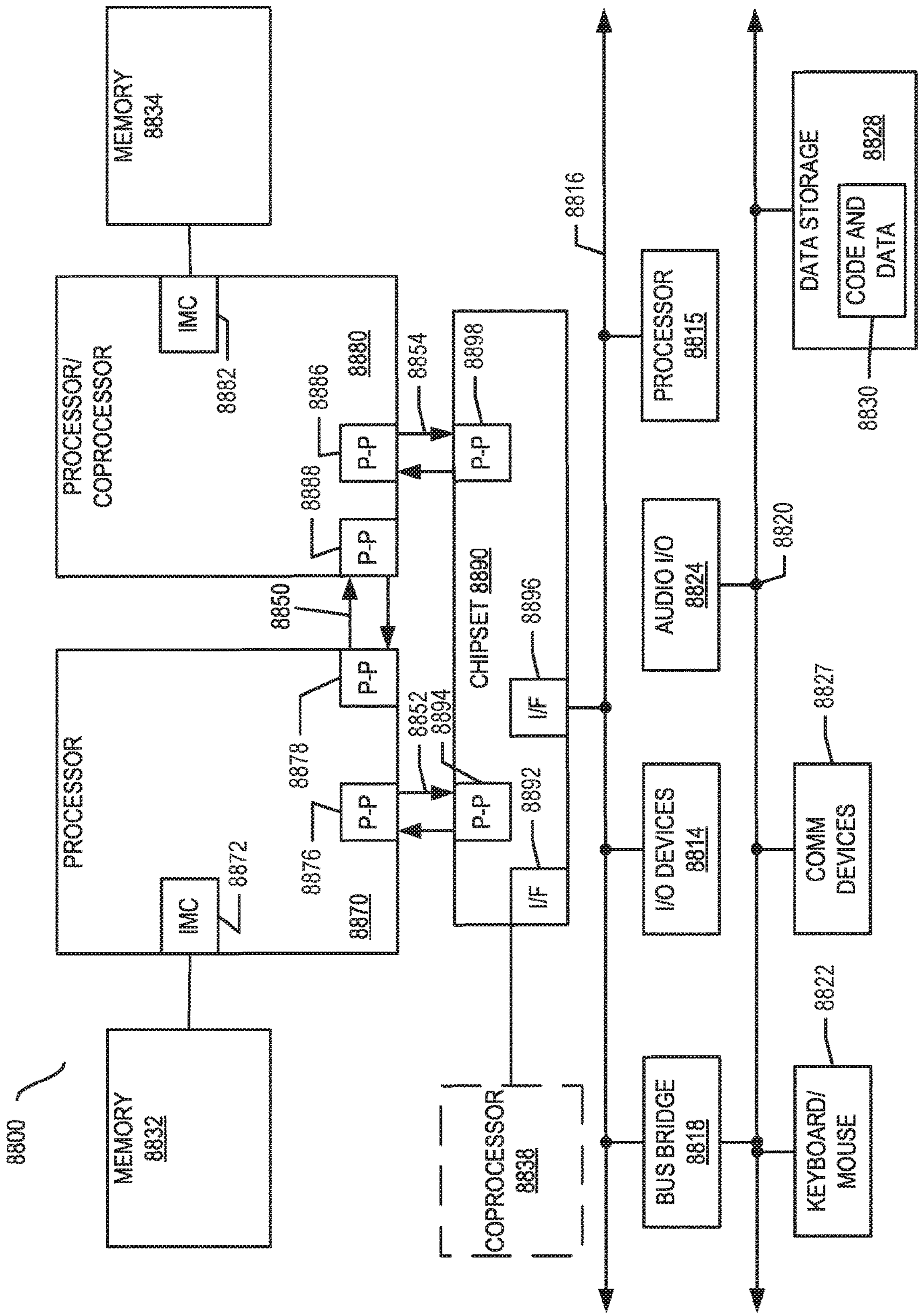

Referring now to FIG. 88, shown is a block diagram of a first more specific exemplary system 8800 in accordance with an embodiment of the present invention. As shown in FIG. 88, multiprocessor system 8800 is a point-to-point interconnect system, and includes a first processor 8870 and a second processor 8880 coupled via a point-to-point interconnect 8850. Each of processors 8870 and 8880 may be some version of the processor 8600. In one embodiment of the invention, processors 8870 and 8880 are respectively processors 8710 and 8715, while coprocessor 8838 is coprocessor 8745. In another embodiment, processors 8870 and 8880 are respectively processor 8710 coprocessor 8745.

Processors 8870 and 8880 are shown including integrated memory controller (IMC) units 8872 and 8882, respectively. Processor 8870 also includes as part of its bus controller units point-to-point (P-P) interfaces 8876 and 8878; similarly, second processor 8880 includes P-P interfaces 8886 and 8888. Processors 8870, 8880 may exchange information via a point-to-point (P-P) interface 8850 using P-P interface circuits 8878, 8888. As shown in FIG. 88, IMCs 8872 and 8882 couple the processors to respective memories, namely a memory 8832 and a memory 8834, which may be portions of main memory locally attached to the respective processors.

Processors 8870, 8880 may each exchange information with a chipset 8890 via individual P-P interfaces 8852, 8854 using point to point interface circuits 8876, 8894, 8886, 8898. Chipset 8890 may optionally exchange information with the coprocessor 8838 via a high-performance interface 8892. In one embodiment, the coprocessor 8838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 8890 may be coupled to a first bus 8816 via an interface 8896. In one embodiment, first bus 8816 may be a Peripheral Component Interconnect (PCI) bus, or a bus such as a PCI Express bus or another I/O interconnect bus, although the scope of the present invention is not so limited.

As shown in FIG. 88, various I/O devices 8814 may be coupled to first bus 8816, along with a bus bridge 8818 which couples first bus 8816 to a second bus 8820. In one embodiment, one or more additional processor(s) 8815, such as coprocessors, high-throughput MIC processors, GPGPU's, accelerators (such as, e.g., graphics accelerators or digital signal processing (DSP) units), field programmable gate arrays, or any other processor, are coupled to first bus 8816. In one embodiment, second bus 8820 may be a low pin count (LPC) bus. Various devices may be coupled to a second bus 8820 including, for example, a keyboard and/or mouse 8822, communication devices 8827 and a storage unit 8828 such as a disk drive or other mass storage device which may include instructions/code and data 8830, in one embodiment. Further, an audio I/O 8824 may be coupled to the second bus 8816. Note that other architectures are possible. For example, instead of the point-to-point architecture of FIG. 88, a system may implement a multi-drop bus or other such architecture.

Figure 89:
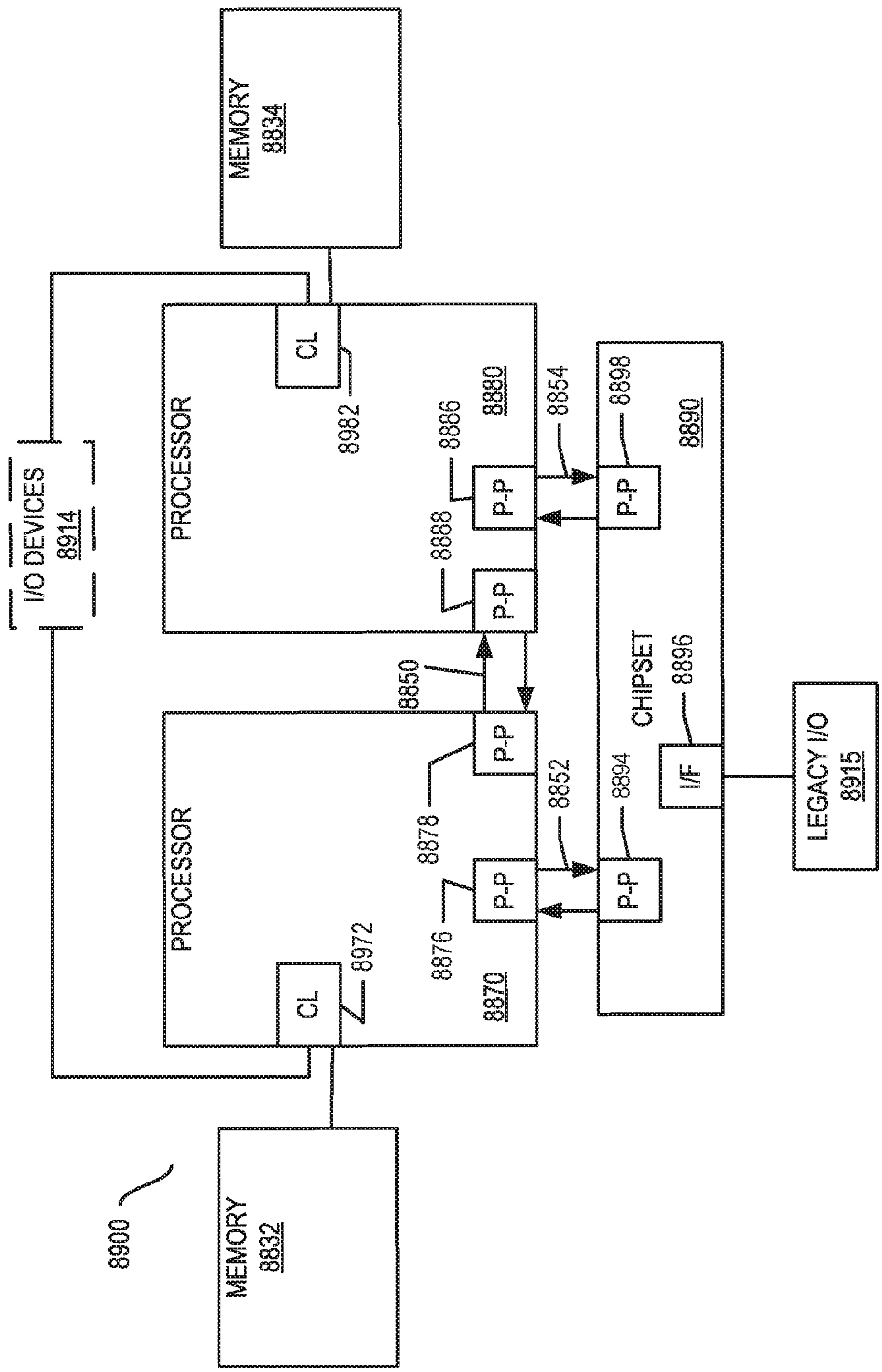

Referring now to FIG. 89, shown is a block diagram of a second more specific exemplary system 8900 in accordance with an embodiment of the present invention. Like elements in FIGS. 88 and 89 bear like reference numerals, and certain aspects of FIG. 88 have been omitted from FIG. 89 in order to avoid obscuring other aspects of FIG. 89.

FIG. 89 illustrates that the processors 8870, 8880 may include integrated memory and I/O control logic ("CL") 8972 and 8982, respectively. Thus, the CL 8972, 8982 include integrated memory controller units and include I/O control logic. FIG. 89 illustrates that not only are the memories 8832, 8834 coupled to the CL 8972, 8982, but also that I/O devices 8914 are also coupled to the control logic 8872, 8882. Legacy I/O devices 8915 are coupled to the chipset 8890.

Figure 90:
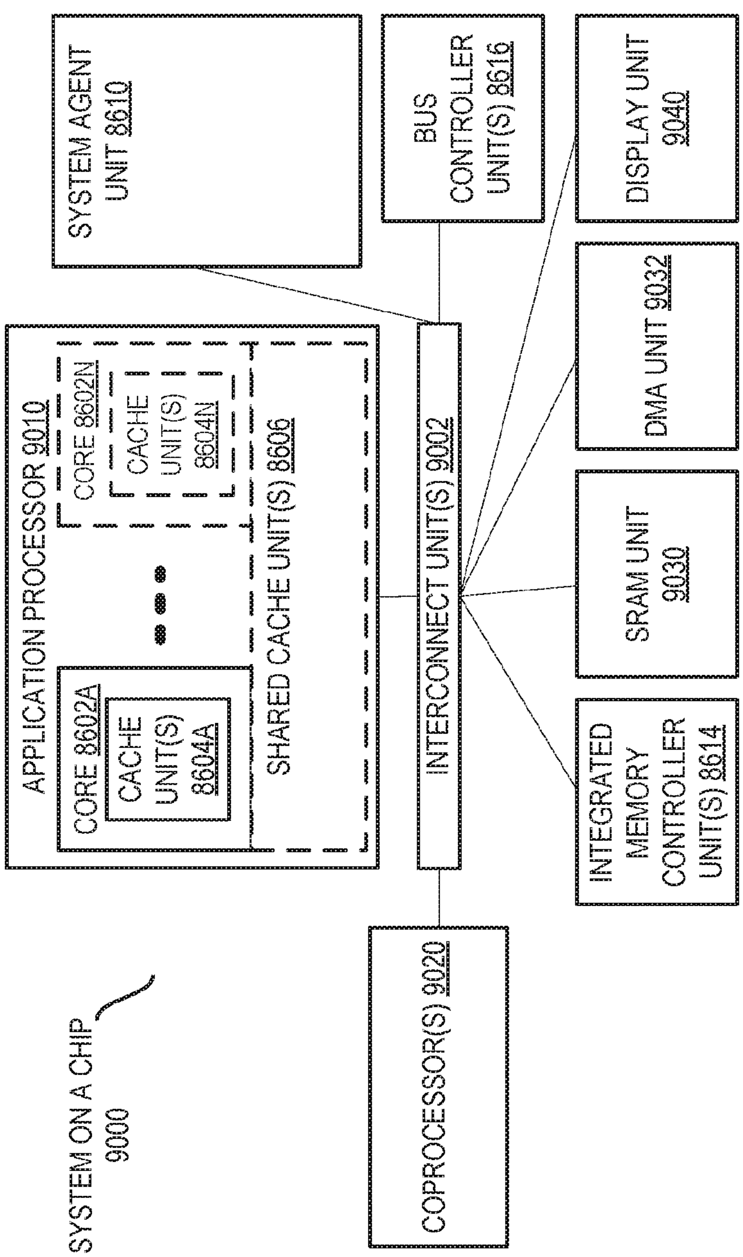

Referring now to FIG. 90, shown is a block diagram of a SoC 9000 in accordance with an embodiment of the present invention. Similar elements in FIG. 86 bear like reference numerals. Also, dashed lined boxes are optional features on more advanced SoCs. In FIG. 90, an interconnect unit(s) 9002 is coupled to: an application processor 9010 which includes a set of one or more cores 902A-N, cache units 8604A-N, and shared cache unit(s) 8606; a system agent unit 8610; a bus controller unit(s) 8616; an integrated memory controller unit(s) 8614; a set or one or more coprocessors 9020 which may include integrated graphics logic, an image processor, an audio processor, and a video processor; an static random access memory (SRAM) unit 9030; a direct memory access (DMA) unit 9032; and a display unit 9040 for coupling to one or more external displays. In one embodiment, the coprocessor(s) 9020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 8830 illustrated in FIG. 88, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

E. Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 91:
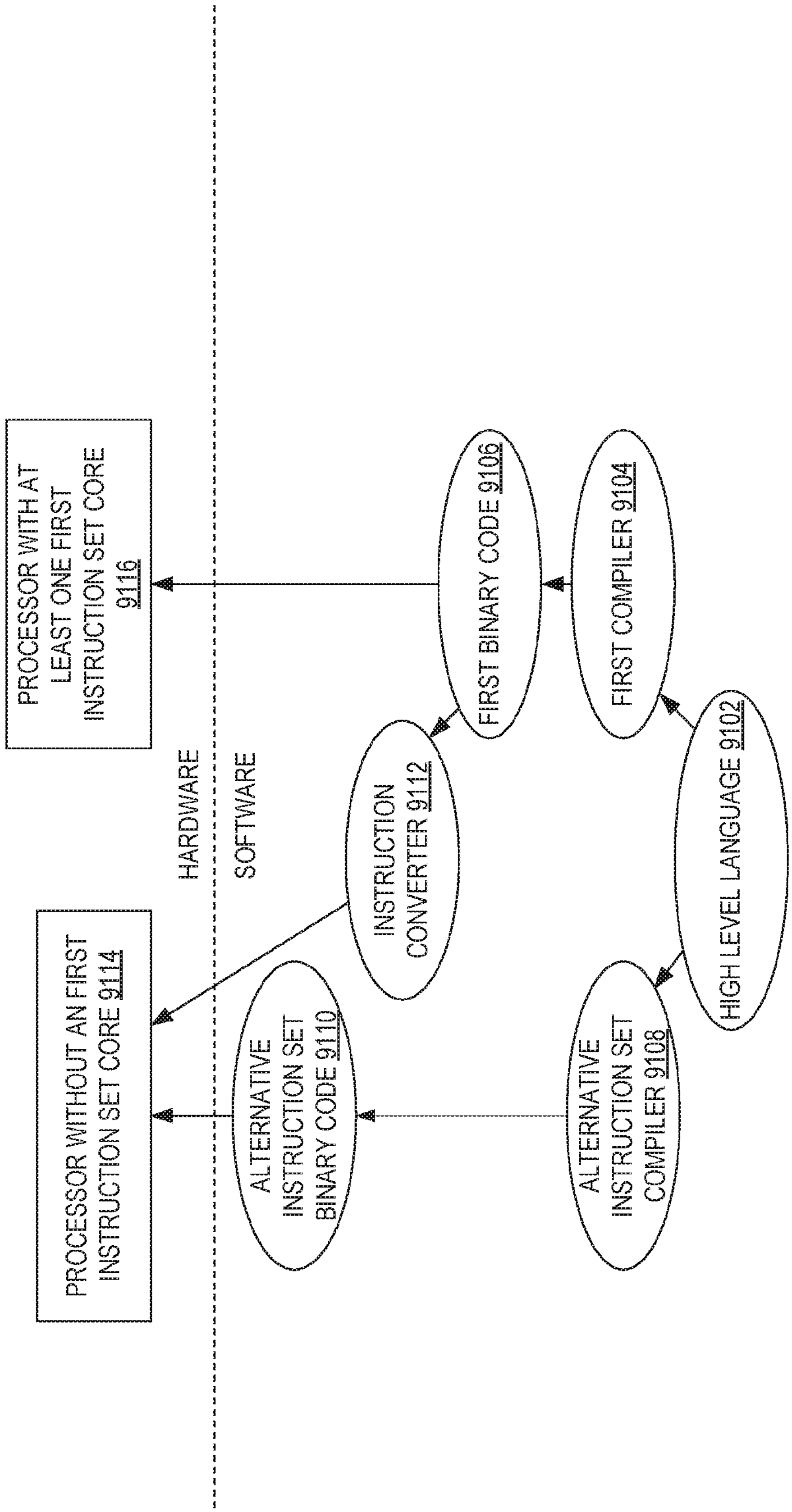
FIG. 91 is a block diagram contrasting the use of a software instruction converter to convert binary instructions in a source instruction set to binary instructions in a target instruction set according to embodiments of the invention.

FIG. 91 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 91 shows a program in a high level language 9102 may be compiled using a first compiler 9104 to generate a first binary code (e.g., x86) 9106 that may be natively executed by a processor with at least one first instruction set core 9116. In some embodiments, the processor with at least one first instruction set core 9116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 9104 represents a compiler that is operable to generate binary code of the first instruction set 9106 (e.g., object code) that can, with or without additional linkage processing, be executed on the processor with at least one first instruction set core 9116. Similarly, FIG. 91 shows the program in the high level language 9102 may be compiled using an alternative instruction set compiler 9108 to generate alternative instruction set binary code 9110 that may be natively executed by a processor without at least one first instruction set core 9114 (e.g., a processor with cores that execute the MIPS instruction set of MIPS Technologies of Sunnyvale, CA and/or that execute the ARM instruction set of ARM Holdings of Sunnyvale, CA). The instruction converter 9112 is used to convert the first binary code 9106 into code that may be natively executed by the processor without a first instruction set core 9114. This converted code is not likely to be the same as the alternative instruction set binary code 9110 because an instruction converter capable of this is difficult to make; however, the converted code will accomplish the general operation and be made up of instructions from the alternative instruction set. Thus, the instruction converter 9112 represents software, firmware, hardware, or a combination thereof that, through emulation, simulation or any other process, allows a processor or other electronic device that does not have a first instruction set processor or core to execute the first binary code 9106.

We claim:

1. An apparatus comprising:

matrix operations circuitry to execute one or more decoded matrix operation instructions on data stored in two-dimensional data structures;

storage to store the two-dimensional data structures according to a to be loaded configuration, the to be loaded configuration to at least independently describe a number of rows and a number of columns per two-dimensional data structure, wherein the configuration is to be loaded in response to execution of a single matrix usage configuration instruction, wherein the single matrix usage configuration instruction is to not load data to be stored in a two-dimensional data structure; and execution circuitry to execute the single matrix usage configuration instruction and to support a plurality of instructions to perform a computational operation after the execution of the single matrix usage configuration instruction.

2. The apparatus of claim 1, wherein the storage is a plurality of packed data registers and the two-dimensional data structures are overlaid on at least a subset of two of the plurality of packed data registers.

3. The apparatus of claim 1, wherein the storage is a plurality of packed data registers and memory, and the two-dimensional data structures are overlaid on at least a subset of two of the plurality of packed data registers and memory.

4. The apparatus of claim 1, wherein the matrix operations circuitry is a plurality of chained fused multiply accumulate circuits.

5. The apparatus of claim 4, wherein each of the chained fused multiply accumulate circuits is to include storage for a portion of a two-dimensional data structure that the fused multiply accumulate circuit is to operate on.

6. The apparatus of claim 1, wherein the matrix operations circuitry supports element matrix multiply, subtract, and add instructions.

7. The apparatus of claim 1, wherein the matrix operations circuitry supports dot product and multiply accumulate operations.

8. The apparatus of claim 1, wherein the matrix operations circuitry supports matrix transpose and diagonal operations.

9. A system comprising:

a host processor including execution circuitry to support a single matrix usage configuration instruction to configure a matrix operations accelerator and a plurality of instructions to cause the matrix operations accelerator to perform a computational operation after the matrix operations accelerator has been configured by an execution of the single matrix usage configuration instruction; and the matrix operations accelerator coupled to the host processor, wherein the matrix operations accelerator is to perform matrix operations on two-dimensional data structures using a computational grid based on commands received from the host processor, wherein the two-dimensional data structures are to be configured according to a to be loaded configuration, the to be loaded configuration to at least describe a number of rows and a number of columns per two-dimensional data structure of the two-dimensional data structures, wherein the configuration is to be loaded in response to the single matrix usage configuration instruction and the single matrix usage configuration instruction is to not load data to be stored in a two-dimensional data structure.

10. The system of claim 9, wherein the matrix operations accelerator further comprises a plurality of data buffers to buffer matrix data in two-dimensional data structures.

11. The system of claim 10, wherein the computational grid is to house at least one of the buffered matrix data from the plurality of data buffers during a matrix manipulation operation.

12. The system of claim 10, wherein the data buffers are a plurality of registers.

13. The system of claim 12, wherein the plurality of registers are a plurality of packed data registers and the two-dimensional data structures are overlaid on at least two of the plurality of packed data registers.

14. The system of claim 12, wherein the two-dimensional data structures are to be configured to use a plurality of packed data registers and memory.

15. The system of claim 9, wherein the matrix operations accelerator comprises a plurality of chained fused multiply add circuits.

16. The system of claim 15, wherein each of the chained fused multiply add circuits is to include storage for a portion of a two-dimensional data structure that the fused multiply add circuit is to operate on.

17. The system of claim 9, further comprising a coherent memory interface coupled to the matrix operations accelerator and host processor to provide access to shared memory between the host processor and matrix operations accelerator.

18. The apparatus of claim 1, wherein the to be loaded configuration is to be loaded in response to a tile configuration instruction.

19. The apparatus of claim 1, wherein the to be loaded configuration is to include restart information.

* * * * *